US011319098B2

(12) United States Patent
Vassberg et al.

(10) Patent No.: US 11,319,098 B2
(45) Date of Patent: May 3, 2022

(54) VACUUM VOLUME REDUCTION SYSTEM AND METHOD WITH FLUID FILL ASSEMBLY FOR A VACUUM TUBE VEHICLE STATION

(71) Applicant: The Boeing Company, Chicago, IL (US)

(72) Inventors: John C. Vassberg, Long Beach, CA (US); Robert Erik Grip, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/994,948

(22) Filed: Aug. 17, 2020

(65) Prior Publication Data

US 2020/0377247 A1    Dec. 3, 2020

Related U.S. Application Data

(60) Continuation-in-part of application No. 16/286,568, filed on Feb. 26, 2019, now Pat. No. 10,745,160,
(Continued)

(51) Int. Cl.
*B61B 13/10* (2006.01)
*B65B 31/04* (2006.01)
(Continued)

(52) U.S. Cl.
CPC .......... *B65B 31/04* (2013.01); *B01D 21/2494* (2013.01); *B61B 13/10* (2013.01);
(Continued)

(58) Field of Classification Search
CPC ...................................................... B61B 13/10
(Continued)

(56) References Cited

U.S. PATENT DOCUMENTS

RE12,700 E * 10/1907 Zehden .......................... 310/13
3,158,765 A * 11/1964 Geoffrey ................. B60L 13/04
310/12.09
(Continued)

OTHER PUBLICATIONS

Wikipedia Article on Hyperloop, 13 web pages, from website web address at https://en.wikipedia.org/wiki/Hyperloop, as of Mar. 31, 2017.
(Continued)

*Primary Examiner* — Joseph A Dillon, Jr.

(57) ABSTRACT

There is provided a vacuum volume reduction system having a volume reduction assembly of a fluid fill assembly coupled to a station wall of a vacuum tube vehicle station, to reduce a volume, under vacuum, in the vacuum tube vehicle station, when a vacuum transport tube vehicle is positioned in the volume at the vacuum tube vehicle station. The fluid fill assembly includes one or more containers, each containing a fluid, and fluid transport member(s), to transport the fluid from the container(s) to one or more enclosed volume portions formed between an exterior of the vacuum transport tube vehicle and an interior of the station wall. The fluid fill assembly further includes one or more fluid pump assemblies attached to the fluid transport member(s), and a control and power system. The vacuum volume reduction system further includes recessed area(s), a vent-to-vacuum assembly coupled to the recessed area(s), and seal elements.

25 Claims, 57 Drawing Sheets

Related U.S. Application Data which is a division of application No. 15/476,963, filed on Mar. 31, 2017, now Pat. No. 10,220,972.

(51) Int. Cl.

| | |
|---|---|
| *G10H 1/46* | (2006.01) |
| *B65G 51/26* | (2006.01) |
| *B65D 19/36* | (2006.01) |
| *B65D 81/20* | (2006.01) |
| *G21F 5/00* | (2006.01) |
| *G21F 5/14* | (2006.01) |
| *B01D 21/24* | (2006.01) |
| *B29L 31/00* | (2006.01) |

(52) U.S. Cl.
CPC ......... *B65D 19/36* (2013.01); *B65D 81/2007* (2013.01); *B65G 51/26* (2013.01); *G10H 1/46* (2013.01); *G21F 5/00* (2013.01); *G21F 5/14* (2013.01); *B29L 2031/712* (2013.01)

(58) Field of Classification Search
USPC ........................................................ 104/138.1
See application file for complete search history.

(56) References Cited

U.S. PATENT DOCUMENTS

| | | | | |
|---|---|---|---|---|
| 3,787,006 A * | 1/1974 | Coanda | ................ | B61B 13/122 406/19 |
| 3,797,405 A * | 3/1974 | Carstens | ................ | B65G 51/04 406/105 |
| 3,870,250 A * | 3/1975 | Teodorescu | ............ | B65G 51/18 406/10 |
| 3,907,231 A * | 9/1975 | Kreiner | ................ | G01N 35/04 406/19 |
| 3,930,450 A * | 1/1976 | Symons | ................ | A63G 3/00 104/73 |
| 3,980,024 A * | 9/1976 | Futer | ................ | B61B 13/10 406/93 |
| 3,999,487 A * | 12/1976 | Valverde | ................ | B61B 13/10 104/138.1 |
| 4,023,500 A * | 5/1977 | Diggs | ................ | B61B 13/10 104/138.1 |
| 4,078,498 A * | 3/1978 | Futer | ................ | B65G 51/02 104/138.1 |
| 4,108,077 A * | 8/1978 | Laing | ................ | B61D 43/00 104/156 |
| 4,184,792 A * | 1/1980 | Turnbo | ................ | B61B 13/10 406/110 |
| 4,202,272 A * | 5/1980 | Teodorescu | ............ | B61B 13/10 104/135 |
| 4,529,335 A * | 7/1985 | Hilbert | ................ | B65G 51/36 406/1 |
| 5,117,962 A * | 6/1992 | Tommarello | .......... | H01J 9/2272 198/378 |
| 5,146,853 A * | 9/1992 | Suppes | ................ | B61B 13/12 104/138.2 |
| 5,460,098 A * | 10/1995 | Jackson | ................ | B60V 3/04 104/124 |
| 5,513,573 A * | 5/1996 | Sutton | ................ | B61B 13/10 104/138.1 |
| 5,653,175 A * | 8/1997 | Milligan | ................ | B60L 13/04 104/138.1 |
| 5,669,310 A * | 9/1997 | Powell | ................ | B60L 13/04 104/281 |
| 5,720,174 A * | 2/1998 | Gorinas | ................ | F04B 37/06 62/55.5 |
| 5,865,123 A * | 2/1999 | Powell | ................ | B60L 13/08 104/281 |
| 5,950,543 A * | 9/1999 | Oster | ................ | B61B 13/10 104/138.1 |
| 6,178,892 B1 * | 1/2001 | Harding | ................ | B60V 3/04 104/119 |
| 6,374,746 B1 * | 4/2002 | Fiske | ................ | B61B 13/08 104/138.1 |
| 6,393,994 B1 * | 5/2002 | Azimi | ................ | B61B 13/10 104/138.1 |
| 8,146,508 B2 * | 4/2012 | Flynn | ................ | B61B 13/10 104/138.1 |
| 8,468,949 B2 * | 6/2013 | Kwon | ................ | B61B 13/08 104/155 |
| 9,228,298 B2 * | 1/2016 | Oster | ................ | E01B 25/34 |
| 9,290,187 B2 * | 3/2016 | Dalrymple | ............ | B61B 13/122 |
| 9,291,055 B2 * | 3/2016 | Kim | ................ | E21D 9/14 |
| 10,000,892 B2 * | 6/2018 | Oster | ................ | B61B 13/10 |
| 10,266,184 B2 * | 4/2019 | Grip | ................ | B61B 13/10 |
| 10,308,133 B2 * | 6/2019 | Kley | ................ | G06Q 50/165 |
| 10,538,254 B2 * | 1/2020 | Grip | ................ | B61B 13/122 |
| 10,941,886 B2 * | 3/2021 | Hilgers | ................ | B61B 13/10 |
| 11,091,175 B2 * | 8/2021 | Grip | ................ | F04B 49/065 |
| 11,091,176 B2 * | 8/2021 | Grip | ................ | B61B 13/10 |
| 11,130,504 B2 * | 9/2021 | Coester | ................ | B61B 13/122 |
| 2004/0112247 A1 * | 6/2004 | Powell | ................ | H02J 15/00 105/35 |
| 2004/0244635 A1 * | 12/2004 | Schlienger | ............ | B61B 13/122 104/138.1 |
| 2011/0079166 A1 * | 4/2011 | Popa-Simil | ............ | B60L 50/20 105/1.4 |
| 2011/0283914 A1 * | 11/2011 | Kwon | ................ | B61B 13/10 104/138.1 |
| 2013/0036935 A1 * | 2/2013 | Bauer | ................ | E01B 25/32 104/286 |
| 2013/0276665 A1 * | 10/2013 | Dalrymple | ............ | B61B 13/08 104/23.1 |
| 2014/0261054 A1 * | 9/2014 | Oster | ................ | B61B 13/08 104/130.02 |
| 2015/0110561 A1 * | 4/2015 | Kim | ................ | E21F 1/003 405/132 |
| 2016/0121908 A1 * | 5/2016 | Ahmad | ................ | B65G 51/02 406/50 |
| 2016/0325759 A1 * | 11/2016 | Pirli | ................ | B61B 1/02 |
| 2017/0334312 A1 * | 11/2017 | Zhou | ................ | E01B 25/30 |
| 2018/0281820 A1 * | 10/2018 | Grip | ................ | B61B 13/10 |
| 2019/0185022 A1 * | 6/2019 | Grip | ................ | B61B 13/10 |
| 2020/0122748 A1 * | 4/2020 | Grip | ................ | F04B 49/065 |
| 2020/0189620 A1 * | 6/2020 | Bahman | ................ | B61B 1/02 |
| 2020/0239036 A1 * | 7/2020 | Lee | ................ | B61B 13/08 |
| 2020/0239037 A1 * | 7/2020 | Grip | ................ | B61B 13/10 |
| 2021/0040851 A1 * | 2/2021 | Mielczarek | ............ | B61K 13/00 |
| 2021/0291880 A1 * | 9/2021 | Wyman | ................ | E21D 11/20 |
| 2021/0347391 A1 * | 11/2021 | Mancuso | ................ | B61B 13/10 |

OTHER PUBLICATIONS

Wikipedia Article on Maglev, 27 web pages, from website web address at https://en.wikipedia.org/wiki/Maglev, as of Mar. 31, 2017.

\* cited by examiner

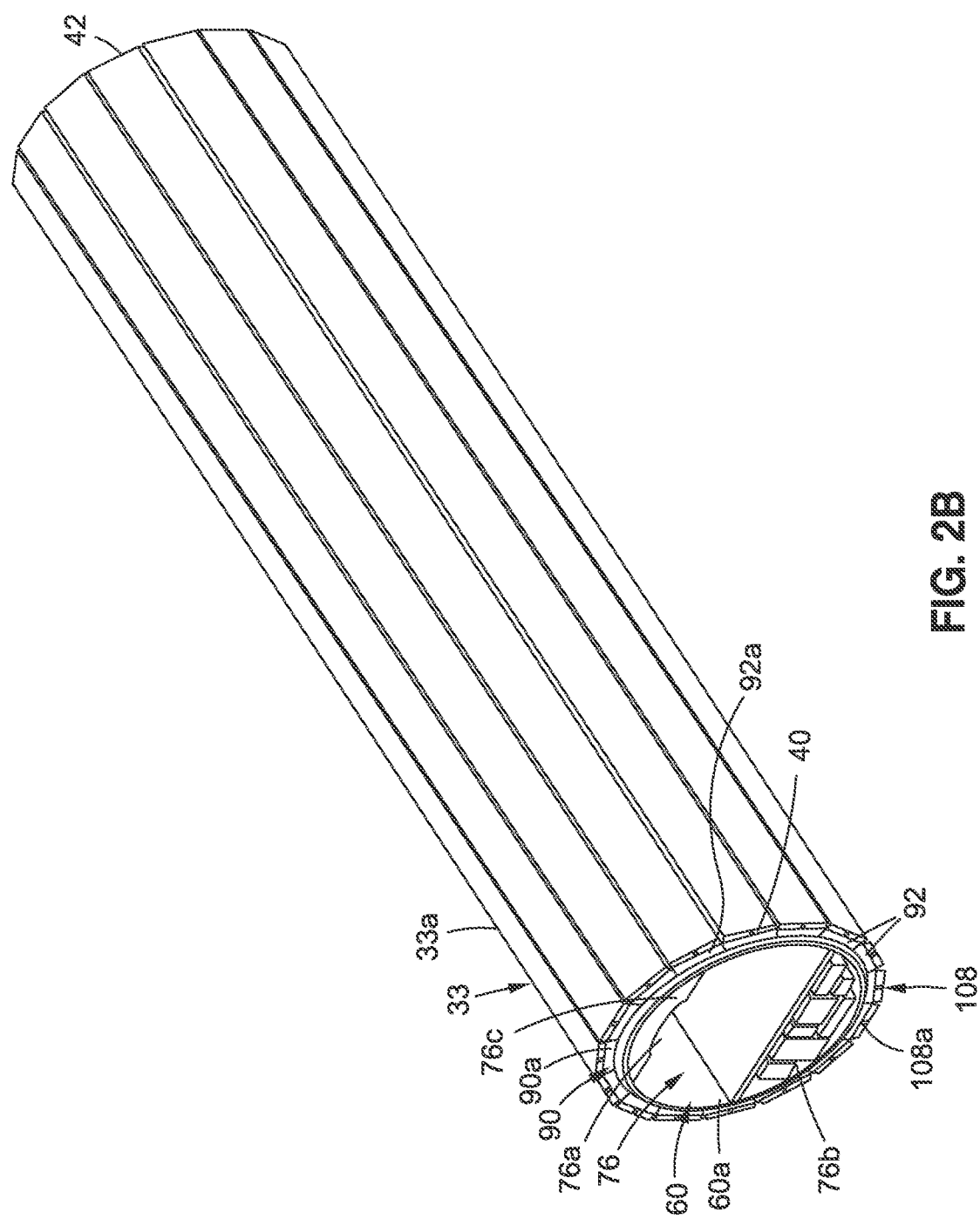

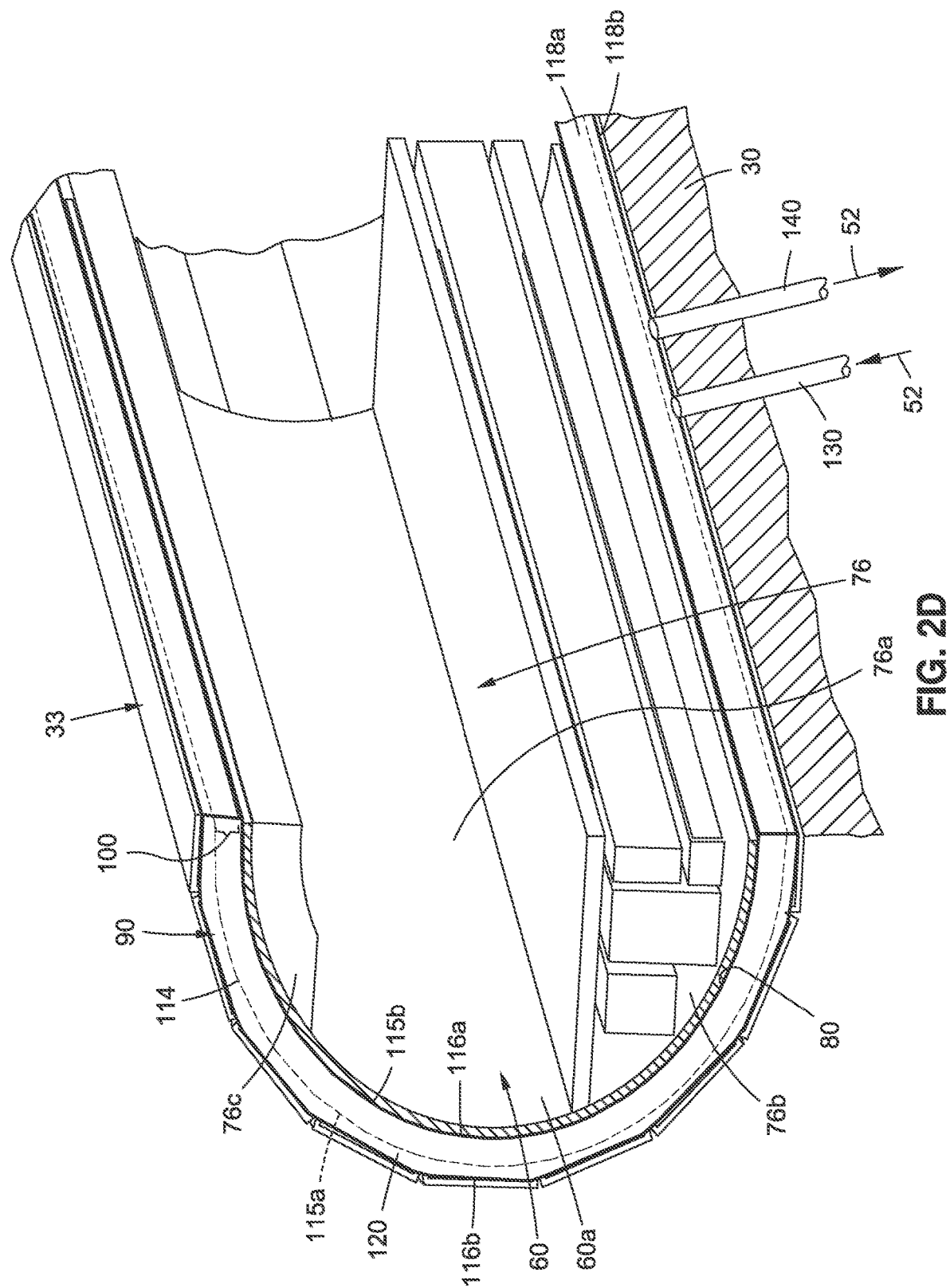

VACUUM VOLUME REDUCTION SYSTEM 10

VACUUM TUBE VEHICLE STATION 12

| STATION WALL 30 | STATION VACUUM TUBE 33 | MODULAR STATION VACUUM TUBE 33a |
| | | BUILT-IN STATION VACUUM TUBE 33b |

| PLURALITY OF CAVITIES 40 | SHAPE 104 |

| STATION DOOR(S) 68 | STATION PASSAGEWAY(S) 70 | VACUUM TUBE(S) 16 |

VACUUM TRANSPORT TUBE VEHICLE 60

| INTERIOR 76 | CABIN 76a | CARGO COMPARTMENT 76b | CEILING 76c | OUTER VEHICLE WALL 78 |

| VEHICLE OUTER SURFACE 80 | CONSTANT RADIUS PORTION 74 | CONTOUR 75 |

| VEHICLE POWER AND CONTROL SYSTEM 88 | MAG-LEV PROPULSION SYSTEM 24 |

| VEHICLE DOOR(S) 66 | DOOR SEAL(S) 122 | PERIMETER 125 |

| DOOR CAVITY 132 | DOOR SEAL CONTROL SYSTEM 124 | PRESSURE SEAL(S) 82 |

VOLUME REDUCTION ASSEMBLY 90

| MODULAR TUBE VOLUME REDUCTION ASSEMBLY 90a | SEAL 91 | SEALED ENGAGEMENT 91a |

| PLURALITY OF BLOCKS 92 | GAP 100 | GAP VOLUME 100a | GAP WIDTH 100b | LONGITUDINAL GAP(S) 160 |

| EXTENDABLE BLOCKS 92b | EXTENDABLE PORTION 99 |

| COMPLIANT MATERIAL 102 | ONE-PIECE MONOLITHIC STRUCTURE 106 | SEAM(S) 161 |

| CONTROL SYSTEM 108 | PNEUMATIC ACTUATOR CONTROL SYS. 108b |

| MECHANICAL ACTUATOR CONTROL SYS. 108a | WORM GEARS 110 | SCISSOR JACKS 112 |

| HYDRAULIC ACTUATOR CONTROL SYS. 108c | ELECTRICAL ACTUATOR CONTROL SYS. 108d |

| INFLATABLE BLADDER 114 | BLADDER INNER SIDE 116a | BLADDER OUTER SIDE 116b |

| BLADDER INTERIOR 118a | BLADDER EXTERIOR 118b | BLADDER BODY 120 |

| AIR SUPPLY ASSEMBLY 130 | AIR PUMP 134 | AIR DUCT 136 | AIR SUPPLY CONTROL VALVES 138 |

| VENT-TO-VACUUM ASSEMBLY 140 | VACUUM PUMP 142 | VACUUM DUCT 144 |

| VACUUM VALVES 146 | VACUUM RESERVOIR 148 | VENTS 149 |

| DOOR CAVITY VOLUME REDUCTION SURFACE 150 | INFLATABLE DOOR BLADDER 152 | FORCE 157 |

| PUMPING RATE 158 | EVACUATION 166 | LEAKAGE 164 |

| VOLUME 50 | TUBE VOLUME 50a | DOOR CAVITY VOLUME 50b | STATION VOLUME 50c |

| REDUCED VOLUME 50d | DISPLACED VOLUME 50e |

| VACUUM 51 | DESIRED VACUUM QUALITY 51a |

| AIR 52 | AMBIENT AIR 52a | COMPRESSED AIR 52b |

FIG. 3

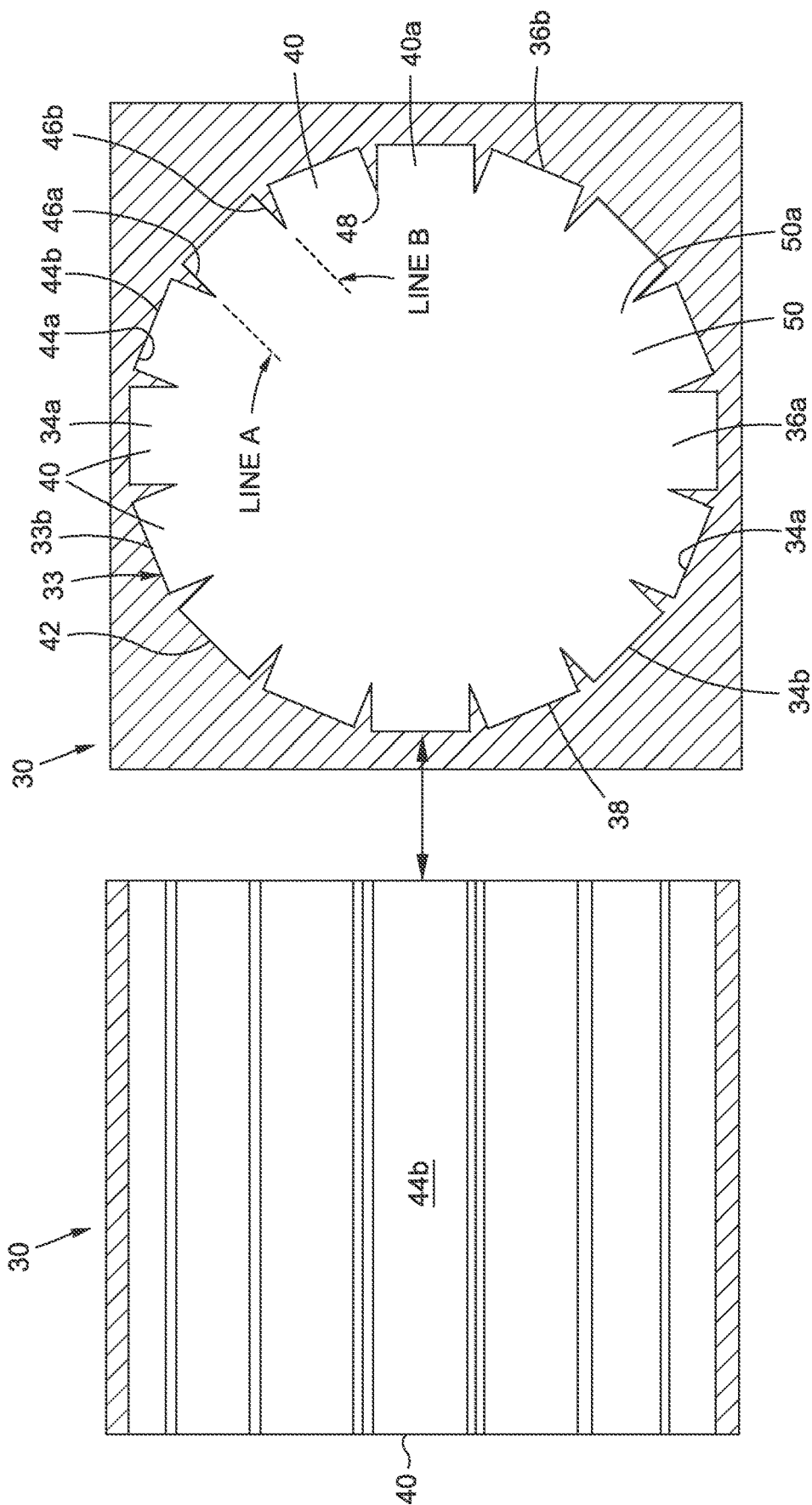

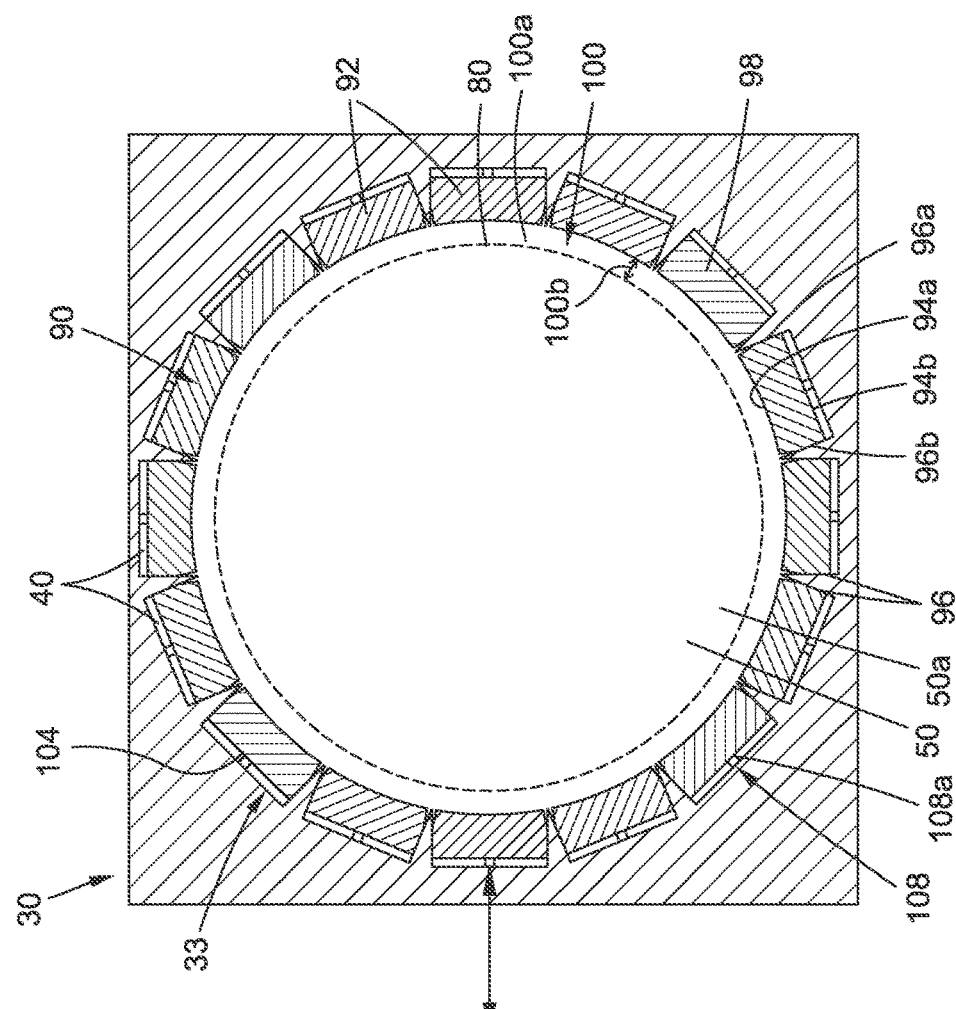
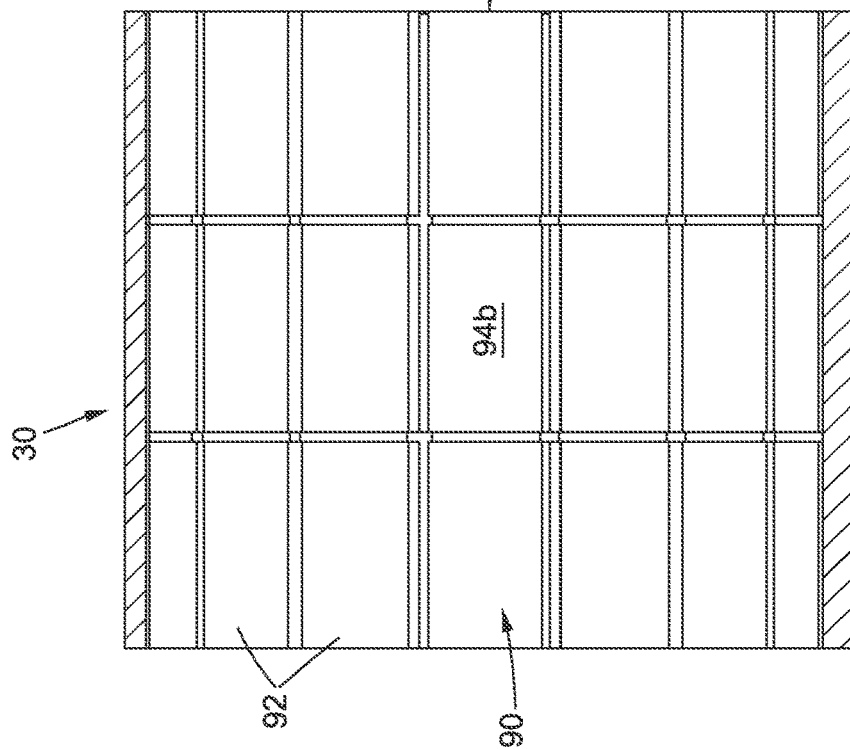
FIG. 5B
FIG. 5A

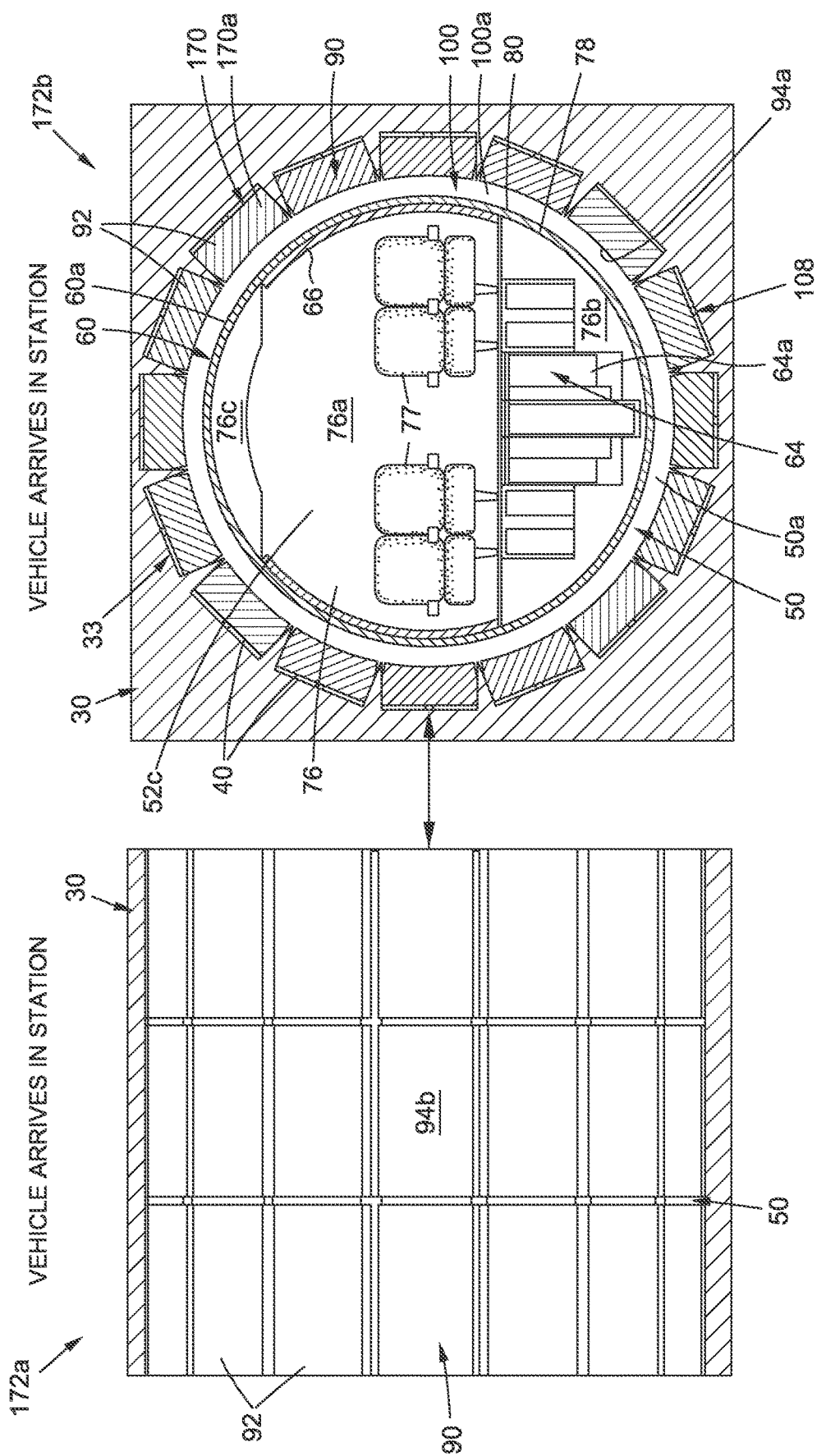

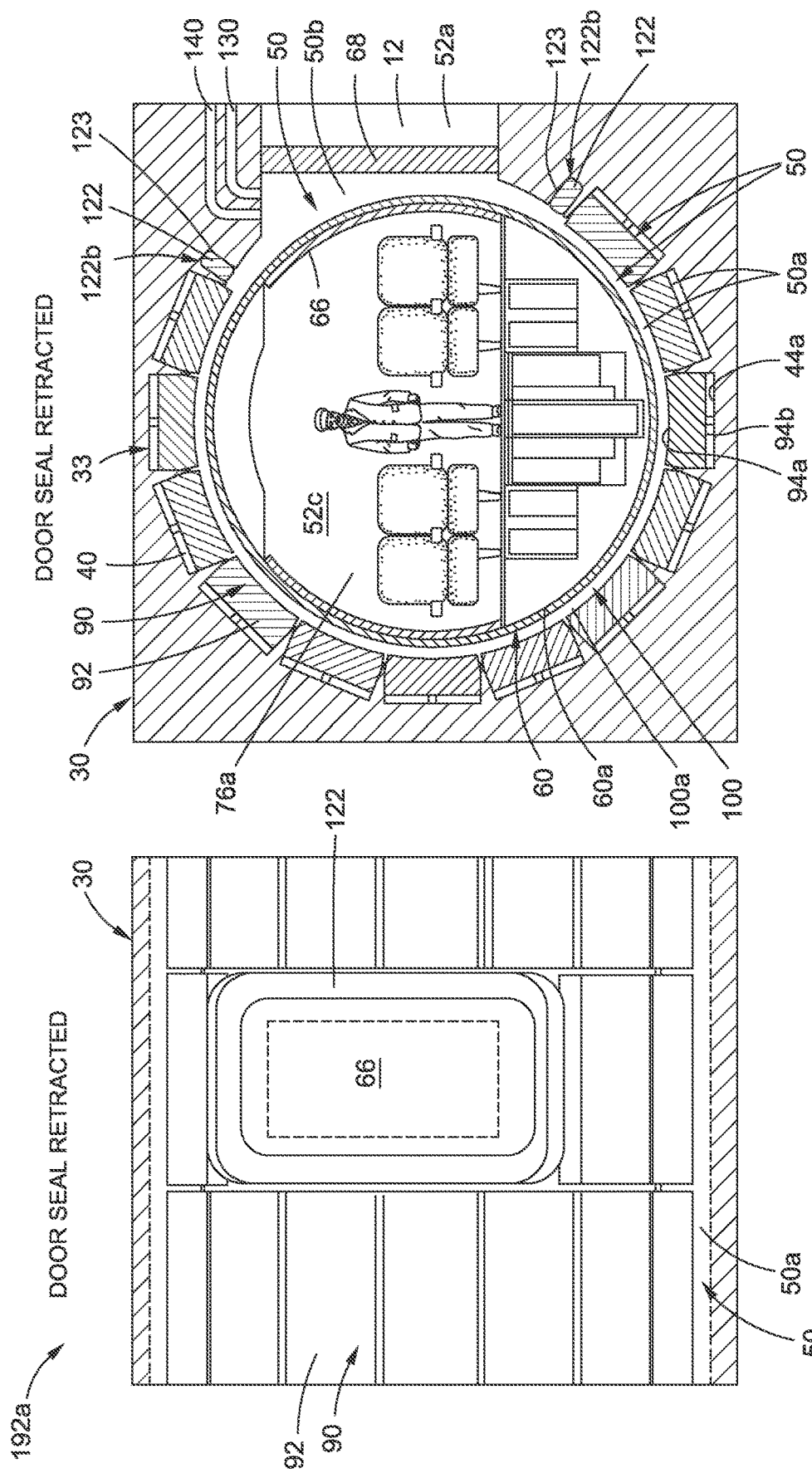

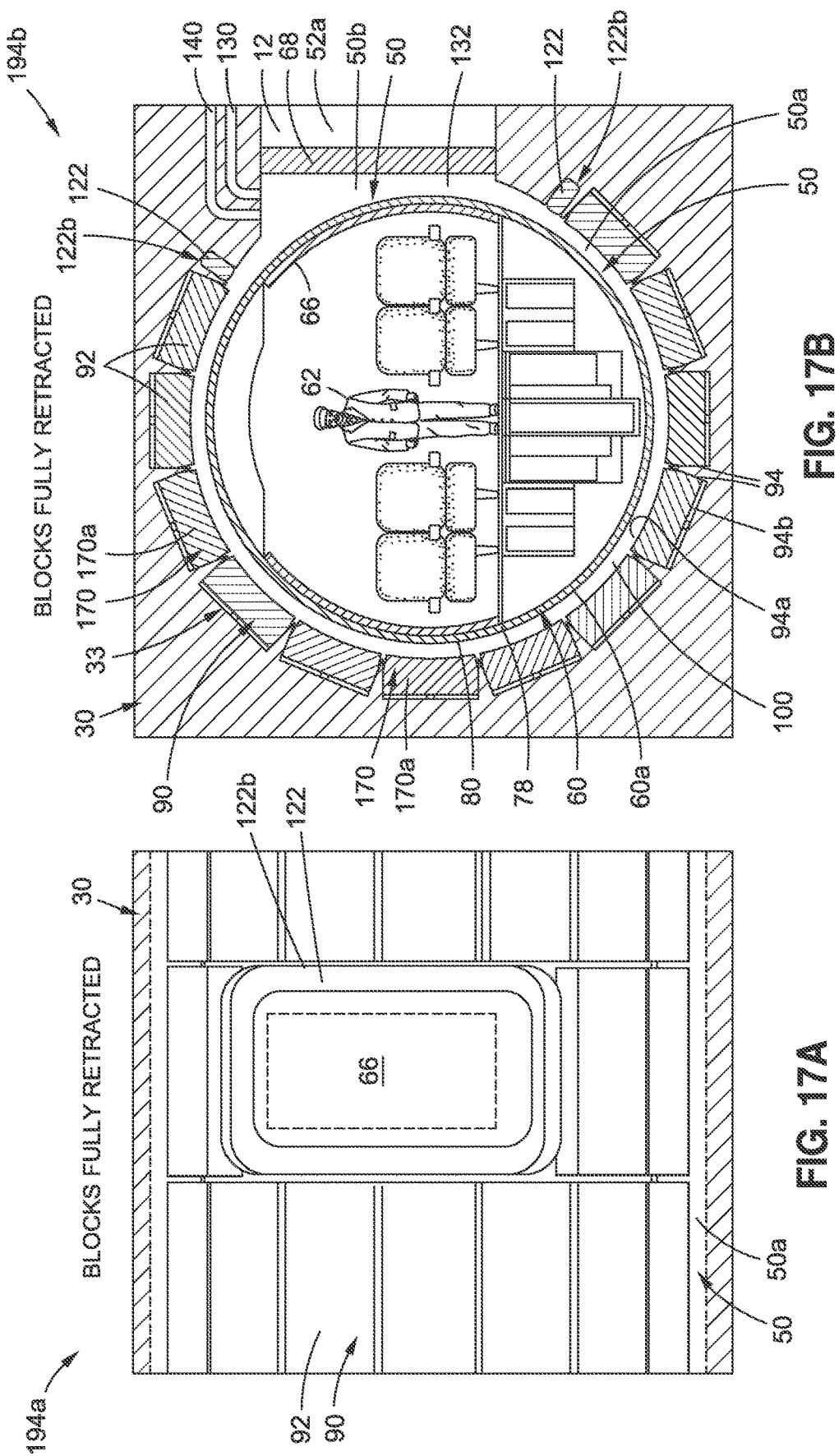

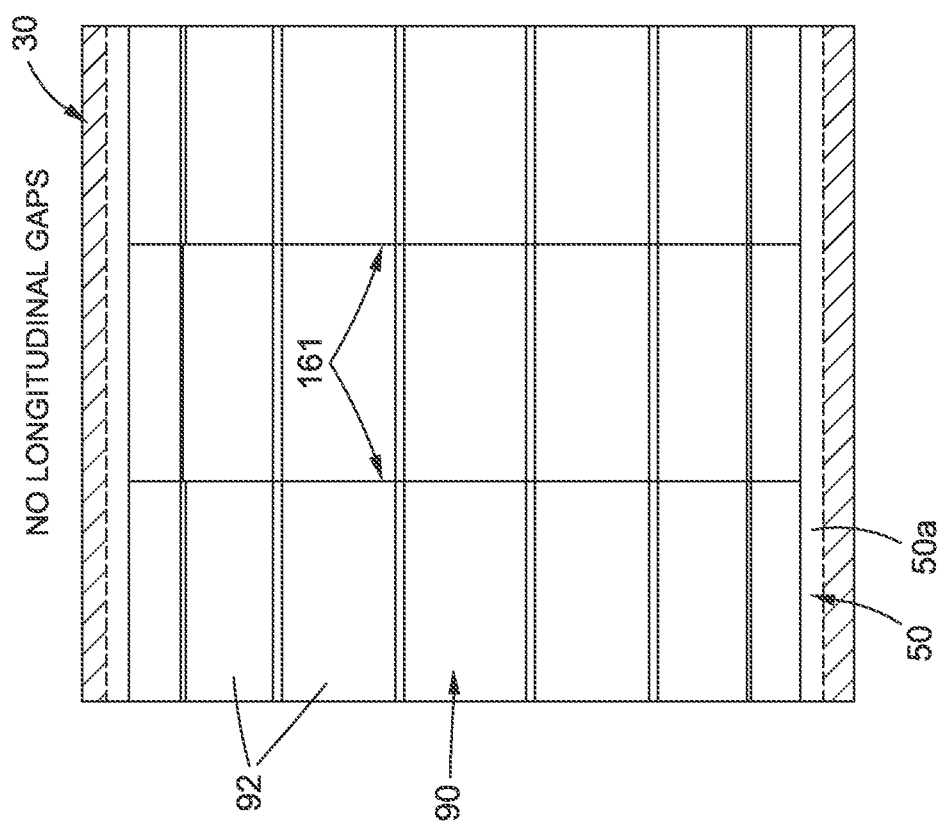

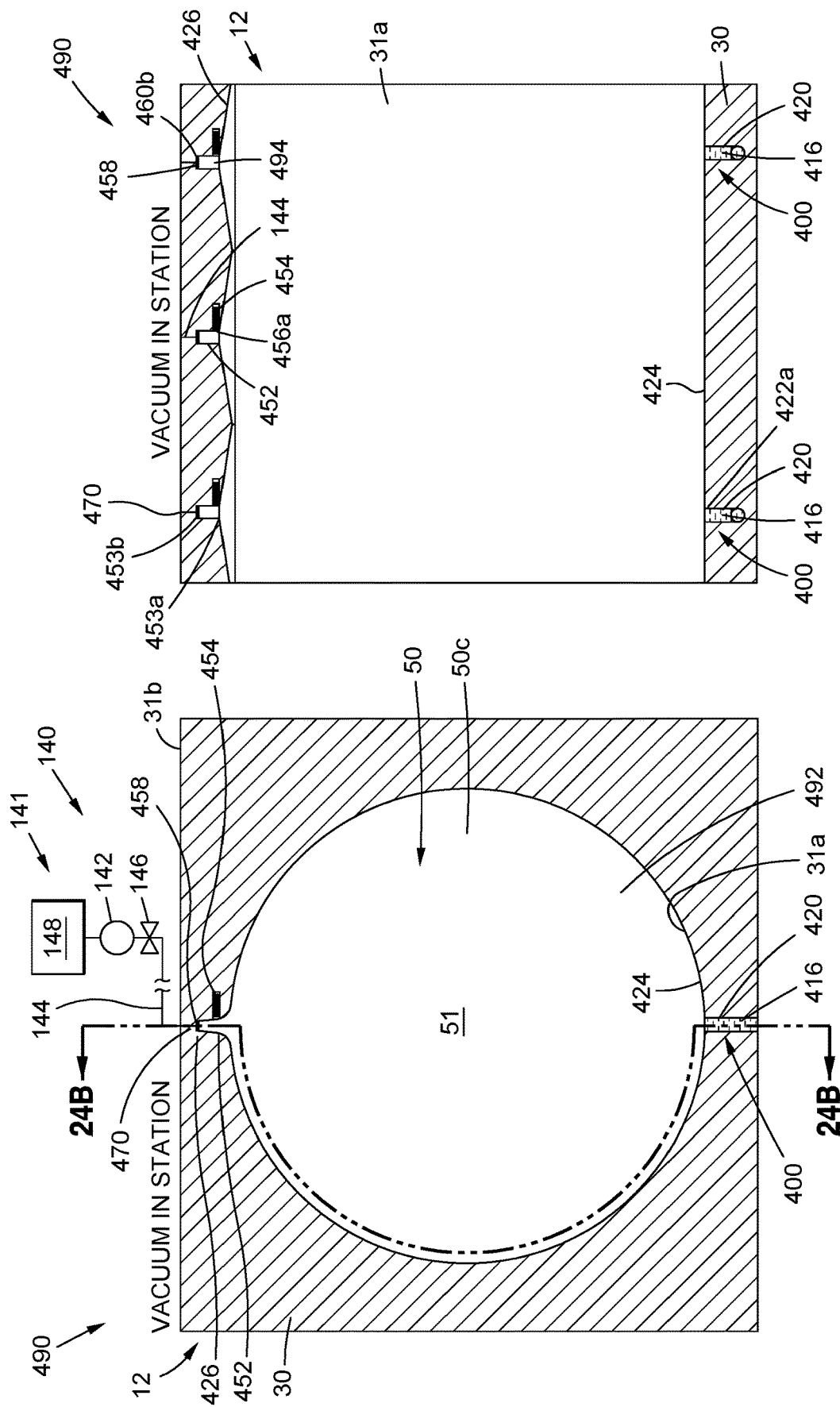

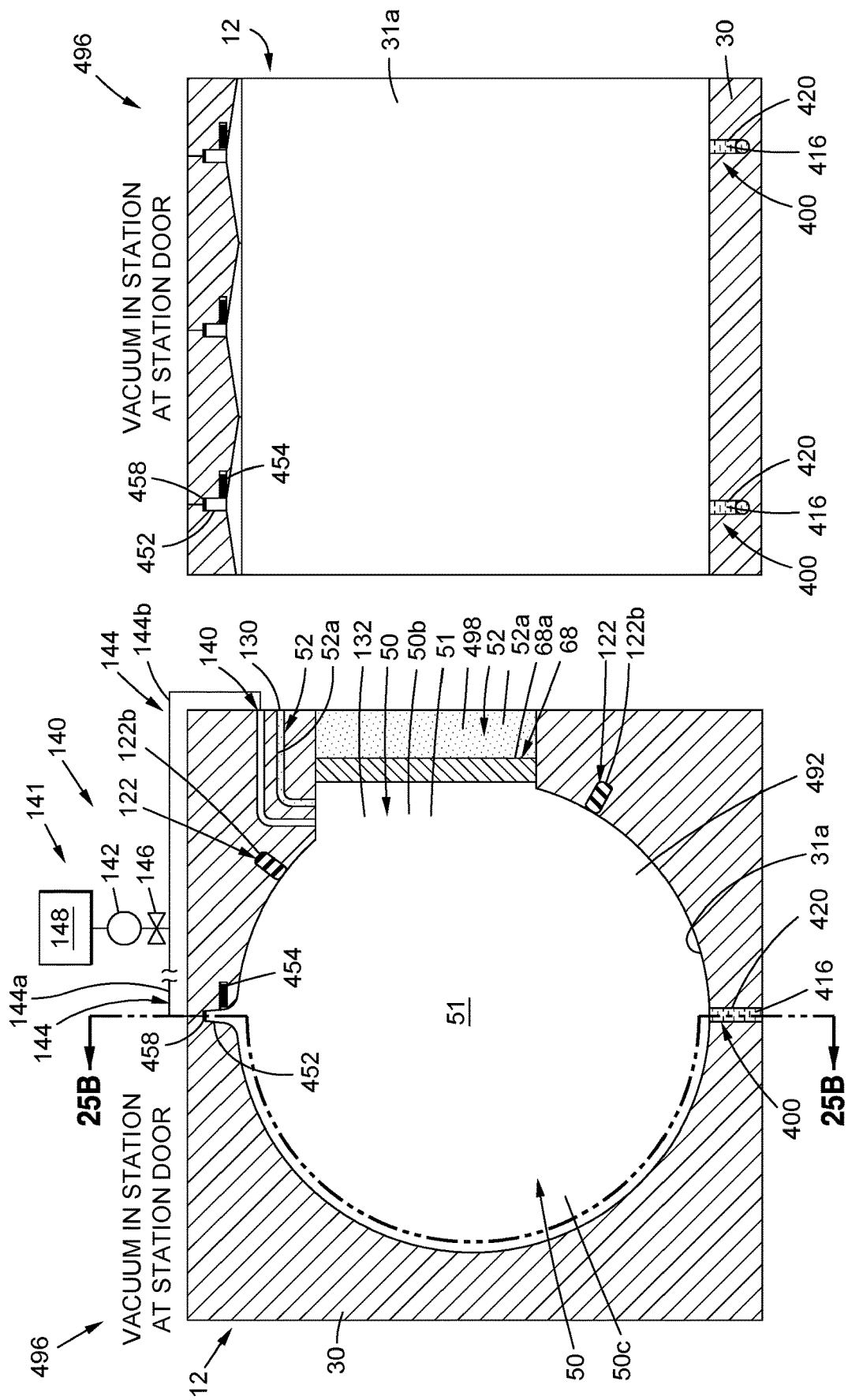

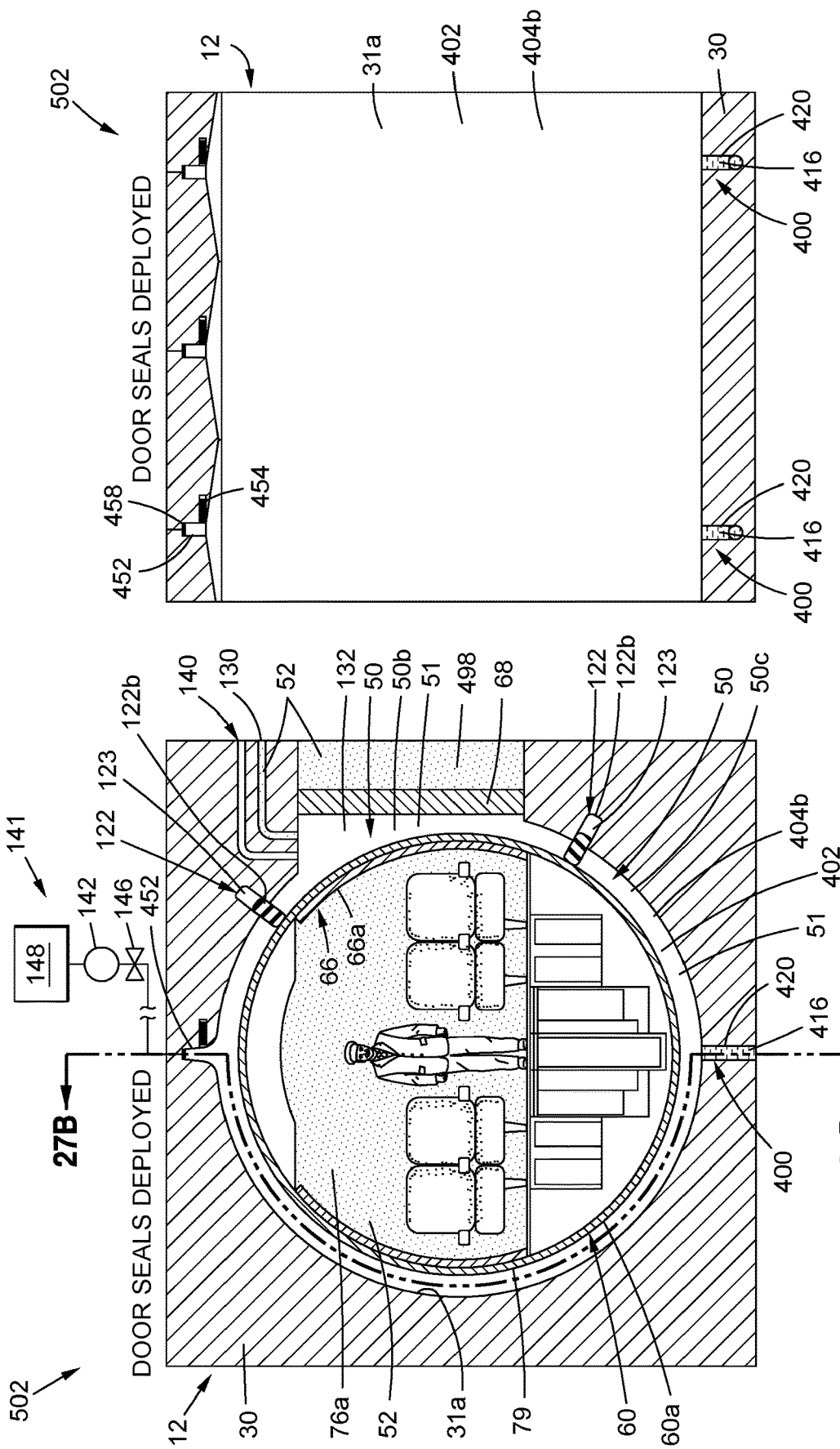

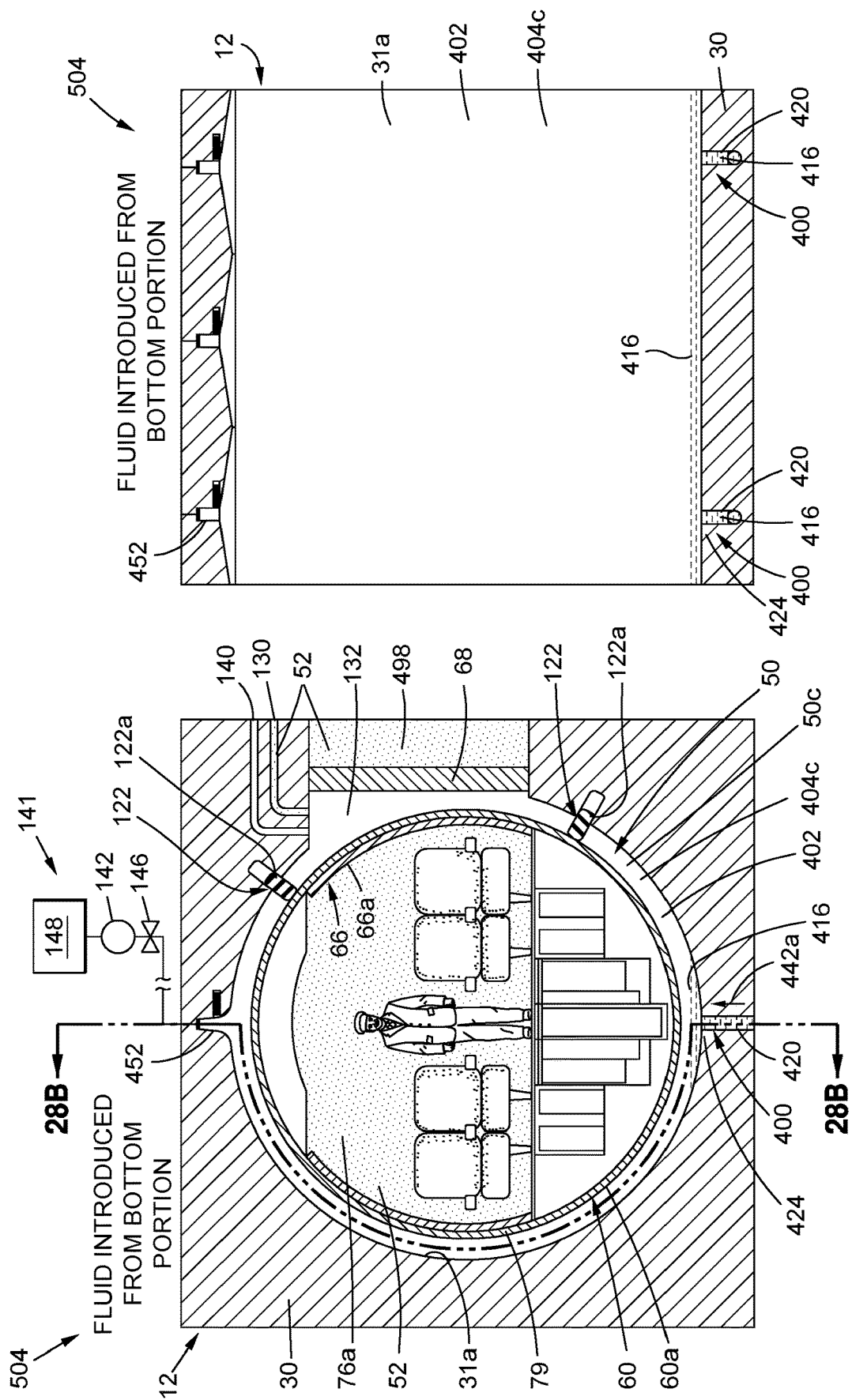

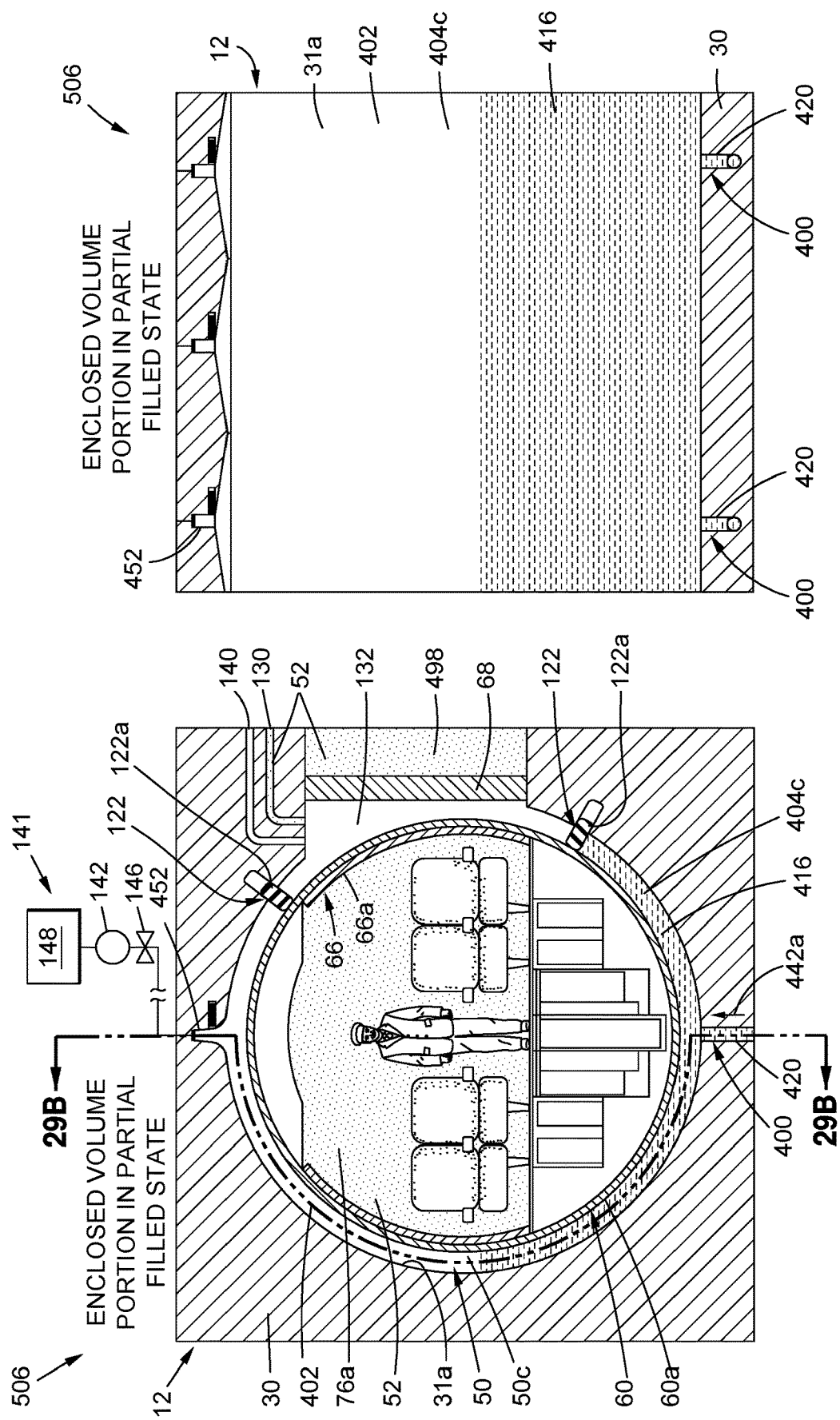

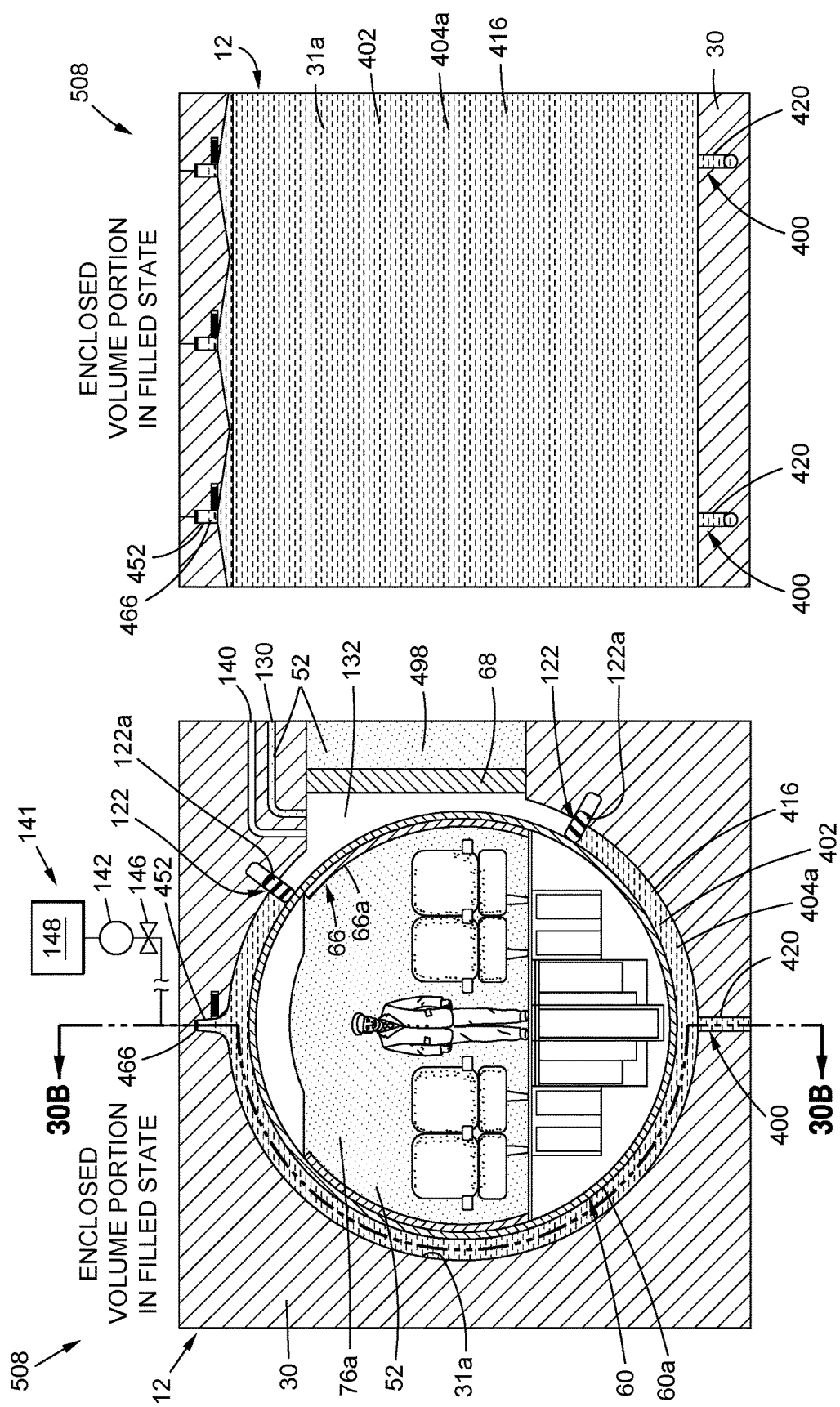

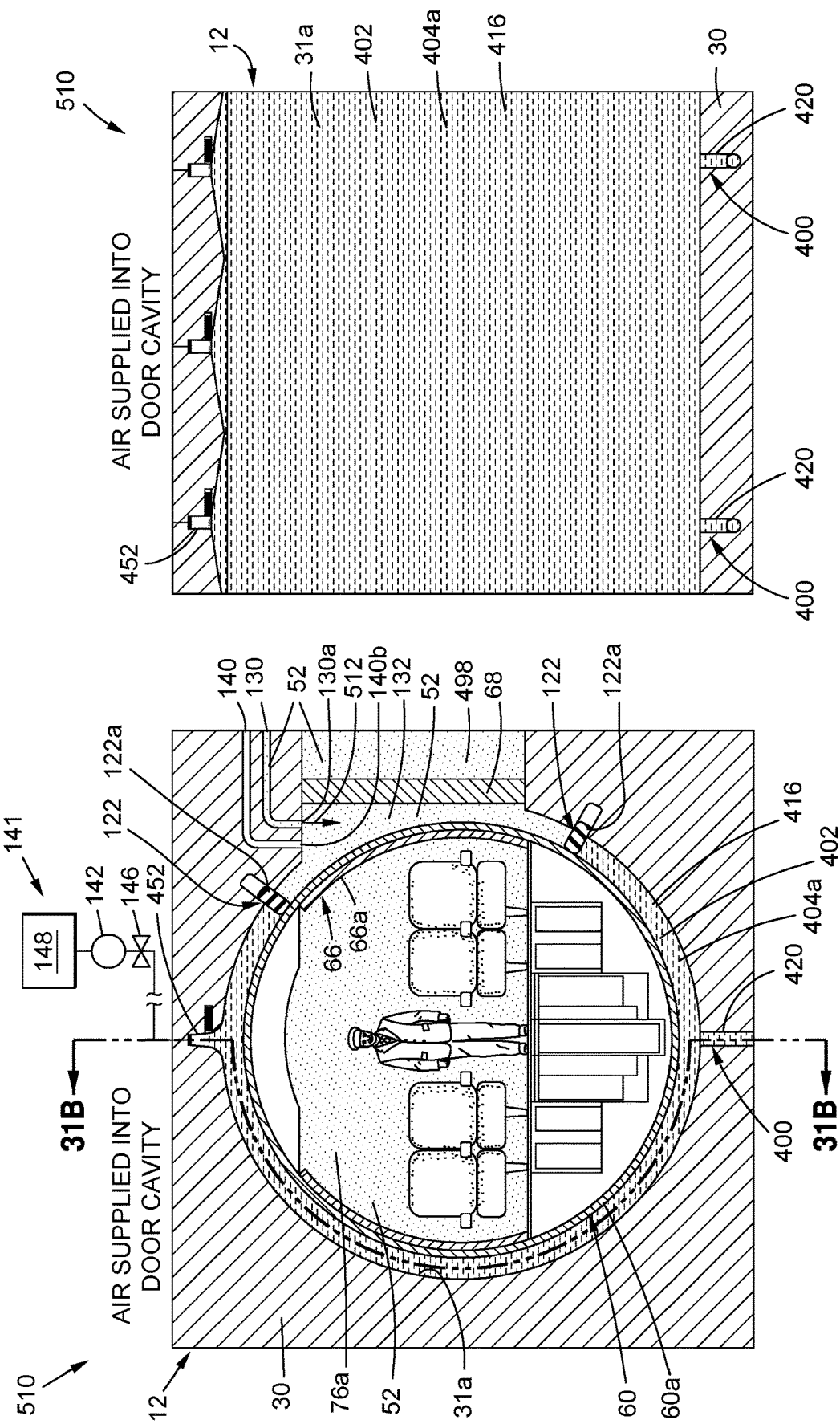

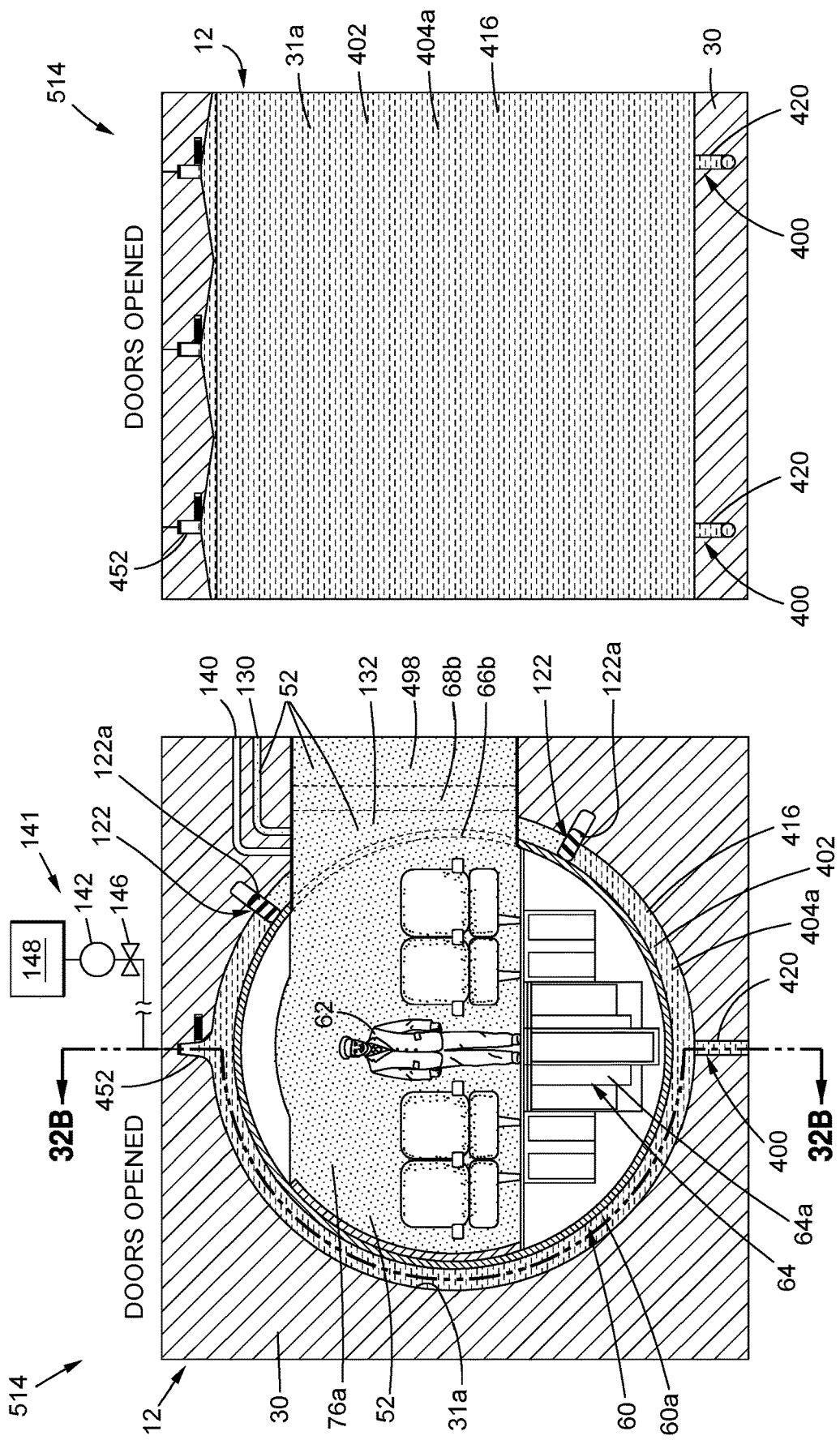

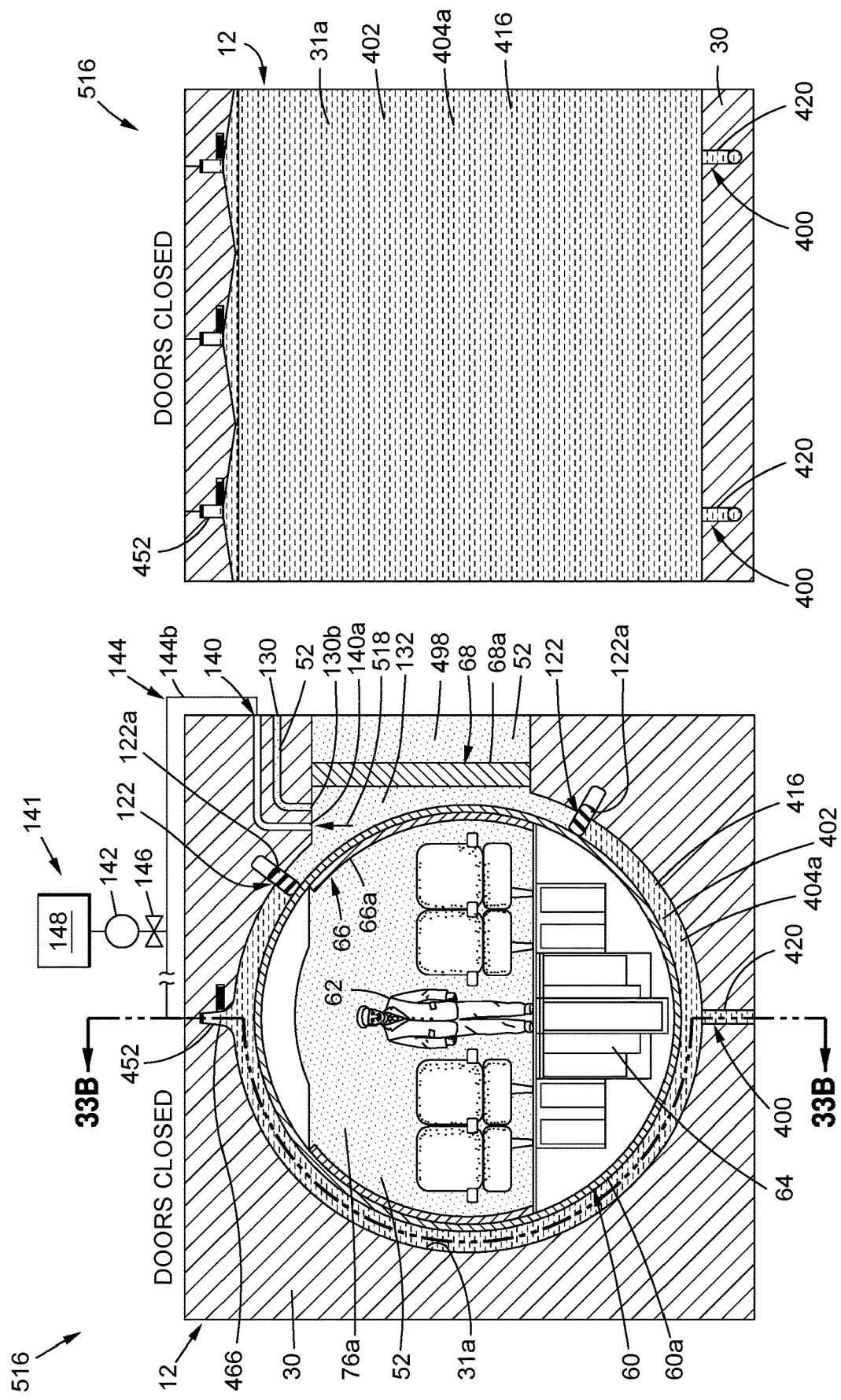

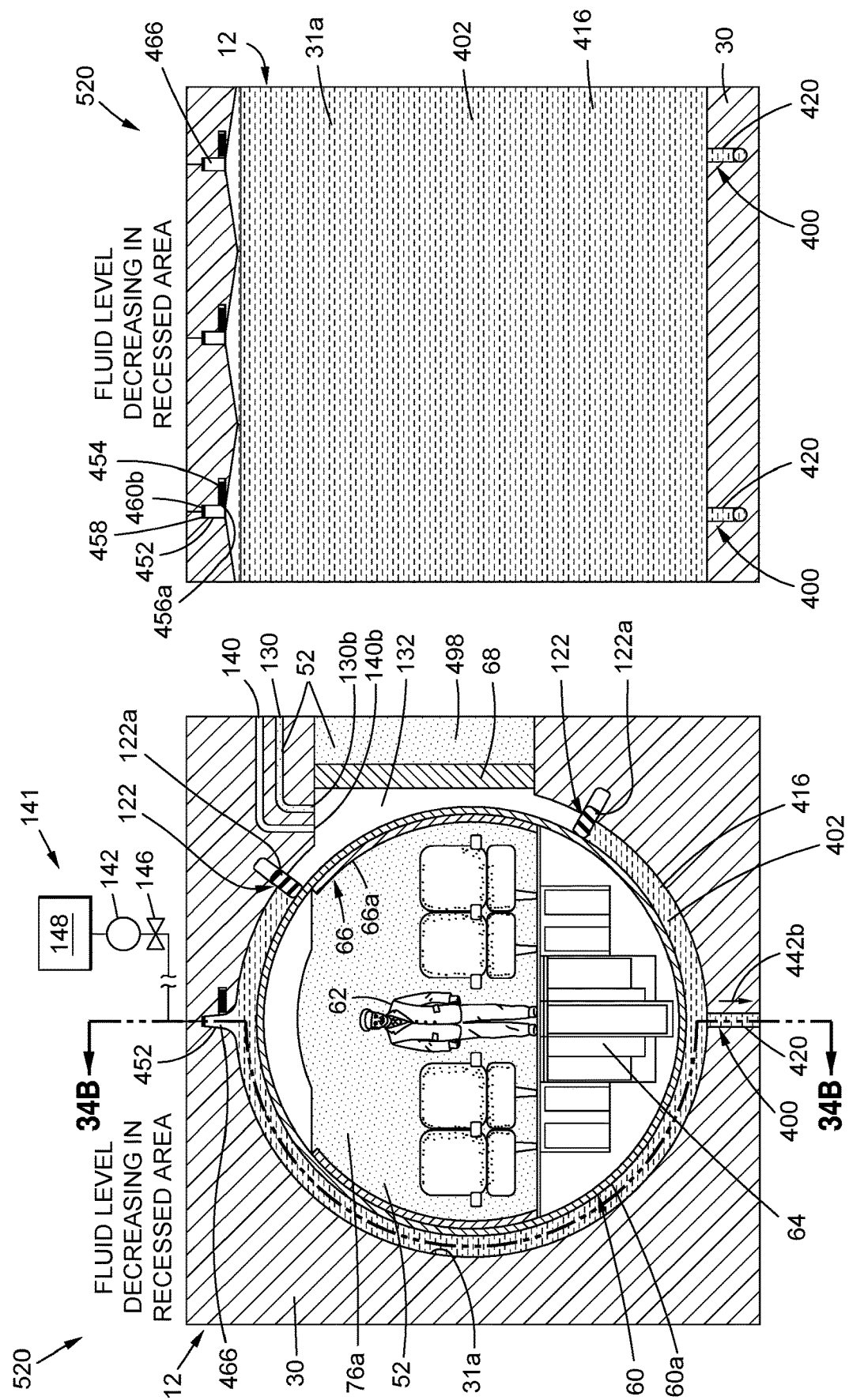

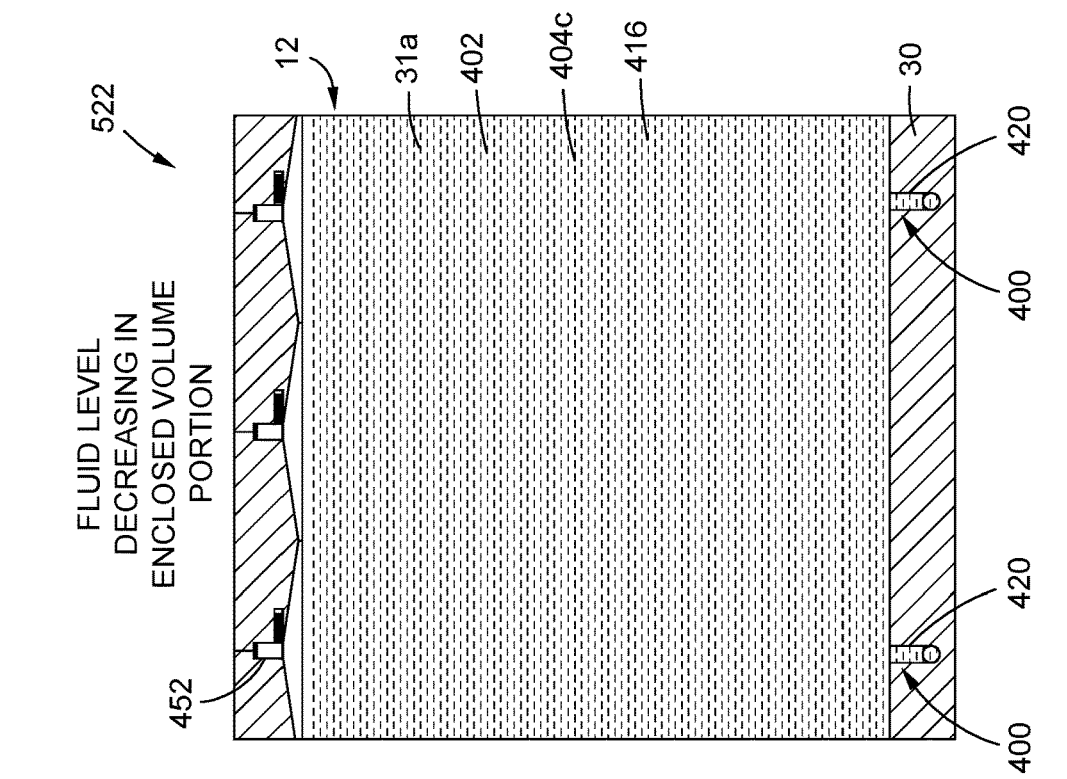
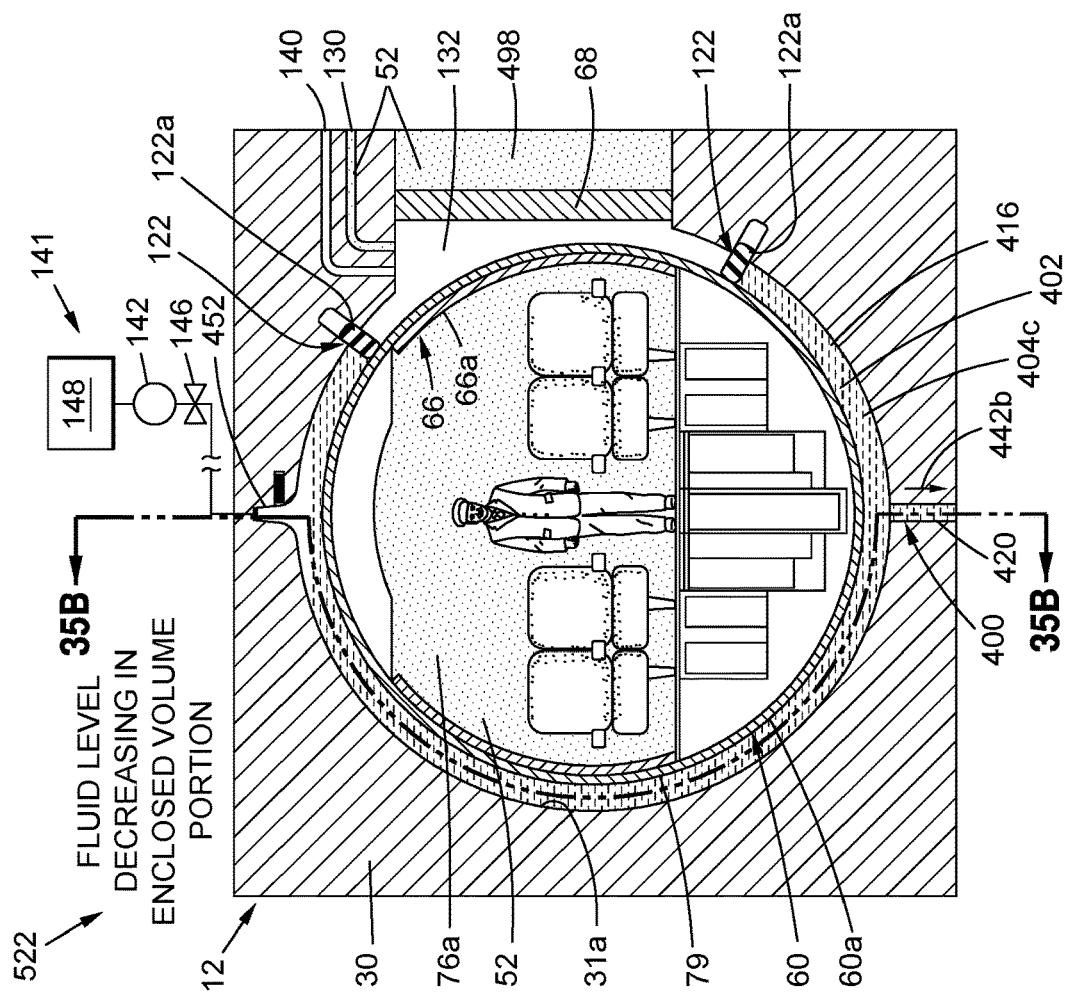
FIG. 35B
FIG. 35A

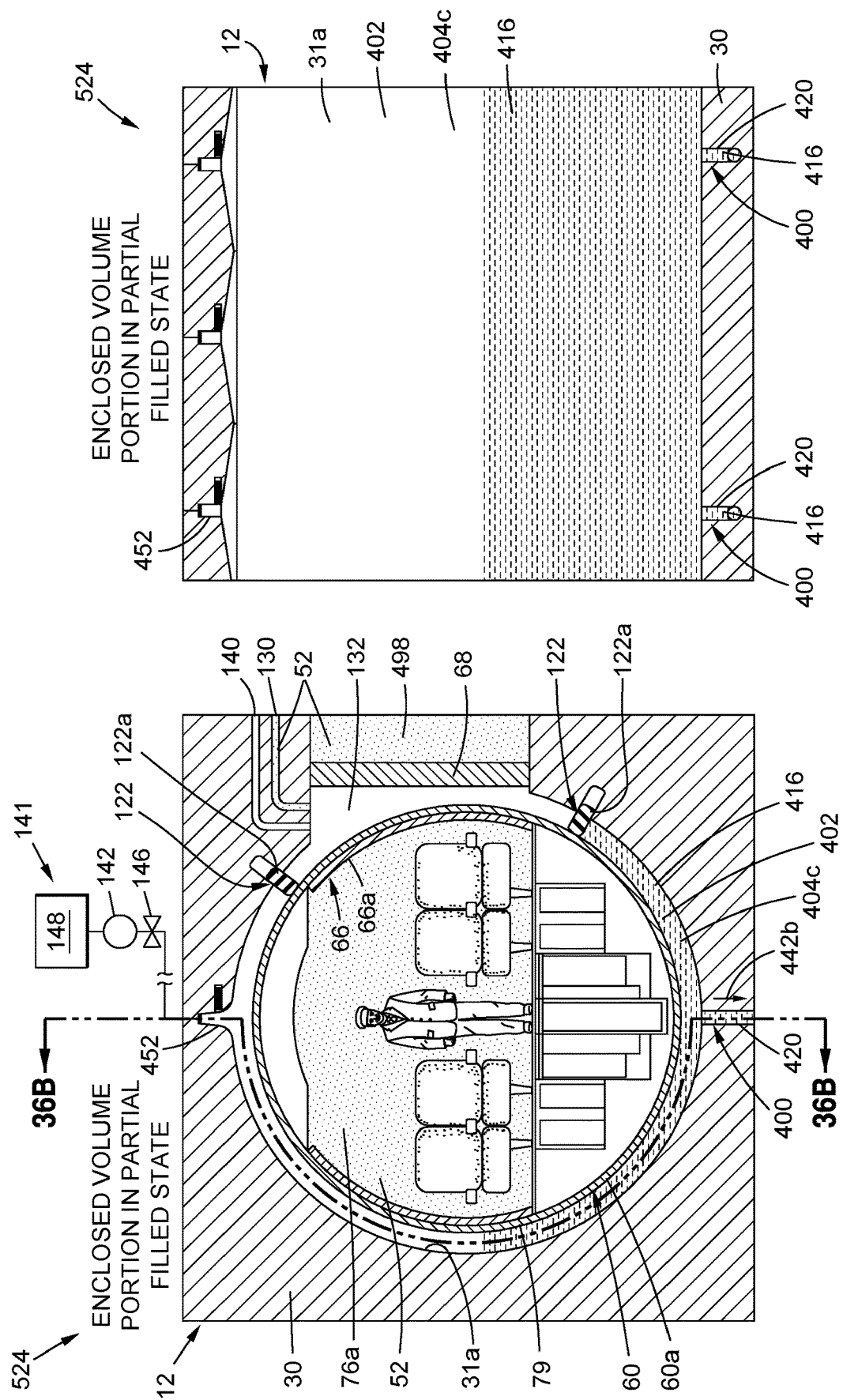

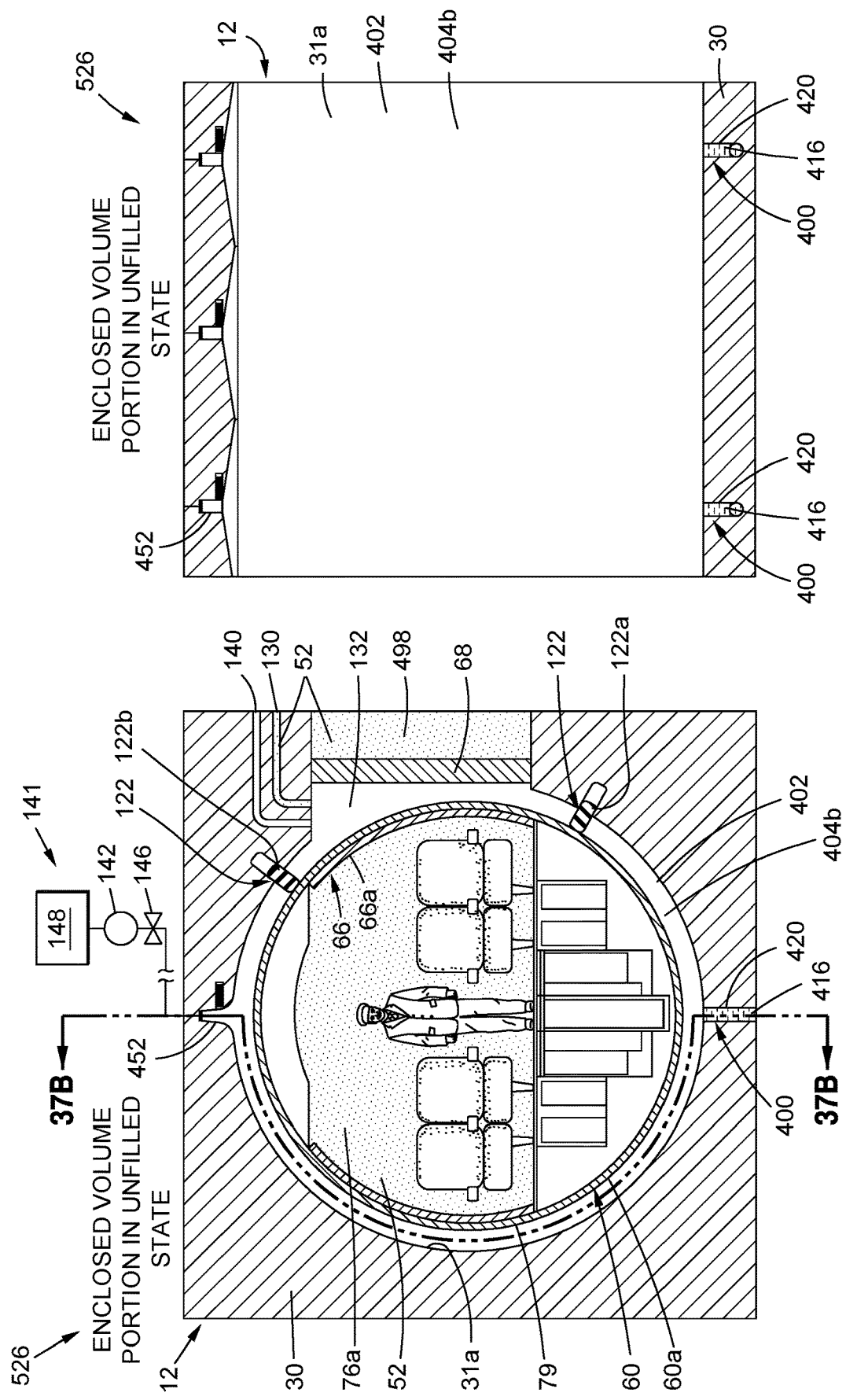

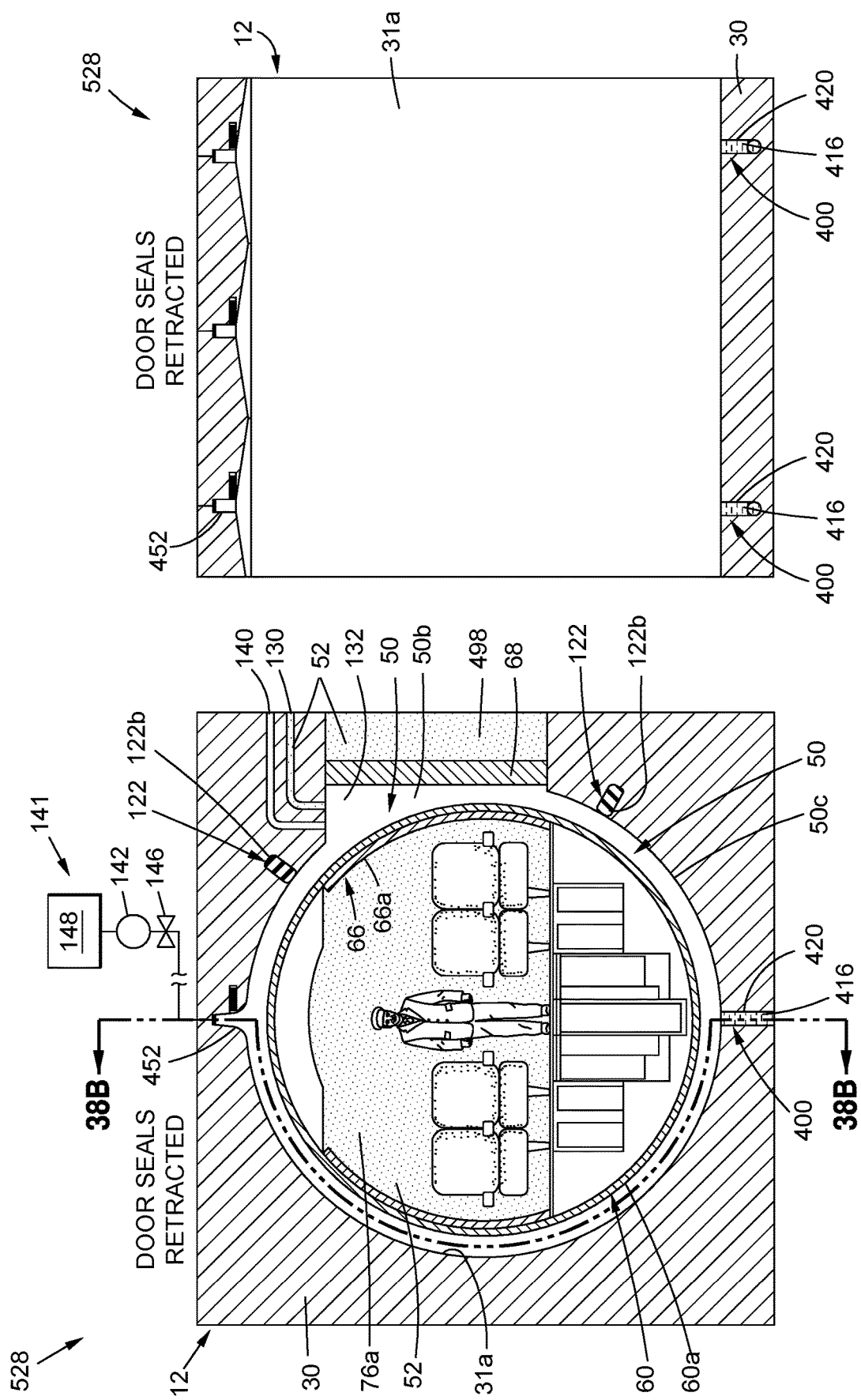

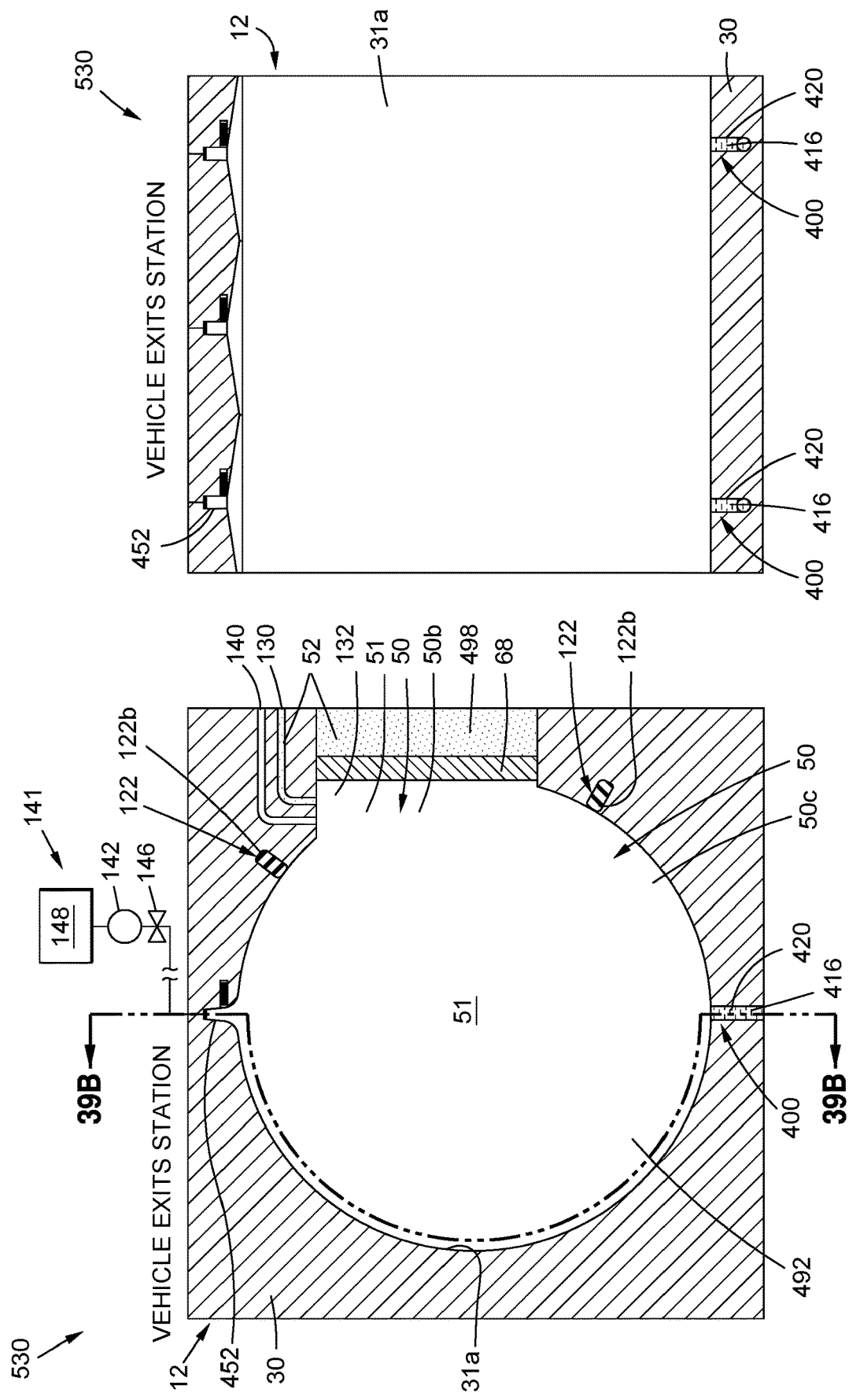

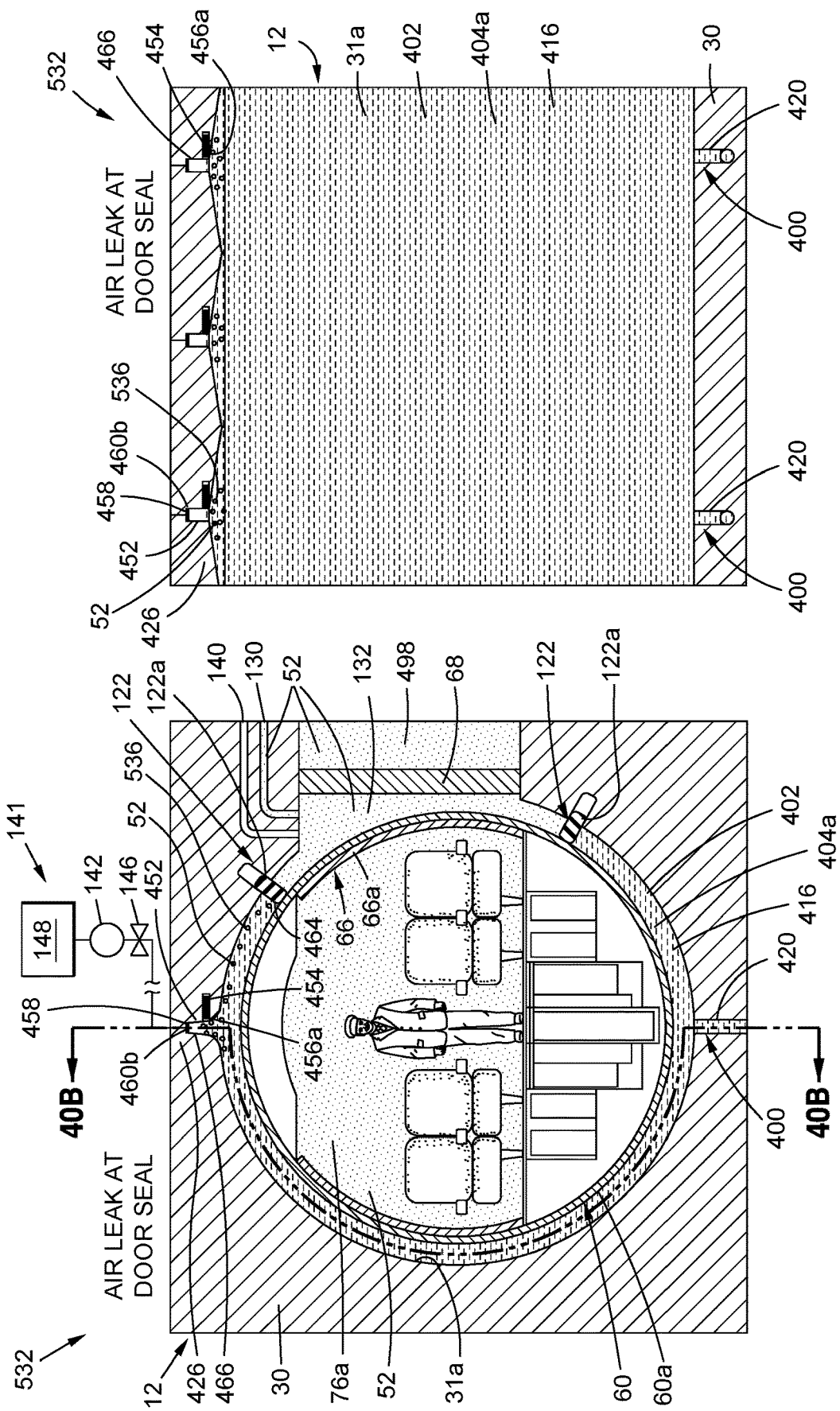

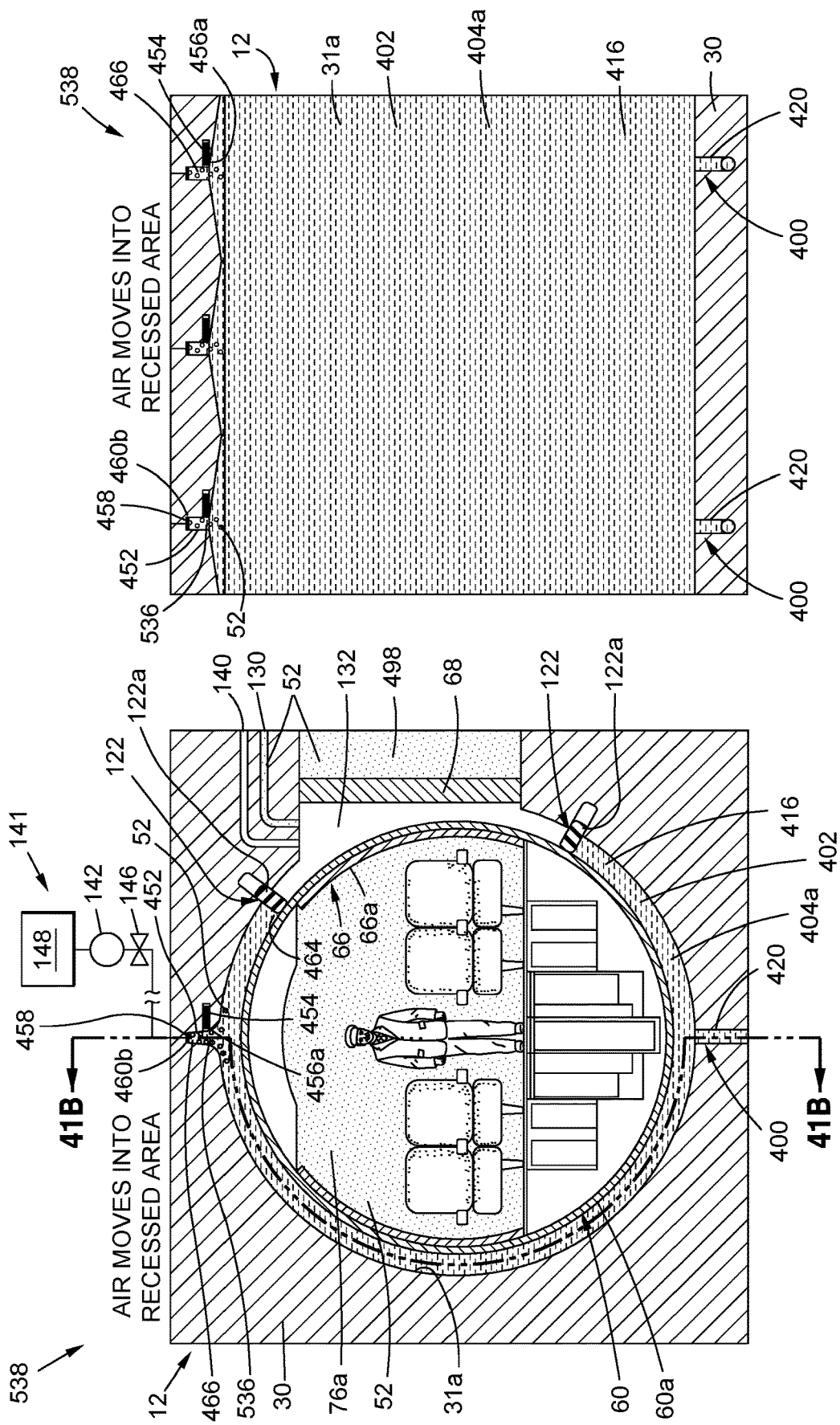

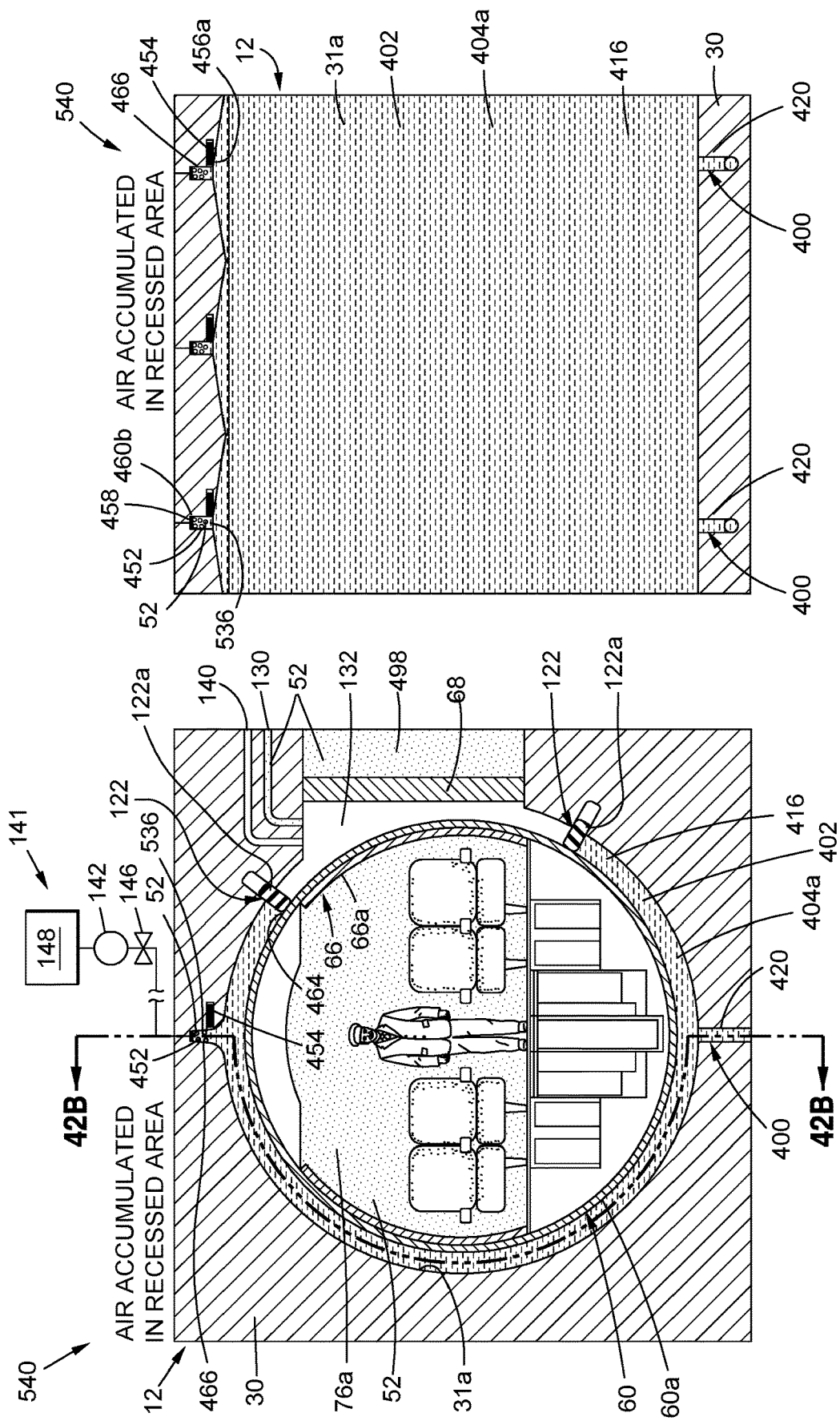

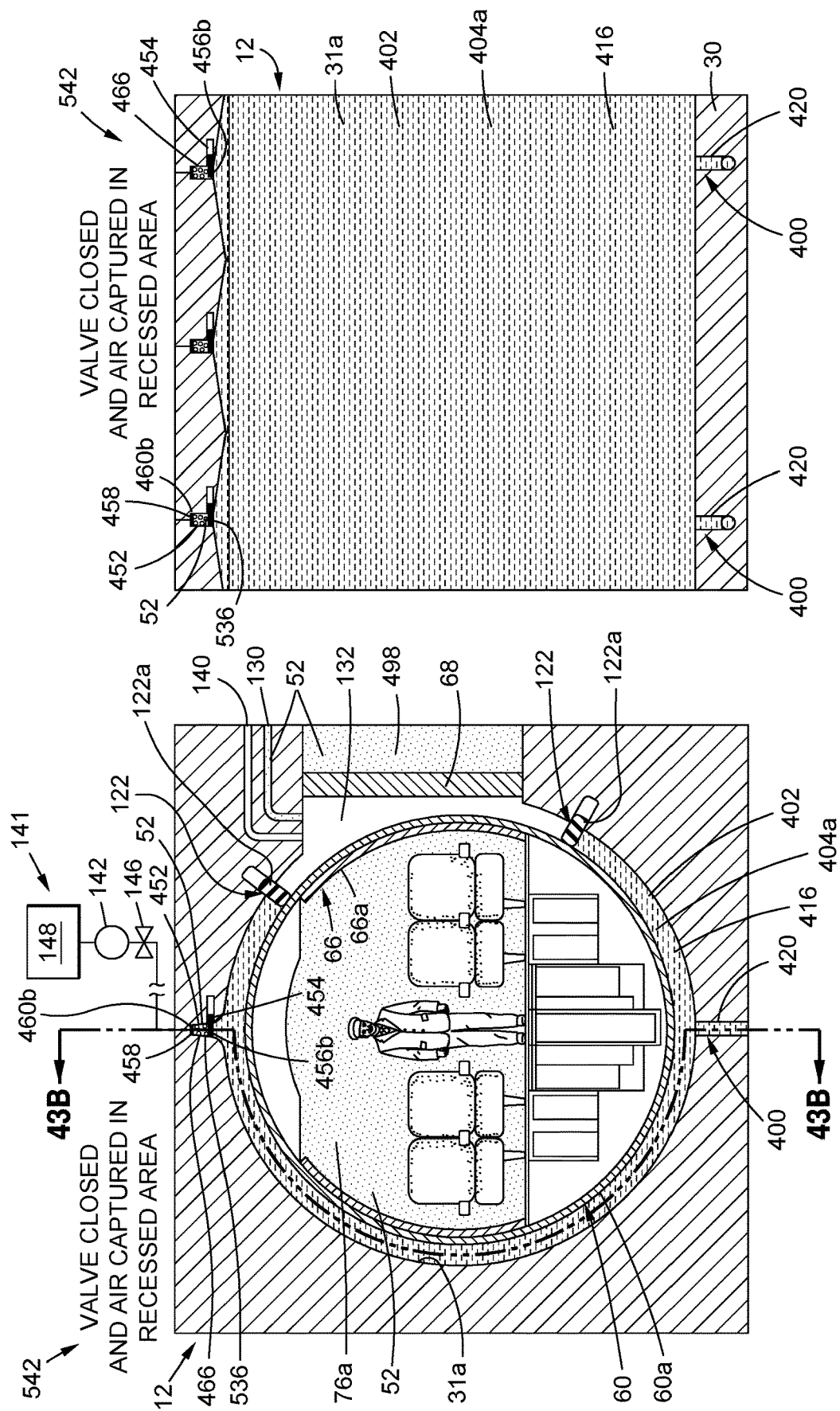

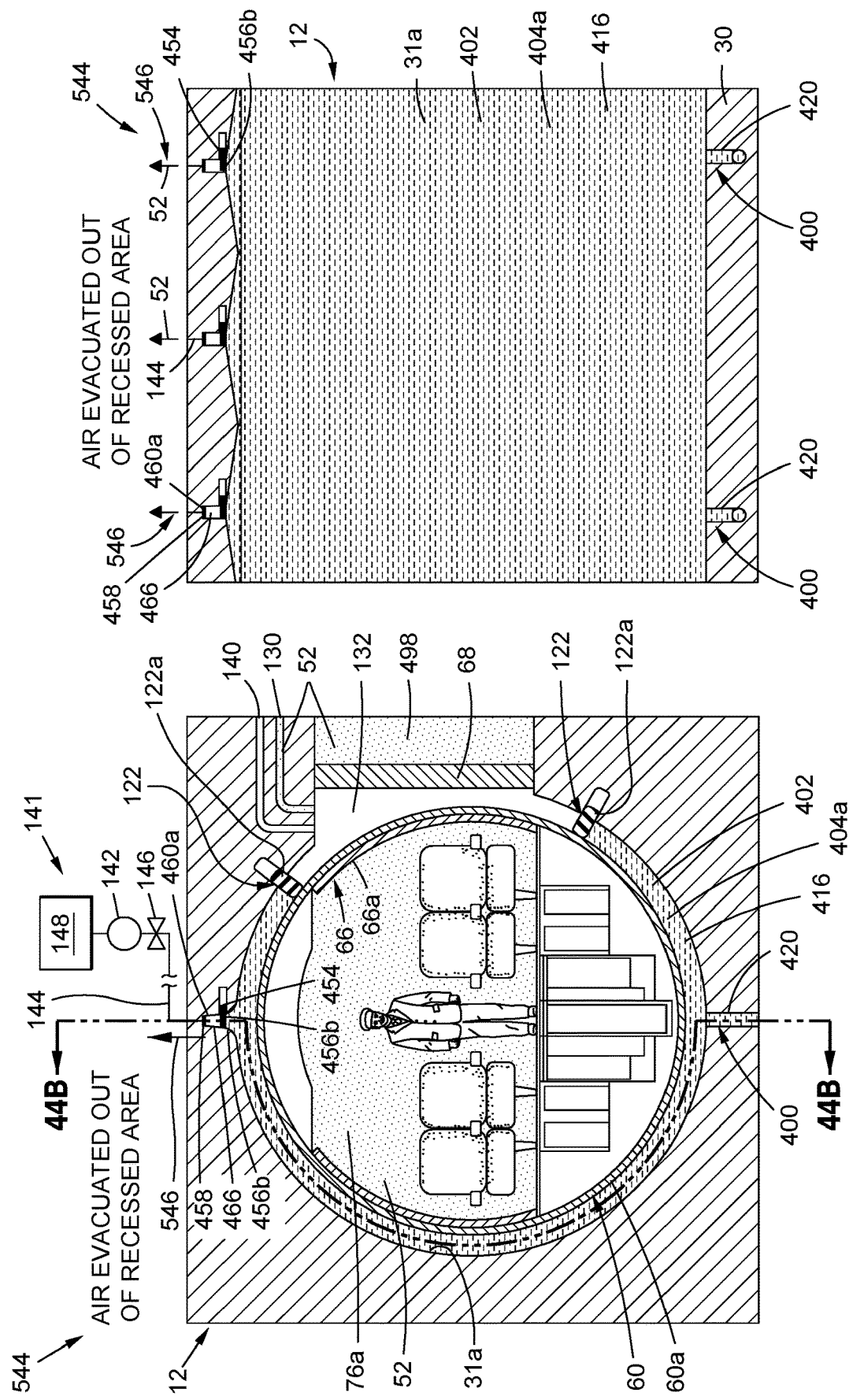

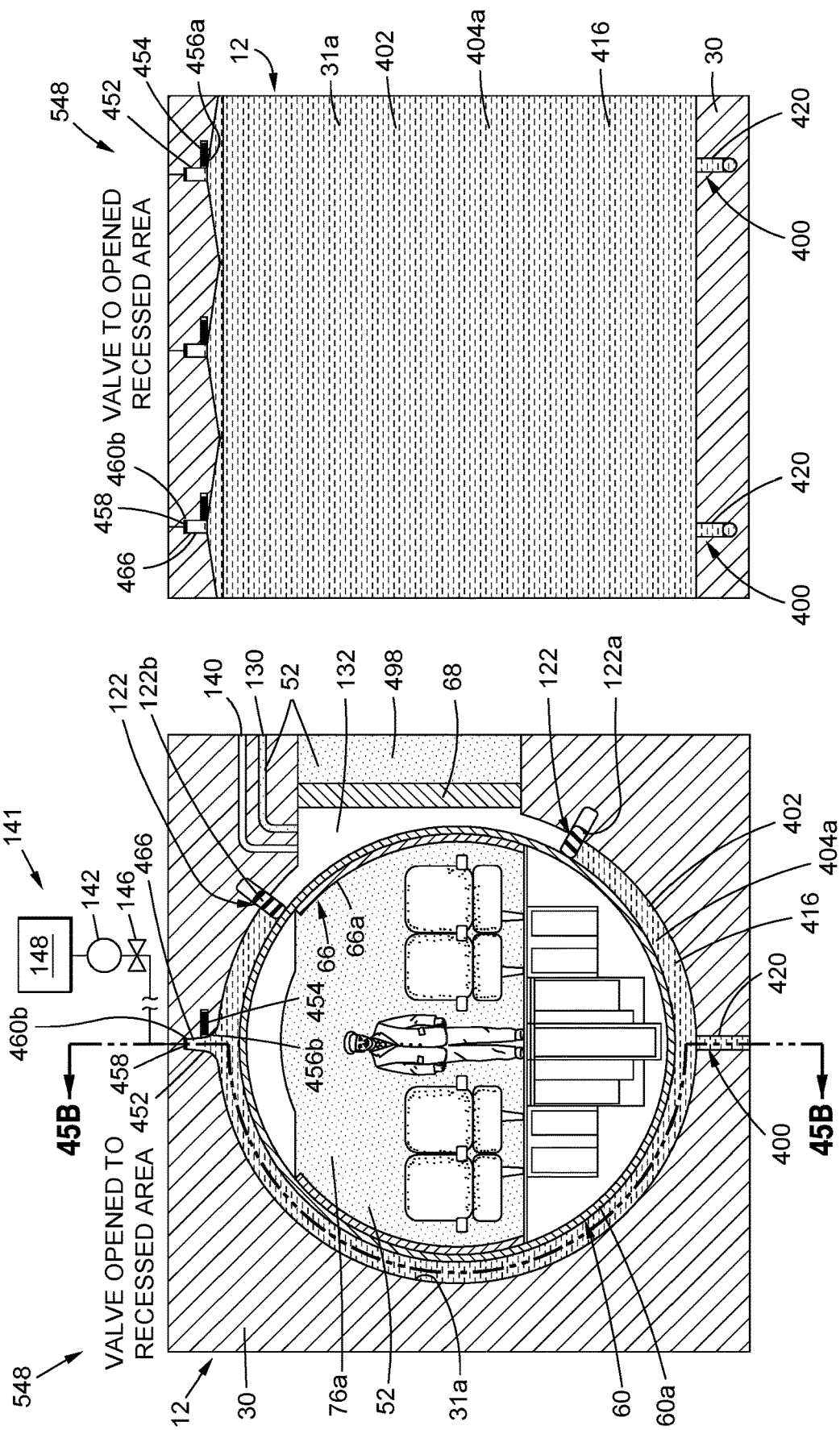

VACUUM VOLUME REDUCTION SYSTEM AND METHOD WITH FLUID FILL ASSEMBLY FOR A VACUUM TUBE VEHICLE STATION

CROSS-REFERENCE TO RELATED APPLICATIONS

The present application is a continuation-in-part and claims priority to pending application Ser. No. 16/286,568, filed Feb. 26, 2019, now U.S. Pat. No. 10,745,160, issued Aug. 18, 2020, entitled VACUUM VOLUME REDUCTION SYSTEM FOR A VACUUM TUBE VEHICLE STATION, the entire contents of which is incorporated herein by reference, and which is a divisional of and claims priority to application Ser. No. 15/476,963, filed Mar. 31, 2017, now U.S. Pat. No. 10,220,972, issued Mar. 5, 2019, entitled VACUUM VOLUME REDUCTION SYSTEM AND METHOD FOR A VACUUM TUBE VEHICLE STATION, the entire contents of which is incorporated herein by reference.

BACKGROUND

1) Field of the Disclosure

The disclosure relates generally to systems and methods for evacuating tubes to create a vacuum, and more particularly, to systems and methods for evacuating air from tubes used for high-speed vacuum tube transportation systems.

2) Description of Related Art

The concept of high-speed travel through tubes has been known for years. Recently, there has been a renewed and increased interest in and investigation of high-speed vacuum or pneumatic tube transportation systems, in which a vehicle travels through an evacuated or partially evacuated tube near the surface of the earth at high speeds, e.g., 200-2000 miles per hour (mph) average speed. The high speeds may be enabled by a magnetic levitation ("mag-lev") propulsion system that eliminates or greatly reduces rolling friction, and by evacuating the tube of air so that aerodynamic drag is eliminated or greatly reduced.

After an initial evacuation of air from the tube, it is important to minimize leakage into the tube from the surrounding ambient atmosphere. If the leakage of air into the tube is minimized, less pumping capacity may be required to maintain the desired quality of vacuum in the tube. Potential sources of air leakage may occur at vacuum tube vehicle stations, such as cargo loading facilities and/or passenger stations. For passenger stations, it is necessary to provide a pathway from the vacuum tube vehicle to the station, through a space where there was previously vacuum.

Known systems for minimizing or eliminating air leakage into the tube at vacuum tube vehicle stations are known. For example, one such known system includes providing pressure seals around vehicle doors, such as passenger entrance/exit doors. After the vacuum tube vehicle pulls into the vacuum tube vehicle station and into the correct position, the pressure seals may extend from the station walls and provide a seal between the interior volume and the volume outside. When the vehicle doors are opened the interior space and the station space are connected, and the passengers may enter or exit the vehicle through the vehicle doors. However, if such pressure seals around the vehicle doors become damaged, worn, or displaced, they may leak, and may lead to air at ambient pressure flowing into the vacuum cavity, which may corrupt the quality of the vacuum along the vacuum tube route.

In addition, another known system includes surrounding the entire vacuum tube vehicle with an airlock, in which pressure barriers are deployed in front of and behind the vehicle to prevent air from flowing into the portions of the tube that are part of the vacuum tube route. Such an airlock arrangement allows for the space inside the station tube to be filled with air, so that pressure seals around vehicle doors may not be necessary. However, the volume between the vacuum tube vehicle and the vacuum tube vehicle station walls may be very large, and may require a large pumping capacity and may require costly vacuum pump equipment to evacuate the station tube in a short amount of time. This may increase the cost of such known system. In addition, the vacuum pump equipment may wear out over time and may need to be maintained, repaired, and/or eventually replaced. This may increase the costs of maintenance, repair, and replacement for such known system. Further, such known system may require the use of additional pressure seals, such as modular pressure seals, and door seals, to be used with the installed vacuum pump equipment. Such additional pressure seals and door seals may be costly to use and install, and may, in turn, increase the overall cost of such known system. Moreover, such an airlock arrangement may still have the potential for air leakage into the vacuum cavity. Such leakage over time may degrade the quality of the vacuum in the vacuum tube along the vacuum tube route.

Thus, it is desirable to provide a system and method for minimizing air leakage into the tube from the surrounding ambient environment and for minimizing the volume that needs to be evacuated in the tube for each vacuum tube vehicle arrival and departure to and from the vacuum tube vehicle station.

Accordingly, there is a need in the art for a vacuum volume reduction system and method that effectively, efficiently, and inexpensively reduces the volume that needs to be evacuated from a vacuum transport tube at a vacuum tube vehicle station, that do not require the use of expensive vacuum pump equipment and pressure seals, and that provide other advantages over known systems and methods.

SUMMARY

Example implementations of this disclosure provide one or more embodiments of a vacuum volume reduction system and a method for reducing a volume to be evacuated at a vacuum tube vehicle station. As discussed in the below detailed description, embodiments of the vacuum volume reduction system and the method may provide significant advantages over existing systems and methods.

In one exemplary embodiment, there is provided a vacuum volume reduction system for reducing a volume to be evacuated at a vacuum tube vehicle station. The vacuum volume reduction system comprises a station vacuum tube disposed in an interior of a station wall of the vacuum tube vehicle station. The station vacuum tube has a tube volume.

The vacuum volume reduction system further comprises a volume reduction assembly coupled to the station vacuum tube. The volume reduction assembly has a control system for radially moving the volume reduction assembly to and from a vehicle outer surface of a vacuum transport tube vehicle, to engage around the vehicle outer surface, for loading and unloading of one or more of, passengers and cargo, through one or more vehicle doors of the vacuum transport tube vehicle and through one or more station doors of the vacuum tube vehicle station.

The vacuum volume reduction system further comprises one or more door seals coupled to the station wall, and configured to surround a perimeter of, and to seal, each of the one or more vehicle doors, and to seal off a door cavity having a door cavity volume. The vacuum volume reduction system further comprises an air supply assembly coupled to the station wall, and configured to supply air to the door cavity.

The vacuum volume reduction system further comprises a vent-to-vacuum assembly coupled to the station wall, and configured to evacuate the air from the door cavity. The vacuum volume reduction system displaces the tube volume between the station wall and the vehicle outer surface, and in turn, reduces a volume to be evacuated at the vacuum tube vehicle station.

In another exemplary embodiment, there is provided a modular tube volume reduction assembly for use at a vacuum tube vehicle station. The modular tube volume reduction assembly comprises a modular station vacuum tube having a tube volume and a plurality of cavities longitudinally formed around a circumference of the modular station vacuum tube.

The modular tube volume reduction assembly further comprises a volume reduction assembly integrated with the modular station vacuum tube. The volume reduction assembly comprises a plurality of blocks longitudinally coupled to a cavity interior of each of the plurality of cavities.

The volume reduction assembly further comprises a control system coupled between the modular station vacuum tube and the plurality of blocks. When the modular tube volume reduction assembly is used at the vacuum tube vehicle station, the control system is configured to radially move the plurality of blocks to and from a vehicle outer surface of a vacuum transport tube vehicle, to engage around the vehicle outer surface, for loading and unloading of one or more of, passengers and cargo, through one or more vehicle doors of the vacuum transport tube vehicle and through one or more station doors of the vacuum tube vehicle station. The modular tube volume reduction assembly displaces the tube volume between a station wall and the vehicle outer surface, and in turn, reduces the volume to be evacuated at the vacuum tube vehicle station.

In another exemplary embodiment, there is provided a method for reducing a volume to be evacuated at a vacuum tube vehicle station. The method comprises the step of installing a vacuum volume reduction system in the vacuum tube vehicle station. The vacuum volume reduction system comprises a station vacuum tube disposed in an interior of a station wall of the vacuum tube vehicle station. The station vacuum tube has a tube volume.

The vacuum volume reduction system further comprises a volume reduction assembly longitudinally coupled to the station vacuum tube. The vacuum volume reduction system further comprises one or more door seals coupled to the station wall. The vacuum volume reduction system further comprises an air supply assembly coupled to the station wall, and a vent-to-vacuum assembly coupled to the station wall.

The method further comprises the step of deploying the volume reduction assembly, via a control system, to engage around a vehicle outer surface of a vacuum transport tube vehicle, and to displace a gap volume between the volume reduction assembly and the vehicle outer surface, when the vacuum transport tube vehicle arrives and is stopped at the vacuum tube vehicle station. The method further comprises the step of deploying the one or more door seals, via a door seal control system, to seal around a perimeter of each of one or more vehicle doors, and to seal off a door cavity positioned between each of the one or more vehicle doors and each of one or more station doors.

The method further comprises the step of supplying air from the air supply assembly to the door cavity. The method further comprises the step of opening the one or more vehicle doors and the one or more station doors, to load and unload one or more of, passengers, and cargo, through the one or more vehicle doors and through the one or more station doors.

The method further comprises the step of closing the one or more vehicle doors, and closing the one or more station doors. The method further comprises the step of evacuating the air from the door cavity with the vent-to-vacuum assembly, to obtain a desired vacuum quality, and closing the vent-to-vacuum assembly.

The method further comprises the step of retracting the volume reduction assembly, via the control system, from around the vehicle outer surface of the vacuum transport tube vehicle, back to the station vacuum tube. The method further comprises the step of retracting the one or more door seals, via the door seal control system, from around each of the one or more vehicle doors, back to the station wall. The method further comprises the step of reducing the volume to be evacuated at the vacuum tube vehicle station.

In another exemplary embodiment, there is provided a vacuum volume reduction system. The vacuum volume reduction system comprises a station vacuum tube disposed in an interior of a station wall of a vacuum tube vehicle station, the station vacuum tube having a tube volume. The vacuum volume reduction system further comprises a volume reduction assembly coupled to one of, the station vacuum tube, and the interior of the station wall, to reduce a volume to be evacuated in the vacuum tube vehicle station.

The vacuum volume reduction system further comprises a control system coupled between the station vacuum tube and the volume reduction assembly. The control system controls movement of the volume reduction assembly during loading and unloading of one or more of, passengers and cargo, through one or more vehicle doors of a vacuum transport tube vehicle at the vacuum tube vehicle station, and through one or more station doors of the vacuum tube vehicle station.

The vacuum volume reduction system further comprise an air supply assembly coupled to the station wall, and supplying air to a door cavity positioned between each of the one or more vehicle doors and each of the one or more station doors. The vacuum volume reduction system further comprises a vent-to-vacuum assembly coupled to the station wall, to evacuate the air from the door cavity. The vacuum volume reduction system displaces the tube volume between the station wall and a vehicle outer surface of the vacuum transport tube vehicle, and in turn, reduces the volume to be evacuated at the vacuum tube vehicle station.

In another exemplary embodiment, there is provided a vacuum volume reduction system. The vacuum volume reduction system comprises a volume reduction assembly comprising a fluid fill assembly coupled to an interior of a station wall of a vacuum tube vehicle station, to reduce a volume, under a vacuum, in the vacuum tube vehicle station, when a vacuum transport tube vehicle is positioned in the volume at the vacuum tube vehicle station.

The fluid fill assembly comprises one or more containers, each containing a fluid. The fluid fill assembly further comprises one or more fluid transport members. Each fluid transport member has a first end attached to a bottom portion of the interior of the station wall, and each fluid transport member has a second end disposed within one of the one or more containers. The one or more fluid transport members are configured to transport the fluid from the one or more containers to one or more enclosed volume portions formed between an exterior of the vacuum transport tube vehicle and the interior of the station wall, to reduce the volume, and to displace the volume with the fluid. The fluid fill assembly further comprises one or more fluid pump assemblies attached to the one or more fluid transport members, to pump the fluid from the one or more containers to the one or more enclosed volume portions. The fluid fill assembly further comprises a control and power system.

The vacuum volume reduction system further comprises one or more recessed areas positioned at a top portion of the interior of the station wall of the vacuum tube vehicle station. The vacuum volume reduction system further comprises a vent-to-vacuum assembly coupled to the one or more recessed areas. The vacuum volume reduction system further comprises a plurality of seal elements, to seal off the one or more enclosed volume portions.

In another exemplary embodiment, there is provided a vacuum volume reduction system for reducing a volume, under a vacuum, and displacing the volume with a fluid, in a vacuum tube vehicle station. The vacuum volume reduction system comprises a volume reduction assembly comprising a fluid fill assembly coupled to an interior of a station wall of the vacuum tube vehicle station, to reduce the volume, under the vacuum, in the vacuum tube vehicle station, when a vacuum transport tube vehicle is positioned in the volume at the vacuum tube vehicle station.

The fluid fill assembly comprises one or more containers positioned under the vacuum tube vehicle station. Each container contains the fluid.

The fluid fill assembly further comprises one or more pipes. Each pipe has a first end attached to a bottom portion of the interior of the station wall, and each pipe has a second end disposed within one of the one or more containers. Each of the one or more pipes is configured to transport the fluid from the one or more containers to one or more enclosed volume portions formed between an exterior of the vacuum transport tube vehicle and the interior of the station wall, to reduce the volume, and to displace the volume with the fluid.

The fluid fill assembly further comprises one or more fluid pump assemblies attached to the one or more pipes, to pump the fluid from the one or more containers to the one or more enclosed volume portions. Each of the one or more fluid pump assemblies comprises a fluid pump, a motor coupled to the fluid pump, and a control valve coupled to the fluid pump, to control a flow of the fluid. The fluid fill assembly further comprises a control and power system.

The vacuum volume reduction system further comprises one or more recessed areas positioned at a top portion of the interior of the station wall of the vacuum tube vehicle station. Each of the one or more recessed areas has a valve configured to capture within the recessed area any air from an air leak, and has a vent configured to evacuate the air out of the recessed area.

The vacuum volume reduction system further comprises a vent-to-vacuum assembly coupled to the one or more recessed areas, via one or more openings in an exterior of the station wall. The vacuum volume reduction system further comprises a plurality of seal elements, to seal off the one or more enclosed volume portions.

In another exemplary embodiment, there is provided a method of using a vacuum volume reduction system, to reduce a volume, under a vacuum, and to displace the volume with a fluid, in a vacuum tube vehicle station. The method comprises the step of positioning a vacuum transport tube vehicle in the volume in the vacuum tube vehicle station. The method further comprises the step of sealing off, with a plurality of seal elements of the vacuum volume reduction system, one or more enclosed volume portions, formed between an exterior of the vacuum transport tube vehicle and an interior of a station wall of the vacuum tube vehicle station.

The method further comprises the step of activating a volume reduction assembly of the vacuum volume reduction system. The volume reduction assembly comprises a fluid fill assembly coupled to the interior of the station wall of the vacuum tube vehicle station. The fluid fill assembly comprises one or more containers positioned under the vacuum tube vehicle station. Each of the one or more containers contains fluid.

The fluid fill assembly further comprises one or more fluid transport members. Each of the one or more fluid transport members has a first end attached to a bottom portion of the interior of the station wall. Each of the one or more fluid transport members has a second end disposed within one of the one or more containers. The fluid fill assembly further comprises one or more fluid pump assemblies attached to the one or more fluid transport members. The fluid fill assembly further comprises a control and power system.

The method further comprises the step of pumping the fluid, with the one or more fluid pump assemblies, from the one or more containers, through the one or more fluid transport members, and into the one or more enclosed volume portions. The method further comprises the step of filling the one or more enclosed volume portions with the fluid, to reduce the volume, and to displace the volume with the fluid, until the one or more enclosed volume portions are in a filled state filled with the fluid.

The method further comprises the step of supplying air to a door cavity positioned between each of one or more vehicle doors of the vacuum transport tube vehicle and each of one or more station doors of the vacuum tube vehicle station. The method further comprises the step of opening the one or more vehicle doors and the one or more station doors, to load and unload one or more of, passengers, and cargo, through the one or more vehicle doors and through the one or more station doors.

The method further comprises the step of closing the one or more vehicle doors and the one or more station door. The method further comprises the step of evacuating the air from the door cavity. The method further comprises the step of transporting the fluid, with the fluid fill assembly, out of the one or more enclosed volume portions, through the one or more fluid transport members, and into the one or more containers, until the one or more enclosed volume portions are in an unfilled state with no fluid. The method further comprises the step of retracting the plurality of seal elements.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 2B is an illustration of a side perspective view of an embodiment of a volume reduction assembly in the form of a modular tube volume reduction assembly of the disclosure;

FIG. 2D is an illustration of an enlarged cut-away side perspective view of another embodiment of a volume reduction assembly in the form of an inflatable bladder of the disclosure;

FIG. 3 is an illustration of a functional block diagram of an exemplary embodiment of a vacuum volume reduction system of the disclosure;

FIG. 4A is an illustration of a cross-sectional side view of a station wall of a vacuum tube vehicle station that may be used with embodiments of a vacuum volume reduction system of the disclosure;

FIG. 4B is an illustration of a cross-sectional front view of the station wall of FIG. 4A, showing an embodiment of a station vacuum tube;

FIG. 5A is an illustration of a cross-sectional side view of an embodiment of a volume reduction assembly of a vacuum volume reduction system of the disclosure incorporated in a station wall;

FIG. 5B is an illustration of a cross-sectional front view of the volume reduction assembly of FIG. 5A in a station wall;

FIG. 6A is an illustration of a cross-sectional side view of an embodiment of a volume reduction assembly in the form of a plurality of blocks when a vacuum transport tube vehicle arrives at a vacuum tube vehicle station;

FIG. 6B is an illustration of a partial sectional front view of the volume reduction assembly in the form of the plurality of blocks, of FIG. 6A, showing the plurality of blocks in a fully retracted position when the vacuum transport tube vehicle arrives at a vacuum tube vehicle station;

FIG. 16A is an illustration of a cross-sectional side view of an embodiment of the volume reduction assembly in the form of a plurality of blocks and showing the vehicle door and showing the door seal in retracted position;

FIG. 16B is an illustration of a partial sectional front view of the volume reduction assembly of FIG. 16A, showing the door seal in the retracted position;

FIG. 17A is an illustration of a cross-sectional side view of an embodiment of a volume reduction assembly in the form of a plurality of blocks and showing the plurality of blocks in a fully retracted position;

FIG. 17B is an illustration of a partial sectional front view of the volume reduction assembly of FIG. 17A, showing the plurality of blocks in the fully retracted position;

FIG. 19 is an illustration of a cross-sectional side view of an embodiment of the volume reduction assembly in the form of a plurality of blocks and showing no longitudinal gaps in the plurality of blocks;

FIG. 24A is an illustration of a cross-sectional front view of a vacuum tube vehicle station that may be used with embodiments of a vacuum volume reduction system with a fluid fill assembly of the disclosure, and shows a vacuum in station stage with a vacuum in an interior passage of the vacuum tube vehicle station;

FIG. 24B is an illustration of a cross-sectional side view of the vacuum tube vehicle station of FIG. 24A, taken along lines 24B-24B of FIG. 24A;

FIG. 25A is an illustration of a cross-sectional front view of a station door and a door cavity of a vacuum tube vehicle station that may be used with embodiments of a vacuum volume reduction system with a fluid fill assembly of the disclosure, and shows a vacuum in station at station door stage with a vacuum in an interior passage and in the door cavity of the vacuum tube vehicle station;

FIG. 25B is an illustration of a cross-sectional side view of the vacuum tube vehicle station of FIG. 25A, taken along lines 25B-25B of FIG. 25A;

FIG. 27A is an illustration of a cross-sectional front view of the vacuum transport tube vehicle at the station door of the vacuum tube vehicle station of FIG. 26A, and shows a door seals deployed stage;

FIG. 27B is an illustration of a cross-sectional side view of the vacuum tube vehicle station of FIG. 27A, taken along lines 27B-27B of FIG. 27A;

FIG. 28A is an illustration of a cross-sectional front view of the vacuum transport tube vehicle at the station door of the vacuum tube vehicle station of FIG. 27A, and shows a fluid introduced from bottom portion stage;

FIG. 28B is an illustration of a cross-sectional side view of the vacuum tube vehicle station of FIG. 28A, taken along lines 28B-28B of FIG. 28A;

FIG. 29A is an illustration of a cross-sectional front view of the vacuum transport tube vehicle at the station door of the vacuum tube vehicle station of FIG. 28A, and shows an enclosed volume portion in partial filled state stage;

FIG. 29B is an illustration of a cross-sectional side view of the vacuum tube vehicle station of FIG. 29A, taken along lines 29B-29B of FIG. 29A;

FIG. 30A is an illustration of a cross-sectional front view of the vacuum transport tube vehicle at the station door of the vacuum tube vehicle station of FIG. 29A, and shows an enclosed volume portion in a filled state stage;

FIG. 30B is an illustration of a cross-sectional side view of the vacuum tube vehicle station of FIG. 30A, taken along lines 30B-30B of FIG. 30A;

FIG. 31A is an illustration of a cross-sectional front view of the vacuum transport tube vehicle at the station door of the vacuum tube vehicle station of FIG. 30A, and shows an air supplied into door cavity stage;

FIG. 31B is an illustration of a cross-sectional side view of the vacuum tube vehicle station of FIG. 31A, taken along lines 31B-31B of FIG. 31A;

FIG. 32A is an illustration of a cross-sectional front view of the vacuum transport tube vehicle at the station door of the vacuum tube vehicle station of FIG. 31A, and shows a doors opened stage;

FIG. 32B is an illustration of a cross-sectional side view of the vacuum tube vehicle station of FIG. 32A, taken along lines 32B-32B of FIG. 32A;

FIG. 33A is an illustration of a cross-sectional front view of the vacuum transport tube vehicle at the station door of the vacuum tube vehicle station of FIG. 31A, and shows a doors closed stage;

FIG. 33B is an illustration of a cross-sectional side view of the vacuum tube vehicle station of FIG. 33A, taken along lines 33B-33B of FIG. 33A;

FIG. 34A is an illustration of a cross-sectional front view of the vacuum transport tube vehicle at the station door of the vacuum tube vehicle station of FIG. 33A, and shows a fluid level decreasing in recessed area stage;

FIG. 34B is an illustration of a cross-sectional side view of the vacuum tube vehicle station of FIG. 34A, taken along lines 34B-34B of FIG. 34A;

FIG. 35A is an illustration of a cross-sectional front view of the vacuum transport tube vehicle at the station door of the vacuum tube vehicle station of FIG. 34A, and shows a fluid level decreasing in enclosed volume portion stage;

FIG. 35B is an illustration of a cross-sectional side view of the vacuum tube vehicle station of FIG. 35A, taken along lines 35B-35B of FIG. 35A;

FIG. 36A is an illustration of a cross-sectional front view of the vacuum transport tube vehicle at the station door of the vacuum tube vehicle station of FIG. 35A, and shows an enclosed volume portion in partial filled state stage;

FIG. 36B is an illustration of a cross-sectional side view of the vacuum tube vehicle station of FIG. 36A, taken along lines 36B-36B of FIG. 36A;

FIG. 37A is an illustration of a cross-sectional front view of the vacuum transport tube vehicle at the station door of the vacuum tube vehicle station of FIG. 36A, and shows an enclosed volume portion in unfilled state stage;

FIG. 37B is an illustration of a cross-sectional side view of the vacuum tube vehicle station of FIG. 37A, taken along lines 37B-37B of FIG. 37A;

FIG. 38A is an illustration of a cross-sectional front view of the vacuum transport tube vehicle at the station door of the vacuum tube vehicle station of FIG. 37A, and shows a door seals retracted stage;

FIG. 38B is an illustration of a cross-sectional side view of the vacuum tube vehicle station of FIG. 38A, taken along lines 38B-38B of FIG. 38A;

FIG. 39A is an illustration of a cross-sectional front view of the station door and door cavity of the vacuum tube vehicle station of FIG. 38A, and shows a vehicle exits station stage;

FIG. 39B is an illustration of a cross-sectional side view of the vacuum tube vehicle station of FIG. 39A, taken along lines 39B-39B of FIG. 39A;

FIG. 40A is an illustration of a cross-sectional front view of a vacuum transport tube vehicle at a station door and a door cavity of a vacuum tube vehicle station, and shows an air leak at door seal stage;

FIG. 40B is an illustration of a cross-sectional side view of the vacuum tube vehicle station of FIG. 40A, taken along lines 40B-40B of FIG. 40A;

FIG. 41A is an illustration of a cross-sectional front view of the vacuum transport tube vehicle at the station door of the vacuum tube vehicle station of FIG. 40A, and shows an air moves into recessed area stage;

FIG. 41B is an illustration of a cross-sectional side view of the vacuum tube vehicle station of FIG. 41A, taken along lines 41B-41B of FIG. 41A;

FIG. 42A is an illustration of a cross-sectional front view of the vacuum transport tube vehicle at the station door of the vacuum tube vehicle station of FIG. 41A, and shows an air accumulated in recessed area stage;

FIG. 42B is an illustration of a cross-sectional side view of the vacuum tube vehicle station of FIG. 42A, taken along lines 42B-42B of FIG. 42A;

FIG. 43A is an illustration of a cross-sectional front view of the vacuum transport tube vehicle at the station door of the vacuum tube vehicle station of FIG. 42A, and shows a valve closed and air captured in recessed area stage;

FIG. 43B is an illustration of a cross-sectional side view of the vacuum tube vehicle station of FIG. 43A, taken along lines 43B-43B of FIG. 43A;

FIG. 44A is an illustration of a cross-sectional front view of the vacuum transport tube vehicle at the station door of the vacuum tube vehicle station of FIG. 43A, and shows an air evacuated out of recessed area stage;

FIG. 44B is an illustration of a cross-sectional side view of the vacuum tube vehicle station of FIG. 44A, taken along lines 44B-44B of FIG. 44A;

FIG. 45A is an illustration of a cross-sectional front view of the vacuum transport tube vehicle at the station door of the vacuum tube vehicle station of FIG. 44A, and shows a valve opened to recessed area stage;

FIG. 45B is an illustration of a cross-sectional side view of the vacuum tube vehicle station of FIG. 45A, taken along lines 45B-45B of FIG. 45A.

The figures shown in this disclosure represent various aspects of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

The disclosure, as discussed in detail below, includes embodiments of a vacuum volume reduction system 10 (see FIGS. 2A, 3) and a method 300 (see FIG. 21) for reducing a volume 50 (see FIGS. 2A, 3) to be evacuated at a vacuum tube vehicle station 12 (see FIGS. 2A, 3).

Figures 1A, 1B:
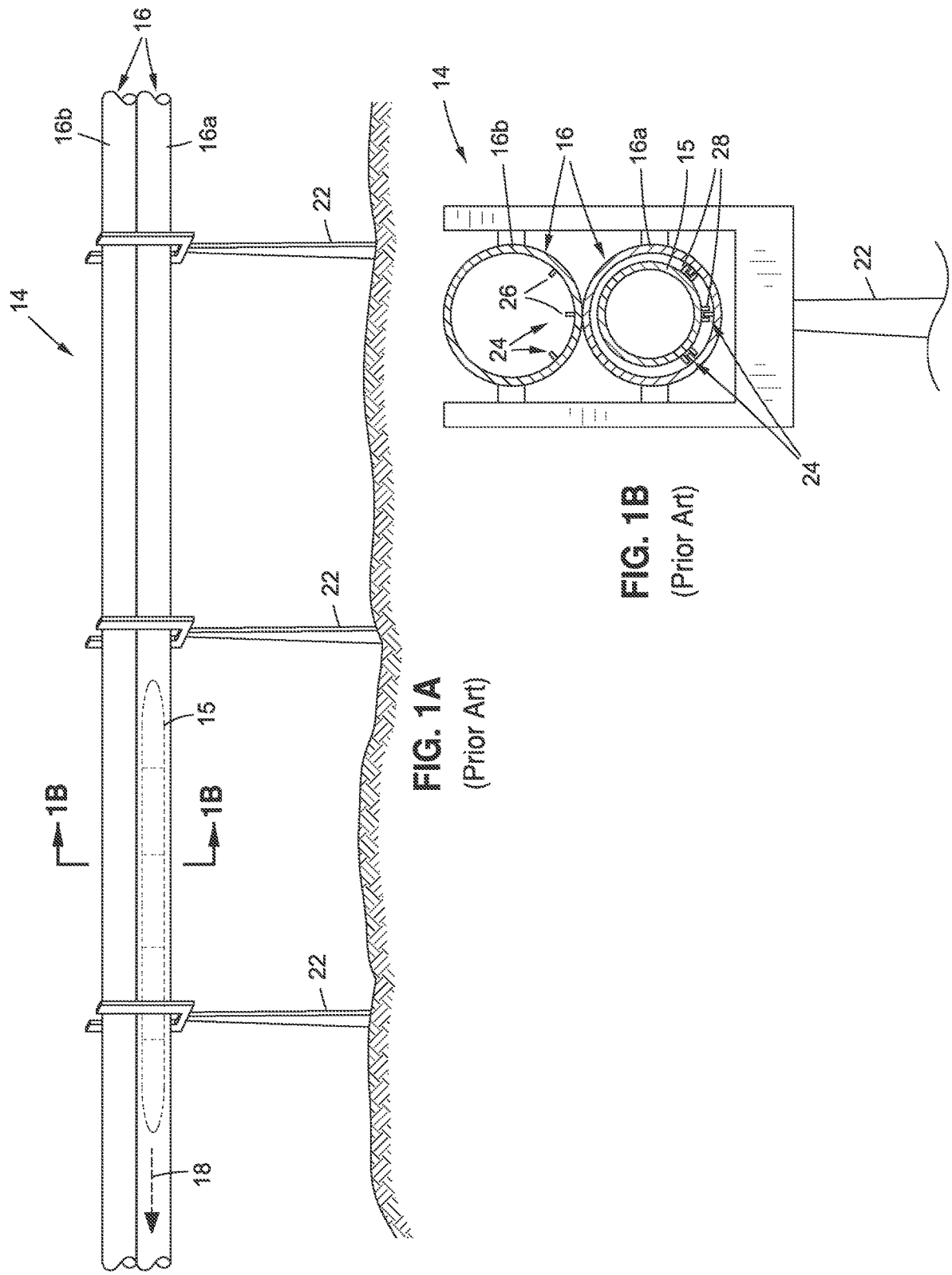
FIG. 1A is an illustration of a side perspective view of a proposed known high-speed vacuum tube transportation system having vacuum transport tubes that may be used with one or more embodiments of the vacuum volume reduction system and method of the disclosure.
FIG. 1B is an illustration of a cross-sectional view of the proposed known high-speed vacuum tube transportation system, taken along lines 1B-1B of FIG. 1A.

Now referring to the Figures, FIG. 1A is an illustration of a side perspective view of a proposed known high-speed vacuum tube transportation system 14, e.g., 200-2000 mph (miles per hour) average speed, with a high-speed vacuum tube transportation train 15 moving or traveling through a vacuum tube 16, such as a first vacuum tube 16a, in a direction of travel 18. As shown in FIG. 1A, the proposed known high-speed vacuum tube transportation system 14 may include the first vacuum tube 16a and a second vacuum tube 16b, one, or both, of which may be used with one or more embodiments of the vacuum transport tube vehicle 60 and the vacuum volume reduction system 10, or vacuum volume reduction system 10a, of the disclosure. As further shown in FIG. 1A, the vacuum tubes 16 are elevated above a ground surface 20, via a plurality of column support structures 22. However, the vacuum tubes 16 may also be installed underneath the ground surface 20.

FIG. 1B is an illustration of a cross-sectional view of the proposed known high-speed vacuum tube transportation system 14, taken along lines 1B-1B of FIG. 1A. FIG. 1B shows the high-speed vacuum tube transportation train 15 within the first vacuum tube 16a. The first vacuum tube 16a (see FIG. 1B) is positioned below the second vacuum tube 16b (see FIG. 1B), and the column support structure 22 (see FIG. 1B) supports the vacuum tubes 16 (see FIG. 1B). As further shown in FIG. 1B, the high speeds of the high-speed vacuum tube transportation train 15 may be enabled by a magnetic levitation (mag-lev) propulsion system 24, which is substantially frictionless and eliminates or greatly reduces rolling friction. The mag-lev propulsion system 24 (see FIG. 1B) may include a plurality of guide magnets 26 (see FIG. 1B) and a plurality of vehicle magnets 28 (see FIG. 1B) to create both lift and substantially frictionless propulsion to move the high-speed vacuum tube transportation train 15 (see FIG. 1B) along a guideway through the vacuum tube 16 (see FIG. 1B) at very high speeds.

Figure 2A:
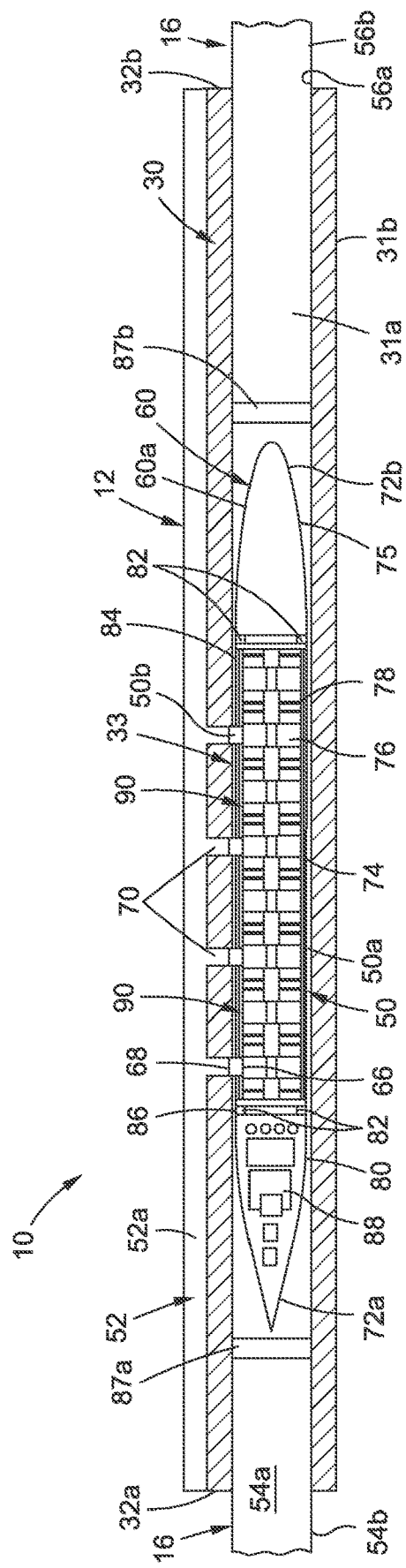
FIG. 2A is an illustration of a top sectional view of an embodiment of a vacuum volume reduction system of the disclosure used with a vacuum transport tube vehicle at a vacuum tube vehicle station.

Now referring to FIG. 2A and FIG. 3, FIG. 2A is an illustration of a top sectional view of an embodiment of a vacuum volume reduction system 10 of the disclosure used with a vacuum transport tube vehicle 60, such as a vacuum transport tube train 60a, at a vacuum tube vehicle station 12. FIG. 3 is an illustration of a functional block diagram of an exemplary embodiment of a vacuum volume reduction system 10 of the disclosure for reducing a volume 50 to be evacuated at a vacuum tube vehicle station 12.

As shown in FIGS. 2A, 3, the vacuum volume reduction system 10 comprises a station vacuum tube 33 disposed in an interior 31a of a station wall 30 of the vacuum tube vehicle station 12. The station vacuum tube 33 (see FIGS. 2A, 3) has a tube volume 50a, which is part of the volume 50 that is a vacuum 51 (see FIG. 3) at the vacuum tube vehicle station 12. The vacuum volume reduction system 10 (see FIGS. 2A, 3) displaces the tube volume 50a (see FIGS. 2A, 3) between the station wall 30 (see FIGS. 2A, 3) and a vehicle outer surface 80 (see FIGS. 2A, 3), and in turn, reduces the volume 50 (see FIGS. 2A, 3) to be evacuated at the vacuum tube vehicle station 12.

Figure 2C:
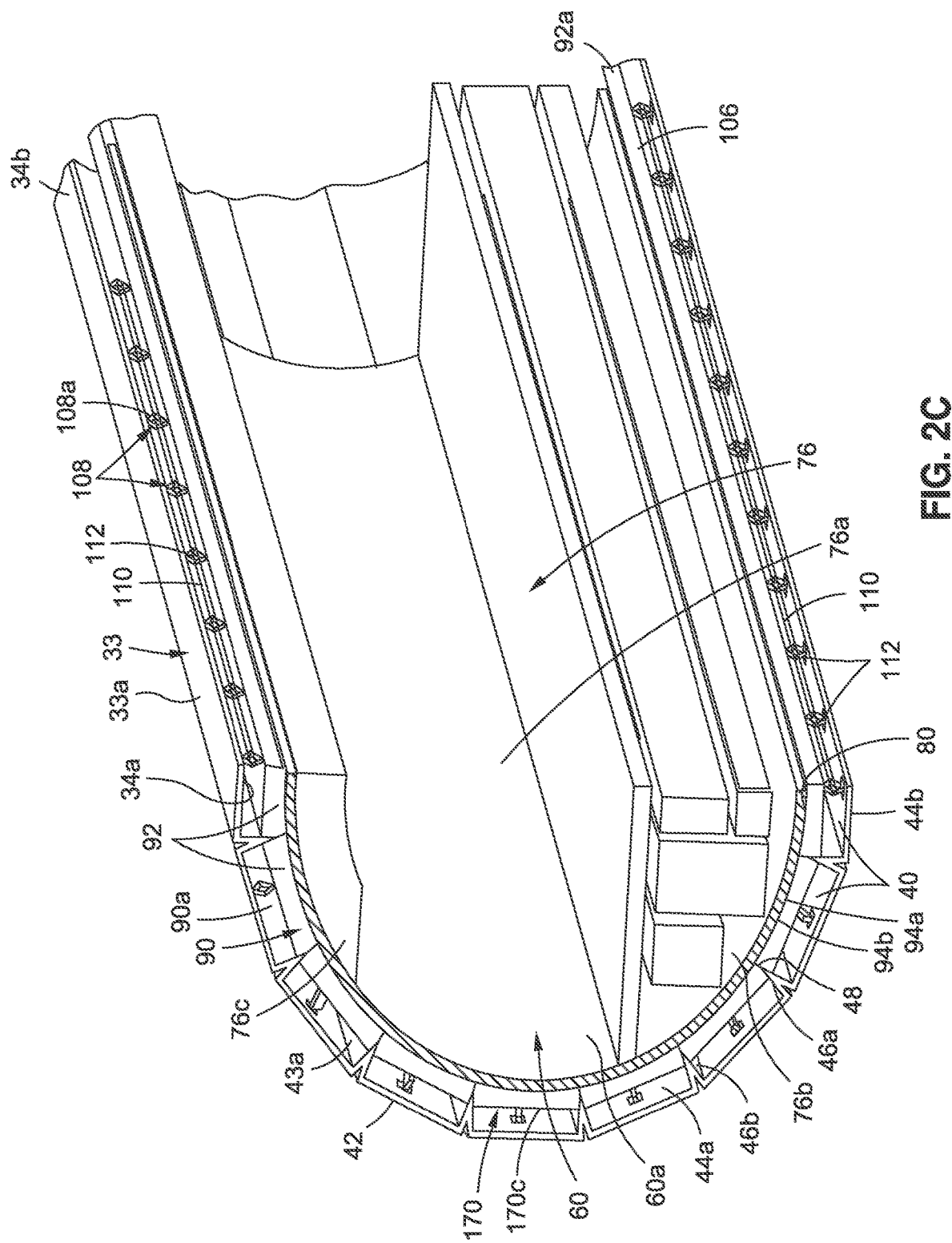
FIG. 2C is an illustration of an enlarged cut-away side perspective view of the modular tube volume reduction assembly of FIG. 2B.

In one embodiment, as shown in FIGS. 2B, 2C, and discussed in further detail below, the station vacuum tube 33 is a modular station vacuum tube 33a (see also FIG. 3) that is integrated with a volume reduction assembly 90 (see also FIG. 3), to form a modular tube volume reduction assembly 90a (see also FIG. 3), configured for installation in the station wall 30 (see also FIGS. 2A, 3). In another embodiment, as shown in FIG. 4B, and discussed in further detail below, the station vacuum tube 33 is a built-in station vacuum tube 33b formed in the station wall 30, and the volume reduction assembly 90 is coupled to the built-in station vacuum tube 33b.

As further shown in FIG. 2A, the station wall 30 of the vacuum tube vehicle station 12 has an interior 31a, an exterior 31b, a first end 32a, and a second end 32b. As further shown in FIG. 2A, vacuum tubes 16 may be coupled to the first end 32a and the second end 32b, respectively, and each vacuum tube 16 has an interior 54a, an exterior 54b, an inner surface 56a, and an outer surface 56b. The interior 54a of the vacuum tubes 16 is preferably coextensive with the interior 31a of the station wall 30 and an interior 36a (see FIG. 4C) of the station vacuum tube 33.

As further shown in FIG. 2A, the vacuum transport tube vehicle 60, such as the vacuum transport tube train 60a, comprises a forward end 72a, and an aft end 72b. As further shown in FIGS. 2A, 3, the vacuum transport tube vehicle 60, such as the vacuum transport tube train 60a, comprises a constant radius portion 74, a contour portion 75, an interior 76, an outer vehicle wall 78, and a vehicle outer surface 80. The vacuum transport tube vehicle 60 (see FIGS. 2A, 3), such as the vacuum transport tube train 60a (see FIG. 2A), may be controlled and powered via a vehicle power and control system 88 (see FIGS. 2A, 3), and the vacuum transport tube vehicle 60 (see FIGS. 2A, 3) may be enabled by the magnetic levitation (mag-lev) propulsion system 24 (see FIGS. 1B, 3), which is substantially frictionless and eliminates or greatly reduces rolling friction.

As shown in FIG. 3, the interior 76 of the vacuum transport tube vehicle 60 preferably comprises a cabin 76a, a cargo compartment 76b, and a ceiling 76c. As further shown in FIGS. 2A, 3, the vacuum transport tube vehicle 60 may comprise one or more vehicle doors 66.

As shown in FIGS. 2A, 3, the vacuum tube vehicle station 12 may comprise one or more station doors 68, and one or more station passageways 70 comprising walkways from the vacuum tube vehicle station 12 to the vacuum transport tube vehicle 60. The vacuum tube vehicle station 12 has station space filled with air 52 (see FIGS. 2A, 3), such as ambient air 52a (see FIGS. 2A, 3). The vacuum tube vehicle station 12 further has a volume 50 (see FIGS. 2A, 3) comprising a tube volume 50a (see FIGS. 2A, 3) and a door cavity volume 50b (see FIGS. 2A, 3) for evacuation 166 (see FIG. 3).

As shown in FIGS. 2A, 3, the vacuum volume reduction system 10 further comprises a volume reduction assembly 90 coupled to the station vacuum tube 33. The volume reduction assembly 90 (see FIG. 3) has a control system 108 (see FIG. 3) for radially moving the volume reduction assembly 90 to and from a vehicle outer surface 80 (see FIGS. 2A, 3) of a vacuum transport tube vehicle 60 at the vacuum tube vehicle station 12. The volume reduction assembly 90 (see FIGS. 2A, 3) engages around the vehicle outer surface 80 (see FIG. 3), for loading and unloading of one or more of, passengers 62 (see FIG. 9B) and cargo 64 (see FIG. 6B), through one or more vehicle doors 66 (see FIGS. 3, 9B) of the vacuum transport tube vehicle 60 (see FIGS. 3, 9B), and through one or more station doors 68 (see FIGS. 3, 9B) of the vacuum tube vehicle station 12. Engages around may mean that the volume reduction assembly 90 may form a seal 91 (see FIG. 3) in a sealed engagement 91a (see FIG. 3) around the vehicle outer surface 80 (see FIG. 3), or may mean that the volume reduction assembly 90 engages in close or near proximity, such as ⅛ inch to ¼ inch distance, to the vehicle outer surface 80 (see FIGS. 2A, 3) of the vacuum transport tube vehicle 60.

In one embodiment, as shown in FIGS. 2B, 2C, as discussed in detail below, the volume reduction assembly 90 comprises a plurality of blocks 92 installed in a plurality of cavities 40 longitudinally formed around a circumference 42 of the station vacuum tube 33. The plurality of blocks 92 (see FIGS. 3, 2B, 2C) are configured to move to reduce a gap volume 100a (see FIGS. 3, 7B) formed between the plurality of blocks 92 and the vehicle outer surface 80, for the loading and the unloading of one or more of, the passengers 62 and the cargo 64, through the one or more vehicle doors 66 and through the one or more station doors 68. The plurality of blocks 92 (see FIGS. 2C, 3) are preferably comprised of a compliant material 102 (see FIG. 3) such as a foam, a rubber, a foam rubber, or another suitably compliant material, that allows the plurality of blocks 92 to deform to match a shape 104 (see FIGS. 3, 5B) of the plurality of cavities 40 (see FIGS. 3, 5B).

The plurality of blocks 92 may be moved with a control system 108 (see FIGS. 2C, 3). As shown in FIG. 3, the control system 108 may comprise one of, a mechanical actuator control system 108a, a pneumatic actuator control system 108b, a hydraulic actuator control system 108c, an electrical actuator control system 108d, or another suitable control system for controlling movement and actuation of the volume reduction assembly 90. In one embodiment, the control system 108 (see FIGS. 2C, 3) comprises the mechanical actuator control system 108*a* (see FIGS. 2C, 3) comprising one or more worm gears 110 (see FIGS. 2C, 3) coupled to one or more scissor jacks 112 (see FIGS. 2C, 3).

Figures 9A, 9B:
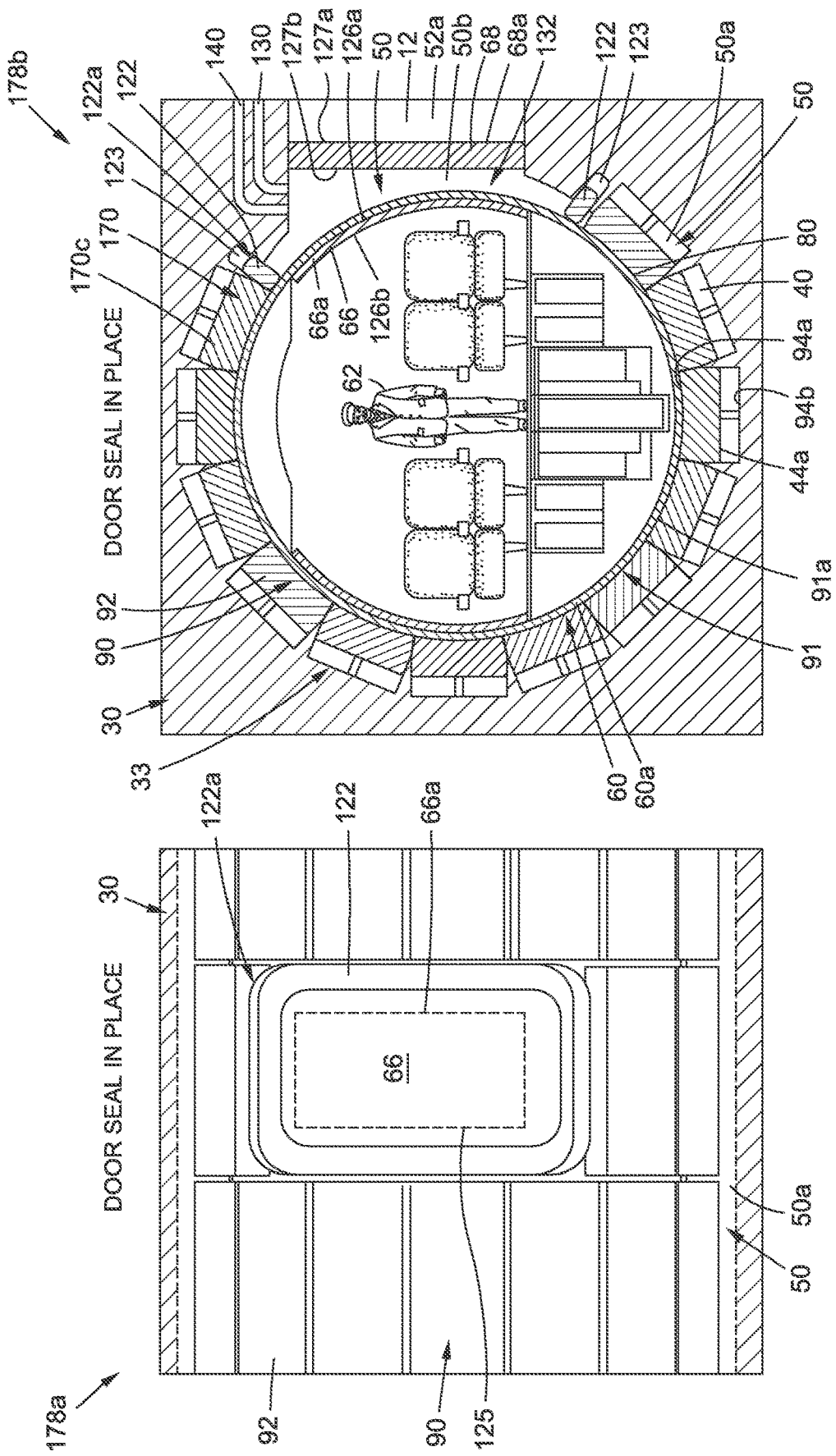
FIG. 9A is an illustration of a cross-sectional side view of an embodiment of the volume reduction assembly in the form of a plurality of blocks and showing a vehicle door and a door seal in a deployed position.
FIG. 9B is an illustration of a partial sectional front view of the volume reduction assembly of FIG. 9A, showing the vehicle door and the door seal in the deployed position.

As shown in FIG. 3, the vacuum volume reduction system 10 further comprises one or more door seals 122 that are coupled to the station wall 30, and configured to surround a perimeter 125 of, and to seal, each of the one or more vehicle doors 66, and to seal off a door cavity 132 having a door cavity volume 50*b*. As shown in FIG. 9B, the door seal 122 may be deployed from and retracted into a door seal cavity 123. The door seal 122 (see FIG. 3) is preferably controlled with a door seal control system 124 (see FIG. 3).

The vacuum volume reduction system 10 (see FIG. 3) further comprises an air supply assembly 130 (see FIG. 3) coupled to the station wall 30 (see FIG. 3), and configured to supply air 52 (see FIG. 3) to the door cavity 132 (see FIG. 3). The air supply assembly 130 (see FIG. 3) is preferably configured to supply air 52 (see FIG. 3) comprising one of, ambient air 52*a* (see FIG. 3) or compressed air 52*b* (see FIG. 3), to the door cavity 132, before the loading and the unloading of one or more of, the passengers 62 and the cargo 64. The door cavity 132 (see FIG. 3) is positioned between each of the one or more vehicle doors 66 (see FIG. 3) and each of the one or more station doors 68 (see FIG. 3). As shown in FIG. 3, the air supply assembly 130 may comprise one or more air pumps 134, one or more air ducts 136, one or more air supply control valves 138, and other suitable components.

The vacuum volume reduction system 10 (see FIG. 3) further comprises a vent-to-vacuum assembly 140 (see FIG. 3) coupled to the station wall 30 (see FIG. 3), and configured to evacuate the air 52 (see FIG. 3) from the door cavity 132 (see FIG. 3). The vent-to-vacuum assembly 140 (see FIG. 3) is configured to evacuate the air 52 (see FIG. 3) comprising one of, the ambient air 52*a* (see FIG. 3), or the compressed air 52*b* (see FIG. 3), from the door cavity 132 (see FIG. 3), after the loading and the unloading of one or more of, the passengers 62 and the cargo 64. As shown in FIG. 3, the vent-to-vacuum assembly 140 may comprise one or more vacuum pumps 142, one or more vacuum ducts 144, one or more vacuum valves 146, and one or more vacuum reservoirs 148 for collecting the evacuated air. The vent-to-vacuum assembly 140 (see FIG. 3) may further comprise one or more vents 149 (see FIG. 3) for venting the evacuated air.

As shown in FIG. 3 and FIGS. 20A-20E, discussed in further detail below, the vacuum volume reduction system 10 may further comprise a door cavity volume reduction surface 150 coupled to each of one or more station doors 68, such as curved station doors 69, and configured to displace the door cavity volume 50*b*, to further reduce the volume 50 to be evacuated at the vacuum tube vehicle station 12. The door cavity volume reduction surface 150 (see FIGS. 3, 20A) comprises an inflatable door bladder 152 (see FIGS. 3, 20A) coupled to the air supply assembly 130 (see FIGS. 3, 20A), to inflate the inflatable door bladder 152 to expand toward the one or more vehicle doors 66 (see FIGS. 3, 20A). The inflatable door bladder 152 (see FIGS. 3, 20A) is further coupled to the vent-to-vacuum assembly 140 (see FIGS. 3, 20A), to deflate the inflatable door bladder 152, to retract from the one or more vehicle doors 66. The inflatable door bladder 152 (see FIGS. 3, 20A) is further coupled to one or more of, a plurality of spring elements 154 (see FIG. 20A), or a plurality of elastic elements 156 (see FIG. 20A), to provide a force 157 (see FIG. 3) to retract the inflatable door bladder 152 (see FIGS. 3, 20A).

The vacuum volume reduction system 10 (see FIGS. 2A, 3) may further comprise one or more pressure seals 82 (see FIGS. 2A, 3) coupled to the vacuum transport tube vehicle 60 (see FIGS. 2A, 3). As shown in FIG. 2A, one or more pressure seals 82 may be coupled at a forward location 86 of the vacuum transport tube vehicle 60, and one or more pressure seals 82 may be coupled at an aft location 84 of the vacuum transport tube vehicle 60.

As shown in FIG. 2A, the vacuum volume reduction system 10 may further comprise a first pressure barrier seal 87*a* coupled to the station wall 30 and configured to deploy in front of the vacuum transport tube vehicle 60, after the vacuum transport tube vehicle 60 has arrived at the vacuum tube vehicle station 12, and may further comprise a second pressure barrier seal 87*b* coupled to the station wall 30 and configured to deploy behind the vacuum transport tube vehicle 60, after the vacuum transport tube vehicle 60 has arrived at the vacuum tube vehicle station 12.

Now referring to FIGS. 2B and 2C, FIG. 2B is an illustration of a side perspective view of an embodiment of a volume reduction assembly 90, in the form of a modular tube volume reduction assembly 90*a*, of the disclosure. FIG. 2C is an illustration of an enlarged cutaway side perspective view of the modular tube volume reduction assembly 90*a* of FIG. 2B. As shown in FIGS. 2B, 2C, in another embodiment, there is provided the modular tube volume reduction assembly 90*a* for use at the vacuum tube vehicle station 12 (see FIG. 2A). FIGS. 2B, 2C show the modular tube volume reduction assembly 90*a* engaged around the vacuum transport tube vehicle 60, and show the interior 76, which includes the cabin 76*a*, the cargo compartment 76*b*, and the ceiling 76*c*.

The modular tube volume reduction assembly 90*a* (see FIGS. 2B, 2C) comprises the station vacuum tube 33 (see FIGS. 2B, 2C), such as in the form of a modular station vacuum tube 33*a* (see FIGS. 2B, 2C), having an inner surface 34*a* (see FIG. 2C) and an outer surface 34*b* (see FIG. 2C). The modular tube volume reduction assembly 90*a* (see FIGS. 2B, 2C) further has a tube volume 50*a* (see FIG. 3) and a plurality of cavities 40 (see FIGS. 2B, 2C) longitudinally formed around a circumference 42 (see FIG. 2B) of the modular station vacuum tube 33*a* (see FIGS. 2B, 2C). As shown in FIG. 2C, each cavity 40, has a cavity interior 43*a*, an interior end 44*a*, an exterior end 44*b*, a first side 46*a*, a second side 46*b*, and a nominal point 48 where the first side 46*a* and the second side 46*b* join.

The modular tube volume reduction assembly 90*a* (see FIGS. 2B, 2C) further comprises a volume reduction assembly 90 (see FIGS. 2B, 2C) integrated with the modular station vacuum tube 33*a* (see FIGS. 2B, 2C). The volume reduction assembly 90 (see FIGS. 2B, 2C) comprises the plurality of blocks 92 (see FIGS. 2B, 2C) longitudinally coupled to the cavity interior 43*a* (see FIG. 2C) of each of the plurality of cavities 40 (see FIGS. 2B, 2C). The plurality of blocks 92 (see FIGS. 2B, 2C) may comprise longitudinal blocks 92*a* (see FIGS. 2B, 2C) having a longitudinal one-piece monolithic structure 106 (see FIGS. 2C, 3).

As shown in FIG. 2C, each block 92 has an inner surface 94*a* and an outer surface 94*b*. The plurality of blocks 92 (see FIGS. 2B, 2C) for the modular tube volume reduction assembly 90*a* (see FIGS. 2B, 2C) are preferably comprised of a compliant material 102 (see FIG. 3), as discussed above, that allows the plurality of blocks 92 to deform to match a shape 104 (see FIG. 3) of the plurality of cavities 40. As further shown in FIG. 2C, the plurality of blocks 92 are in a block position 170 comprising a fully deployed position 170*c* where the inner surface 94*a* of each block 92 is in engaged around the vehicle outer surface 80 of the vacuum transport tube vehicle 60. The plurality of blocks 92 may engage around the vehicle outer surface 80 by contacting the vehicle outer surface 80 directly to form a seal 91 (see FIG. 3) in a sealed engagement 91a (see FIG. 3) against the vehicle outer surface 80, or the plurality of blocks 92 may engage around the vehicle outer surface 80 by engaging in close or near proximity, such as ⅛ inch or ¼ inch distance, to the vehicle outer surface 80.

As shown in FIGS. 2B, 2C, the volume reduction assembly 90, in the form of a modular tube volume reduction assembly 90a, comprises a control system 108, such as a mechanical actuator control system 108a, coupled between the modular station vacuum tube 33a and the plurality of blocks 92. As shown in FIG. 2C, the mechanical actuator control system 108a comprises worm gears 110 coupled to a plurality of scissor jacks 112. However, the mechanical actuator control system 108a may comprise other suitable mechanical actuation devices.

The control system 108 (see FIGS. 2B, 2C) is configured to radially move the plurality of blocks 92 (see FIGS. 2B, 2C) to and from the vehicle outer surface 80 (see FIG. 2C) of the vacuum transport tube vehicle 60 (see FIGS. 2B, 2C), such as the vacuum transport tube train 60a (see FIGS. 2B, 2C), to engage around the vehicle outer surface 80, such as in a sealed engagement 91a (see FIG. 3), to directly contact the vehicle outer surface 80, or in a close or near proximity engagement, such as ⅛ inch to ¼ inch distance, to the vehicle outer surface 80. This occurs for loading and unloading of one or more of, passengers 62 (see FIG. 9B) and cargo 64 (see FIG. 6B) in the cargo compartment 76b (see FIGS. 2B, 2C), through one or more vehicle doors 66 (see FIGS. 2A, 3) of the vacuum transport tube vehicle 60 (see FIGS. 2A, 2B, 2C) and through one or more station doors 68 (see FIGS. 2A, 3) of the vacuum tube vehicle station 12 (see FIG. 2A), when the modular tube volume reduction assembly 90a (see FIG. 2C) is used at the vacuum tube vehicle station 12 (see FIG. 2A), such as being installed in the station wall 30 (see FIG. 2A). The modular tube volume reduction assembly 90a (see FIGS. 2B, 2C) displaces the tube volume 50a (see FIG. 2A) between the station wall 30 (see FIG. 2A) and the vehicle outer surface 80 (see FIG. 2C), and in turn, reduces the volume 50 (see FIGS. 2A, 3) to be evacuated at the vacuum tube vehicle station 12 (see FIG. 2A).

Now referring to FIG. 2D, FIG. 2D is an illustration of an enlarged cutaway side perspective view of another embodiment of a volume reduction assembly 90 in the form of an inflatable bladder 114 of the disclosure. The volume reduction assembly 90 (see FIG. 3) comprises one or more inflatable bladders 114 (see FIGS. 2D, 3) coupled to the station vacuum tube 33 (see FIGS. 2D, 3). The one or more inflatable bladders 114 (see FIGS. 2D, 3) are each configured to inflate to reduce a gap volume 100a (see FIG. 3) formed between the one or more inflatable bladders 114 and the vehicle outer surface 80 (see FIG. 3) of the vacuum transport tube vehicle 60 (see FIG. 2D), such as in the form of vacuum transport tube train 60a (see FIG. 2D), for the loading and the unloading of one or more of, the passengers 62 (see FIG. 9B) and the cargo 64 (see FIG. 6B), through the one or more vehicle doors 66 (see FIG. 6B) and through the one or more station doors 68 (see FIG. 9B). FIG. 2D shows the interior 76 of the vacuum transport tube vehicle 60, including the cabin 76a, the cargo compartment 76b, and the ceiling 76c.

As shown in FIG. 2D, in an inflated position 115b, the inflatable bladder 114 has a bladder inner side 116a coupled against the vacuum transport tube vehicle 60 to engage around the vehicle outer surface 80 of the vacuum transport tube vehicle 60. The inflatable bladder 114 (see FIG. 2D) may engage around the vehicle outer surface 80 (see FIG. 2D) by contacting the vehicle outer surface 80 directly to form a seal 91 (see FIG. 3) in a sealed engagement 91a (see FIG. 3) against the vehicle outer surface 80, or the inflatable bladder 114 may engage around the vehicle outer surface 80 by engaging in close or near proximity, such as ⅛ inch or ¼ inch distance, to the vehicle outer surface 80. The inflatable bladder 114 (see FIG. 2D) has a bladder outer side 116b (see FIG. 2D) coupled to station vacuum tube 33 (see FIG. 2D). FIG. 2D further shows the inflatable bladder 114 in a deflated position 115a with dotted lines in which the bladder body 120 is reduced in size with the bladder outer side 116b still coupled to station vacuum tube 33. In an inflated position 115b (see FIG. 2D), a bladder body 120 (see FIG. 2D) of the inflatable bladder 114 (see FIG. 2D) fills a gap 100 (see FIG. 2D). The gap 100 (see FIG. 2D) is between the bladder inner side 116a (see FIG. 2D), when the inflatable bladder 114 is in the deflated position 115a, and the vehicle outer surface 80 (see FIG. 2D) of the vacuum transport tube vehicle 60 (see FIG. 2D).

The inflatable bladder 114 (see FIG. 2D) is configured to inflate to reduce the gap 100 (see FIG. 2D) between the bladder inner side 116a (see FIG. 2D) and the vacuum transport tube vehicle 60 (see FIG. 2D), when the inflatable bladder 114 expands from the deflated position 115a (see FIG. 2D) to the inflated position 115b (see FIG. 2D), and to engage around the vehicle outer surface 80 (see FIG. 2C) of the vacuum transport tube vehicle 60, when the vacuum transport tube vehicle 60 arrives at and stops at the vacuum tube vehicle station 12 (see FIG. 2A). As shown in FIGS. 2D, 3, each of the one or more inflatable bladders 114 comprises the bladder inner side 116a, the bladder outer side 116b, a bladder interior 118a, a bladder exterior 118b, and the bladder body 120.

As further shown in FIG. 2D, the inflatable bladder 114 may be deflated to the deflated position 115a, via the evacuation of air 52 out of the inflatable bladder 114, via the vent-to-vacuum assembly 140 coupled between the inflatable bladder 114 and the station wall 30. However, other suitable inflation and deflation devices or systems may also be used to inflate and deflate the inflatable bladder 114.

Figure 2E:
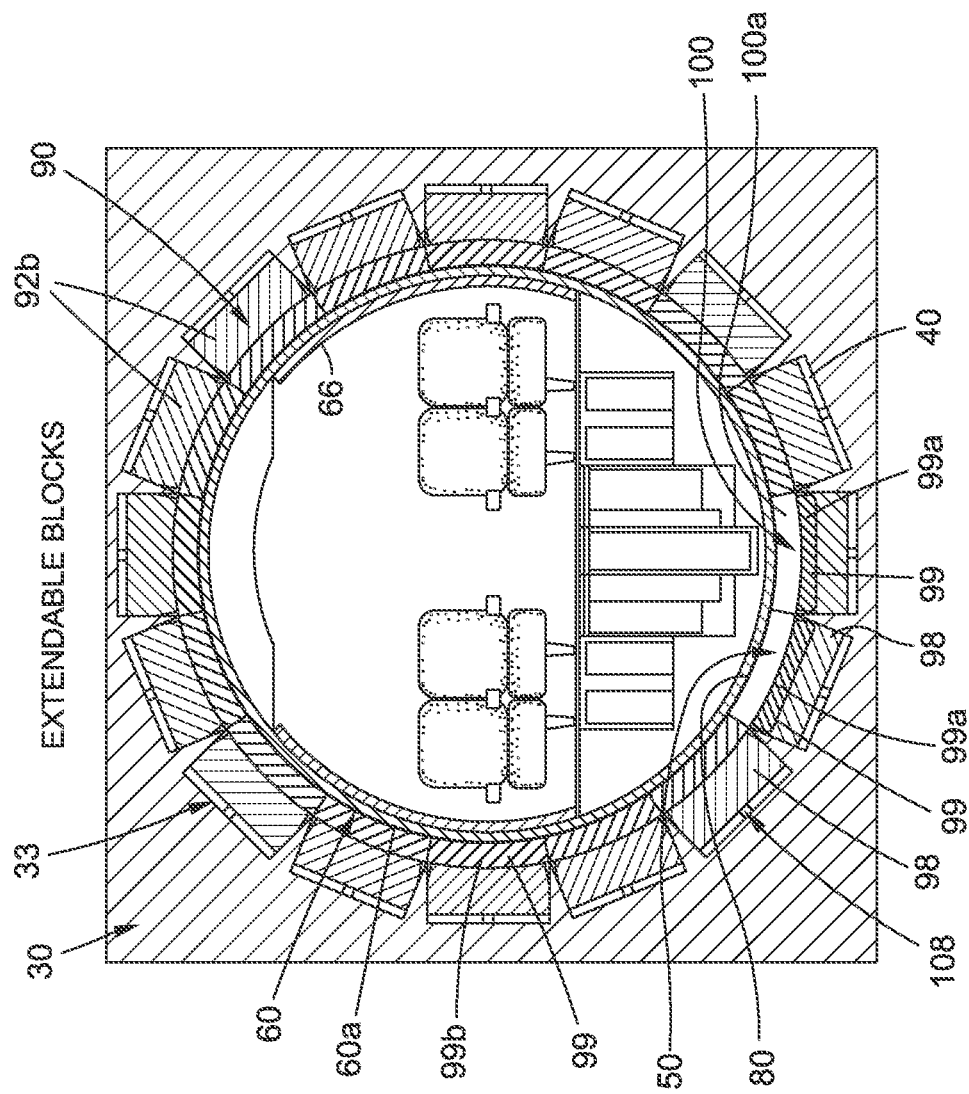
FIG. 2E is an illustration of a partial sectional front view of yet another embodiment of a volume reduction assembly in the form of a plurality of extendable blocks of the disclosure.

FIG. 2E is an illustration of a partial sectional front view of yet another embodiment of a volume reduction assembly 90 coupled to the station vacuum tube 33 in the station wall 30 of the disclosure in the form of a plurality of extendable blocks 92b of the disclosure. In this embodiment, the volume reduction assembly 90 comprises the plurality of extendable blocks 92b. Each extendable block 92b comprises an extendable portion 99 that is extendable from a block body 98. FIG. 2E shows the extendable block 92b in a retracted position 99a with a gap 100 having a gap volume 100a between the extendable block 92b and the vehicle outer surface 80 of the vacuum transport tube vehicle 60, such as the vacuum transport tube train 60a. The gap volume 100a (see FIG. 2E) is part of the volume 50 (see FIG. 2E). FIG. 2E further shows the extendable block 92b in an extended position 99b, where just the extendable portion 99, and not the block body 98 is moved radially inward via the control system 108 in contact with the vehicle outer surface 80 to engage around the vehicle outer surface 80. The extendable portions 99 of the plurality of extendable blocks 92b may engage around the vehicle outer surface 80 by contacting the vehicle outer surface 80 directly to form a seal 91 (see FIG. 3) in a sealed engagement 91a (see FIG. 3) against the vehicle outer surface 80, or the extendable portions 99 of the plurality of extendable blocks 92b may engage around the vehicle outer surface 80 by engaging in close or near proximity, such as ⅛ inch or ¼ inch distance, to the vehicle outer surface 80.

Figure 4C:
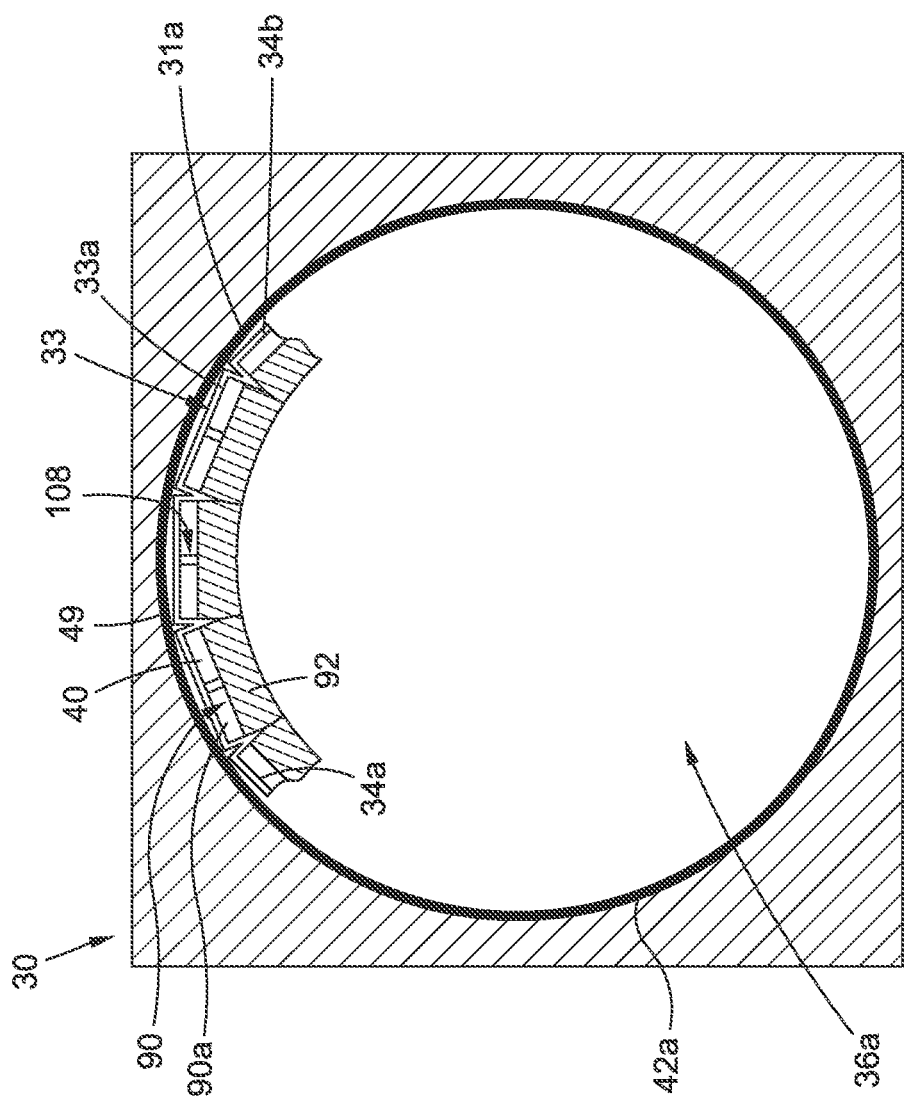
FIG. 4C is an illustration of a cross-sectional front view of a station wall showing another embodiment of a station vacuum tube.

Now referring to FIGS. 4A-4C, FIG. 4A is an illustration of a cross-sectional side view of a station wall 30 of a vacuum tube vehicle station 12 (see FIG. 12A) that may be used with embodiments of a vacuum volume reduction system 10 (see FIGS. 2A, 3) of the disclosure. FIG. 4B is an illustration of a cross-sectional front view of the station wall 30 of FIG. 4A, showing an embodiment of a station vacuum tube. FIG. 4C is an illustration of a cross-sectional front view of a station wall 30 showing another embodiment of a station vacuum tube 33.

FIG. 4A shows cavities and the exterior end 44b of the cavities. FIG. 4B shows the station vacuum tube 33, such as in the form of a built-in station vacuum tube 33b, that may be built into the station wall 30. FIG. 4B further shows the plurality of cavities 40, where each cavity 40 has the interior end 44a, the exterior end 44b, the first side 46a, the second side 46b, and the nominal point 48 where the first side 46a of one cavity 40 meets or joins with a second side 46b of an adjacent cavity 40a. As shown in FIG. 4B, the first side 46a shown as LINE A is extended and is parallel to extended LINE B indicating the second side 46b. FIG. 4B further shows the inner surface 34a of the station vacuum tube 33, the outer surface 34b of the station vacuum tube 33, the interior 36a of the station vacuum tube 33, and the exterior 36b of the station vacuum tube 33. The interior 36a of the station vacuum tube 33 comprises a volume 50, such as a tube volume 50a.

FIG. 4C shows in partial view the volume reduction assembly 90, such as in the form of modular tube volume reduction assembly 90a, installed in the station wall 30. The volume reduction assembly 90, such as in the form of modular tube volume reduction assembly 90a, includes the station vacuum tube 33, in the form of a modular station vacuum tube 33a, with the inner surface 34a and the outer surface 34b, and shows the cavity 40, the control system 108, and the blocks 92. As further shown in FIG. 4C, the volume reduction assembly 90 may include a liner element 49 coupled to the interior 31a of the station wall 30 for contact or engagement with the outer surface 34b of the station vacuum tube 33. The liner element 49 may provide additional protection against leaks, as well as a protective layer for the volume reduction assembly 90.

Now referring to FIGS. 5A-5B, FIG. 5A is an illustration of a cross-sectional side view of an embodiment of a volume reduction assembly 90, such as in the form of the plurality of blocks 92, in the station wall 30, and showing the outer surface 94b of the plurality of blocks 92. FIG. 5B is an illustration of a cross-sectional front view of the volume reduction assembly 90, in the form of the plurality of blocks 92, of FIG. 5A in the station wall 30.

FIG. 5B shows the plurality of blocks 92 inserted in the cavities 40 of the station vacuum tube 33, and shows each block 92 conforming to the shape 104 of each cavity 40. As shown in FIG. 5B, each block 92 comprises an inner surface 94a, an outer surface 94b, sides 96 including a first side 96a and a second side 96b, and a block body 98. FIG. 5B further shows the control system 108, such as in the form of the mechanical actuator control system 108a, for moving or actuating the blocks 92, when deployed, radially inward toward the vehicle outer surface 80, so that the inner surface 94a of each block 92 contacts, or engages, the vehicle outer surface 80 (shown in dotted lines in FIG. 5B) of the vacuum transport tube vehicle 60, after the vacuum transport tube vehicle 60 has arrived at the vacuum tube vehicle station 12. The actuation of the blocks 92 by the control system 108 may be mechanical, pneumatic, hydraulic, or electric. The amount of force required to move the blocks 92 inward and later outward will likely be minimal, because they are moving in a vacuum 51, and they are not designed to impart a large force upon the outer vehicle wall 78 (see FIG. 6B). The material of the blocks 92 is preferably a compliant material 102 (see FIG. 3), so that it can easily deform to match the contour portion 75 (see FIG. 2A) of the vacuum transport tube vehicle 60 (see FIG. 2A). FIG. 5B further shows the volume 50, such as the tube volume 50a.

Now referring to FIGS. 6A-18B, various stages of operation of an embodiment of the volume reduction assembly 90, such as in the form of a plurality of blocks 92, in cavities 40, of the vacuum volume reduction system 10 of the disclosure, are discussed, when a vacuum transport tube vehicle 60, such as a vacuum transport tube train 60a, arrives at, stops to load and unload passengers 62 and/or cargo 64, and exits from a vacuum tube vehicle station 12. It is noted that one or more of these stages of operation may also be performed with other embodiments of the volume reduction assembly 90, such as the inflatable bladder 114 (see FIG. 2D), the longitudinal blocks 92a (see FIG. 2B), the extendable blocks 92b (see FIG. 2E), and other embodiments disclosed herein.

Now referring to FIGS. 6A-6B, FIG. 6A is an illustration of a cross-sectional side view of an embodiment of a volume reduction assembly 90, in the form of a plurality of blocks 92, when a vacuum transport tube vehicle 60 (see FIG. 6B), such as a vacuum transport tube train 60a (see FIG. 6B), arrives at a vacuum tube vehicle station 12 (see FIG. 2A). FIG. 6A shows a vehicle arrival stage side view 172a, and also shows the station wall 30, the outer surface 94b of the plurality of blocks 92, and the volume 50.

FIG. 6B is an illustration of a partial sectional front view of the volume reduction assembly 90, such as in the form of the plurality of blocks 92, of FIG. 6A, showing the plurality of blocks 92 in a block position 170 of a fully retracted position 170a. FIG. 6B shows a vehicle arrival stage front view 172b. FIG. 6B further shows a gap 100 with a gap volume 100a between the vehicle outer surface 80 of the outer vehicle wall 78 of the vacuum transport tube vehicle 60, and the inner surface 94a of each block 92. Between the vehicle outer surface 80 (see FIG. 6B) and the inner surface 94a (see FIG. 6B) of each block 92 is the gap 100 (see FIG. 6B) having a gap width 100b (see FIG. 3) of a few inches, where the gap 100 is part of the volume 50 (see FIG. 6B), such as the tube volume 50a (see FIG. 6B). FIG. 6B further shows the station wall 30, the station vacuum tube 33, the vacuum transport tube vehicle 60 with the interior 76, including the cabin 76a having chairs 77 and cabin air 52c, the cargo compartment 76b having cargo 64, such as luggage 64a, stored in the cargo compartment 76b, the ceiling 76c, and the vehicle door 66. FIG. 6B further shows the volume reduction assembly 90, such as the plurality of block 92, disposed in the cavities 40, and coupled to the control system 108 that operates movement, such as deployment and retraction, of the plurality of blocks 92.

Figure 7B:
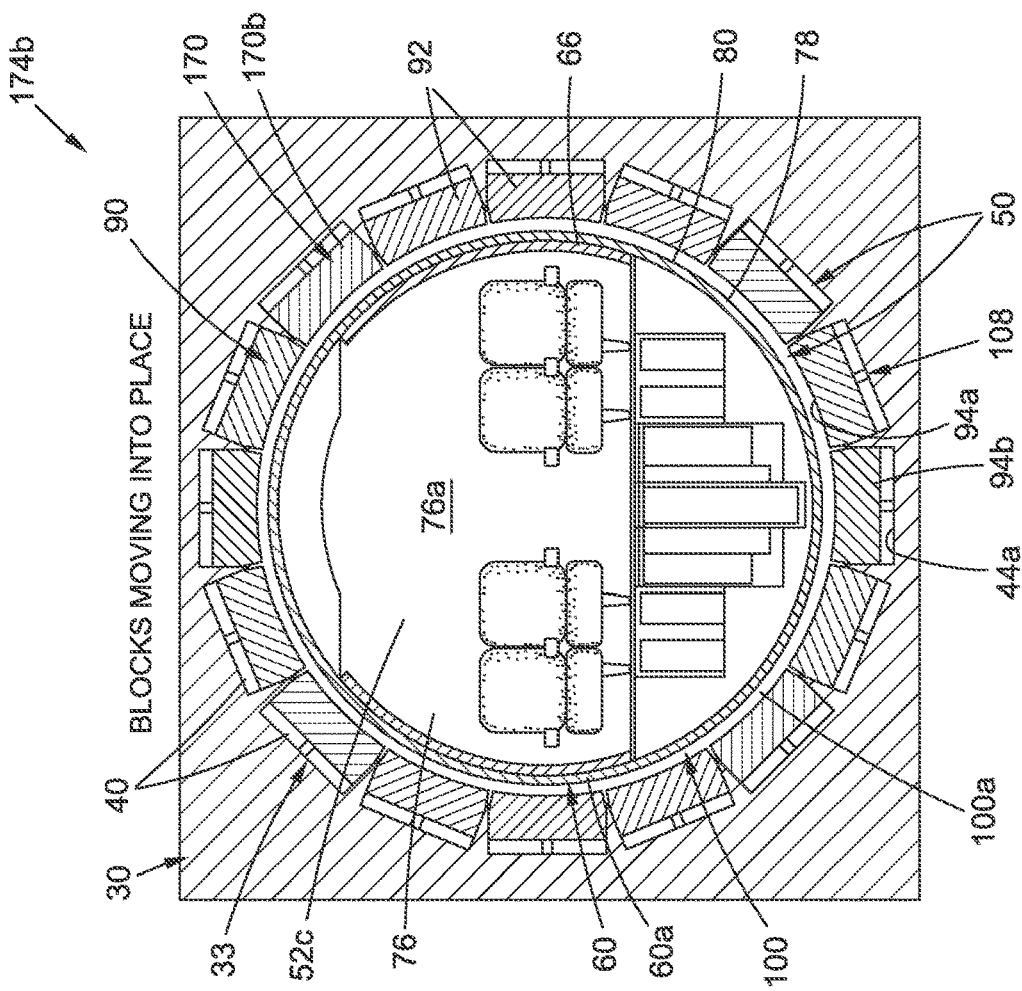
FIG. 7B is an illustration of a partial sectional front view of the volume reduction assembly of FIG. 7A, showing the plurality of blocks in the partially deployed position.
Figure 7A:
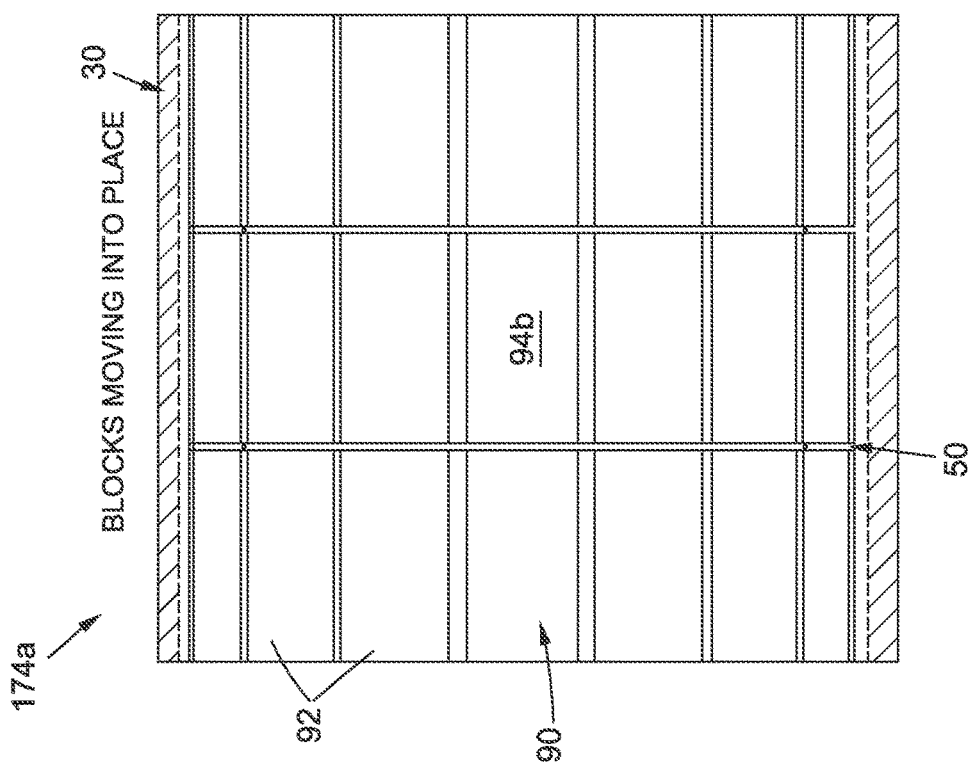
FIG. 7A is an illustration of a cross-sectional side view of an embodiment of the volume reduction assembly in the form of a plurality of blocks and showing the plurality of blocks is in a partially deployed position.

Now referring to FIGS. 7A-7B, FIG. 7A is an illustration of a cross-sectional side view of an embodiment of the volume reduction assembly 90, in the form of the plurality of blocks 92, and shows the outer surface 94b of the plurality of blocks 92 which are coupled to the station wall 30, and shows the volume 50. FIG. 7A shows a blocks moving into place stage side view 174a.

FIG. 7B is an illustration of a partial sectional front view of the volume reduction assembly 90 of FIG. 7A, showing the plurality of blocks 92 in the block position 170 of a partially deployed position 170*b*. FIG. 7B shows a blocks moving into place stage front view 174*b*. FIG. 7B shows the station wall 30, the station vacuum tube 33, the cavities 40 with an interior end 44*a*, the control system 108, and the vacuum transport tube vehicle 60, such as the vacuum transport tube train 60*a*, when the vacuum transport tube vehicle 60 has arrived at the vacuum tube vehicle station 12 (see FIG. 3) and is stopped, and the plurality of blocks 92 are moving into place. FIG. 7B further shows the inner surface 94*a* and the outer surface 94*b* of the plurality of blocks 92, which move radially inward toward the vehicle outer surface 80 of the outer vehicle wall 78 of the vacuum transport tube vehicle 60, such as the vacuum transport tube train 60*a*. The plurality of blocks 92 preferably do not change their overall shape and size but experience a rigid body radial motion. FIG. 7B further shows the interior 76 of the vacuum transport tube vehicle 60, including the cabin 76*a* having cabin air 52*c*, and the vehicle door 66, and shows the volume 50. As the plurality of blocks 92 move radially toward the vehicle outer surface 80, via the control system 108, the gap 100 and the gap volume 100*a*, gets displaced and gets smaller in size. At this point, all volumes 50 (see also FIG. 3) inside the vacuum tube vehicle station 12 (see FIG. 2A) are in a vacuum 51. As shown in FIG. 7B, this includes the volume 50 and the gap volume 100*a*.

Figure 8B:
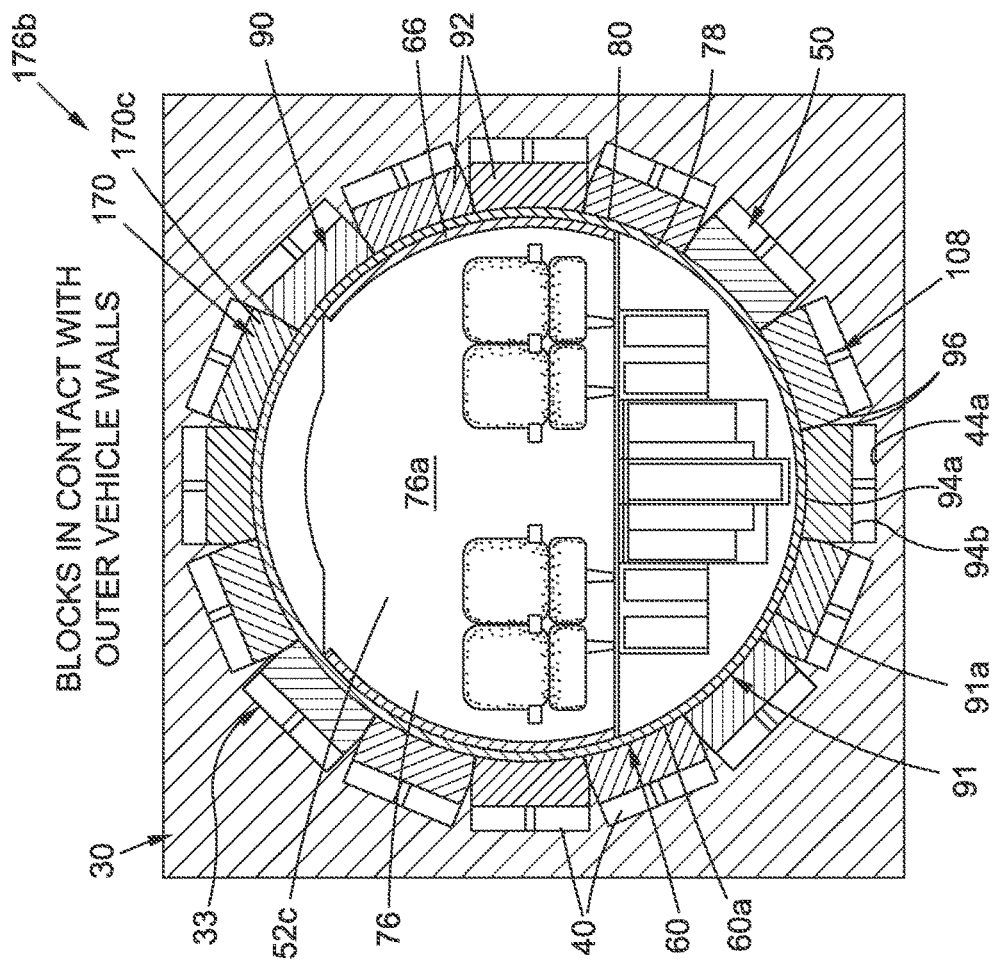
FIG. 8B is an illustration of a partial sectional front view of the volume reduction assembly of FIG. 8A, showing the plurality of blocks in the fully deployed position.
Figure 8A:
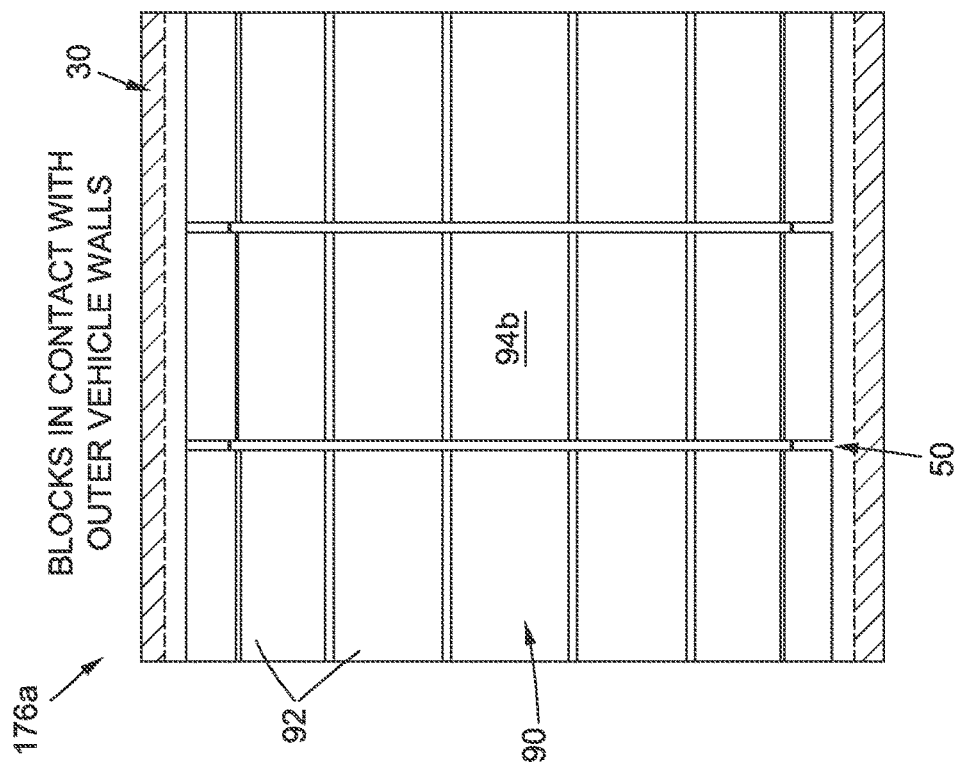
FIG. 8A is an illustration of a cross-sectional side view of an embodiment of the volume reduction assembly in the form of a plurality of blocks and showing the plurality of blocks in a fully deployed position.

Now referring to FIGS. 8A-8B, FIG. 8A is an illustration of a cross-sectional side view of an embodiment of the volume reduction assembly 90, in the form of the plurality of blocks 92, and shows the outer surface 94*b* of the plurality of blocks 92, which blocks 92 are coupled to the station wall 30, and shows the volume 50. FIG. 8A shows a blocks in contact with outer vehicle walls stage side view 176*a*.

FIG. 8B is an illustration of a partial sectional front view of the volume reduction assembly 90 of FIG. 8A, showing the plurality of blocks 92 in the block position 170 of a fully deployed position 170*c*. FIG. 8B shows a blocks in contact with outer vehicle walls stage front view 176*b*. FIG. 8B shows all of the plurality of blocks 92 have moved into place where they are contacting the vehicle outer surface 80 of the outer vehicle wall 78 of the vacuum transport tube vehicle 60, such as the vacuum transport tube train 60*a*, and have also moved into contact with each other. The dimensions of each block 92 may be designed such that each is slightly larger than the cavity 40 allotted for each block 92 in the fully deployed position 170*c*, thus causing the sides 96 to be compressed against each other. This compressive force causes the surfaces of the sides 96 to bear snugly against each other, and makes it difficult for air molecules to travel between the blocks 92 and reside there. FIG. 8B shows the plurality of blocks 92 forming a seal 91 in a sealed engagement 91*a* around the vehicle outer surface 80 of the vacuum transport tube vehicle 60. Alternatively, the plurality of blocks 92 may engage around the vehicle outer surface 80 in close or near proximity to the vehicle outer surface 80, such as ⅛ inch to ¼ inch distance away from the vehicle outer surface 80. FIG. 8B further shows the station wall 30, the station vacuum tube 33, the cavities 40 with an interior end 44*a*, the control system 108, and the vacuum transport tube vehicle 60 with the interior 76, including the cabin 76*a* having cabin air 52*c*, and the vehicle door 66, and shows the volume 50. As the plurality of blocks 92 move into place, the gap 100 and the gap volume 100*a*, get displaced, and FIG. 8B shows no gap 100 (see FIG. 8B).

Now referring to FIGS. 9A-9B, FIG. 9A is an illustration of a cross-sectional side view of an embodiment of the volume reduction assembly 90, in the form of the plurality of blocks 92, and shows a vehicle door 66 in a closed position 66*a*, with a perimeter 125, and with a door seal 122 in a deployed position 122*a*. FIG. 9A is shown from the view of viewing the vacuum transport tube vehicle 60 (see FIG. 9B) from the door cavity 132 (see FIG. 9B) between the vehicle door 66 (see FIG. 9B) and the station door 68 (see FIG. 9B). FIG. 9A shows the plurality of blocks 92 in the station wall 30, and shows the volume 50, such as the tube volume 50*a*. FIG. 9A shows a door seal in place stage side view 178*a*.

FIG. 9B is an illustration of a partial sectional front view of the volume reduction assembly 90 of FIG. 9A, and FIG. 9B shows the plurality of blocks 92 in the block position 170 of a fully deployed position 170*c* and shows the door seal 122 in a deployed position 122*a* deployed from a door seal cavity 123. FIG. 9B shows a door seal in place stage front view 178*b*. FIG. 9B shows the station wall 30, the station vacuum tube 33, the cavities 40 with an interior end 44*a*, and the vacuum transport tube vehicle 60, such as the vacuum transport tube train 60*a*. FIG. 9B shows the inner surface 94*a*, the outer surface 94*b*, and the volume 50, such as the tube volume 50*a*. FIG. 9B further shows a passenger 62, the vehicle door 66 in a closed position 66*a*, the vehicle door outer surface 126*a*, the vehicle door inner surface 126*b*, the station door 68 in a closed position 68*a*, the station door outer surface 127*a*, the station door inner surface 127*b*, the door cavity 132 between the vehicle door 66 and the station door 68, the ambient air 52*a* in the vacuum tube vehicle station 12, the air supply assembly 130, the vent-to-vacuum assembly 140, and the volume 50, including the tube volume 50*a* and the door cavity volume 50*b*. To prepare for the eventual opening of the vehicle door 66, the door seal 122 has moved inward, via a door seal control system 124 (see FIG. 3), from the station wall 30 to contact the vehicle outer surface 80, including the vehicle door outer surface 126*a*, of the vehicle door 66. The door seal 122 is shaped to form a seal around the perimeter 125 (see FIG. 9A) of the vehicle door 66.

Figure 10B:
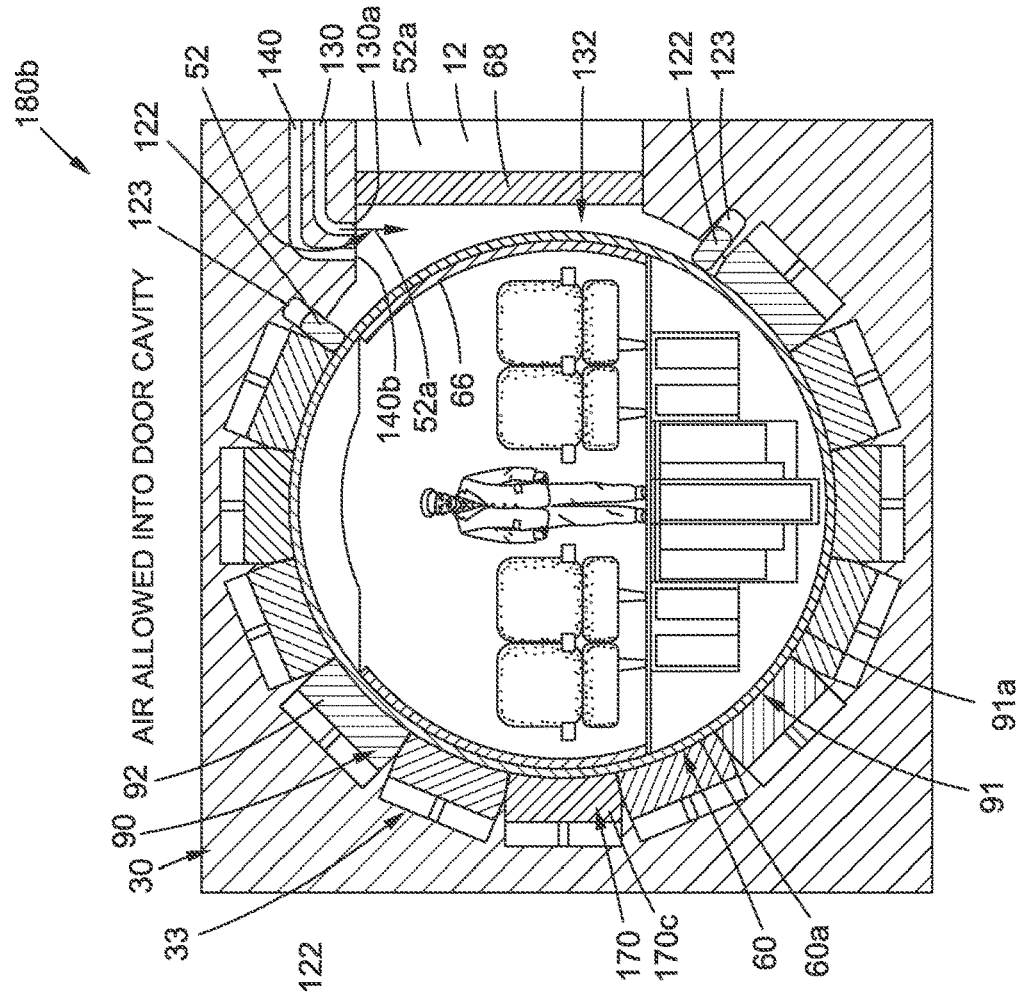
FIG. 10B is an illustration of a partial sectional front view of the volume reduction assembly of FIG. 10A, showing air being supplied to a door cavity via an air supply assembly.
Figure 10A:
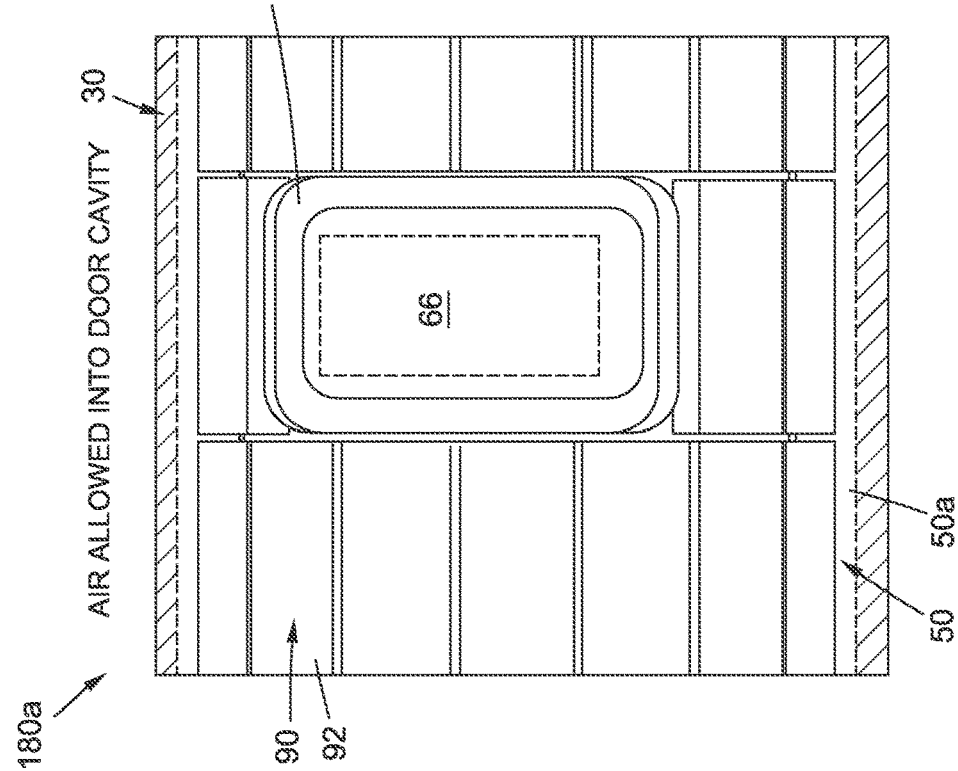
FIG. 10A is an illustration of a cross-sectional side view of an embodiment of the volume reduction assembly in the form of a plurality of blocks and showing a vehicle door.

Now referring to FIGS. 10A-10B, FIG. 10A is an illustration of a cross-sectional side view of an embodiment of the volume reduction assembly 90, in the form of the plurality of blocks 92, and shows the vehicle door 66 with the door seal 122. FIG. 10A is shown from the view of viewing the vacuum transport tube vehicle 60 (see FIG. 10B) from the door cavity 132 (see FIG. 10B) between the vehicle door 66 (see FIG. 10B) and the station door 68 (see FIG. 10B). FIG. 10A shows the plurality of blocks 92 in the station wall 30, and shows the volume 50, such as the tube volume 50*a*. FIG. 10A shows an air allowed into door cavity stage side view 180*a*.

FIG. 10B is an illustration of a partial sectional front view of the volume reduction assembly 90, such as the plurality of blocks 92, of FIG. 10A, showing air 52, such as ambient air 52*a*, being supplied to the door cavity 132 via the air supply assembly 130. The supply of ambient air 52*a* may be at ambient pressure. Alternatively, compressed air 52*b* (see FIG. 3) may be supplied to the door cavity 132. If compressed air 52*b* (see FIG. 3) is used, a smaller tube may be used to quickly fill the door cavity 132 (see FIG. 10B). The diameter of each of the supply tube or tubes for the air supply assembly 130 may be designed to minimize noise. FIG. 10B shows an air allowed into door cavity stage front view 180*b*. FIG. 10B further shows the plurality of blocks 92 still in the block position 170 of the fully deployed position 170*c* and shows the door seal 122 deployed from the door seal cavity 123. FIG. 10B shows the station wall 30, the station vacuum tube 33, the vehicle door 66 and the station door 68, the ambient air 52*a* in the vacuum tube vehicle station 12, the air supply assembly 130 in an open position 130*a*, the vent-to-vacuum assembly 140 in a closed position 140*b*, and the plurality of blocks 92 forming a seal 91 in a sealed engagement 91*a* with the vacuum transport tube vehicle 60, such as the vacuum transport tube train 60*a*. Alternately, the plurality of blocks 92 may engage around the vehicle outer surface 80 in close or near proximity, such as ⅛ inch or ¼ inch distance away, or another suitable proximate distance away.

Figures 11A, 11B:
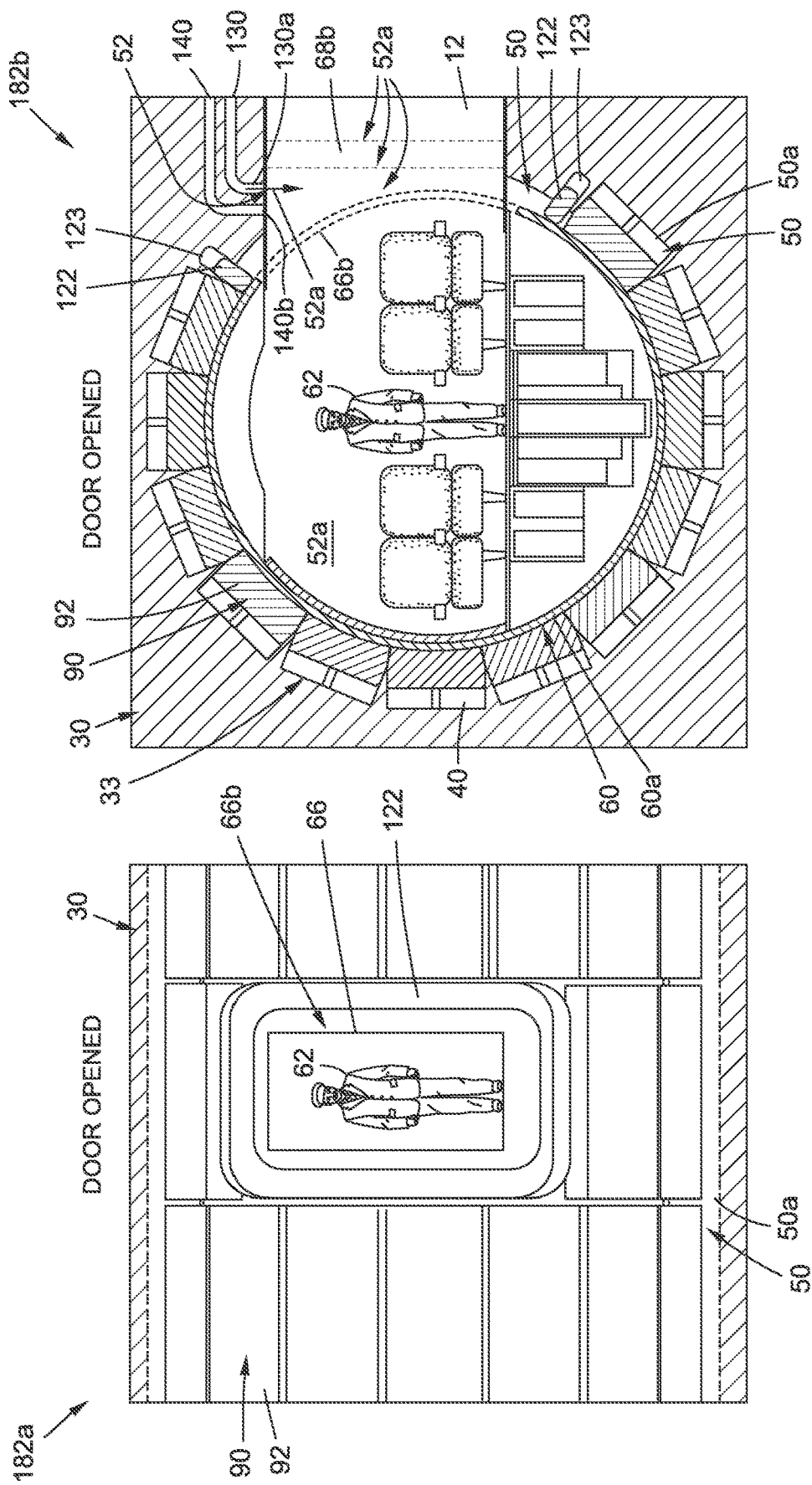
FIG. 11A is an illustration of a cross-sectional side view of an embodiment of the volume reduction assembly in the form of a plurality of blocks and showing a vehicle door in an opened position.
FIG. 11B is an illustration of a partial sectional front view of the volume reduction assembly of FIG. 11A, showing the vehicle door in the opened position.

Now referring to FIGS. 11A-11B, FIG. 11A is an illustration of a cross-sectional side view of an embodiment of the volume reduction assembly 90, in the form of the plurality of blocks 92 and shows the vehicle door 66 in an opened position 66*b* with a passenger 62 standing in the opened vehicle door 66 and shows the door seal 122 still around the vehicle door 66. FIG. 11A is shown from the view of viewing the vacuum transport tube vehicle 60 (see FIG. 11B) from the door cavity 132 (see FIG. 10B) between the vehicle door 66 (see FIG. 10B) now in the opened position 66*b* (see also FIG. 11B) and the station door 68 (see FIG. 10B) now in the opened position 68*b* (see FIG. 11B). FIG. 11A shows the plurality of blocks 92 in the station wall 30, and shows the volume 50, such as the tube volume 50*a*. FIG. 9A shows a door opened stage side view 182*a*.

FIG. 11B is an illustration of a partial sectional front view of the volume reduction assembly 90, such as the plurality of blocks 92, of FIG. 11A, and shows the vehicle door 66 (see FIG. 66) in the opened position 66*b*. The plurality of blocks 92 are still in the fully deployed position 170*c* (see FIG. 10B). FIG. 11B shows a door opened stage front view 182*b*. FIG. 11B shows the station wall 30, the station vacuum tube 33, the cavities 40, the vacuum transport tube vehicle 60, such as the vacuum transport tube train 60*a*, and the volume 50, such as the tube volume 50*a*. FIG. 11B further shows the ambient air 52*a* in the cabin 76*a* (see FIG. 8B), and ambient air 52*a* in the vacuum tube vehicle station 12 which may flow and mix with the air 52 in the door cavity 132 (see FIG. 10B), which is now open, and into the vacuum transport tube vehicle 60, which is now open. FIG. 11B further shows the air supply assembly 130 in the open position 130*a* and shows the air supply assembly 130 supplying air 52, such as ambient air 52*a*, to the door cavity 132 (see FIG. 10B) and to inside the vacuum transport tube vehicle. 60. FIG. 11B further shows the vent-to-vacuum assembly 140 in the closed position 140*b*, the door seal 122 still deployed from the door seal cavity 123, and shows the volume 50, including the tube volume 50*a*. FIG. 11B shows that after the pressure in the door cavity 132 (see FIG. 10B) is at ambient pressure, the vehicle door 66 (see FIG. 11A) may be opened.

Figure 12B:
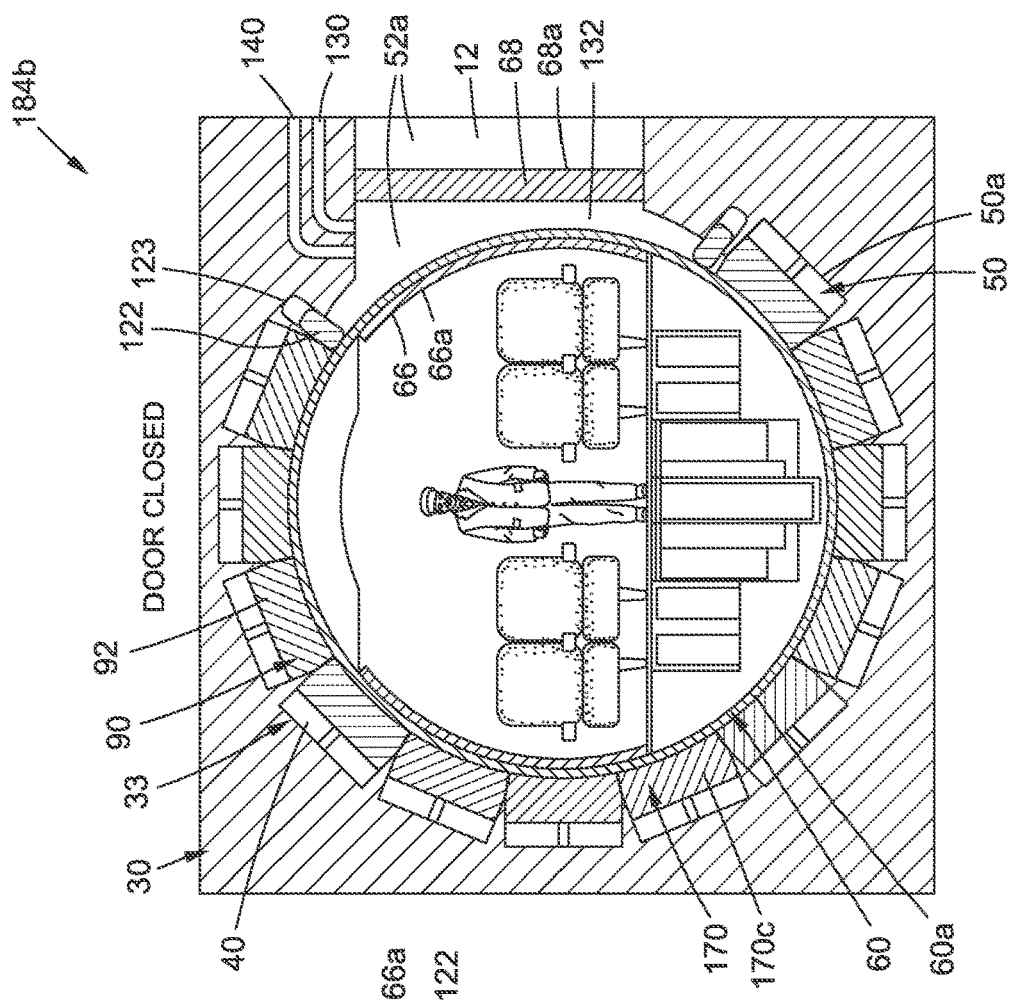
FIG. 12B is an illustration of a partial sectional front view of the volume reduction assembly of FIG. 12A, showing the vehicle door in the closed position.
Figure 12A:
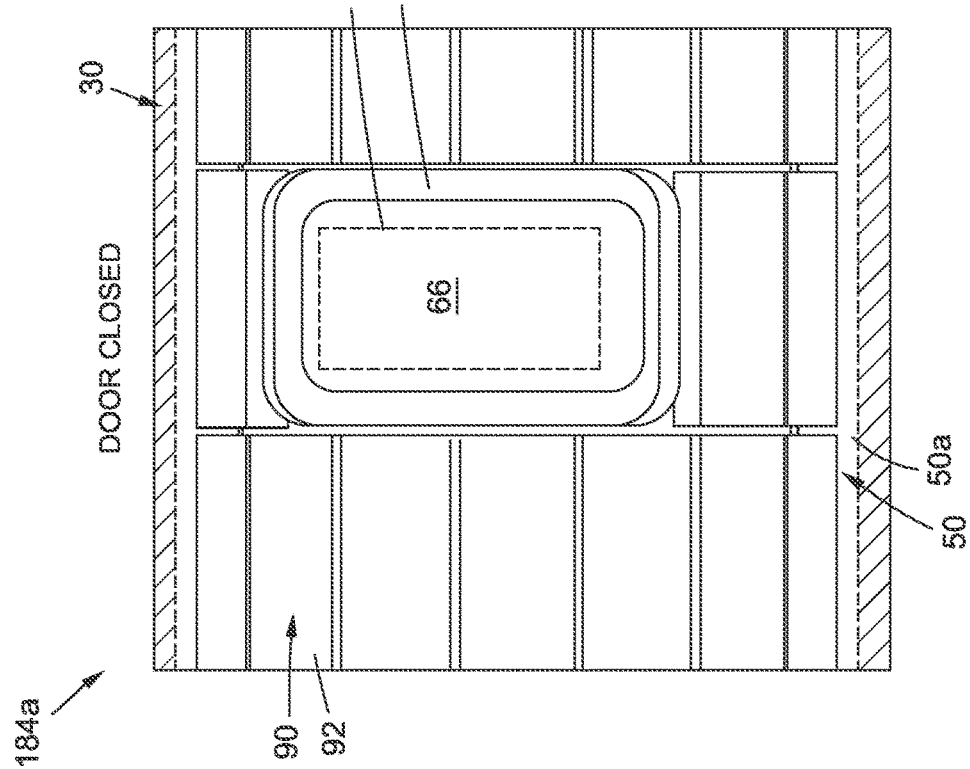
FIG. 12A is an illustration of a cross-sectional side view of an embodiment of the volume reduction assembly in the form of a plurality of blocks and showing a vehicle door in a closed position.

Now referring to FIGS. 12A-12B, FIG. 12A is an illustration of a cross-sectional side view of an embodiment of the volume reduction assembly 90, in the form of the plurality of blocks 92 and shows the vehicle door 66 in a closed position 66*a* and shows the door seal 122 still around the vehicle door 66. FIG. 12A is shown from the view of viewing the vacuum transport tube vehicle 60 (see FIG. 12B) from the door cavity 132 (see FIG. 12B) between the vehicle door 66 (see FIG. 12B) now in the closed position 66*a* (see also FIG. 12B) and the station door 68 (see FIG. 10B) now in the closed position 68*a* (see FIG. 12B). FIG. 12A shows the plurality of blocks 92 in the station wall 30, and shows the volume 50, such as the tube volume 50*a*. FIG. 12A shows a door closed stage side view 184*a*.

FIG. 12B is an illustration of a partial sectional front view of the volume reduction assembly 90, such as the plurality of blocks 92, of FIG. 12A, showing the vehicle door 66 in the closed position 66*a*, and shows the stage after passengers 62 (see FIG. 11B) have exited and/or entered the vacuum transport tube vehicle 60. FIG. 12B shows a door closed stage front view 184*b*. FIG. 12B shows the station wall 30, the station vacuum tube 33, the cavities 40, the vacuum transport tube vehicle 60, such as the vacuum transport tube train 60*a*, and the volume 50, such as the tube volume 50*a*. FIG. 12B further shows the ambient air 52*a* in the vacuum tube vehicle station 12 and in the door cavity 132 between the vehicle door 66, which is in the closed position 66*a*, and the station door 68 which is in the closed position 68*a*. FIG. 11B further shows the air supply assembly 130 and the vent-to-vacuum assembly 140, the door seal 122 still deployed from the door seal cavity 123, and shows the plurality of blocks 92 still in the block position 170 of the fully deployed position 170*c*.

Figure 13B:
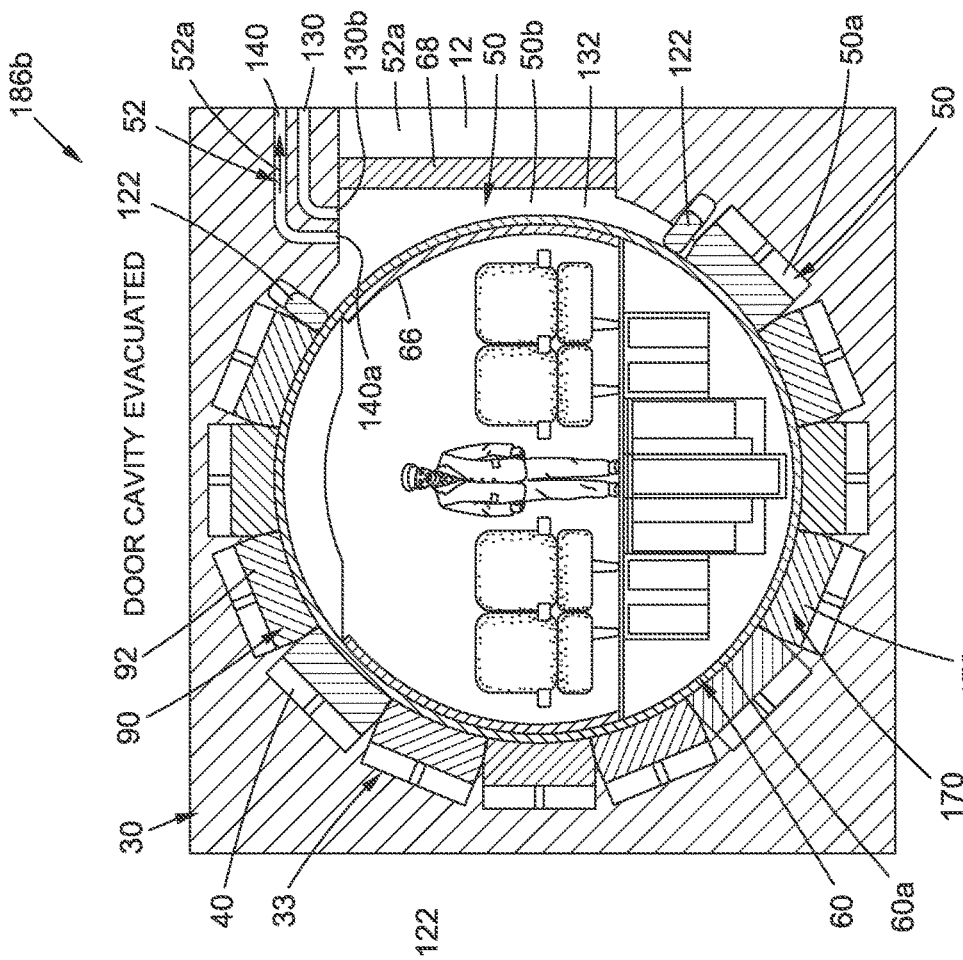
FIG. 13B is an illustration of a partial sectional front view of the volume reduction assembly of FIG. 13A, showing the vehicle door in the closed position and showing air being evacuated from the door cavity via a vent-to-vacuum assembly.
Figure 13A:
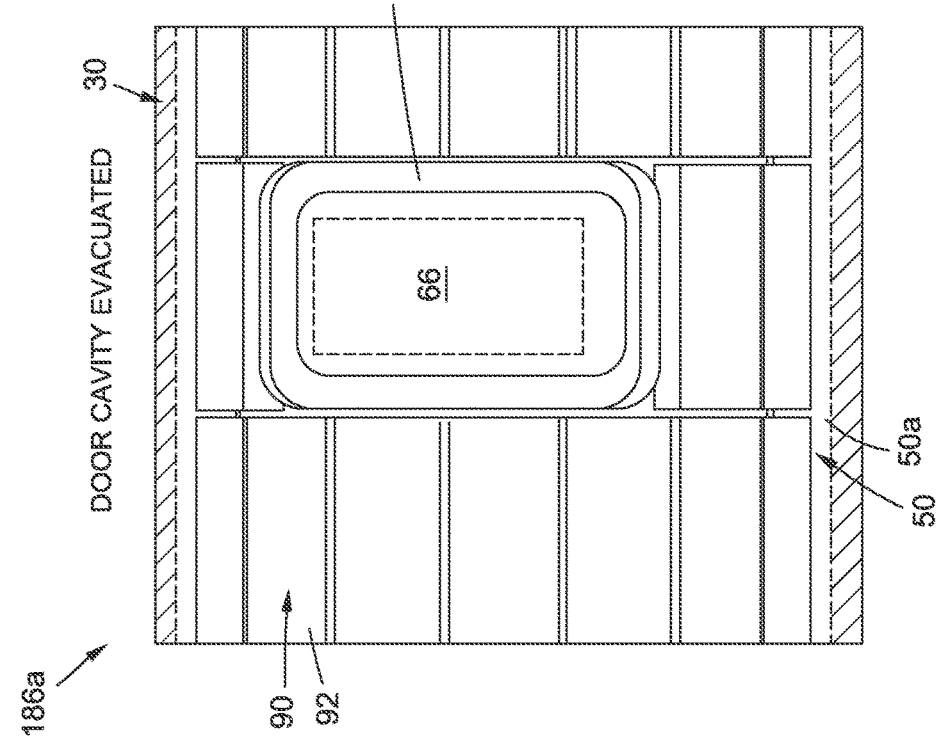
FIG. 13A is an illustration of a cross-sectional side view of an embodiment of the volume reduction assembly in the form of a plurality of blocks and showing a vehicle door in a closed position.

Now referring to FIGS. 13A-13B, FIG. 13A is an illustration of a cross-sectional side view of an embodiment of the volume reduction assembly 90, in the form of the plurality of blocks 92, and shows the vehicle door 66 with the door seal 122. The vehicle door 66 is still in the closed position 66*a* (see FIG. 12A). FIG. 13A is shown from the view of viewing the vacuum transport tube vehicle 60 (see FIG. 13B) from the door cavity 132 (see FIG. 13B) between the vehicle door 66 (see FIG. 13B) now in the closed position 66*a* (see also FIG. 12B) and the station door 68 (see FIG. 13B) now in the closed position 68*a* (see FIG. 12B). FIG. 13A shows the plurality of blocks 92 in the station wall 30, and shows the volume 50, such as the tube volume 50*a*. FIG. 13A shows a door cavity evacuated stage side view 186*a*.

FIG. 13B is an illustration of a partial sectional front view of the volume reduction assembly 90, such as the plurality of blocks 92, of FIG. 13A, showing the vehicle door 66 in the closed position (see FIG. 12B), and showing the air 52, such as ambient air 52*a*, being evacuated from the door cavity 132, via the vent-to-vacuum assembly 140. As shown in FIG. 13B, the vent-to-vacuum assembly 140 is in the open position 140*a*, and the air supply assembly 130 is in the closed position 130*b*. FIG. 13B shows a door cavity evacuated stage front view 186*b*. FIG. 13B shows the station wall 30, the station vacuum tube 33, the cavities 40, the vacuum transport tube vehicle 60, such as the vacuum transport tube train 60*a*, and the volume 50, such as the tube volume 50*a*, and the door cavity volume 50*b*. FIG. 13B further shows the ambient air 52*a* in the vacuum tube vehicle station 12, the station door 68, the door seal 122 still deployed from the door seal cavity 123, and shows the plurality of blocks 92 still in the block position 170 of the fully deployed position 170*c*.

Figure 14B:
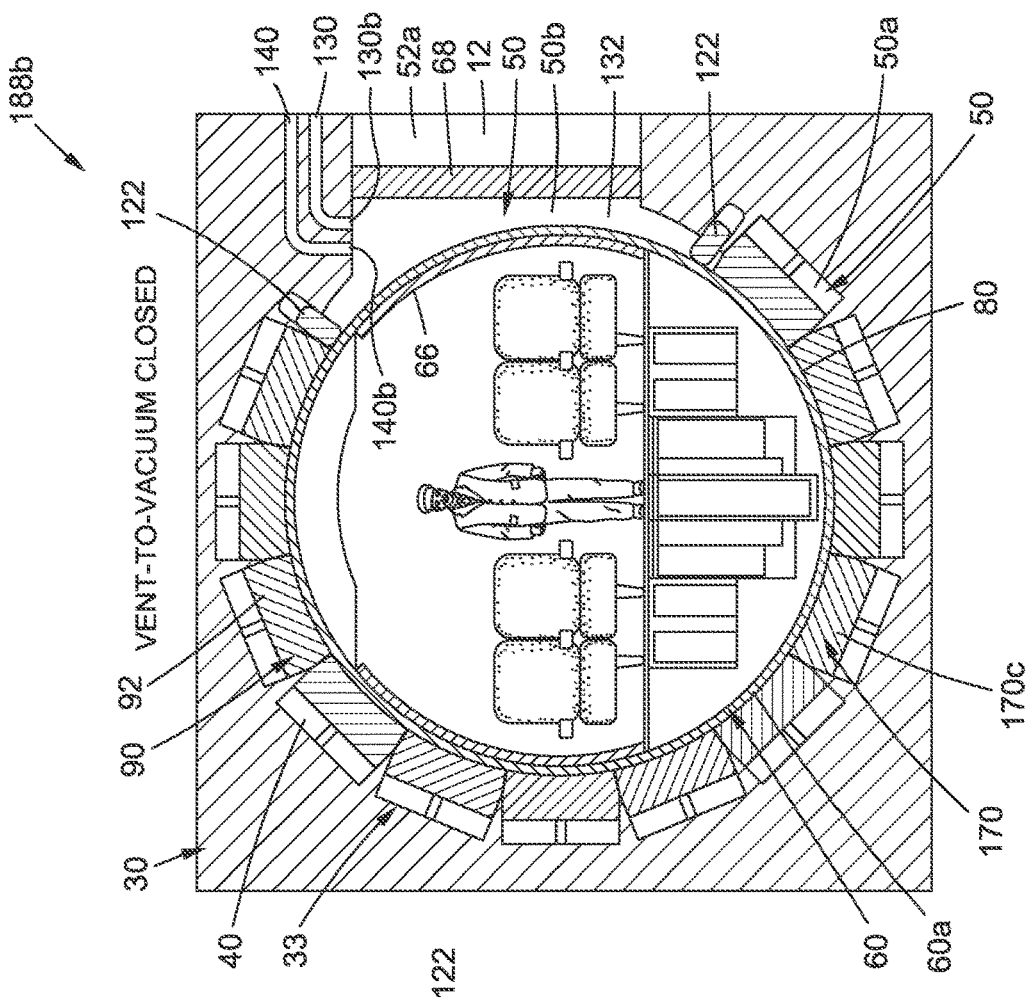
FIG. 14B is an illustration of a partial sectional front view of the volume reduction assembly of FIG. 14A, showing the vehicle door in the closed position and showing the vent-to-vacuum assembly closed.
Figure 14A:
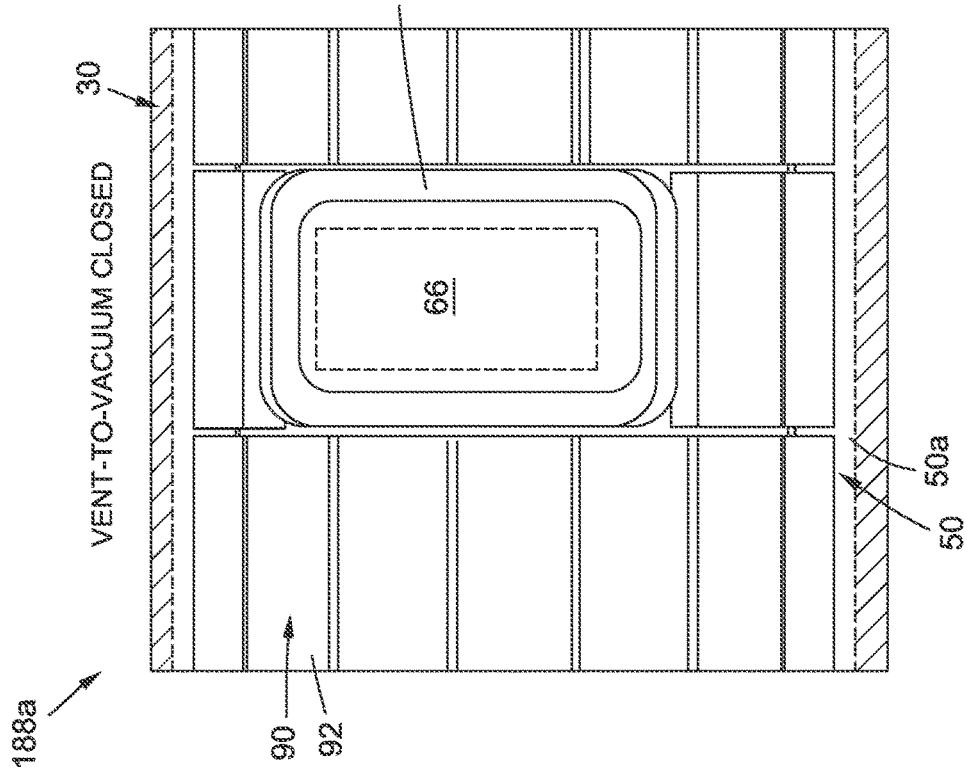
FIG. 14A is an illustration of a cross-sectional side view of an embodiment of the volume reduction assembly in the form of a plurality of blocks and showing a vehicle door in a closed position.

Now referring to FIGS. 14A-14B, FIG. 14A is an illustration of a cross-sectional side view of an embodiment of the volume reduction assembly 90 in the form of the plurality of blocks 92, and shows the vehicle door 66 with the door seal 122. The vehicle door 66 is in the closed position 66*a* (see FIG. 12A). FIG. 14A is shown from the view of viewing the vacuum transport tube vehicle 60 (see FIG. 14B) from the door cavity 132 (see FIG. 14B) between the vehicle door 66 (see FIG. 14B) and the station door 68 (see FIG. 14B). FIG. 14A shows the plurality of blocks 92 in the station wall 30, and shows the volume 50, such as the tube volume 50*a*. FIG. 14A shows a vent-to-vacuum closed stage side view 188*a*.

FIG. 14B is an illustration of a partial sectional front view of the volume reduction assembly 90, such as the plurality of blocks 92, of FIG. 14A, showing the vehicle door 66, which is still in the closed position 66a (see FIG. 12B) and shows the vent-to-vacuum assembly 140 now in the closed position 140b, after the door cavity 132 has been evacuated to a desired vacuum quality 51a (see FIG. 3). The air supply assembly 130 (see FIG. 14B) is in the closed position 130b (see FIG. 14B). FIG. 14B shows a vent-to-vacuum closed stage front view 188b. FIG. 14B shows the station wall 30, the station vacuum tube 33, the cavities 40, the vacuum transport tube vehicle 60, such as the vacuum transport tube train 60a, and the volume 50, such as the tube volume 50a, and the door cavity volume 50b. FIG. 14B further shows the ambient air 52a in the vacuum tube vehicle station 12, the station door 68, the door seal 122 still deployed from the door seal cavity 123 (see FIG. 13B), and shows the plurality of blocks 92 still in the block position 170 of the fully deployed position 170c.

Figure 15B:
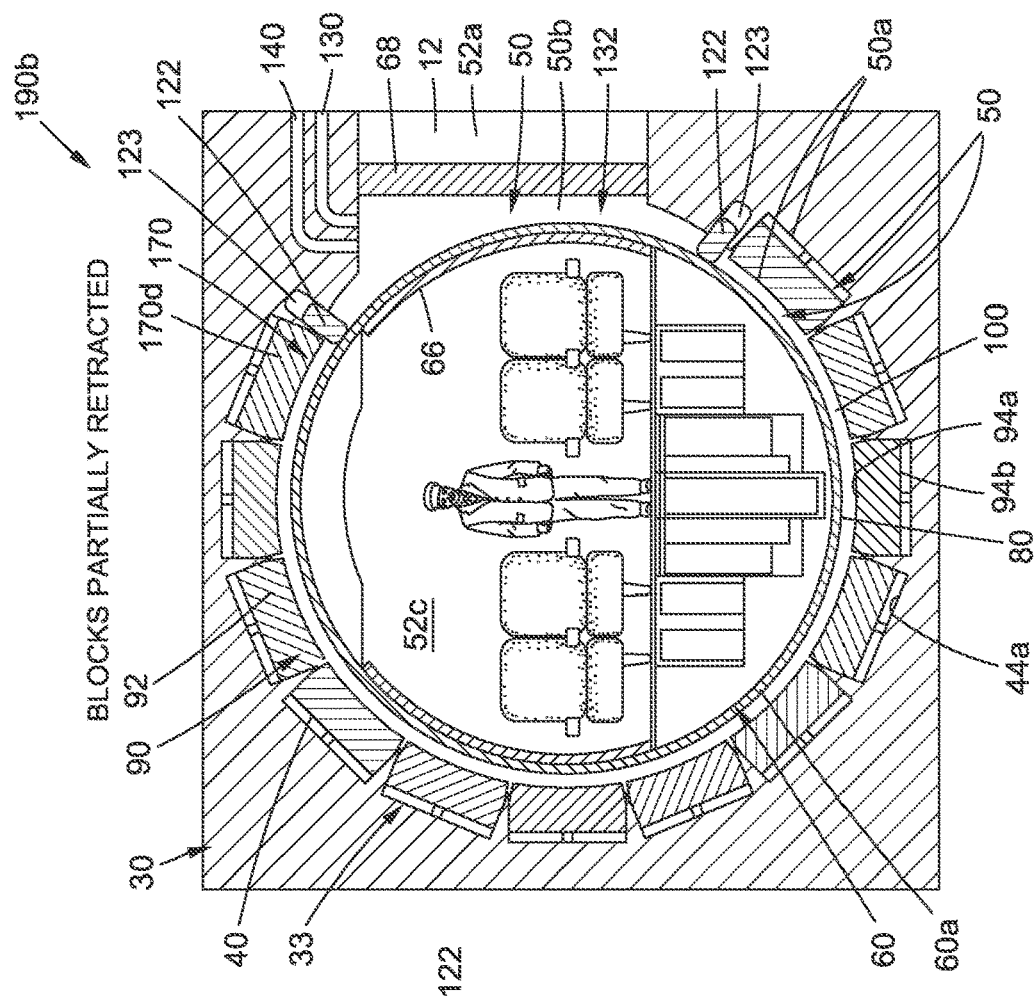
FIG. 15B is an illustration of a partial sectional front view of the volume reduction assembly of FIG. 15A, showing the plurality of blocks in the partially retracted position.
Figure 15A:
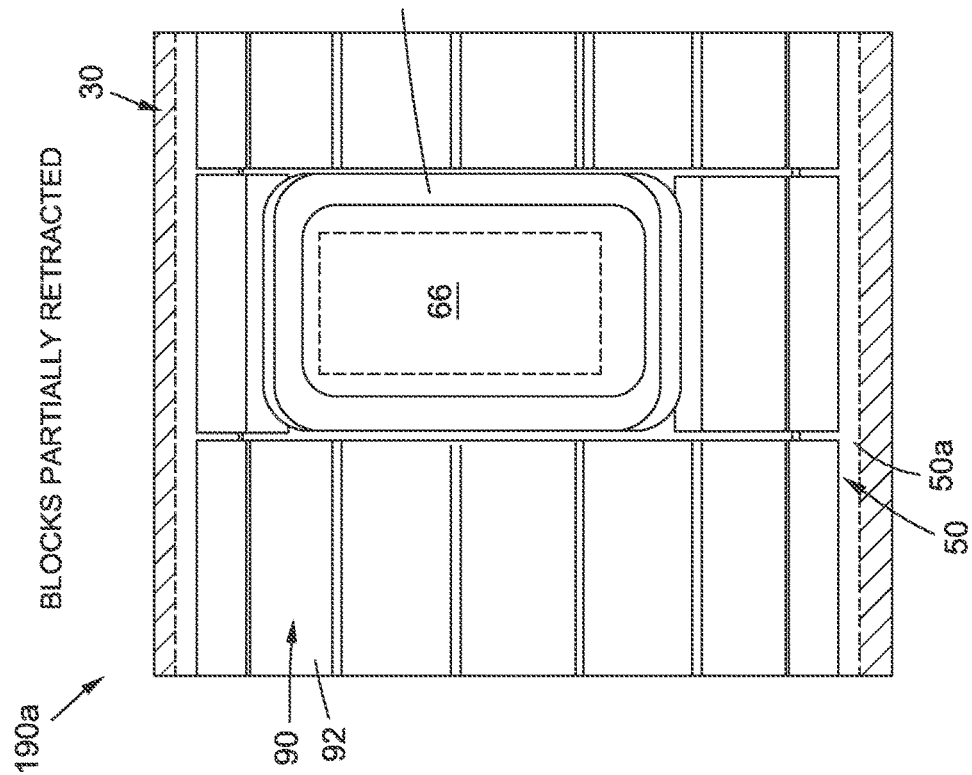
FIG. 15A is an illustration of a cross-sectional side view of an embodiment of the volume reduction assembly in the form of a plurality of blocks and showing the plurality of blocks is in a partially retracted position.

Now referring to FIGS. 15A-15B, FIG. 15A is an illustration of a cross-sectional side view of an embodiment of the volume reduction assembly 90 in the form of the plurality of blocks 92 and shows the vehicle door 66 with the door seal 122. The vehicle door 66 (see FIG. 15A) is in the closed position 66a (see FIG. 12A). FIG. 15A is shown from the view of viewing the vacuum transport tube vehicle 60 (see FIG. 15B) from the door cavity 132 (see FIG. 15B) between the vehicle door 66 (see FIG. 15B) and the station door 68 (see FIG. 15B). FIG. 15A shows the plurality of blocks 92 in the station wall 30, and shows the volume 50, such as the tube volume 50a. FIG. 15A shows a blocks partially retracted stage side view 190a.

FIG. 15B is an illustration of a partial sectional front view of the volume reduction assembly 90, such as the plurality of blocks 92, of FIG. 15A, showing the plurality of blocks 92 in the block position 170 of a partially retracted position 170d. FIG. 15B shows a blocks partially retracted stage front view 190b. At this stage, the volume 50 (see FIG. 15B), such as the tube volume 50a, which is part of the station volume 50c (see FIG. 3), is opened to high vacuum.

The air supply assembly 130 (see FIG. 15B) is in the closed position 130b (see FIG. 14B), and the vent-to-vacuum assembly 140 (see FIG. 15B) is in the closed position 140b (see FIG. 14B). FIG. 15B shows the station wall 30, the station vacuum tube 33, the cavities 40, the vacuum transport tube vehicle 60, such as the vacuum transport tube train 60a, and the volume 50, such as the tube volume 50a, and the door cavity volume 50b. FIG. 15B further shows the ambient air 52a in the vacuum tube vehicle station 12, the station door 68, the door seal 122 still deployed from the door seal cavity 123. The plurality of blocks 92 (see FIG. 15B) are moved radially outward, so that the inner surface 94a of each block 92 is moved away from the vehicle outer surface 80 (see FIG. 15B) to increase the gap 100 (see FIG. 15B) and decrease the cavity 40 as the outer surface 94b of the block 92 gets closer to the interior end 44a of the cavity 40. At this point, the gap 100 (see FIG. 15B) may be exposed to vacuum 51. This optional step may be used in case a significant amount of air 52 has escaped past the door seals 122 (see FIG. 15B). The orifice or set of orifices that vent the gap 100 may be one or two vents near the forward end 72a (see FIG. 2A) and the aft end 72b (see FIG. 2A) of the vacuum transport tube vehicle 60 (see FIG. 2A), or they may be distributed longitudinally and radially over the circumference and length of the vacuum tube vehicle station 12 (see FIG. 2A).

It is noted that the sequence of deployment of the plurality of blocks 92 and deployment of the door seal(s) 122 may be deployment of the door seal(s) 122 and then deployment of the blocks 92, or may be deployment of the blocks 92 and then deployment of the door seal(s) 122. It is further noted that the sequence of retraction of the plurality of blocks 92 and retraction of the door seal(s) 122 may be retraction of the door seal(s) 122 and then retraction of the blocks 92, or may be retraction of the blocks 92 and then retraction of the door seal(s) 122.

Now referring to FIGS. 16A-16B, FIG. 16A is an illustration of a cross-sectional side view of an embodiment of the volume reduction assembly 90 in the form of the plurality of blocks 92 and shows the vehicle door 66 and the door seal 122, which at this stage is being retracted. The vehicle door 66 (see FIG. 16A) is in the closed position 66a (see FIG. 12A). FIG. 16A is shown from the view of viewing the vacuum transport tube vehicle 60 (see FIG. 16B) from the door cavity 132 (see FIG. 15B) between the vehicle door 66 (see FIG. 16B) and the station door 68 (see FIG. 16B). FIG. 16A shows the plurality of blocks 92 in the station wall 30, and shows the volume 50, such as the tube volume 50a. FIG. 16A shows a door seal retracted stage side view 192a.

FIG. 16B is an illustration of a partial sectional front view of the volume reduction assembly 90, such as the plurality of blocks 92, of FIG. 16A, showing the door seal 122 in a retracted position 122b back into the door seal cavity 123. FIG. 16B shows the station wall 30, the station vacuum tube 33, the cavities 40, the vacuum transport tube vehicle 60, such as the vacuum transport tube train 60a, and the volume 50, such as the tube volume 50a, and the door cavity volume 50b. FIG. 16B further shows the ambient air 52a in the vacuum tube vehicle station 12, the station door 68, the air supply assembly 130, the vent-to-vacuum assembly 140, the vehicle door 66, and the cabin 76a with cabin air 52c. FIG. 16B shows the inner surface 94a of each block 92 moved away from the vehicle outer surface 80 (see FIG. 15B) of the vacuum transport tube vehicle 60, and shows the gap 100 with the gap volume 100a. FIG. 16B further shows the outer surface 94b of the block 92 in relation to the interior end 44a of the cavity 40.

Now referring to FIGS. 17A-17B, FIG. 17A is an illustration of a cross-sectional side view of an embodiment of the volume reduction assembly 90, in the form of the plurality of blocks 92, and shows the vehicle door 66 with the door seal 122 in a retracted position 122b. FIG. 17A is shown from the view of viewing the vacuum transport tube vehicle 60 (see FIG. 17B) from the door cavity 132 (see FIG. 17B) between the vehicle door 66 (see FIG. 17B) and the station door 68 (see FIG. 17B). FIG. 17A shows the plurality of blocks 92 in the station wall 30, and shows the volume 50, such as the tube volume 50a. FIG. 17A shows a blocks fully retracted stage side view 194a.

FIG. 17B is an illustration of a partial sectional front view of the volume reduction assembly 90, such as the plurality of blocks 92, of FIG. 17A, showing the plurality of blocks 92 in the block position 170 of a fully retracted position 170a. The vacuum transport tube vehicle 60 (see FIG. 17B), such as the vacuum transport tube train 60a (see FIG. 17B), is preparing to exit or leave the vacuum tube vehicle station 12, and the blocks 92 are fully retracted. FIG. 17B shows a blocks fully retracted stage front view 194b. FIG. 17B shows the station wall 30, the station vacuum tube 33, the inner surface 94a, the outer surface 94b, and the sides 96 of the blocks 92, and shows the volume 50, such as the tube volume 50a, and the door cavity volume 50b. FIG. 17B further shows the ambient air 52a in the vacuum tube vehicle station 12, the station door 68, the air supply assembly 130, the vent-to-vacuum assembly 140, the door cavity 132, the vehicle door 66, a passenger 62, and the door seal 122 in the retracted position 122b. FIG. 17B shows the inner surface 94*a* of each block 92 moved further away from the vehicle outer surface 80 of the outer vehicle wall 78 of the vacuum transport tube vehicle 60, and shows the gap 100. FIG. 17B further shows the outer surface 94*b* of the block 92 in relation to the interior end 44*a* of the cavity 40.

Figure 18B:
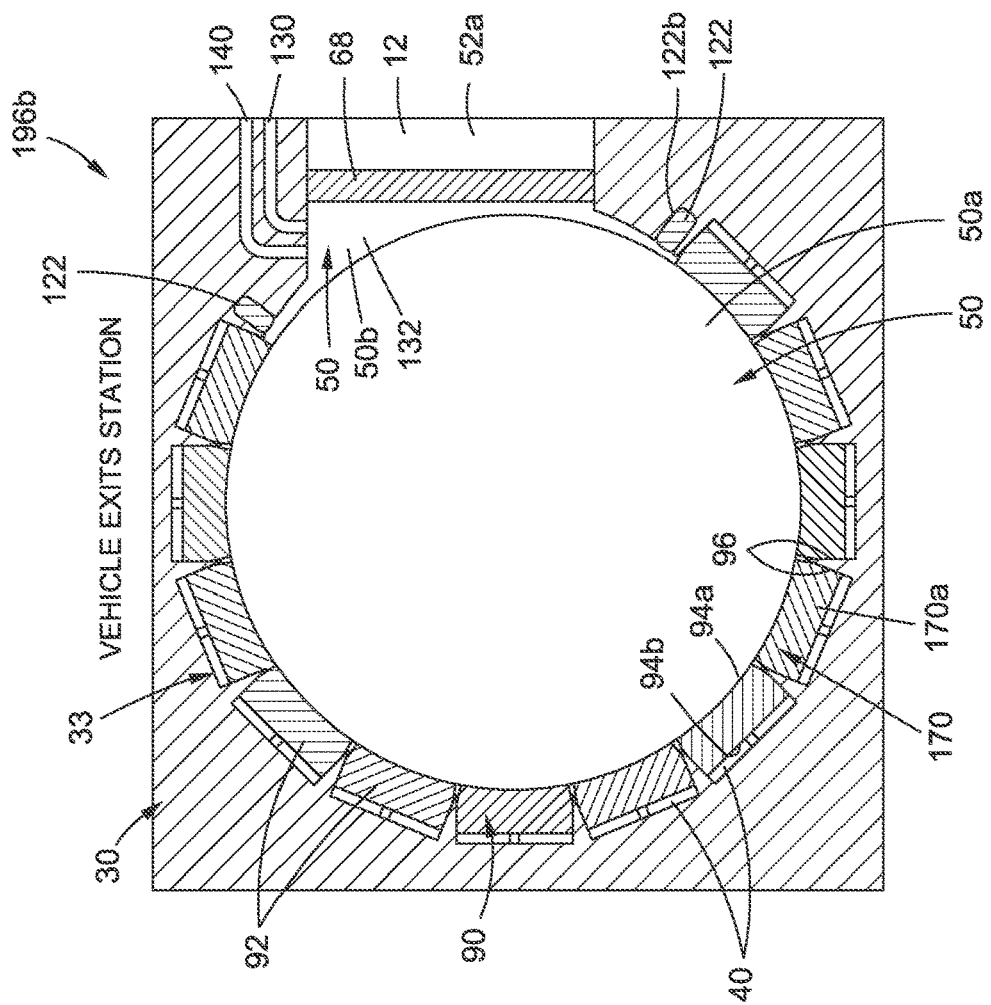
FIG. 18B is an illustration of a partial sectional front view of the volume reduction assembly of FIG. 18A, showing the plurality of blocks in the fully retracted position when the vacuum transport tube vehicle exits the vacuum tube vehicle station.
Figure 18A:
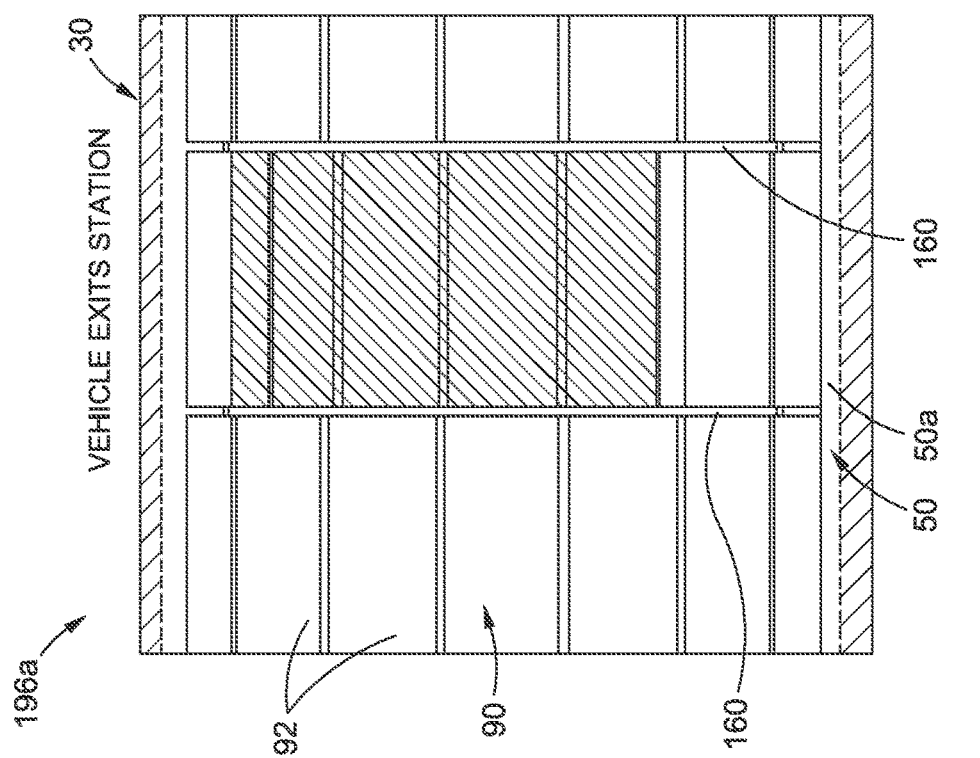
FIG. 18A is an illustration of a cross-sectional side view of an embodiment of a volume reduction assembly in the form of a plurality of blocks and showing the plurality of blocks in a fully retracted position when the vacuum transport tube vehicle exits the vacuum tube vehicle station.

Now referring to FIGS. 18A-18B, FIG. 18A is an illustration of a cross-sectional side view of an embodiment of the volume reduction assembly 90, in the form of the plurality of blocks 92, as the vacuum transport tube vehicle 60 (see FIG. 17B) exits the vacuum tube vehicle station 12 (see FIG. 18B). FIG. 18A is shown from the view of viewing the volume reduction assembly 90 (see FIG. 18B) from the door cavity 132 (see FIG. 18B). FIG. 18A shows the plurality of blocks 92 in the station wall 30, and shows the volume 50, such as the tube volume 50*a*. FIG. 17A further shows longitudinal gaps 160 between the columns of blocks 92. FIG. 18A shows a vehicle exit stage side view 196*a*.

FIG. 18B is an illustration of a partial sectional front view of the volume reduction assembly 90, such as the plurality of blocks 92, of FIG. 18A, showing the plurality of blocks in the block position 170 of the fully retracted position 170*a*, when the vacuum transport tube vehicle 60 (see FIG. 17B) has exited the vacuum tube vehicle station 12. FIG. 18B shows a vehicle exit stage front view 196*b*. FIG. 18B shows the station wall 30, the station vacuum tube 33, the cavities 40, the inner surface 94*a*, the outer surface 94*b*, and the sides 96 of the blocks 92, and shows the volume 50, such as the tube volume 50*a*, and the door cavity volume 50*b*. FIG. 18B further shows the ambient air 52*a* in the vacuum tube vehicle station 12, the station door 68, the air supply assembly 130, the vent-to-vacuum assembly 140, the door cavity 132, and the door seal 122.

Depending on the location of the vent-to-vacuum assembly 140 (see FIG. 18B) vacuum vents, the vacuum vents may be adjusted. If the vent-to-vacuum assembly 140 vacuum vents are the same vents that evacuated the door cavity 132 (see FIG. 18B), they can remain open while the door seal 122 (see FIG. 18B) is retracted, and as the blocks 92 (see FIG. 18B) are in a partially retracted position 170*d* (see FIG. 15B).

Now referring to FIG. 19, FIG. 19 is an illustration of a cross-sectional side view of an embodiment of the volume reduction assembly 90, in the form of the plurality of blocks 92 and shows, in another embodiment, the blocks 92 having a plurality of seams 161 between the columns of blocks 92, and having no longitudinal gaps 160, as shown in FIG. 18A, between the columns of blocks 92. FIG. 19 further shows the blocks 92 coupled to the station wall 30 and the volume 50, such as the tube volume 50*a*. Having longitudinal gaps 160 (see FIG. 18A) between the blocks 92 may facilitate manufacturing them and installing them. Having the plurality of seams 161 may provide improved efficiency of evacuation of the air 52 from the vacuum tube vehicle station 12. For example, if the blocks 92 (see FIG. 5B) are 12.0 inches long, and the longitudinal gaps 160 are 0.1 inches wide, this may allow a vacuum 51 of approximately 10-2 atmospheres to be present after the blocks 92 (see FIG. 5B) have been retracted. This is improved over evacuating that volume starting at an ambient pressure of 1.0 atmosphere, since it may reduce the required flow rate from 32,800 ft3/min (cubic foot per minute) to about 16,400 ft3/min, with a commensurate reduction in pump equipment cost. While this may be improved over evacuating that volume starting at ambient pressure of 1.0 atmosphere, such calculation underscores the importance of removing as much volume as possible for the vacuum equipment to evacuate. Thus, in one embodiment, the blocks 92 (see FIG. 19) may be constructed with the plurality of seams 161 (see FIG. 19) and no longitudinal gaps 160, as shown in FIG. 18A, which may reduce the volume 50 (see FIG. 3) between the station wall 30 (see FIG. 19) and the outer vehicle wall 78 (see FIG. 7B) of the vacuum transport tube vehicle 60 (see FIG. 7B), so that it may effectively be zero.

Now referring to FIGS. 20A-20E, FIGS. 20A-20E show a door cavity volume reduction surface operation process 200 (see FIG. 2A). It may be advantageous to take measures to reduce the volume 50 (see FIG. 3), such as the door cavity volume 50*b* (see FIGS. 2A, 3). One way to accomplish this is to design the station door 68, such as a curved station door 69 (see FIG. 20A), having one curved side, to contain an inflatable door bladder 152 (see FIG. 20) that may occupy the door cavity volume 50*b* between the station door 68, such as the curved station door 69 (see FIG. 20A), at the vacuum tube vehicle station 12 (see FIG. 20A), and the vehicle door 66 (see FIG. 20A). The inflatable door bladder 152 (see FIG. 20) may be attached or contained in the station door 68. When the station door 68 or doors close, for example, similar to elevator doors, the inflatable door bladder 152 (see FIG. 20) may already be in place, or position, to start the door cavity volume reduction surface operation process 200.

Figure 20A:
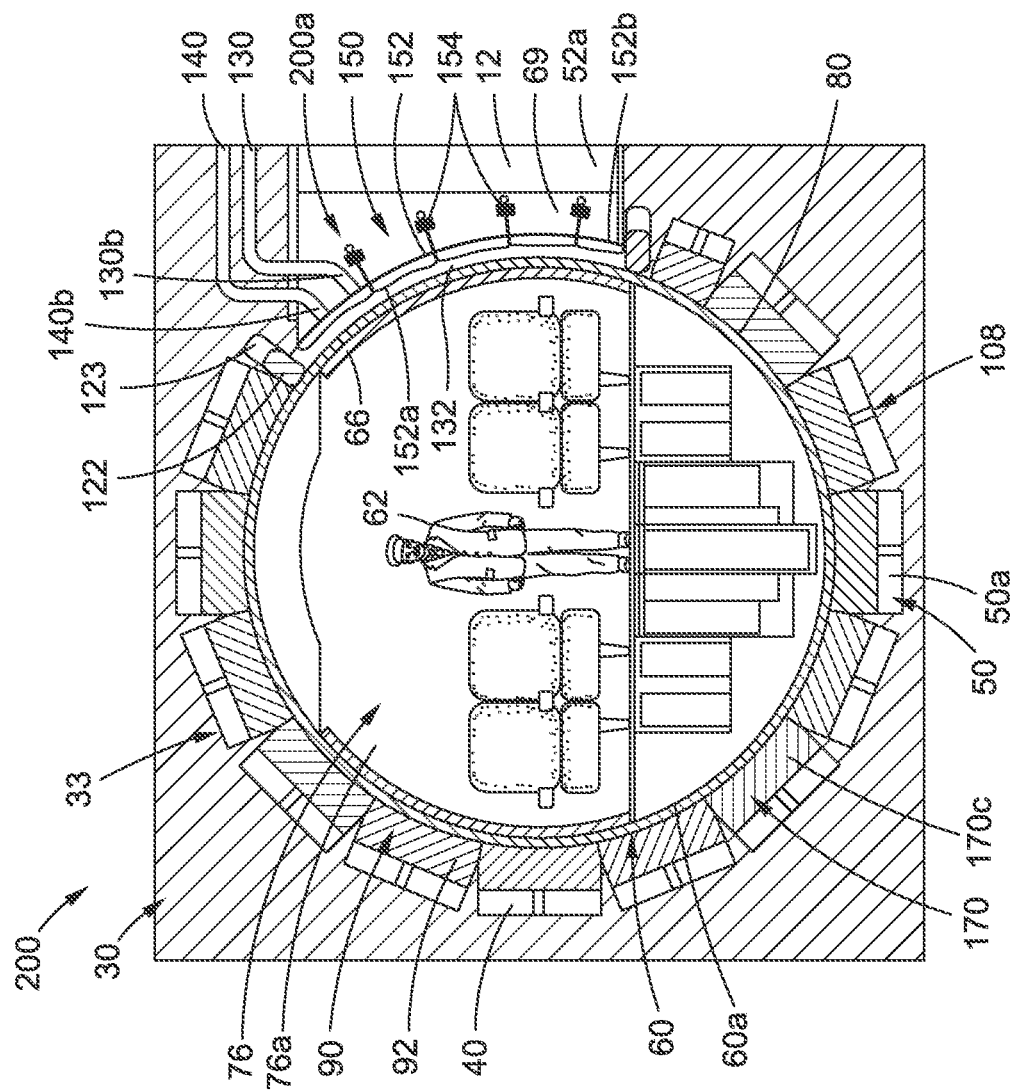
FIG. 20A is an illustration of a partial sectional front view of door cavity volume reduction surface operation process showing an embodiment of a door cavity volume reduction surface in an initial fully retracted inflatable door bladder position.

FIG. 20A is an illustration of a partial sectional front view of the door cavity volume reduction surface operation process 200 showing an embodiment of a door cavity volume reduction surface 150 coupled to a curved station door 69 and in an initial fully retracted inflatable door bladder position 200*a*. As shown in FIG. 20A, the door cavity volume reduction surface 150 comprises an inflatable door bladder 152, having a bladder inner surface 152*a* and a bladder outer surface 152*b*. As shown in FIG. 20A, the inflatable door bladder 152 is connected to the air supply assembly 130, which preferably supplies compressed air 52*b* (see FIG. 3) to the inflatable door bladder 152. The air supply assembly 130 inflates the inflatable door bladder 152 to expand toward the one or more vehicle doors 66. FIG. 20A shows the air supply assembly 130 in a closed position 130*b*.

As further shown in FIG. 20A, the inflatable door bladder 152 is connected to the vent-to-vacuum assembly 140 to deflate the inflatable door bladder 152 to retract from the one or more vehicle doors 66. As further shown in FIG. 20A, the inflatable door bladder 152 is coupled to one or more of, a plurality of spring elements 154, or a plurality of elastic elements 156, to provide a force 157 (see FIG. 3) to retract the inflatable door bladder 152. FIG. 20A shows the vent-to-vacuum assembly 140 in a closed position 140*b*.

FIGS. 20A-20E show the door cavity volume reduction surface 150 configured, via the door cavity 132, to contact the vehicle outer surface 80 of the vehicle door 66 of the vacuum transport tube vehicle 60, such as the vacuum transport tube train 60*a*, stopped in the station wall 30, and show the door cavity volume reduction surface 150, such as the inflatable door bladder 152, having the bladder inner surface 152*a* and the bladder outer surface 152*b*, connected to the air supply assembly 130, the vent-to-vacuum assembly 140, and the curved station door 69 at the vacuum tube vehicle station 12, and show the station vacuum tube 33.

FIG. 20A further shows the volume reduction assembly 90, such as in the form of the plurality of blocks 92, in the block position 170, such as the fully deployed position 170*c*, the cavities 40, the control system 108, the interior 76, such as the cabin 76*a*, with a passenger 62, and the vehicle outer surface 80, of the vacuum transport tube vehicle 60, the door seal 122 and the door seal cavity 123, the volume 50, such as the tube volume 50*a*, and the ambient air 52*a* at the vacuum tube vehicle station 12.

Figure 20B:
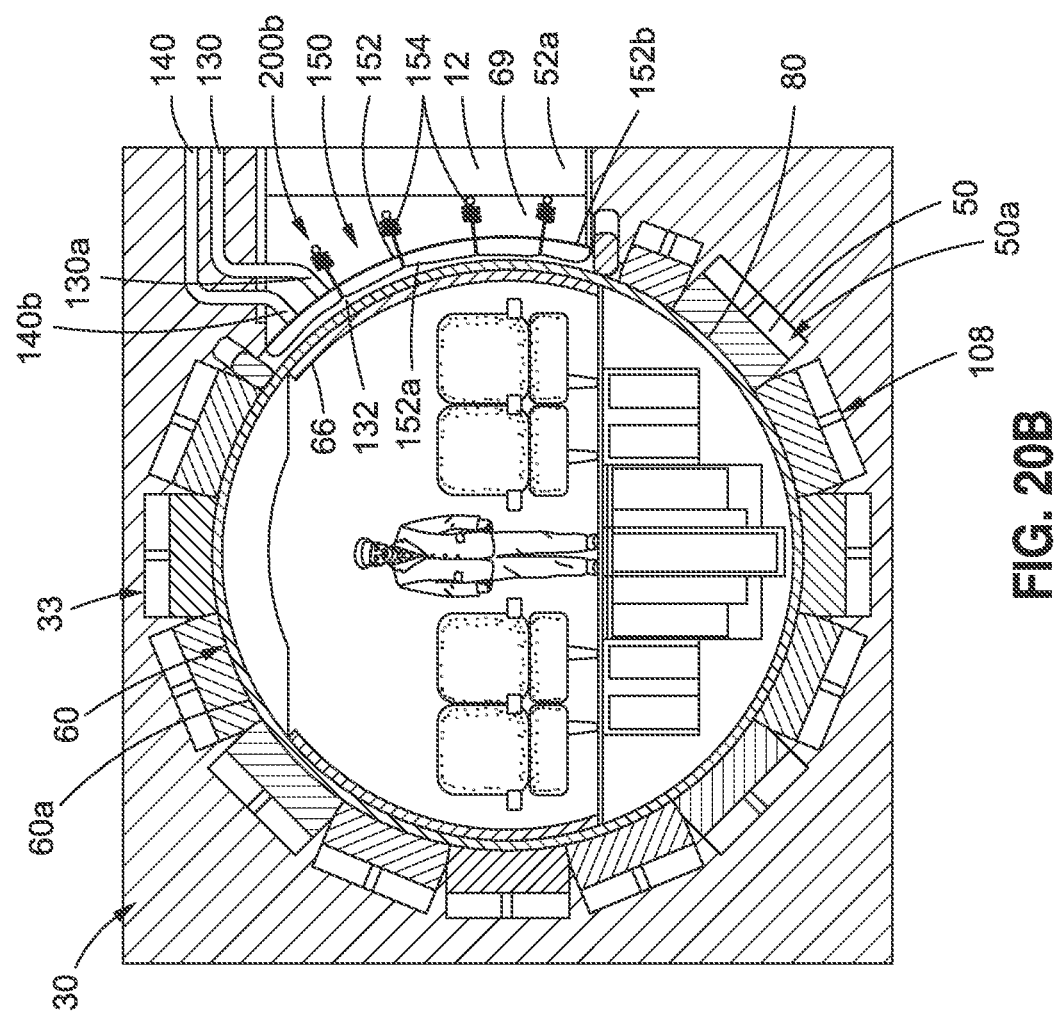
FIG. 20B is an illustration of a partial sectional front view of the door cavity volume reduction surface of FIG. 20A in a partially deployed inflatable door bladder position.

FIG. 20B is an illustration of a partial sectional front view of the door cavity volume reduction surface of FIG. 20A, in a partially deployed inflatable door bladder position 200*b*. As shown in FIG. 20B, the air supply assembly 130 is in an open position 130*a* and the vent-to-vacuum assembly 140 is in a closed position 140*b*. The air supply assembly 130 (see FIG. 20B) supplies air 52 (see FIG. 3), such as compressed air 52*b* (see FIG. 3), to the inflatable door bladder 152, which causes the inflatable door bladder 152 to inflate. This inflation causes the bladder inner surface 152*a* (see FIG. 20B) to move towards the vehicle door 66 (see FIG. 20B) of the vacuum transport tube vehicle 60 (see FIG. 20B). The pressure of the compressed air 52*b* is sufficient to overcome the force 157 (see FIG. 3) in the spring elements 154 (see FIG. 20B) or the elastic elements 156 (see FIG. 20B) that would tend to pull the bladder outer surface 152*b* (see FIG. 20B) in the opposite direction towards the curved station door 69 (see FIG. 20B). FIG. 20B further shows the control system 108, the volume 50, such as the tube volume 50*a*, and the ambient air 52*a* at the vacuum tube vehicle station 12.

Figure 20C:
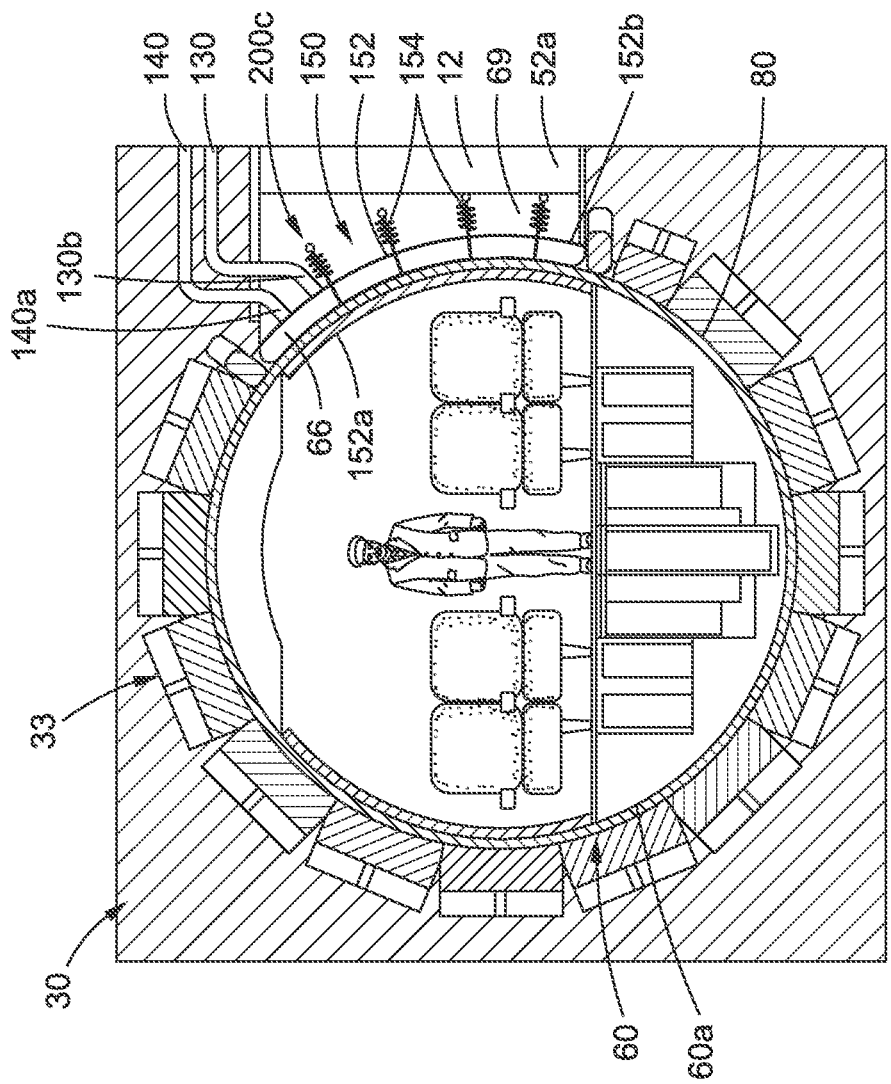
FIG. 20C is an illustration of a partial sectional front view of the door cavity volume reduction surface of FIG. 20A in a fully deployed inflatable door bladder position.

FIG. 20C is an illustration of a partial sectional front view of the door cavity volume reduction surface 150 of FIG. 20A, such as the inflatable door bladder 152, in a fully deployed inflatable door bladder position 200*c*. FIG. 20C shows the air supply assembly 130 in a closed position 130*b* and shows the vent-to-vacuum assembly 140 in an open position 140*a*.

After the inflatable door bladder 152 has completely inflated, so that it contacts the vehicle outer surface 80 of the vehicle door 66, the air supply assembly 130 is closed. At this point, the inflated inflatable door bladder 152 has displaced the air 52 (see FIG. 3) that was previously in the door cavity 132 (see FIG. 20A) between the curved station door 69 (see FIG. 20C) and the vehicle door 66 (see FIG. 20C). Depending on the design of the inflatable door bladder 152, the percentage of the door cavity volume 50*b* (see FIG. 3) that has been displaced is approximately 95% (ninety-five percent) to 99% (ninety-nine percent) of the door cavity 132 (see FIG. 20A), leaving a maximum of 5% (five percent) and a minimum of 1% (one percent) of the air 52 (see FIG. 3) in the door cavity 132 (see FIG. 20A).

Figure 20D:
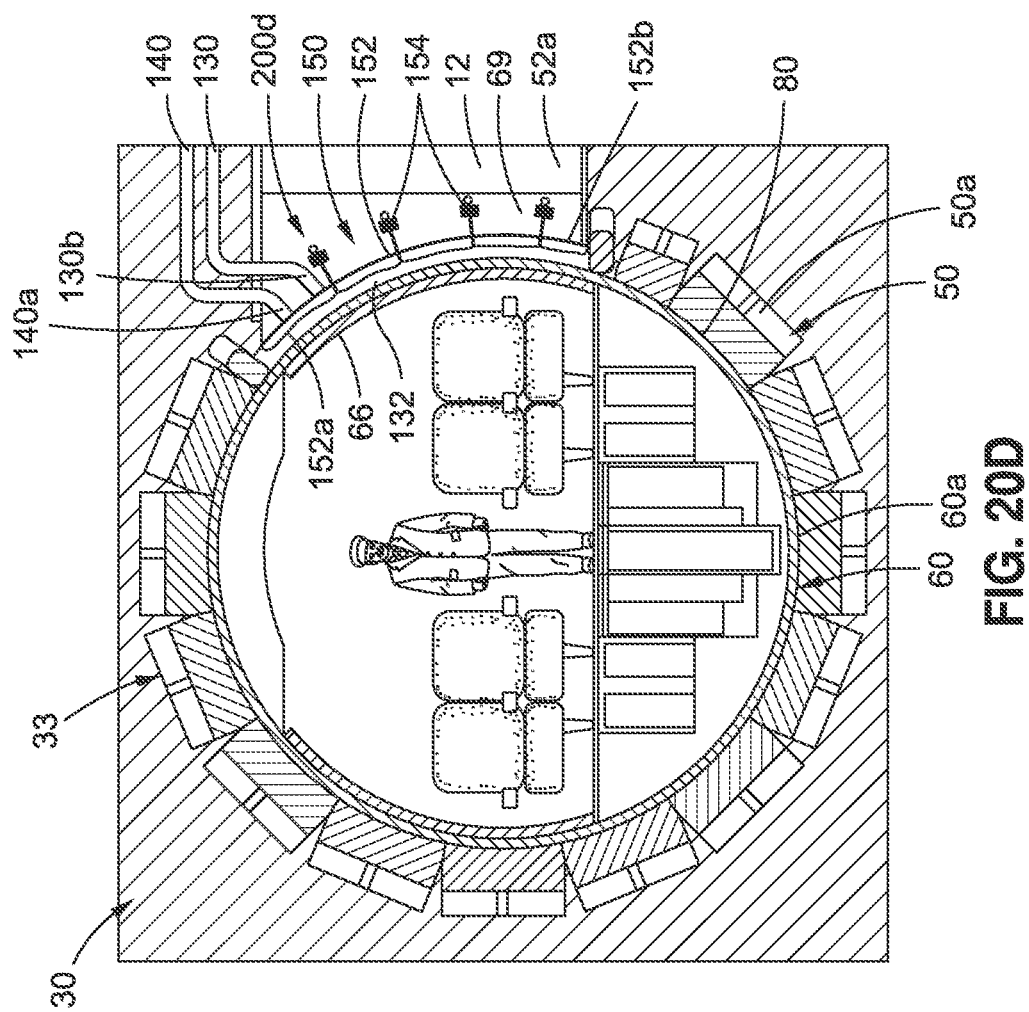
FIG. 20D is an illustration of a partial sectional front view of the door cavity volume reduction surface of FIG. 20A in a partially retracted inflatable door bladder position.

FIG. 20D is an illustration of a partial sectional front view of the door cavity volume reduction surface 150 of FIG. 20A, in a partially retracted inflatable door bladder position 200*d*. FIG. 20D shows the air supply assembly 130 in a closed position 130*b* and shows the vent-to-vacuum assembly 140 in an open position 140*a*. In FIG. 20D, the inflatable door bladder 152 is retracting. The vent-to-vacuum assembly 140 (see FIG. 20D) is open, which will allow the air to escape from the inflatable door bladder 152. However, since there is no pressure in the door cavity 132 (see FIG. 20D) between the inflatable door bladder 152 (see FIG. 20D) and the vehicle door 66 (see FIG. 20D), there is no force 157 (see FIG. 3) to push the inflatable door bladder 152 (see FIG. 20D) back. For this reason, the spring elements 154 (see FIG. 20D), or the elastic elements 156 (see FIG. 20D), provide a tension force to pull the bladder outer surface 152*b* (see FIG. 20D) back to the curved station door 69 (see FIG. 20D). The amount of force needed is likely very modest. The spring elements 154 (see FIG. 20D), or the elastic elements 156 (see FIG. 20D), may be arranged so that they are more or less distributed.

Figure 20E:
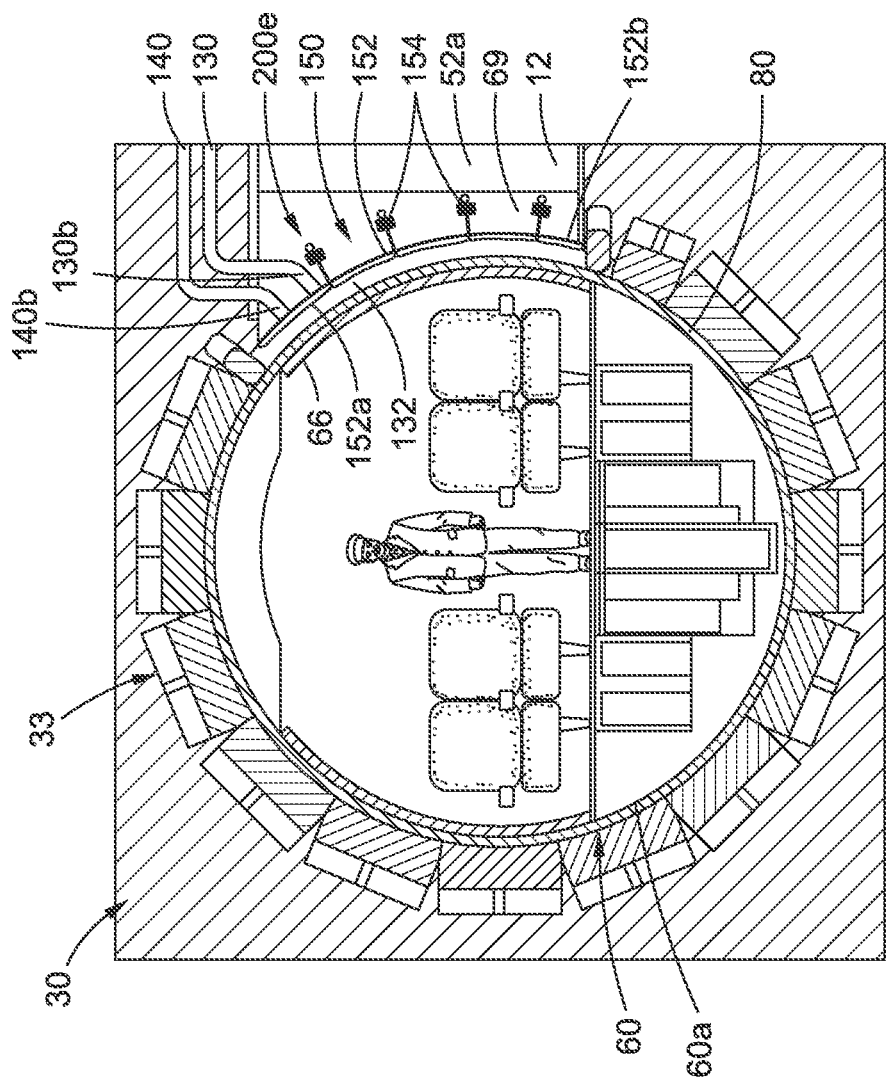
FIG. 20E is an illustration of a partial sectional front view of the door cavity volume reduction surface of FIG. 20A in a final fully retracted inflatable door bladder position.

FIG. 20E is an illustration of a partial sectional front view of the door cavity volume reduction surface 150 of FIG. 20A, in a final fully retracted inflatable door bladder position 200*e*. FIG. 20E shows the air supply assembly 130 in a closed position 130*b* and shows the vent-to-vacuum assembly 140 in a closed position 140*b*. The inflatable door bladder 152 (see FIG. 20E) is now in a position to have the cycle repeated.

If the door cavity volume reduction surface 150, such as in the form of inflatable door bladder 152, removes 95% (ninety-five percent), a pumping rate 158 (see FIG. 3) corresponding to ten (10) passenger exits is reduced to 39.9 ft3/min, which significantly reduces the cost of pumping equipment. The following equation shows:

$$Q = (V/t)(\ln(P0/P1)) = ((0.05)(86.7)/1)(\ln(1/0.0001))$$
$$= 39.9 \text{ ft3/min}$$

If the bladder removes 99% (ninety-nine percent), the pumping rate 158 (see FIG. 3) corresponding to ten (10) passenger exits is reduced to 6.0 ft3/min, which reduces the cost of the pumping equipment even further. The following equation shows:

$$Q = (V/t)(\ln(P0/P1)) = ((0.01)(86.7)/1)(\ln(1/0.0001))$$
$$= 6.0 \text{ ft3/min}$$

FIGS. 20A-20E show just one door cavity 132, but it is likely that each vacuum transport tube vehicle 60 may have more than one entrance/exit. Instead of entering and exiting to just one side, entrances and exits may be present on the other side also. To allow for faster boarding and deboarding times, a vacuum transport tube vehicle 60 may have as many as ten (10), or more, exits. The door cavity volume 50*b* associated with each door cavity 132 may be estimated by the following equation. For a doorway 4.0 ft wide by 6.5 feet high, and a 4 inch gap between the station door 68 (see FIG. 9B) and the vehicle door 66 (see FIG. 9B), the volume of the door cavity is 8.67 feet.

$$V\text{door} = (w\text{door})(h\text{door})(d\text{door}) = (4.0)(6.5)(0.33) = 8.67 \text{ ft3}$$

Ten (10) entrances/exits would result in a volume per car of 86.7 ft3. The flow rate required per car is then given by the following equation:

$$Q = (V/t)(\ln(P0/P1)) = (86.7/1)(\ln(1/0.0001)) = 798.5 \text{ ft3/min}$$

Figure 21:
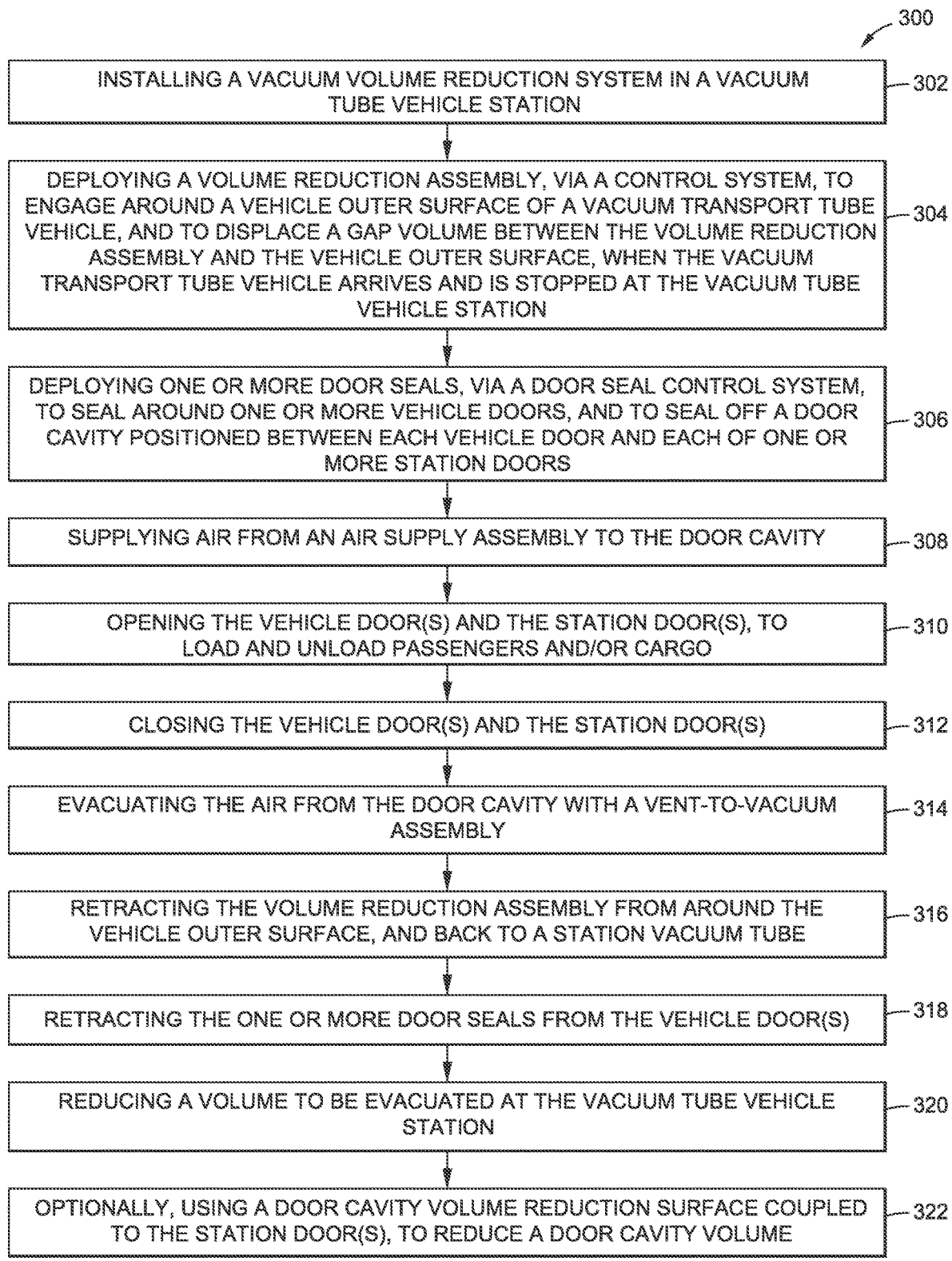
FIG. 21 is an illustration of a flow diagram showing an exemplary embodiment of a method of the disclosure.

Now referring to FIG. 21, FIG. 21 is an illustration of a flow diagram showing an exemplary embodiment of a method 300 of the disclosure. In another embodiment, there is provided the method 300 (see FIG. 21) for reducing a volume 50 (see FIGS. 2A, 3) to be evacuated at a vacuum tube vehicle station 12 (see FIGS. 2A, 3).

As shown in FIG. 21, the method 300 comprises step 302 of installing a vacuum volume reduction system 10 (see FIGS. 2A-2C, 3) in the vacuum tube vehicle station 12. As discussed in detail above, the vacuum volume reduction system 10 (see FIGS. 2A, 3) comprises a station vacuum tube 33 (see FIGS. 2A-2C, 3, 4B) disposed in an interior 31*a* (see FIG. 2A) of a station wall 30 (see FIG. 2A) of the vacuum tube vehicle station 12 (see FIG. 2A). The station vacuum tube 33 (see FIGS. 2A-2C, 3, 4B) has a tube volume 50*a* (see FIGS. 2A, 3, 4B).

The step 302 (see FIG. 21) of installing the vacuum volume reduction system 10 (see FIGS. 2A, 3) in the vacuum tube vehicle station 12 (see FIGS. 2A, 3) comprises, in one embodiment, integrating the volume reduction assembly 90 (see FIGS. 2B-2C) and the station vacuum tube 33 (see FIGS. 2B-2C) comprising a modular station vacuum tube 33*a* (see FIGS. 2B-2C), to form a modular tube volume reduction assembly 90*a* (see FIGS. 2B-2C) configured for installation in the station wall 30 (see FIGS. 2A, 4C).

The step 302 (see FIG. 21) of installing the vacuum volume reduction system 10 (see FIGS. 2A, 3) in the vacuum tube vehicle station 12 (see FIGS. 2A, 3) comprises in another embodiment coupling the volume reduction assembly 90 (see FIG. 5B) to the station vacuum tube 33 (see FIGS. 4B, 5B) comprising a built-in station vacuum tube 33b (see FIG. 4B) formed in the station wall 30 (see FIG. 4B).

As discussed in detail above, the vacuum volume reduction system 10 (see FIGS. 2A, 3) further comprises a volume reduction assembly 90 (see FIGS. 2A-2C, 3, 5B) coupled to the station vacuum tube 33 (see FIGS. 2A-2C, 3, 4B). The step 302 (see FIG. 21) of installing the vacuum volume reduction system 10 (see FIGS. 2A, 3) in the vacuum tube vehicle station 12 comprises, in one embodiment, installing the vacuum volume reduction system 10 (see FIGS. 2A, 3) comprising the volume reduction assembly 90 (see FIGS. 2B-2C, 3, 5B) comprising a plurality of blocks 92 (see FIGS. 2B-2C, 3, 5B) installed in a plurality of cavities 40 (see FIGS. 2B-2C, 3, 5B) that are longitudinally formed around a circumference 42 (see FIGS. 2B, 4B) of the station vacuum tube 33 (see FIGS. 2B, 4B).

The plurality of blocks 92 (see FIGS. 2B-2C, 3, 5B) are preferably comprised of a compliant material 102 (see FIG. 3) that allows the plurality of blocks 92 to deform to match a shape 104 (see FIGS. 3, 5B) of the plurality of cavities 40 (see FIGS. 3, 5B). In one embodiment, each of the plurality of blocks 92 (see FIG. 2C) may comprise a longitudinal one-piece monolithic structure 106 (see FIG. 2C). In another embodiment, each of the plurality of blocks 92 may comprise an extendable portion 99 (see FIG. 2E) that extends to engage around the vehicle outer surface 80 (see FIG. 2E) of the vacuum transport tube vehicle 60 (see FIG. 2E), such as the vacuum transport tube train 60a (see FIG. 2E).

The step 302 (see FIG. 21) of installing the vacuum volume reduction system 10 (see FIGS. 2A, 3) in the vacuum tube vehicle station 12 comprises, in another embodiment, installing the vacuum volume reduction system 10 (see FIGS. 2A, 3) comprising the volume reduction assembly 90 (see FIG. 2D) comprising one or more inflatable bladders 114 (see FIG. 2D) coupled to the station vacuum tube 33 (see FIG. 2D). As shown in FIG. 2D, the inflatable bladder 114 is used instead of the plurality of blocks 92 (see FIG. 2C) and the inflatable bladder 114 is shown from a deflated position 115a to an inflated position 115b, and is inflated with air 52 from the air supply assembly 130 coupled to the station wall 30, and is deflated with the vent-to-vacuum assembly 140 coupled to the station wall 30.

As discussed in detail above, the vacuum volume reduction system 10 (see FIGS. 2A, 3) further comprises one or more door seals 122 (see FIGS. 3, 9B) coupled to the station wall 30 (see FIG. 9B). As discussed in detail above, the vacuum volume reduction system 10 (see FIGS. 2A, 3) further comprises an air supply assembly 130 (see FIGS. 3, 9B) coupled to the station wall 30 (see FIG. 9B). As discussed in detail above, the vacuum volume reduction system 10 (see FIGS. 2A, 3) further comprises a vent-to-vacuum assembly 140 (see FIGS. 3, 9B) coupled to the station wall 30 (see FIG. 9B).

As shown in FIG. 21, the method 300 further comprises step 304 of deploying the volume reduction assembly 90 (see FIGS. 7B, 8B), via a control system 108 (see FIGS. 7B, 8B), to engage around the vehicle outer surface 80 (see FIG. 8B) of the vacuum transport tube vehicle 60 (see FIG. 8B), and to displace a gap volume 100a (see FIG. 7B) between the volume reduction assembly 90 (see FIG. 7B) and the vehicle outer surface 80 (see FIG. 7B), when the vacuum transport tube vehicle 60 (see FIGS. 6B, 7B, 8B) arrives and is stopped at the vacuum tube vehicle station 12 (see FIG. 2A). The volume reduction assembly 90 may form a seal 91 (see FIG. 3) in a sealed engagement 91a (see FIG. 3) around the vehicle outer surface 80 (see FIG. 3), or may engage in close or near proximity, such as ⅛ inch to ¼ inch distance, to the vehicle outer surface 80 (see FIGS. 2A, 3) of the vacuum transport tube vehicle 60.

As shown in FIG. 21, the method 300 further comprises step 306 of deploying the one or more door seals 122, via a door seal control system 124 (see FIG. 3), to seal around a perimeter 125 of each of one or more vehicle doors 66, and to seal off a door cavity 132 positioned between each of the one or more vehicle door 66 and each of one or more station doors 68. As shown in FIG. 21, the method 300 further comprises step 308 of supplying air 52 from the air supply assembly 130 to the door cavity 132. The step 308 (see FIG. 21) of supplying the air 52 from the air supply assembly 130 to the door cavity 132 comprises supplying one of, ambient air 52a, or compressed air 52b, to the door cavity 132.

As shown in FIG. 21, the method 300 further comprises step 310 of opening the one or more vehicle doors 66 and the one or more station doors 68, to load and unload one or more of, passengers 62 and cargo 64, through the one or more vehicle doors 66 and through the one or more station doors 68. As shown in FIG. 21, the method 300 further comprises step 312 of closing the one or more vehicle doors 66, and closing the one or more station doors 68.

As shown in FIG. 21, the method 300 further comprises step 314 of evacuating the air 52, such as the ambient air 52a, or compressed air 52b, from the door cavity 132 with the vent-to-vacuum assembly 140, to obtain a desired vacuum quality 51a (see FIG. 3), and closing the vent-to-vacuum assembly 140. The vent-to-vacuum assembly 140 is configured to evacuate the air 52 comprising one of, the ambient air 52a, or the compressed air 52b, from the door cavity 132, after the loading and the unloading of one or more of, the passengers 62 and the cargo 64.

As shown in FIG. 21, the method 300 further comprises step 316 of retracting the volume reduction assembly 90, via the control system 108, from around the vehicle outer surface 80 of the vacuum transport tube vehicle 60, back to the station vacuum tube 33, such as back to the plurality of cavities 40 of the station vacuum tube 33.

As shown in FIG. 21, the method 300 further comprises step 318 of retracting the one or more door seals 122, via the door seal control system 124, from around each of the one or more vehicle doors 66, back to the station wall 30. The method 300 (see FIG. 21) further comprises step 320 of reducing the volume 50 to be evacuated at the vacuum tube vehicle station 12.

As shown in FIG. 21, the method 300 may further comprise optional step 322 of using a door cavity volume reduction surface 150 (see FIGS. 20A-20E) comprising an inflatable door bladder 152 (see FIGS. 20A-20E) coupled to each of the one or more station doors 68 (see FIG. 3), such as one or more curved station doors 69 (see FIGS. 20A-20E), to displace a door cavity volume 50b (see FIG. 20A) of the door cavity 132 (see FIG. 20A), to further reduce the volume 50 (see FIG. 20A) to be evacuated at the vacuum tube vehicle station 12 (see FIG. 2A). As shown in FIGS. 20A-20E, the door cavity volume reduction surface 150 comprises an inflatable door bladder 152 coupled to the air supply assembly 130, to inflate the inflatable door bladder 152 to expand toward the one or more station doors 68, such as the one or more curved station doors 69. As further shown in FIGS. 20A-20E, the inflatable door bladder 152 is coupled to the vent-to-vacuum assembly 140, to deflate the inflatable door bladder 152, to retract from the one or more curved station doors 69. As shown in FIGS. 20A-20E, the inflatable door bladder 152 is coupled to one or more of, a plurality of spring elements 154, or a plurality of elastic elements 156, to provide a force 157 (see FIG. 3) to retract the inflatable door bladder 152.

Figure 22:
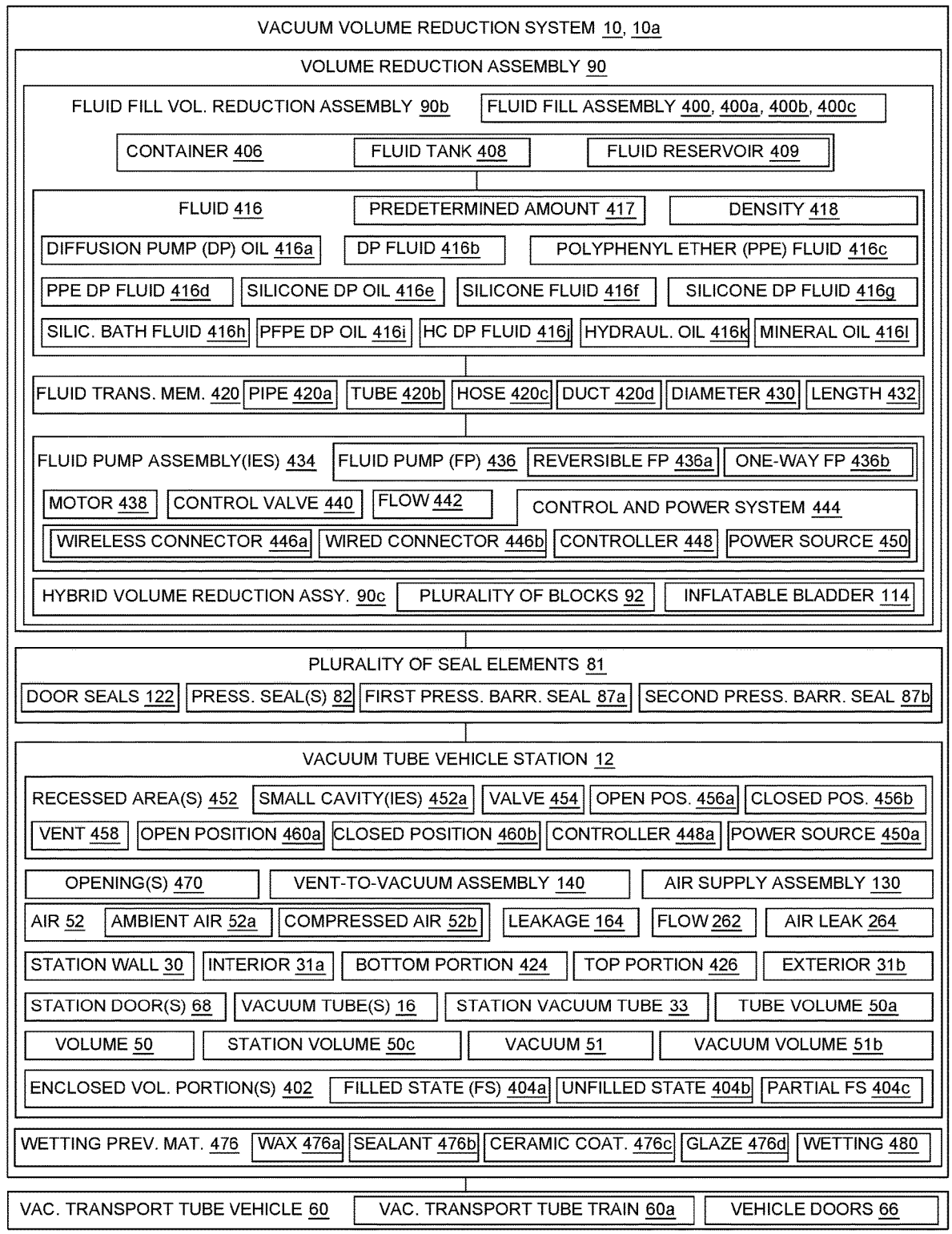
FIG. 22 is an illustration of a functional block diagram of exemplary embodiments of a vacuum volume reduction system with versions of a volume reduction assembly of the disclosure.

Now referring to FIGS. 22 and 23A-23C, in another exemplary embodiment, there is provided a vacuum volume reduction system 10, such as in the form of a vacuum volume reduction system 10a. FIG. 22 is an illustration of a functional block diagram of exemplary embodiments of a vacuum volume reduction system 10, such as in the form of vacuum volume reduction system 10a, with versions of a volume reduction assembly 90 of the disclosure.

The blocks in FIG. 22A represent elements, and lines connecting the various blocks do not imply any particular dependency of the elements. Further, the connecting lines shown in the various Figures contained herein are intended to represent example functional relationships and/or physical couplings between the various elements, but it is noted that other alternative or additional functional relationships or physical connections may be present in versions disclosed herein.

Figure 23A:
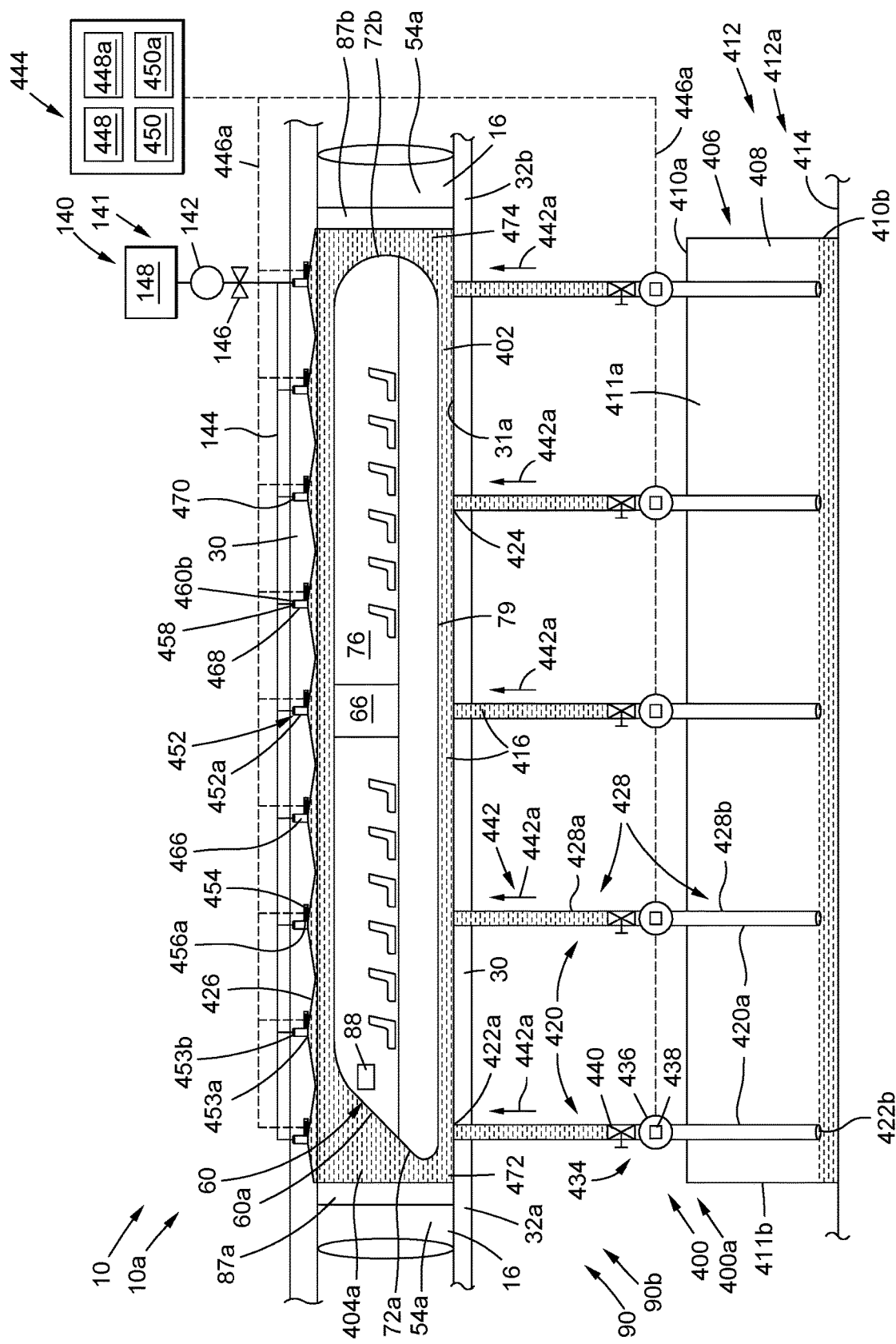
FIG. 23A is an illustration of a cross-sectional side view of an embodiment of a vacuum volume reduction system with a version of a volume reduction assembly, in the form of a fluid fill volume reduction assembly, of the disclosure, used with a vacuum transport tube vehicle at a vacuum tube vehicle station, and showing an enclosed volume portion in a filled state.

FIG. 23A is an illustration of a cross-sectional side view of an embodiment of a vacuum volume reduction system 10, such as in the form of a vacuum volume reduction system 10a, with a version of a volume reduction assembly 90, in the form of a fluid fill volume reduction assembly 90b, comprising a fluid fill assembly 400, of the disclosure, used with a vacuum transport tube vehicle 60 at a vacuum tube vehicle station 12, and showing an enclosed volume portion 402 in a filled state 404a.

Figure 23B:
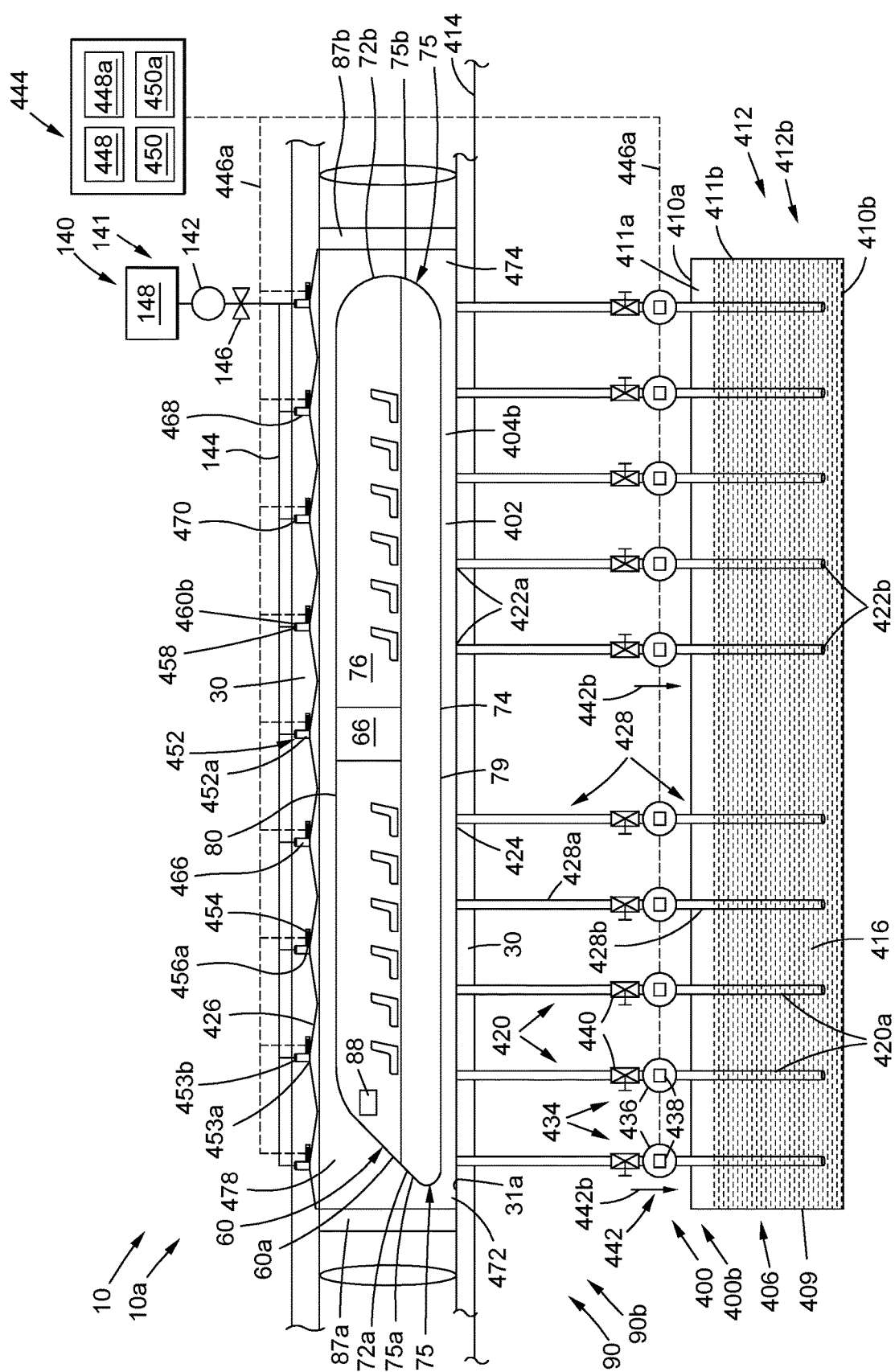
FIG. 23B is an illustration of a cross-sectional side view of an embodiment of a vacuum volume reduction system with a version of a volume reduction assembly, in the form of a fluid fill volume reduction assembly, of the disclosure, used with a vacuum transport tube vehicle at a vacuum tube vehicle station, and showing an enclosed volume portion in an unfilled state.

FIG. 23B is an illustration of a cross-sectional side view of an embodiment of a vacuum volume reduction system 10, such as in the form of a vacuum volume reduction system 10a, with a version of a volume reduction assembly 90, in the form of the fluid fill volume reduction assembly 90b, comprising the fluid fill assembly 400, of the disclosure, used with the vacuum transport tube vehicle 60 at the vacuum tube vehicle station 12, and showing the enclosed volume portion 402 in an unfilled state 404b, or emptied state.

Figure 23C:
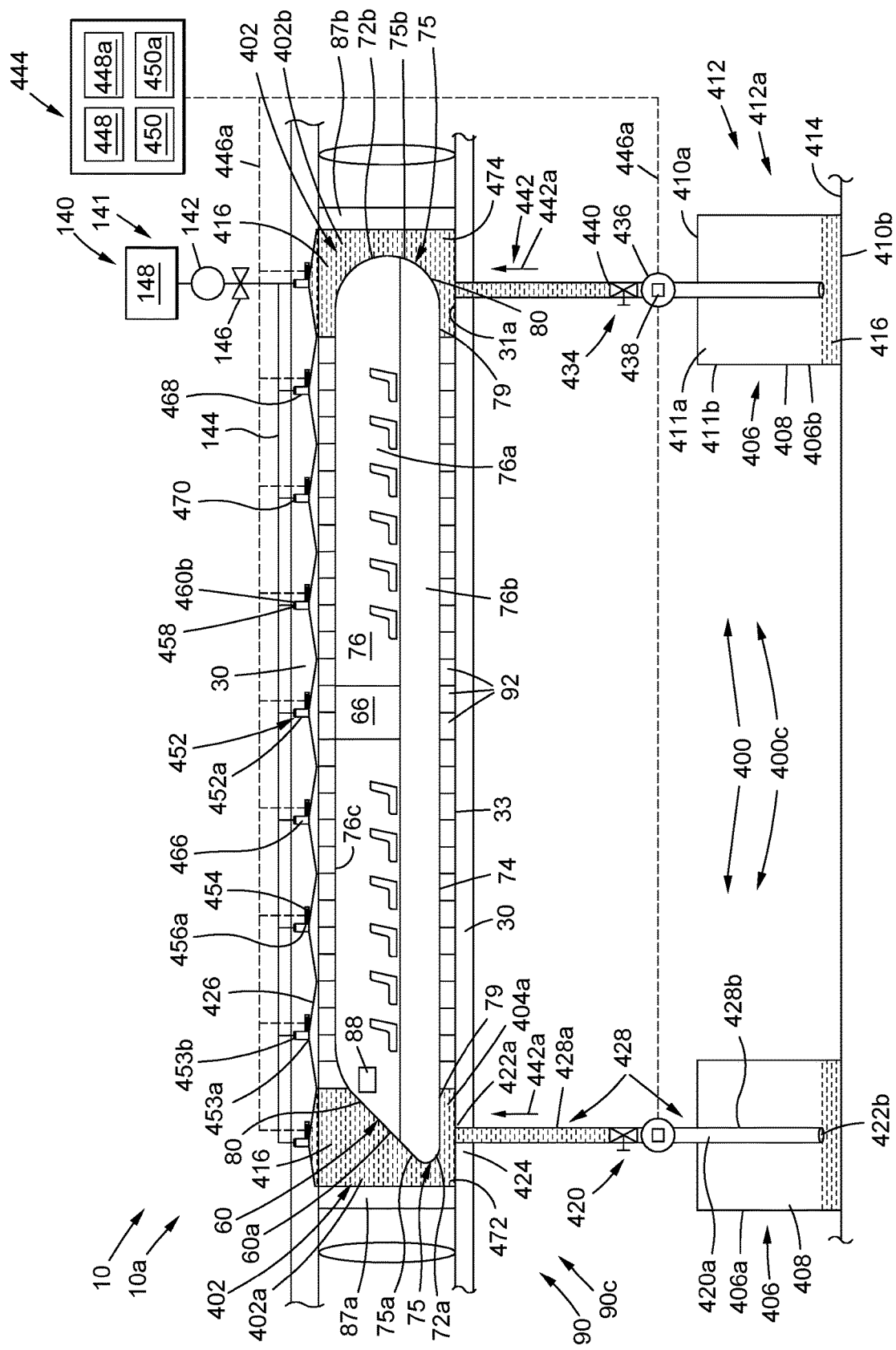
FIG. 23C is an illustration of a cross-sectional side view of an embodiment of a vacuum volume reduction system with another version of a volume reduction assembly, in the form of a hybrid volume reduction assembly, of the disclosure, used with a vacuum transport tube vehicle at a vacuum tube vehicle station, and showing enclosed volume portions in a filled state at a forward end and at an aft end of the vacuum transport tube vehicle.

FIG. 23C is an illustration of a cross-sectional side view of an embodiment of a vacuum volume reduction system 10, such as in the form of a vacuum volume reduction system 10a, with another version of a volume reduction assembly 90, in the form of a hybrid volume reduction assembly 90c, of the disclosure, used with the vacuum transport tube vehicle 60 at the vacuum tube vehicle station 12, and showing enclosed volume portions 402, such as a first enclosed volume portion 402a and a second enclosed volume portion 402b, each in a filled state 404a at a forward end 72a and at an aft end 72b of the vacuum transport tube vehicle 60.

As shown in FIGS. 22, 23A-23C, the vacuum volume reduction system 10, such as the vacuum volume reduction system 10a, is used with a vacuum transport tube vehicle 60, such as a vacuum transport tube train 60a, at a vacuum tube vehicle station 12, to reduce a volume 50 (see FIG. 22), under a vacuum 51 (see FIG. 22), to be evacuated at the vacuum tube vehicle station 12.

As shown in FIGS. 22, 23A-23C, the vacuum volume reduction system 10, such as the vacuum volume reduction system 10a, comprises a volume reduction assembly 90. In one version, the volume reduction assembly 90 comprises a fluid fill volume reduction assembly 90b (see FIGS. 22, 23A-23B). In another version, the volume reduction assembly comprises a hybrid volume reduction assembly 90c (see FIGS. 22, 23C), discussed in further detail below.

As shown in FIGS. 22, 23A-23C, the volume reduction assembly 90, such as the fluid fill volume reduction assembly 90b, comprises the fluid fill assembly 400. As shown in FIG. 23A, the fluid fill assembly 400 is in the form of a fluid fill assembly 400a. As shown in FIG. 23B, the fluid fill assembly 400 is in the form of a fluid fill assembly 400b. As shown in FIG. 23C, the fluid fill assembly 400 is in the form of a fluid fill assembly 400c. FIGS. 23A-23C are merely exemplary versions of the fluid fill assembly 400, and other versions may be used with the vacuum tube vehicle station 12 and the vacuum transport tube vehicle 60.

The fluid fill assembly 400 is preferably coupled to an interior 31a (see FIGS. 22, 23A-23C) of a station wall 30 (see FIGS. 22, 23A-23C) of the vacuum tube vehicle station 12. The fluid fill assembly 400 of the vacuum volume reduction system 10, such as the vacuum volume reduction system 10a, is used to reduce, and reduces, the volume 50, for example, a station volume 50c (see FIG. 22), under a vacuum 51 (see FIG. 22), in the vacuum tube vehicle station 12, when the vacuum transport tube vehicle 60 is positioned in the volume 50 at the vacuum tube vehicle station 12. Thus, a vacuum volume 51b (see FIG. 22) is reduced As shown in FIGS. 22, 23A-23C, the fluid fill assembly 400 comprises one or more containers 406. The one or more containers 406 comprise one of, a fluid tank 408 (see FIGS. 22, 23A, 23C), a fluid reservoir 409 (see FIGS. 22, 23B), or another suitable container. As shown in FIGS. 23A-23C, each of the one or more containers 406 has a first end 410a, a second end 410b, an interior 411a and an exterior 411b. The one or more containers 406 are preferably sealed or closed. As shown in FIGS. 23A-23B, the fluid fill assembly 400 comprises one container 406. As shown in FIG. 23C, the fluid fill assembly 400 comprises two containers 406, such as a first container 406a and a second container 406b. However, the fluid fill assembly 400 may comprise more than two containers 406.

As shown in FIGS. 23A-23C, the containers 406 are positioned at a location 412 under, or below, the vacuum tube vehicle station 12, and under, or below, the vacuum transport tube vehicle 60, when the vacuum transport tube vehicle 60 is positioned or stopped at the vacuum tube vehicle station 12. In one version, shown in FIGS. 23A, 23C, the one or more containers 406, such as the one or more fluid tanks 408, are positioned at the location 412, such as an above ground location 412a, and positioned on ground 414, and the vacuum tube vehicle station 12 and the vacuum transport tube vehicle 60 are elevated above the ground 414. In another version, shown in FIG. 23B, the container 406, such as the fluid reservoir 409, is positioned at the location 412, such as an underground location 412b, and positioned below the ground 414, and the vacuum tube vehicle station 12 and the vacuum transport tube vehicle 60 are on the ground 414.

Each of the one or more containers 406 is configured to contain, and contains, a fluid 416 (see FIGS. 22, 23A-23C), such as predetermined amount 417 (see FIG. 22), of the fluid 416. The fluid 416 is used to displace the volume 50 in the vacuum tube vehicle station 12, and in particular, is used to displace the volume 50 in the one or more enclosed volume portions 402 (see FIGS. 22, 23A-23C), or sealed volume portions, formed between an exterior 79 (see FIGS. 23A-23C) of the vacuum transport tube vehicle 60 and the interior 31a of the station wall (30).

The fluid 416 used is a fluid that does not boil when it is in the one or more containers 406 and when it is in the one or more enclosed volume portions 402, and it does not boil at any time during the filling, and unfilling, or emptying, of the one or more enclosed volume portions 402 with the fluid fill assembly 400. Preferably, the fluid 416 used is a fluid that provides sufficient lubrication to the one or more enclosed volume portions 402 and the components of the fluid fill assembly 400.

As shown in FIG. 22, the fluid 416 may comprise one of, a diffusion pump (DP) oil 416a, a diffusion pump (DP) fluid 416b, a polyphenyl ether (PPE) fluid 416c, a polyphenyl ether (PPE) diffusion pump (DP) fluid 416d, a silicone diffusion pump (DP) oil 416e, a silicone fluid 416f, a silicone diffusion pump (DP) fluid 416g, a silicone bath fluid 416h, a perfluoropolyether (PFPE) diffusion pump (DP) oil 416i, a hydrocarbon diffusion pump fluid 416j, hydraulic oil 416k, mineral oil 416l, or another suitable fluid.

Diffusion pump oils, such as silicones, hydrocarbons, esters, perfluorals, or polyphenyl ethers, may be used, and such diffusion pump oils have a high molecular weight, a low vapor pressure, and a low chemical reactivity. In particular, the polyphenyl ether (PPE) fluid 416c and the polyphenyl ether (PPE) diffusion pump (DP) fluid 416d may have excellent thermal stability, excellent oxidation resistance, excellent chemical resistance, and excellent radiation resistance.

Preferably, the fluid 416 has a density 418 (see FIG. 22) in a range of from 0.8 g/ml (grams per milliliter) to 1.9 g/ml at a temperature from 20° C. (Celsius) to 25° C. The density of the diffusion pump oil 416a and the density of the density of the diffusion pump fluid 416b are preferably in the range of from 0.8 g/ml (grams per milliliter) to 1.9 g/ml at a temperature from 20° C. (Celsius) to 25° C. A density 418 that is higher, such as 0.8 g/ml to 1.9 g/ml, is beneficial, as it reduces the length 432 of the fluid transport members 420 needed to pull a vacuum 51.

For example, the density of polyphenyl ether (PPE) fluid 416c is 1.20 g/ml at 20° C., and the density of polyphenyl ether (PPE) diffusion pump (DP) fluid 416d is the same or approximate to 1.20 g/ml at 20° C. For example, the density of silicone diffusion pump oil 416e is 0.98 g/ml at 25° C. The density of silicone fluid 416f is 1.07 g/ml at 25° C. The density of silicone diffusion pump (DP) fluid 416g is the same or approximate to 1.07 g/ml at 25° C. The density of silicone bath fluid 416h is 0.98 g/ml at 25° C. For example, the density of perfluoropolyether (PFPE) diffusion pump (DP) oil 416i 1.89 g/ml at 20° C. The density of a hydrocarbon diffusion pump fluid 416j is on or about 0.87 g/ml at 25° C. The density of hydraulic oil 416k is in a range of from 0.8 g/ml up to 1.0 g/ml at 25° C. The density of mineral oil 416l is 0.838 g/mL at 25° C.

As shown in FIGS. 22, 23A-23C, the fluid fill assembly 400 further comprises one or more fluid transport members 420. As shown in FIG. 22, the one or more fluid transport members 420 may comprise one of, a pipe 420a (see also FIGS. 23A-23C), a tube 420b, a hose 420c, a duct 420d, or another suitable fluid transport member to transport the fluid 416.

As shown in FIGS. 23A-23C, each fluid transport member 420 has a first end 422a attached to a bottom portion 424 (see also FIG. 22), or bottommost portion, of the interior 31a of the station wall 30. The interior 31a of the station wall 30 has a top portion 426 (see FIGS. 22, 23A-23C). As further shown in FIGS. 23A-23C, each fluid transport member 420 has a second end 422b disposed within the interior 411a of one of the one or more containers 406. As shown in FIGS. 23A-23C, each fluid transport member 420 further comprises an elongated body 428 having a first portion 428a and a second portion 428b.

Preferably, each of the one or more fluid transport members 420 has a diameter 430 (see FIG. 22) in a range of 3 (three) inches to 24 (twenty-four) inches, or greater, in size. More preferably, each of the one or more fluid transport members 420 has a diameter 430 in a range of 3 (three) inches to 6 (six) inches in size. However, the one or more fluid transport members 420 may have another suitable size diameter. The number of fluid transport members 420 used may preferably be in a range of 2 (two) to 200 (two-hundred) fluid transport members 420, and more preferably, in a range of 2 (two) to 80 (eighty) fluid transport members 420. The number of fluid transport members 420 used depends on the diameter 430 and the length 432 of the fluid transport members 420, as well as the diameter and the length of the vacuum transport tube vehicle 60, the diameter, the length and the volume 50, such as the station volume 50c, of the vacuum tube vehicle station 12, and the volume 50 of the enclosed volume portion 402. For example, FIG. 23A shows the fluid fill assembly 400, such as the fluid fill assembly 400a, having 5 (five) fluid transport members 420, and if each of the 5 (five) fluid transport members 420 are in side-by-side pairs, the total number is 10 (ten) fluid transport members 420. For example, FIG. 23B shows the fluid fill assembly 400, such as the fluid fill assembly 400b, having 10 (ten) fluid transport members 420, and if each of the ten (10) fluid transport members 420 are in side-by-side pairs, the total number is 20 (twenty) fluid transport members 420. For example, FIG. 23C shows the fluid fill assembly 400, such as the fluid fill assembly 400c, having 2 (two) fluid transport members 420, and if each of the 2 (two) fluid transport members 420 are in side-by-side pairs, the total number is 4 (four) fluid transport members 420.

Preferably, each of the one or more fluid transport members 420 has a length 432 (see FIG. 22) in a range of 15 feet to 45 feet, or greater, in length. However, the one or more fluid transport members 420 may have another suitable length. The length 432 of the fluid transport member 420 chosen is dependent on the density 418 of the fluid 416 chosen, such as needed to pull 1 atm. (one atmosphere) of vacuum 51.

For example, if the fluid used to fill the one or more enclosed volume portions 402 is water, the length 432 of each fluid transport member 420 would be 33 feet because that is the minimum distance required to pull a vacuum if the fluid is water. If the fluid 416 has a density 418 that is greater than the density of water (i.e., density of water is 0.9982 g/ml at 20° C., and 0.9970 g/ml at 25° C.), the length 432 of each fluid transport member 420 will be less then 33 feet, and if the fluid 416 has a density 418 that is less than the density of water, the length 432 of each fluid transport member 420 will be greater than 33 feet.

The desired size of the diameter 430 and the desired length 432 chosen for the fluid transport members 420, such as pipes 420a, depends on how long it takes to fill, and unfill, or empty, the one or more enclosed volume portions 402 with the fluid 416 from the fluid fill assembly 400. The desired size of the diameter 430 and the desired length 432 chosen for the fluid transport members 420, such as pipes 420a, may be calculated by determining the volume of the one or more enclosed volume portions 402 to be filled with the fluid 416, such as a predetermined amount 417, of the fluid 416, the time required to fill the one or more enclosed volume portions 402 to a filled state 404a (see FIG. 22), a maximum flow rate of the fluid 416, and the number of fluid transport members 420 distributed along the length of the vacuum tube vehicle station 12. An important distance is the distance required to pull a vacuum, measured from the second end 422b, or bottom, of each fluid transport member 420, such as a pipe 420a or tube 420b.

Preferably, the time to fill the one or more enclosed volume portions 402 to the filled state 404a is in a range of 4 (four) seconds to 180 (one hundred eighty) seconds. More preferably, the time to fill the one or more enclosed volume portions 402 to the filled state 404a is in a range of 4 (four) seconds to 60 (sixty) seconds. The time to fill the one or more enclosed volume portions 402 is also dependent on the type, and operation of, the vacuum transport tube vehicle 60, such as the vacuum transport tube train 60a.

The one or more fluid transport members 420 are configured to transport, and transport, the fluid 416 from the one or more containers 406 to the one or more enclosed volume portions 402 formed between the exterior 79 (see FIGS. 22, 23A-23B) of the vacuum transport tube vehicle 60 and the interior 31a (see FIGS. 22, 23A-23B) of the station wall 30, to reduce the volume 50, and to displace the volume 50 with the fluid 416.

In examples, a vacuum tube vehicle station 12 has a diameter of an interior passage 492 of 15 (fifteen) feet, and a vacuum transport tube vehicle 60 has a diameter of 14 (fourteen) feet and a length of 40 (forty) feet, and is positioned inside the vacuum tube vehicle station 12. The distance between an exterior 79 of the vacuum transport tube vehicle 60 and an interior 31a of the station wall 30 of the vacuum tube vehicle station 12 is 0.5 (one-half) foot, and a volume 50 of the enclosed volume portion 402 for a 1 (one) foot length is 22.78 ft$^3$ (cubic feet), and a station volume 50c in the interior passage 492 (see FIG. 24A) is 911.06 ft$^3$ (cubic feet). A fluid fill assembly 400 coupled to the bottom portion 424 of the interior 31a of the station wall 30 of the vacuum tube vehicle station 12 to fill the enclosed volume portion 402 with fluid 416 has fluid transport members 420, such as in the form of hoses 420c, where each hose 420c has a diameter of 3.54 inches (9 centimeters) and has a volume flow of 2.82 ft$^3$/sec (80 (eighty) liters/second or 0.08 m$^3$/sec). Two (2) hoses 420c are spaced apart from each other a distance of 2 (two) feet (24 (twenty-four) inches) and along the length of the 40 foot vacuum transport tube vehicle, there are 40 (forty) hoses with a volume flow of 112.8 ft$^3$/sec (cubic feet per second) (2.82 ft$^3$/sec×40). The time to fill the enclosed volume portion 402 is 8.07 seconds (911.06 ft$^3$/112.8 ft$^3$/sec)

If the distance between the two (2) hoses is 0.5 foot, the total number of hoses is 160 (2 hoses×(40 foot length of vacuum transport tube vehicle/0.5 foot distance)) and the volume flow is 451.2 ft$^3$/sec (2.82 ft$^3$/sec×160), and the time to fill the enclosed volume is 2.01 seconds (911.06 ft$^3$/451.2 ft$^3$/sec). If the distance between the two (2) hoses is 1.0 foot, the total number of hoses is 80 (2 hoses×(40 foot length of vacuum transport tube vehicle/1.0 foot distance)), and the volume flow is 225.6 ft$^3$/sec (2.82 ft$^3$/sec×80), and the time to fill the enclosed volume is 4.03 seconds (911.06 ft$^3$/225.6 ft$^3$/sec). If the distance between the two (2) hoses is 4.0 feet, the total number of hoses is 20 (2 hoses×(40 foot length of vacuum transport tube vehicle/4.0 feet distance)), and the volume flow is 56.4 ft$^3$/sec (2.82 ft$^3$/sec×20), and the time to fill the enclosed volume is 16.15 seconds (911.06 ft$^3$/56.4 ft$^3$/sec). If the distance between two (2) hoses is 8.0 feet, the total number of hoses is 10 (2 hoses×(40 foot length of vacuum transport tube vehicle/8.0 feet distance)), and the volume flow is 28.2 ft$^3$/sec (2.82 ft$^3$/sec×10), and the time to fill the enclosed volume is 32.30 seconds (911.06 ft$^3$/28.2 ft$^3$/sec). If the distance between the two (2) hoses is 10.0 feet, the total number of hoses is 8 (2 hoses×(40 foot length of vacuum transport tube vehicle/10.0 feet distance)), and the volume flow is 22.56 ft$^3$/sec (2.82 ft$^3$/sec×8), and the time to fill the enclosed volume is 40.38 seconds (911.06 ft$^3$/22.56 ft$^3$/sec).

As shown in FIGS. 22, 23A-23C, the fluid fill assembly 400 further comprises one or more fluid pump assemblies 434 attached to the elongated body 428 of each of the one or more fluid transport members 429, to pump the fluid 416 from the one or more containers 406 to the one or more enclosed volume portions 402. Each of the one or more fluid pump assemblies 434 comprises a fluid pump 436 (see FIGS. 22, 23A-23C). The fluid pump 436 may comprise a reversible fluid pump 436a (see FIG. 22), a one-way fluid pump 436b (see FIG. 22), or another suitable fluid pump. If the fluid transport members 420, such as in the form of pipes 420a, are manifolded, a pipe 420a that is larger can accommodate the flow 442 of fluid 416 through multiple pipes 420a that are smaller.

The operating pressure of the fluid pump 436 is preferably in a range of 14 psi (fourteen pounds per square inch) absolute measured relative to a full vacuum to 100 psi (one hundred pounds per square inch) absolute measured relative to a full vacuum, and more preferably, in a range of 30 psi (thirty pounds per square inch) to 60 psi (sixty pounds per square inch) absolute measured relative to a full vacuum. The operating pressure of the fluid pump 436 may vary due to various factors, for example, changes in the level of the fluid 416 in the container 406. Each of the one or more fluid pump assemblies 434 further comprises a motor 438 (see FIGS. 22, 23A-23C) coupled to the fluid pump 436, to provide power to operate and run the fluid pump 436. The motor 438 may comprise an electric motor, a hydraulic motor, or another suitable type of motor.

Each of the one or more fluid pump assemblies 434 further comprises a control valve 440 (see FIGS. 22, 23A-23C) coupled to the fluid pump 436, to control a flow 442 (see FIG. 22) of the fluid 416 from the one or more containers 406 to the one or more enclosed volume portions 402, and to control the flow 442 of the fluid 416 from the one or more enclosed volume portions 402 back to the one or more containers 406. As shown in FIG. 23A, the flow 442 of fluid 416 comprises an upward flow 442a of fluid 416 from the one or more containers 406 to the one or more enclosed volume portions 402. As shown in FIG. 23B, the flow 442 of fluid 416 comprises a downward flow 442b of fluid 416 from the one or more enclosed volume portions 402 back to the one or more containers 406. The control valve 440 may comprise a rotary motion valve, a linear motion valve, or another suitable type of control valve. Each of the one or more fluid pump assemblies 434 may further comprise additional valves, pumps, motors, or other components known in the art.

As shown in FIGS. 22, 23A-23C, the fluid fill assembly 400 further comprises a control and power system 444. The control and power system 444, or one or more components of the control and power system 444, may be located in the vacuum tube vehicle station 12 and coupled to the one or more fluid pump assemblies 434, via one or more wireless connectors 446a (see FIGS. 22, 23A-23C), or via one or more wired connectors 446b (see FIG. 22). Alternatively, the control and power system 444, or one or more components of the control and power system 444, may be located at, or near, the one or more fluid pump assemblies 434, or at another location remote from the vacuum tube vehicle station 12 and the one or more fluid pump assemblies 434.

The control and power system 444 comprises a controller 448 (see FIGS. 22, 23A-23C) for controlling the operation of the fluid pump 436, the motor 438, and/or the control valve 440 of each of the fluid pump assemblies 434. The controller 448 may comprise an electronic controller, a digital controller, a hydraulic controller, or another suitable controller. The controller 448 may include one or more controls or instruments for control, one or more computers, one or more algorithms, and other suitable components known in the art.

The controller 448 may be located in the vacuum tube vehicle station 12 and coupled to the one or more fluid pump assemblies 434, via one or more wireless connectors 446a (see FIGS. 22, 23A-23C), or via one or more wired connectors 446b (see FIG. 22). Alternatively, the controller 448 may be located at, or near, the one or more fluid pump assemblies 434, or at another location remote from the vacuum tube vehicle station 12 and the one or more fluid pump assemblies 434.

As shown in FIGS. 22, 23A-23C, the control and power system 444 further comprises a power source 450 for providing power to the motor 438, the fluid pump 436, and/or the control valve 440 of each of the fluid pump assemblies 434. The power source 450 may comprise electric power sources, such as direct current (DC) sources, for example, batteries, or such as alternating current (AC) sources, for example, a power grid, inverters, or electrical generators, hydraulic power sources, or another suitable power source.

The power source 450 may be located in the vacuum tube vehicle station 12 and coupled to the one or more fluid pump assemblies 434, via one or more wireless connectors 446a (see FIGS. 22, 23A-23C), or via one or more wired connectors 446b (see FIG. 22). Alternatively, the power source 450 may be located at, or near, the one or more fluid pump assemblies 434, or at another location remote from the vacuum tube vehicle station 12 and the one or more fluid pump assemblies 434.

As shown in FIGS. 22, 23C, in another version, the vacuum volume reduction system 10a further comprise further comprising a plurality of blocks (92) installed in a plurality of cavities (40) longitudinally for the volume reduction assembly 90 comprising a hybrid volume reduction assembly 90c. As shown in FIG. 23C, in one version of the hybrid volume reduction assembly 90c, the fluid fill assembly 400, such as the fluid fill assembly 400c, is used with a plurality of blocks 92 (see also FIG. 22). As shown in FIG. 23C, the fluid fill assembly 400c comprises containers 406 comprising a first container 406a and a second container 406b, each containing fluid 416. The containers 406 are in the form of fluid tanks 408. The fluid 416 in the first container 406a is pumped with the fluid pump 436 through the fluid transport member 420, such as the pipe 420a. The control valve 440 (see FIG. 23C) controls the flow 442 (see FIG. 23C), comprising the upward flow 442a, of the fluid 416 from the first container 406a. As shown in FIG. 23C, the fluid 416 flows from the first container 406a to the enclosed volume portion 402 around the vehicle outer surface 80 (see also FIG. 23B) of a contour portion 75 (see also FIG. 23B), such as a forward contour portion 75a (see also FIG. 23B), of the vacuum transport tube vehicle 60 at a forward end 72a of the vacuum transport tube vehicle 60.

As further shown in FIG. 23C, the fluid 416 in the second container 406b is pumped with the fluid pump 436 through the fluid transport member 420, such as the pipe 420a. The control valve 440 (see FIG. 23C) controls the flow 442 (see FIG. 23C), comprising the upward flow 442a, of the fluid 416 from the second container 406b. As shown in FIG. 23C, the fluid 416 flows from the second container 406b to the enclosed volume portion 402 around the vehicle outer surface 80 (see also FIG. 23B) of a contour portion 75 (see also FIG. 23B), such as an aft contour portion 75b (see also FIG. 23B) of the vacuum transport tube vehicle 60 at an aft end 72b of the vacuum transport tube vehicle 60.

As further shown in FIG. 23C, hybrid volume reduction assembly 90c comprises the plurality of blocks 92 installed in a plurality of cavities 40 longitudinally formed around a circumference 42 (see FIG. 2B) of a station vacuum tube 33 (see also FIG. 22) disposed in the interior 31a of the station wall 30 of the vacuum tube vehicle station 12. The plurality of blocks 92 are configured to engage, such as in a sealed engagement 91a (see FIG. 3), around a vehicle outer surface 80 (see also FIG. 23B) of a constant radius portion 74 (see also FIG. 23B) of the vacuum transport tube vehicle 60. Engages around may mean that the plurality of blocks 92 of the hybrid volume reduction assembly 90c may form a seal 91 (see FIG. 3) in a sealed engagement 91a (see FIG. 3) around the vehicle outer surface 80 (see FIG. 23C), or may mean that the plurality of blocks 92 engage in close, or near, proximity, such as ⅛ inch to ¼ inch distance, to the vehicle outer surface 80 (see FIG. 23A) of the vacuum transport tube vehicle 60. Additionally, the fluid 416 from the containers 406 pumped into the enclosed volume portions 402 around the forward contour portion 75a and the aft contour portion 75b may also be used to fill in any spaces or gaps between the plurality of blocks 92, if needed.

The plurality of blocks 92 are preferably comprised of a compliant material 102 (see FIG. 3) such as a foam, a rubber, a foam rubber, or another suitably compliant material, that allows the plurality of blocks 92 to deform to match a shape 104 (see FIGS. 3, 5B) of the plurality of cavities 40 (see FIGS. 3, 5B, 23A). The plurality of blocks 92 may be moved with a control system 108 (see FIGS. 2C, 3). As shown in FIG. 3, the control system 108 may comprise one of, a mechanical actuator control system 108a, a pneumatic actuator control system 108b, a hydraulic actuator control system 108c, an electrical actuator control system 108d, or another suitable control system for controlling movement and actuation of the volume reduction assembly 90 comprising the hybrid volume reduction assembly 90c.

Thus, with the hybrid volume reduction assembly 90c, the plurality of blocks fill the enclosed volume portion 402 around the constant radius portion 74 of the vacuum transport tube vehicle 60, and the fluid 416 fills the enclosed volume portions 402 around the forward contour portion 75a and the aft contour portion 75b of the vacuum transport tube vehicle 60. Alternatively, the hybrid volume reduction assembly 90c may use an inflatable bladder 114 (see FIGS. 2D, 22) in place of the plurality of blocks 92.

As shown in FIGS. 22, 23A-23C, the vacuum volume reduction system 10a further comprises one or more recessed areas 452 positioned at the top portion 426, or topmost portion, of the interior 31a of the station wall 30 of the vacuum tube vehicle station 12. The one or more recessed areas 452 may be in the form of one or more small cavities 452a (see FIGS. 22, 23A-23C), or compartments, enclosed within the top portion 426, or topmost portion, of the interior 31a of the station wall 30. As shown in FIGS. 23A-23C and 24B, the recessed area 452, such as the small cavity 452a, has a first end 453a and a second end 453b.

Each of the one or more recessed areas 452 includes a valve 454 (see FIGS. 22, 23A-23C) coupled to the first end 453a of the recessed area 452. The valve 454 may comprise a control valve, such as a rotary motion valve, a linear motion valve, or another suitable control valve, or the valve 454 may comprise a shutoff valve, or another suitable valve. The valve 454 is configured to move, and moves, back and forth between an open position 456a (see FIGS. 22, 23A-23C, 42A-42B) and a closed position 456b (see FIGS. 22, 43A-43B).

Each of the one or more recessed areas 452 further includes a vent 458 (see FIGS. 22, 23A-23C) coupled to the second end 453b of the recessed area 452. Alternative to the vent 458, the recessed area 452 may include another valve, or another suitable structure. The vent 458 is configured to move, and moves, back and forth between an open position 460a (see FIGS. 22, 44A-44B) and a closed position 460b (see FIGS. 22, 23A-23C, 43A-43B).

The valve 454 is configured to capture, and captures, within the recessed area 452 a flow 462 (see FIG. 22) of air 52, such as from an air leak 464, that flows into an interior 466 (see FIGS. 23A-23C, 41A-41B) of the recessed area 452. If there is an air leak 464 of the air 52, such as ambient air 52a, or compressed air 52b, from one or more of the station doors 68 (see FIGS. 22, 40A), from one or more of the vehicle doors 66 (see FIGS. 22, 40A), and/or from the air supply assembly 130 (see FIGS. 22, 40A), into one or more of the door cavities 132 (see FIG. 40A), the air 52 (see FIGS. 22, 40A-40B) may leak from the one or more door cavities 132 through one or more of the door seals 122 (see FIGS. 22, 40A), and move upward through the enclosed volume portion 402 (see FIGS. 40A-40B) and into the one or more recessed areas 452 (see FIGS. 41A-41B) in the station wall 30 (see FIGS. 41A-41B) of the vacuum tube vehicle station 12. When all of the air 52, such as the ambient air 52a, or compressed air 52b, is within an interior 466 (see FIGS. 42A-42B) of the recessed area 452 (see FIGS. 42A-42B), the valve 454 moves from the open position 456a (see FIGS. 22, 42A-42B) to the closed position 456b (see FIGS. 22, 43A-43B), to capture the air 52 in the interior 466 of the recessed area 452, and the vent 458 (see FIGS. 22, 43A-43B) is in the closed position 460b (see FIGS. 22, 43A-43B).

The vent 458 is configured to evacuate, and evacuates, the air 52, such as ambient air 52a, or compressed air 52b, out of the interior 466 of the recessed area 452, through an exterior 468 (see FIGS. 44A-44B)) of the recessed area 452, and to a vent-to-vacuum assembly 140 (see FIGS. 22, 23A-23C) coupled to the recessed area 252. When the air 52, such as the ambient air 52a, or compressed air 52b, captured in the interior 466 (see FIGS. 42A-42B) of the recessed area 452 (see FIGS. 42A-42B), is ready to be evacuated out of the recessed area 452, the vent 458 moves from the closed position 460b (see FIGS. 22, 43A-43B) to the open position 460a (see FIGS. 22, 44A-44B), and the air 52 (see FIGS. 44A-44B) flows out of the interior 466 of the recessed area 452, into the vent-to-vacuum assembly 140, and the valve 454 (see FIGS. 44A-44B) is in the closed position 456b (see FIGS. 44A-44B).

As shown in FIGS. 22, 23A-23C, the vacuum volume reduction system 10a further comprises the vent-to-vacuum assembly 140 coupled to the one or more recessed areas 452, via one or more openings 470 in the station wall 30 of the vacuum tube vehicle station 12. The vent-to-vacuum assembly 140 (see FIGS. 22, 23A-23C) is coupled to the station wall 30 (see FIGS. 22, 23A-23C), and configured to evacuate the air 52 out of the one or more recessed areas 452, as well as from the door cavity 132 (see FIG. 33A). The vent-to-vacuum assembly 140 (see FIG. 33A) is configured to evacuate the air 52 (see FIG. 33a) comprising one of, ambient air 52a (see FIG. 22), or compressed air 52b (see FIG. 22), from the door cavity 132 (see FIG. 33a), after the loading and the unloading of one or more of, passengers 62 (see FIG. 33A) and cargo 64 (see FIG. 33A). As shown in FIGS. 23A-23C, the vent-to-vacuum assembly 140 comprises a vacuum pump assembly 141 having one or more vacuum pumps 142, one or more vacuum ducts 144, one or more vacuum valves 146, and one or more vacuum reservoirs 148 for collecting the air 52 evacuated from the recessed areas 452.

The vacuum pump 142 is preferably a durable vacuum pump with a good vapor handling capability. The vacuum pump 142 may comprise a dual stage rotary vane mechanical vacuum pump, or another suitable vacuum pump. Preferably, the vacuum pump 142 has a pressure of $1 \times 10^{-4}$ Torr, or a pressure of <1 Torr (less than one Torr). However, other vacuum pumps with other suitable pressures may also be used.

As shown in FIGS. 23A-23C, vacuum ducts 144, or air lines, of the vent-to-vacuum assembly 140 are coupled at one end to the vents 458 of the recessed areas 452 through the openings 470 in the top portion 426 of the station wall 30 in the vacuum tube vehicle station 12. As shown in FIGS. 23A-23C, the vacuum ducts 144 are coupled at the other end to the vacuum pump 142, via the vacuum valve 146, and the vacuum reservoir 148 is further coupled to the vacuum pump 142 via a vacuum duct 144. The vent-to-vacuum assembly 140 with the vacuum pump assembly 141 is used to vent the air 52 evacuated from the one or more recessed areas 452. The vent-to-vacuum assembly 140 is also used to vent the air 52 from the door cavity 132 (see FIG. 33A).

The vent-to-vacuum assembly 140, as well as the valve 454 and the vent 458 of each of the recessed areas 452 are preferably controlled with a controller 448a (see FIGS. 22, 23A-23C) coupled to the vent-to-vacuum assembly 140, the valve 454, and the vent 458. The controller 448a may comprise an electronic controller, a digital controller, a hydraulic controller, or another suitable controller. The controller 448a may include one or more controls or instruments for control, one or more computers, one or more algorithms, and other suitable components known in the art. As shown in FIGS. 23A-23C, the controller 448a may be part of the control and power system 444 that also controls the fluid pump assemblies 434. Alternatively, the controller 448a may be separate from the control and power system 444.

The controller 448a may be located in the vacuum tube vehicle station 12 and coupled to the vent-to-vacuum assembly 140, the valve 454, and the vent 458, via one or more wireless connectors 446a (see FIGS. 22, 23A-23C), or via one or more wired connectors 446b (see FIG. 22). Alternatively, the controller 448a may be located at, or near, the vent-to-vacuum assembly 140, the valve 454, and the vent 458, or at another location remote from the vacuum tube vehicle station 12, and the vent-to-vacuum assembly 140, the valve 454, and the vent 458.

The vent-to-vacuum assembly 140, as well as the valve 454 and the vent 458 are preferably powered with a power source 450a (see FIGS. 22, 23A-23C) coupled to the vent-to-vacuum assembly 140, the valve 454, and the vent 458. The power source 450a may comprise electric power sources, such as direct current (DC) sources, for example, batteries, or such as alternating current (AC) sources, for example, a power grid, inverters, or electrical generators, hydraulic power sources, or another suitable power source. As shown in FIGS. 23A-23C, the power source 450a may be part of the control and power system 444 that also controls the fluid pump assemblies 434. Alternatively, the power source 450a may be separate from the control and power system 444.

The power source 450a may be located in the vacuum tube vehicle station 12 and coupled to the vent-to-vacuum assembly 140, the valve 454, and the vent 458, via one or more wireless connectors 446a (see FIGS. 22, 23A-23C), or via one or more wired connectors 446b (see FIG. 22). Alternatively, the power source 450a may be located at, or near, the vent-to-vacuum assembly 140, the valve 454, and the vent 458, or at another location remote from the vacuum tube vehicle station 12 and the vent-to-vacuum assembly 140, the valve 454, and the vent 458.

As shown in FIG. 22, the vacuum volume reduction system 10a further comprises a plurality of seal elements 81, to seal off the one or more enclosed volume portions 402, prior to the one or more enclosed volume portions 402 being filled with fluid 416.

As shown in FIG. 22, the plurality of seal elements 81 comprise two or more door seals 122 (see also FIGS. 25A, 27A) coupled to the interior 31a of the station wall 30. The two or more door seals 122 are coupled to the interior 31a of the station wall 30, to seal off the one or more enclosed volume portions 402 (see FIGS. 22, 23A-23C, 27A) from one or more vehicle doors 66 (see FIG. 27A) of the vacuum transport tube vehicle 60, from one or more station doors 68 (see FIG. 27A) located at the vacuum tube vehicle station 12, and from the door cavity 132 (see FIG. 27A) positioned between each of the one or more vehicle doors 66 and each of the one or more station doors 68. The two or more door seals 122 are deployed from a retracted position 122b (see FIG. 26A) to a deployed position 122a (see FIG. 27A), via a door seal control system 124 (see FIG. 3), to seal around a perimeter 125 (see FIG. 3) of each of one or more vehicle doors 66, and to seal off the door cavity 132 (see FIG. 27A) having a door cavity volume 50b (see FIG. 3). As shown in FIG. 27A, the door seal 122 may be deployed from and retracted into a door seal cavity 123. The two or more door seals 122 (see FIGS. 22, 27A) are preferably controlled with the door seal control system 124 (see FIG. 3). The two or more door seals 122 are moved from the deployed position 122a to the retracted position 122b, when the vacuum transport tube vehicle 60 is ready to leave the vacuum tube vehicle station 12, after the filling, and unfilling, or emptying, of the fluid 416 and boarding and unboarding of passengers 62 or cargo 64.

As shown in FIGS. 22, 23A-23C, the plurality of seal elements 81 further comprise a first pressure barrier seal 87a (see also FIG. 2A) and a second pressure barrier seal 87b (see also FIG. 2A), each coupled to the interior 31a of the station wall 30. As shown in FIGS. 23A-23C, the first pressure barrier seal 87a is coupled to the interior 31a of the station wall 30 at a front area 472 in front of a forward end 72a of the vacuum transport tube vehicle 60 (see FIGS. 23A-23C). As shown in FIGS. 23A-23C, the second pressure barrier seal 87b is coupled to the interior 31a of the station wall 30 at a back area 474 in back of, or behind, an aft end 72b of the vacuum transport tube vehicle 60, to seal off the one or more enclosed volume portions 402. The first pressure barrier seal 87a and the second pressure barrier seal 87b are moved out of the way, when the vacuum transport tube vehicle 60 is ready to leave the vacuum tube vehicle station 12, after the filling and unfilling, or emptying, of the fluid 416 and boarding and unboarding of passengers 62 or cargo 64.

As shown in FIG. 22, the plurality of seal elements 81 may further comprise one or more pressure seals 82 coupled to the vacuum transport tube vehicle 60 (see also FIG. 2A). The one or more pressure seals 82 coupled to the vacuum transport tube vehicle 60 may be coupled at one or more of, a forward location 86 (see FIG. 2A) of the vacuum transport tube vehicle 60, and at an aft location 84 (see FIG. 2A) of the vacuum transport tube vehicle 60.

As shown in FIG. 22, the vacuum volume reduction system 10a may further optionally comprise a wetting prevention material 476. The wetting prevention material 476 may be applied to the exterior 79 (see FIG. 23B) of the vacuum transport tube vehicle 60, and preferably, may be applied to a vehicle outer surface 80 (see FIG. 23B) on the exterior 79 of the vacuum transport tube vehicle 60. Additionally, the wetting prevention material 476 may also be applied to the interior 31a (see FIG. 23B) of the station wall 30 (see FIG. 23B), and preferably, may be applied to an inner surface 478 (see FIG. 23B) of the interior 31a of the station wall 30.

The wetting prevention material 476, or wettability prevention material, prevents, or minimizes, wetting 480 (see FIG. 22), or wettability, by the fluid 416 on the exterior 79 of the vacuum transport tube vehicle 60 and prevents, or minimizes, wetting 480 by the fluid 416 on the interior 31a of the station wall 30, after the fluid 416 is emptied, or evacuated, from the one or more enclosed volume portions 402. As used herein, "wetting", also referred to as wettability, means the ability of a liquid to maintain contact with a solid surface, resulting from intermolecular interactions when the two are brought together, and the degree of wetting or wettability is determined by a force balance between adhesive and cohesive forces.

As shown in FIG. 22, the wetting prevention material 476 may comprise one or more of, a wax 476a, a sealant 476b, a ceramic coating 476c, a glaze 476d, or another suitable wetting prevention material. Preferably, the wetting prevention material 476 is a high surface tension material to prevent, or minimize, wetting 480, by the fluid 416, and to cause, or promote, beading of the fluid 416 on the exterior 79 of the vacuum transport tube vehicle 60 and the interior 31a of the station wall 30.

The exterior 79 of the vacuum transport tube vehicle 60 and the interior 31a of the station wall 30 may be treated with the wetting prevention material 476 prior to using the fluid fill assembly 400 to fill the one or more enclosed volume portions 402 with the fluid 416. How often the wetting prevention material 476 is applied, and how many coats, or layers, of the wetting prevention material 476 is applied, is dependent on the type of wetting prevention material 476 used, and the type of fluid 416 used to fill the one or more enclosed volume portions 402.

As shown in FIG. 22, the vacuum tube vehicle station 12 further comprises the air supply assembly 130 (see also FIG. 32A) coupled to the station wall 30 (see FIG. 32A), and configured to supply air 52 (see FIG. 3) to the door cavity 132 (see FIG. 3). The air supply assembly 130 is preferably configured to supply air 52 (see FIGS. 22, 32A) comprising one of, ambient air 52a (see FIG. 22) or compressed air 52b (see FIG. 22), to the door cavity 132 (see FIG. 32A), before the loading and the unloading of one or more of, the passengers 62 and the cargo 64. As shown in FIG. 31A, the door cavity 132 is positioned between each vehicle doors 66 and each station doors 68. The air supply assembly 130 may comprise one or more air pumps 134 (see FIG. 3), one or more air ducts 136 (see FIG. 3), one or more air supply control valves 138 (see FIG. 3), and other suitable components.

As shown in FIG. 22, the vacuum tube vehicle station 12 further comprises vacuum tubes 16 (see FIGS. 22, 23A) coupled to a first end 32a (see FIG. 23A) and a second end 32b (see FIG. 23A) of the vacuum tube vehicle station 12 (see FIG. 23A). Each vacuum tube 16 has an interior 54a (see FIG. 23A) that is preferably coextensive with the interior 31a of the station wall 30 and/or coextensive with an interior 36a (see FIG. 23C) of a station vacuum tube 33 (see FIGS. 22, 23C), such as used with the hybrid volume reduction assembly 90c (see FIGS. 22, 23C).

As shown in FIG. 22, the vacuum tube vehicle station 12 may comprise a station vacuum tube 33 having a tube volume 50a, which is part of the volume 50. With the hybrid volume reduction assembly 90c (see FIGS. 22, 23C), discussed above, the station vacuum tube 33 is disposed in the interior 31a of the station wall 30 of the vacuum tube vehicle station 12. With the hybrid volume reduction assembly 90c (see FIG. 22), a liner element 49 (see FIG. 4C) may be coupled to the interior 31a of the station wall 30 for contact or engagement with the outer surface 34b (see FIG. 4C) of the station vacuum tube 33. The liner element 49 may provide additional protection against leaks, as well as a protective layer for the plurality of blocks 92 of the volume reduction assembly 90 comprising the hybrid volume reduction assembly 90c.

As further shown in FIGS. 23A-23C, the vacuum transport tube vehicle 60, such as the vacuum transport tube train 60a, may be controlled and powered via a vehicle power and control system 88, and the vacuum transport tube vehicle 60 may be enabled by a magnetic levitation (mag-lev) propulsion system 24 (see FIGS. 1B, 3), which is substantially frictionless and eliminates or greatly reduces rolling friction. As shown in FIG. 23C, the interior 76 of the vacuum transport tube vehicle 60 preferably comprises a cabin 76a, a cargo compartment 76b, and a ceiling 76c. As further shown in FIGS. 23A-23CC, the vacuum transport tube vehicle 60 may comprise one or more vehicle doors 66.

In one exemplary embodiment there is provided, a vacuum volume reduction system 10a (see FIGS. 22, 23A-23C) for reducing a volume 50 (see FIG. 22), under a vacuum 51 (see FIG. 22), and displacing the volume 50 with a fluid 416 (see FIG. 22), in a vacuum tube vehicle station 12 (see FIGS. 22, 23A-23C). The vacuum volume reduction system 10a comprises a volume reduction assembly 90 (see FIGS. 22, 23A-23C) comprising a fluid fill volume reduction assembly 90b (see FIG. 22), having a fluid fill assembly 400 (see FIGS. 22, 23A-23C) coupled to an interior 31a (see FIGS. 22, 23A-23C) of a station wall 30 (see FIGS. 22, 23A-23C) of the vacuum tube vehicle station 12, to reduce the volume 50, under the vacuum 51, in the vacuum tube vehicle station 12, when a vacuum transport tube vehicle 60 (see FIGS. 22, 23A-23C) is positioned in the volume 50 at the vacuum tube vehicle station 12.

The fluid fill assembly 400 comprises one or more containers 406 (see FIGS. 22, 23A-23C) positioned under the vacuum tube vehicle station 12, and positioned under the vacuum transport tube vehicle 60, when the vacuum transport tube vehicle 60 is at the vacuum tube vehicle station 12. Each container 406 contains the fluid 416 (see FIGS. 22, 23A-23C). The container 406 may comprise a fluid tank 408 (see FIGS. 22, 23A), such as at an above ground location 412a (see FIG. 23A) positioned under the vacuum tube vehicle station 12, or a fluid reservoir 409 (see FIGS. 22, 23C), such as at an underground location 412b under the vacuum tube vehicle station 12.

The fluid 416 comprises one of, a diffusion pump (DP) oil 416a, a diffusion pump (DP) fluid 416b, a polyphenyl ether (PPE) fluid 416c, a polyphenyl ether (PPE) diffusion pump (DP) fluid 416d, a silicone diffusion pump (DP) oil 416e, a silicone fluid 416f, a silicone diffusion pump (DP) fluid 416g, a silicone bath fluid 416h, a perfluoropolyether (PFPE) diffusion pump (DP) oil 416i, a hydrocarbon diffusion pump fluid 416j, hydraulic oil 416k, mineral oil 416l or another suitable fluid.

The fluid fill assembly 400 further comprises one or more pipes 420a (see FIGS. 22, 23A-23C). Each pipe 420a has a first end 422a (see FIG. 23A) attached to a bottom portion 424 (see FIG. 23A) of the interior 31a of the station wall 30. Each pipe 420a has a second end 422b (see FIG. 23A) disposed within one of the one or more containers 406, The one or more pipes 420a are each configured to transport the fluid 416 from the one or more containers 406 to one or more enclosed volume portions 402 (see FIGS. 22, 23A-23C) formed between an exterior 79 (see FIGS. 23A-23C) of the vacuum transport tube vehicle 60 and the interior 31a of the station wall 30, to reduce the volume 50, and to displace the volume 50 with the fluid 416.

The fluid fill assembly 400 further comprises one or more fluid pump assemblies 434 (see FIGS. 22, 23A-23C) attached to the one or more pipes 420a, to pump the fluid 416 from the one or more containers 406 to the one or more enclosed volume portions 402. Each of the one or more fluid pump assemblies 434 comprises a fluid pump 436 (see FIGS. 22, 23A-23C), a motor 438 (see FIGS. 22, 23A-23C) coupled to the fluid pump 436, and a control valve 440 (see FIGS. 22, 23A-23C) coupled to the fluid pump 436, to control a flow 442 (see FIGS. 22, 23A, 23B) of the fluid 416. The fluid fill assembly 400 further comprises a control and power system 444 (see FIGS. 22, 23A-23C).

The vacuum volume reduction system 10a further comprises one or more recessed areas 452 (see FIGS. 22, 23A-23C) positioned at a top portion 426 (see FIGS. 22, 23A-23C), or topmost portion, of the interior 31a of the station wall 30 of the vacuum tube vehicle station 12. Each of the one or more recessed areas 452 has a valve 454 (see FIGS. 22, 23A-23C) configured to capture, and capturing, within the recessed area 452, any air 52 (see FIG. 22) from an air leak 464 (see FIG. 22). Each of the one or more recessed areas 452 further has a vent 458 (see FIGS. 22, 23A-23C) configured to evacuate, and evacuating, the air 52 out of the recessed area 452.

The vacuum volume reduction system 10a further comprises a vent-to-vacuum assembly 140 (see FIGS. 22, 23A-23C) coupled to the one or more recessed areas 452, via one or more openings 470 (see FIGS. 22, 23A-23C) in an exterior 31b of the station wall 30. The vacuum volume reduction system 10a further comprises a plurality of seal elements 81, to seal off the one or more enclosed volume portions 402. The plurality of seal elements 81 comprise two or more door seals 122 (see FIGS. 22, 27A) coupled to the interior 31a of the station wall 30, a first pressure barrier seal 87a (see FIGS. 22, 23A) and a second pressure barrier seal 87b (see FIGS. 22, 23A) each coupled to the interior 31a of the station wall 30, and pressure seals 82 (see FIG. 22).

The first pressure barrier seal 87a is coupled to the interior 31a of the station wall 30 at a front area 472 (see FIG. 23A) in front of a forward end 72a (see FIG. 23A) of the vacuum transport tube vehicle 60, and the second pressure barrier seal 87b is coupled to the interior 31a of the station wall 30 at a back area 474 (see FIG. 23A) aft of an aft end 72b (see FIG. 23A) of the vacuum transport tube vehicle 60. The first pressure barrier seal 87a and the second pressure barrier seal 87b are moved out of the way when the vacuum transport tube vehicle 60 is ready to leave the vacuum tube vehicle station 12, after the filling and unfilling, or emptying, of the fluid 416 and boarding and unboarding of passengers 62 or cargo 64.

The two or more door seals 122 are coupled to the interior 31a of the station wall 30, to seal off the one or more enclosed volume portions 402 from one or more vehicle doors 66 of the vacuum transport tube vehicle 60, from one or more station doors 68 located at the vacuum tube vehicle station 12, and from the door cavity 132 located between each of the one or more vehicle doors 66 and each of the one or more station doors 68.

The vacuum volume reduction system 10a may further comprise a wetting prevention material 476 (see FIG. 22) applied to the exterior 79 of the vacuum transport tube vehicle 60, and applied to the interior 31a of the station wall 30, to prevent wetting 480 (see FIG. 22) of the exterior 79 of the vacuum transport tube vehicle 60 and the interior 31a of the station wall 30. The wetting prevention material 476 may comprise a wax 476a (see FIG. 22), a sealant 476b (see FIG. 22), a ceramic coating 476c (see FIG. 22), a glaze 476d (see FIG. 22), or another suitable wetting prevention material.

The vacuum volume reduction system 10a may further comprise the volume reduction assembly 90 in the form of a hybrid volume reduction assembly 90c (see FIGS. 22A, 23C) comprising a plurality of blocks 92 (see FIGS. 22A, 23C) installed in a plurality of cavities 40 (see FIG. 23C) longitudinally formed around a circumference 42 of a station vacuum tube 33 (see FIGS. 22, 23C). The plurality of blocks 92 are configured to engage around the vehicle outer surface 80 (see FIG. 23C) of a constant radius portion 74 (see FIG. 23C) of the vacuum transport tube vehicle 60. The fluid 416 is configured to fill the one or more enclosed volume portions 402 (see FIG. 23A) around the vehicle outer surface 80 (see FIG. 23C) of a forward contour portions 75a (see FIG. 23C) and a aft contour portion 75b (see FIG. 23C) of the vacuum transport tube vehicle 60.

Now referring to FIGS. 24A-33B, FIGS. 24A-33B show various stages prior to, during, and after, filling the enclosed volume portion 402 in the vacuum tube vehicle station 12 with fluid 416 using the fluid fill assembly 400, when a vacuum transport tube vehicle 60 arrives at, and is positioned, or stopped, at the vacuum tube vehicle station 12, such as to board and unboard passengers 62 and/or cargo 64.

Now referring to FIGS. 24A-24B, FIG. 24A is an illustration of a cross-sectional front view of a vacuum tube vehicle station 12 that may be used with embodiments of a vacuum volume reduction system 10a (see FIG. 22) having a fluid fill assembly 400 of the disclosure, and shows a vacuum in station stage 490 with a volume 50, such as a station volume 50c, under a vacuum 51, in an interior passage 492 of the vacuum tube vehicle station 12. FIG. 24B is an illustration of a cross-sectional side view of the vacuum tube vehicle station 12 of FIG. 24A, taken along lines 24B-24B of FIG. 24A, showing the vacuum in station stage 490.

FIGS. 24A-24B further show the interior 31a of the station wall 30 and fluid transport members 420 of the fluid fill assembly 400 filled with fluid 416. As shown in FIGS. 24A-24B, the first end 422a of each fluid transport member 420 is attached to the bottom portion 424 of the interior 31a of the station wall 30. FIGS. 24A-24B further show recessed areas 452, each with a valve 454 and a vent 458, and each positioned at a top portion 426 of the interior 31a of the station wall 30 of the vacuum tube vehicle station 12. As shown in FIG. 24B, valve 454 is in an open position 456a, and the vent 458 is in a closed position 460b. The recessed areas 452 are in an unfilled state 494 (see FIG. 24B) with no fluid 416, or air 52. As shown in FIG. 24B, each recessed area 452 has a first end 453a and a second end 253b. FIG. 24A further shows the vacuum pump assembly 141, of the vent-to-vacuum assembly 140, having the vacuum pump 142, the vacuum valve 146, the vacuum reservoir 148, and the vacuum duct 144 (see also FIG. 24B) coupled to the recessed areas 452, via an opening 470 through the exterior 31b of the station wall 30.

Now referring to FIGS. 25A-25B, FIG. 25A is an illustration of a cross-sectional front view of a station door 68 and a door cavity 132 of a vacuum tube vehicle station 12 that may be used with embodiments of a vacuum volume reduction system 10a (see FIG. 22) with the fluid fill assembly 400 of the disclosure, and shows a vacuum in station at station door stage 496 with a volume 50, such as the station volume 50c, under vacuum 51, in the interior passage 492 of the vacuum tube vehicle station 12, and with a volume 50, such as a door cavity volume 50b, under vacuum 51, in the door cavity 132 of the vacuum tube vehicle station 12. FIG. 25B is an illustration of a cross-sectional side view of the vacuum tube vehicle station 12 of FIG. 25A, taken along lines 25B-25B of FIG. 25A, showing the vacuum in station at station door stage 496.

FIGS. 25A-25B further show the interior 31a of the station wall 30 and fluid transport members 420 of the fluid fill assembly 400 filled with fluid 416, and show the recessed areas 452 each with the valve 454 and the vent 458. FIG. 25A further shows the vent-to-vacuum assembly 140 with the vacuum pump assembly 141 having the vacuum valve 146, the vacuum pump 142, and the vacuum reservoir 148, and a vacuum duct 144, such as vacuum duct 144a, coupled to the recessed area 452, and a vacuum duct 144, such as a vacuum duct 144b, coupled to the vent-to-vacuum assembly 140 within the station wall 30 at the door cavity 132. FIG. 25A further shows the air supply assembly 130 filled with air 52, such as ambient air 52a, at the door cavity 132, shows an entryway 498 to the station door 68 filled with air 52, such as ambient air 52a, and shows two door seals 122 in a retracted position 122b in the station wall 30.

Figures 26A, 26B:
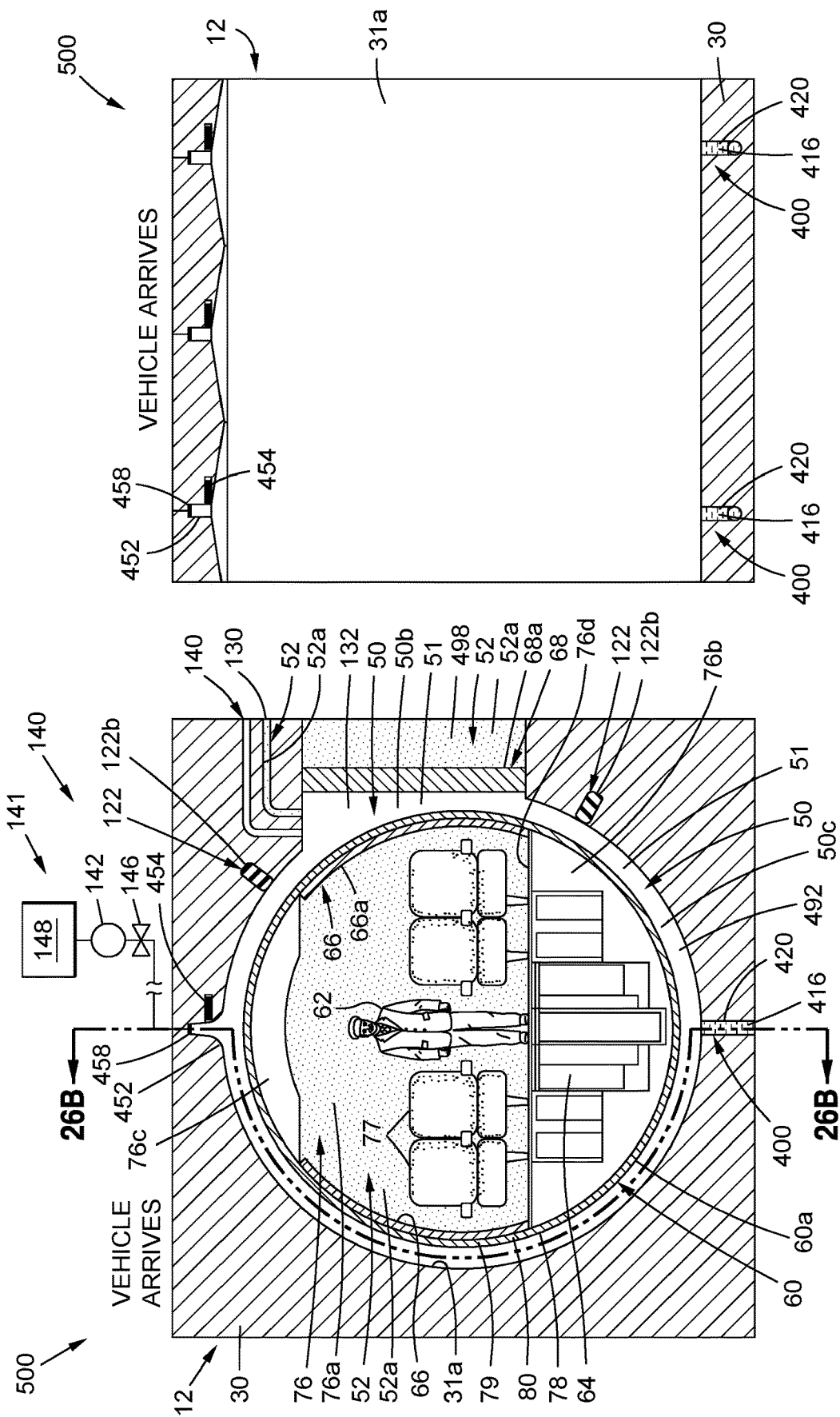
FIG. 26A is an illustration of a cross-sectional front view of a vacuum transport tube vehicle at the station door of the vacuum tube vehicle station of FIG. 25A, and shows a vehicle arrives stage.
FIG. 26B is an illustration of a cross-sectional side view of the vacuum tube vehicle station of FIG. 26A, taken along lines 26B-26B of FIG. 26A.

Now referring to FIGS. 26A-26B, FIG. 26A is an illustration of a cross-sectional front view of a vacuum transport tube vehicle 60, such as the vacuum transport tube train 60a, at the station door 68 and the door cavity 132 of the vacuum tube vehicle station 12 of FIG. 25A, and shows a vehicle arrives stage 500. FIG. 26B is an illustration of a cross-sectional side view of the vacuum tube vehicle station of FIG. 26A, taken along lines 26B-26B of FIG. 26A, and shows the vehicle arrives stage 500.

FIG. 26A shows the vacuum transport tube vehicle 60 positioned in the volume 50, such as the station volume 50c, under vacuum 51 in the interior passage 492 of the vacuum tube vehicle station 12, and shows the volume 50, such as the door cavity volume 50b, under vacuum 51, in the door cavity 132. FIGS. 26A-26B further show the interior 31a of the station wall 30 and fluid transport members 420 of the fluid fill assembly 400 filled with fluid 416, and show the recessed areas 452 each with the valve 454 and the vent 458. FIG. 26A further shows the vent-to-vacuum assembly 140, the vacuum pump assembly 141 having the vacuum valve 146, the vacuum pump 142, and the vacuum reservoir 148, the air supply assembly 130 filled with air 52, such as ambient air 52a, the entryway 498 to the station door 68 filled with air 52, such as ambient air 52a, and two door seals 122 in the retracted position 122b in the station wall 30.

FIG. 26A further shows vacuum transport tube vehicle 60, such as a vacuum transport tube train 60a, having an interior 76 with a cabin 76a, a cargo compartment 76b, a ceiling 76c, and a floor 76d. As shown in FIG. 26A, the cabin 76a has chairs 77 and a passenger 62, and the cabin 76a is filled with air 52, such as ambient air 52a. As further shown in FIG. 26A, the cargo compartment 76b has cargo 64. FIG. 26A further shows the vacuum transport tube vehicle 60, such as the vacuum transport tube train 60a, having the exterior 79 with the outer vehicle wall 78 and the vehicle outer surface 80, and having vehicle doors 66 in a closed position 66a.

Now referring to FIGS. 27A-27B, FIG. 27A is an illustration of a cross-sectional front view of the vacuum transport tube vehicle 60, such as the vacuum transport tube train 60a, at the station door 68 of the vacuum tube vehicle station 12 of FIG. 26A, and shows a door seals deployed stage 502. FIG. 27A shows the two door seals 122 in a deployed position 122a and shows door seal cavities 123 in the station wall 30. With the door seals 122 in the deployed position 122a, an enclosed volume portion 402 (see also FIG. 27B) is formed between the exterior 79 of the vacuum transport tube vehicle 60, such as the vacuum transport tube train 60a, and the interior 31a of the station wall 30. The enclosed volume portion 402 is in an unfilled state 404b (see FIG. 27A). FIG. 27B is an illustration of a cross-sectional side view of the vacuum tube vehicle station 12 of FIG. 27A, taken along lines 27B-27B of FIG. 27A, and shows the door seals deployed stage 502.

FIG. 27A shows the vacuum transport tube vehicle 60 positioned in the volume 50, such as the station volume 50c, under vacuum 51, in the vacuum tube vehicle station 12, and shows the volume 50, such as the door cavity volume 50b, under vacuum 51, in the door cavity 132. FIGS. 27A-27B further show the interior 31a of the station wall 30 and fluid transport members 420 of the fluid fill assembly 400 filled with fluid 416, and show the recessed areas 452. FIG. 27A further shows the vent-to-vacuum assembly 140, the vacuum pump assembly 141 having the vacuum valve 146, the vacuum pump 142, and the vacuum reservoir 148, the air supply assembly 130 filled with air 52, the entryway 498 filled with air 52, the cabin 76a filled with air 52, and the vehicle doors 66 in the closed position 66a.

Now referring to FIGS. 28A-28B, FIG. 28A is an illustration of a cross-sectional front view of the vacuum transport tube vehicle 60, such as the vacuum transport tube train 60a, at the station door 68 of the vacuum tube vehicle station 12 of FIG. 27A, and shows a fluid introduced from bottom portion stage 504. FIG. 28B is an illustration of a cross-sectional side view of the vacuum tube vehicle station 12 of FIG. 28A, taken along lines 28B-28B of FIG. 28A, and shows the fluid introduced from bottom portion stage 504.

As shown in FIGS. 28A-28B, the fluid 416 is introduced from the fluid transport member 420 through the bottom portion 424 of the interior 31a of the vacuum tube vehicle station 12, and into the enclosed volume portion 402 between the exterior 79 (see FIG. 28A) of the vacuum transport tube vehicle 60 (see FIG. 28A), such as the vacuum transport tube train 60a (see FIG. 28A), and the interior 31a of the station wall 30, and the enclosed volume portion 402 is in partial filled state 404c. As shown in FIG. 28A, the fluid 416 is transported in an upward flow 442a from the fluid transport member 420 coupled to a container 406 (see FIGS. 22, 23A) containing the fluid 416. The volume 50 (see FIG. 28A), such as the station volume 50c (see FIG. 28A), is displaced by the fluid 416.

FIGS. 28A-28B further show the recessed areas 452. FIG. 28A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76a filled with air 52, the vehicle doors 66 in the closed position 66a, and the two door seals 122 in the deployed position 122a.

Now referring to FIGS. 29A-29B, FIG. 29A is an illustration of a cross-sectional front view of the vacuum transport tube vehicle 60, such as the vacuum transport tube train 60a, at the station door 68 of the vacuum tube vehicle station 12 of FIG. 28A, and shows an enclosed volume portion in partial filled state stage 506. FIG. 29B is an illustration of a cross-sectional side view of the vacuum tube vehicle station 12 of FIG. 29A, taken along lines 29B-29B of FIG. 29A, and shows the enclosed volume portion in partial filled state stage 506.

As shown in FIGS. 29A-29B, the fluid 416 is continuing to be introduced from the fluid transport member 420 of the fluid fill assembly 400 into the enclosed volume portion 402, and the enclosed volume portion 402 is in partial filled state 404c, such as half full with fluid 416. As shown in FIG. 29A, the fluid 416 is transported in an upward flow 442a from the fluid transport member 420 coupled to a container 406 (see FIGS. 22, 23A) containing the fluid 416. The volume 50 (see FIG. 29A), such as the station volume 50c (see FIG. 29A), is displaced by the fluid 416.

FIGS. 29A-29B further show the recessed areas 452, and the interior 31a of the station wall 30. FIG. 29A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76a filled with air 52, the vehicle doors 66 in the closed position 66a, and the two door seals 122 in the deployed position 122a.

Now referring to FIGS. 30A-30B, FIG. 30A is an illustration of a cross-sectional front view of the vacuum transport tube vehicle 60, such as the vacuum transport tube train 60a, at the station door 68 of the vacuum tube vehicle station 12 of FIG. 29A, and shows an enclosed volume portion in a filled state stage 508. FIG. 30B is an illustration of a cross-sectional side view of the vacuum tube vehicle station 12 of FIG. 30A, taken along lines 30B-30B of FIG. 30A, and shows the enclosed volume portion in a filled state stage 508.

As shown in FIGS. 30A-30B, the enclosed volume portion 402 is in the filled state 404a, such as full, with fluid 416 transported by the fluid transport member 420 of the fluid fill assembly 400. As shown in FIGS. 30A-30B, the fluid 416 has displaced the entirety of the volume 50 (see FIGS. 27A, 29A). FIGS. 30A-30B further show the recessed areas 452 with fluid 416 in the interior 466. FIGS. 30A-30B further show the interior 31a of the station wall 30. FIG. 30A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76a filled with air 52, the vehicle doors 66 in the closed position 66a, and the two door seals 122 in the deployed position 122a.

Now referring to FIGS. 31A-31B, FIG. 31A is an illustration of a cross-sectional front view of the vacuum transport tube vehicle 60, such as the vacuum transport tube train 60a, at the station door 68 of the vacuum tube vehicle station 12 of FIG. 30A, and shows an air supplied into door cavity stage 510. FIG. 31B is an illustration of a cross-sectional side view of the vacuum tube vehicle station 12 of FIG. 31A, taken along lines 31B-31B of FIG. 31A, and shows the air supplied into door cavity stage 510. As shown in FIG. 31A, the air supply assembly 130 is in an open position 130a, and an air flow 512 of air 52, such as ambient air 52a, is supplied from the air supply assembly 130 into the door cavity 132, and the air 52, such as ambient air 52a, fills the door cavity 132. As shown in FIG. 31A, the vent-to-vacuum assembly 140 is in a closed position 140b.

As shown in FIGS. 31A-31B, the enclosed volume portion 402 is in the filled state 404a, such as full, with fluid 416 transported by the fluid transport member 420 of the fluid fill assembly 400. FIGS. 31A-31B further show the recessed areas 452, and the interior 31a of the station wall 30. FIG. 31A further shows the vacuum pump assembly 141 having the vacuum valve 146, the vacuum pump 142, and the vacuum reservoir 148, the entryway 498 filled with air 52, the cabin 76a filled with air 52, the vehicle doors 66 in the closed position 66a, and the two door seals 122 in the deployed position 122a.

Now referring to FIGS. 32A-32B, FIG. 32A is an illustration of a cross-sectional front view of the vacuum transport tube vehicle 60, such as the vacuum transport tube train 60a, at the station door 68 (see FIG. 31A), which is in an opened position 68b, of the vacuum tube vehicle station of FIG. 31A, and shows a doors opened stage 514. FIG. 32B is an illustration of a cross-sectional side view of the vacuum tube vehicle station of FIG. 32A, taken along lines 32B-32B of FIG. 32A, and shows the doors opened stage 514.

As shown in FIG. 32A, the station door 68 (see FIG. 31A) is in the opened position 68b, and the vehicle door 66 (see FIG. 31A) is in an opened position 66b. FIG. 32A shows the air 52 in the cabin 76a, in the door cavity 132, in the entryway 498, and in the air supply assembly 130. The vehicle door 66 and the station door 68 are opened to load and unload passengers 62 (see FIG. 32A) and/or cargo 64 (see FIG. 32A), such as luggage 64a (see FIG. 32A).

As shown in FIGS. 32A-32B, the enclosed volume portion 402 is in the filled state 404a, such as full, with fluid 416 transported by the fluid transport member 420 of the fluid fill assembly 400. FIGS. 32A-32B further show the recessed areas 452, and the interior 31a of the station wall 30. FIG. 32A further shows the vent-to-vacuum assembly 140, the vacuum pump assembly 141 having the vacuum valve 146, the vacuum pump 142, and the vacuum reservoir 148, and the two door seals 122 in the deployed position 122a.

Now referring to FIGS. 33A-33B, FIG. 33A is an illustration of a cross-sectional front view of the vacuum transport tube vehicle 60, such as the vacuum transport tube train 60a, at the station door 68 of the vacuum tube vehicle station 12 of FIG. 31A, and shows a doors closed stage 516. FIG. 33B is an illustration of a cross-sectional side view of the vacuum tube vehicle station 12 of FIG. 33A, taken along lines 33B-33B of FIG. 33A, and shows the doors closed stage 516.

As shown in FIG. 33A, after the passengers 62 and/or cargo 64 are loaded and unloaded into and out of the vacuum transport tube vehicle 60, the station door 68 closes to the closed position 68a, and the vehicle door 66 closes to the closed position 66a. As shown in FIG. 33A, the vent-to-vacuum assembly 140 is in an open position 140a, and an air flow 518 of air 52, is vented or evacuated out of the door cavity 132 with the vent-to-vacuum assembly 140, and with the vacuum pump assembly 141. The air 52 that is evacuated, or vented, with the vent-to-vacuum assembly 140 and the vacuum pump assembly 141 may be pulled through a vacuum duct 144b to the vacuum reservoir 148, via the vacuum valve 146 and the vacuum pump 142, until all of the air 52 is evacuated out of the door cavity 132. As shown in FIG. 33A, the air supply assembly 130 is in a closed position 130b.

As further shown in FIG. 33A, air 52 is in the cabin 76a, in the entryway 498, and in the air supply assembly 130. As further shown in FIGS. 33A-33B, the enclosed volume portion 402 is in the filled state 404a, such as full, with fluid 416 transported by the fluid transport member 420 of the fluid fill assembly 400. FIGS. 33A-33B further show the recessed areas 452 also having fluid 416 in the interior 466. FIGS. 33A-33B further show the interior 31a of the station wall 30. FIG. 33A further shows the two door seals 122 in the deployed position 122a.

Now referring to FIGS. 34A-39B, FIGS. 34A-39B show various stages during and after emptying, or unfilling, of the enclosed volume portion 402 in the vacuum tube vehicle station 12, with fluid 416, using the fluid fill assembly 400, when the vacuum transport tube vehicle 60 is positioned, or stopped, at the vacuum tube vehicle station 12, after boarding and unboarding passengers 62 and/or cargo 64.

Now referring to FIGS. 34A-34B, FIG. 34A is an illustration of a cross-sectional front view of the vacuum transport tube vehicle 60, such as the vacuum transport tube train 60a, at the station door 68 of the vacuum tube vehicle station 12 of FIG. 33A, and shows a fluid level decreasing in recessed area stage 520. FIG. 34B is an illustration of a cross-sectional side view of the vacuum tube vehicle station 12 of FIG. 34A, taken along lines 34B-34B of FIG. 34A, and shows the fluid level decreasing in recessed area stage 520.

After the passengers 62 (see FIG. 34A) and/or cargo 64 (see FIG. 34A) are loaded and unloaded into and out of the vacuum transport tube vehicle 60, and the station door 68 and the vehicle door 66 are closed, and the air 52 is evacuated out of the door cavity 132 with the vent-to-vacuum assembly 140, the fluid fill assembly 400 can begin the process of evacuating the fluid 416 and restoring the volume 50 in the enclosed volume portion 402 and the recessed areas 452.

To begin the process of emptying or evacuating the fluid 416, the fluid 416 is first removed or evacuated from the interior 466 (see FIGS. 34A-34B) of the recessed areas 452 (see FIGS. 34A-34B) and the valve 454 (see FIG. 34B) for each recessed area 452 is in an open position 456a (see FIG. 34B), and the vent 458 (see FIG. 34B) for each recessed area 452 is in the closed position 460b (see FIG. 34B). Next, the fluid 416 is removed, drained, or evacuated out of the enclosed volume portion 402 (see FIGS. 34A-34B). The fluid fill assembly 400 (see FIGS. 34A-34B) draws the fluid 416 in a downward flow 442b (see FIG. 34B) through the fluid transport member 420 (see FIGS. 34A-34B) and back to the one or more containers 406 (see FIGS. 23A-23B), to empty the recessed areas 452 (see FIGS. 34A-34B) and the enclosed volume portion 402 (see FIGS. 34A-34B). As shown in FIG. 34A, air 52 is in the cabin 76a, in the entryway 498, and in the air supply assembly 130, and the door cavity 132 has no air 52 and has the door cavity volume 50b. As further shown in FIG. 34A, the vent-to-vacuum assembly 140 is in a closed position 140b, the air supply assembly 130 is in a closed position 130b, and the two door seals 122 are in the deployed position 122a. FIG. 34a further shows the vacuum valve 146, the vacuum pump 142, and the vacuum reservoir 148.

Now referring to FIGS. 35A-35B, FIG. 35A is an illustration of a cross-sectional front view of the vacuum transport tube vehicle 60, such as the vacuum transport tube train 60a, at the station door 68 of the vacuum tube vehicle station 12 of FIG. 34A, and shows a fluid level decreasing in enclosed volume portion stage 522. FIG. 35B is an illustration of a cross-sectional side view of the vacuum tube vehicle station 12 of FIG. 35A, taken along lines 35B-35B of FIG. 35A, and shows the fluid level decreasing in enclosed volume portion stage 522.

As the process of emptying, or evacuating, the fluid 416 continues, the fluid 416 is removed, drained, or evacuated out of the enclosed volume portion 402 (see FIGS. 34A-34B) further. As shown in FIGS. 35A-34B, the recessed areas 452 are empty of the fluid 416, and the enclosed volume portion 402, formed between the interior 31a of the station wall 30 and the exterior 79 (see FIG. 35A) of the vacuum transport tube vehicle 60 (see FIG. 35A), is in a partial filled state 404c with the fluid 416. The fluid fill assembly 400 (see FIGS. 35A-35B) draws the fluid 416 in the downward flow 442b (see FIG. 35A) through the fluid transport member 420 (see FIGS. 35A-35B) and back to the one or more containers 406 (see FIGS. 23A-23B).

As shown in FIG. 35A, air 52 is in the cabin 76a, in the entryway 498, and in the air supply assembly 130, and the door cavity 132 has no air 52 and has the door cavity volume 50b. FIG. 35A further shows the vent-to-vacuum assembly 140, the vacuum pump assembly 141 having the vacuum valve 146, the vacuum pump 142, and the vacuum reservoir 148, the vehicle door 66 in the closed position 66a, and the two door seals 122 in the deployed position 122a.

Now referring to FIGS. 36A-36B, FIG. 36A is an illustration of a cross-sectional front view of the vacuum transport tube vehicle 60, such as the vacuum transport tube train 60a, at the station door 68 of the vacuum tube vehicle station 12 of FIG. 35A, and shows an enclosed volume portion in a partial filled state stage 524. FIG. 36B is an illustration of a cross-sectional side view of the vacuum tube vehicle station 12 of FIG. 36A, taken along lines 36B-36B of FIG. 36A, and shows the enclosed volume portion in a partial filled state stage 524.

As the process of emptying or evacuating the fluid 416 continues, the fluid 416 is removed, drained, or evacuated out of the enclosed volume portion 402 (see FIGS. 34A-34B) further. As shown in FIGS. 35A-34B, the enclosed volume portion 402, formed between the interior 31a of the station wall 30 and the exterior 79 (see FIG. 36A) of the vacuum transport tube vehicle 60 (see FIG. 36A), is in a partial filled state 404c with the fluid 416, or about one-half empty. The fluid fill assembly 400 (see FIGS. 36A-36B) draws the fluid 416 in the downward flow 442b (see FIG. 36A) through the fluid transport member 420 (see FIGS. 36A-36B) and back to the one or more containers 406 (see FIGS. 23A-23B). As shown in FIG. 36A, air 52 is in the cabin 76a, in the entryway 498, and in the air supply assembly 130, and the door cavity 132 has no air 52 and has the door cavity volume 50b. FIG. 36A further shows the vent-to-vacuum assembly 140 having the vacuum valve 146, the vacuum pump 142, and the vacuum reservoir 148, the vacuum pump assembly 141, and the two door seals 122 in the deployed position 122a. FIGS. 36A-36B further show the recessed areas 452 with no fluid 416 inside.

Now referring to FIGS. 37A-37B, FIG. 37A is an illustration of a cross-sectional front view of the vacuum transport tube vehicle 60, such as the vacuum transport tube train 60a, at the station door 68 of the vacuum tube vehicle station 12 of FIG. 36A, and shows an enclosed volume portion in unfilled state stage 526. FIG. 37B is an illustration of a cross-sectional side view of the vacuum tube vehicle station 12 of FIG. 37A, taken along lines 37B-37B of FIG. 37A, and shows the enclosed volume portion in unfilled state stage 526.

After the process of emptying or evacuating the fluid 416 is finished, as shown in FIGS. 37A-37B, the enclosed volume portion 402 is in the unfilled state 404b, and the volume 50 in the enclosed volume portion 402, between the interior 31a of the station wall 30 and the exterior 79 (see FIG. 37A) of the vacuum transport tube vehicle 60, is restored. FIGS. 37A-37B show the fluid fill assembly 400 with the fluid transport member 420 filled with the fluid 416, and show the recessed areas 452. As shown in FIG. 37A, air 52 is in the cabin 76a, in the entryway 498, and in the air supply assembly 130, and the door cavity 132 has no air 52 and has the door cavity volume 50b. FIG. 37A further shows the vent-to-vacuum assembly 140, the vacuum pump assembly 141 having the vacuum valve 146, the vacuum pump 142, and the vacuum reservoir 148, the vehicle door 66 in the closed position 66a, and the two door seals 122 in the deployed position 122a.

New referring to FIGS. 38A-38B, FIG. 38A is an illustration of a cross-sectional front view of the vacuum transport tube vehicle 60, such as the vacuum transport tube train 60a, at the station door 68 of the vacuum tube vehicle station 12 of FIG. 37A, and shows a door seals retracted stage 528. FIG. 38B is an illustration of a cross-sectional side view of the vacuum tube vehicle station 12 of FIG. 38A, taken along lines 38B-38B of FIG. 38A, and shows the door seals retracted stage 528.

FIG. 38A shows the two door seals 122 in the retracted position 122b, and the volume 50, such as the station volume 50c, integrated, or commingled, with the volume 50, such as the door cavity volume 50b in the door cavity 132. FIGS. 38A-38B show the fluid transport member 420 of the fluid fill assembly 400, filled with the fluid 416, show the interior 31a of the station wall 30, and show the recessed areas 452. FIG. 38B shows the valve 454 and the vent 458 of the recessed area 452. As shown in FIG. 38A, air 52 is in the cabin 76a, in the entryway 498, and in the air supply assembly 130. FIG. 38A further shows the vent-to-vacuum assembly 140, the vacuum pump assembly 141 having the vacuum valve 146, the vacuum pump 142, and the vacuum reservoir 148, the vacuum pump assembly 141, and the vehicle door 66 in the closed position 66a.

Now referring to FIGS. 39A-39B, FIG. 39A is an illustration of a cross-sectional front view of the station door 68 and the door cavity 132 of the vacuum tube vehicle station 12 of FIG. 38A, and shows a vehicle exits station stage 530. FIG. 39B is an illustration of a cross-sectional side view of the vacuum tube vehicle station 12 of FIG. 39A, taken along lines 39B-39B of FIG. 39A, and shows the vehicle exits station stage 530. The vacuum transport tube vehicle 60 (see FIG. 38A), such as the vacuum transport tube train 60a (see FIG. 38A), has exited, or moved out of, the vacuum tube vehicle station 12 (see FIGS. 39A-39B).

FIG. 39A shows the volume 50, such as the station volume 50c, under vacuum 51, in the interior passage 492 of the vacuum tube vehicle station 12, and shows the volume 50, such as the door cavity volume 50b, under vacuum 51, in the door cavity 132 of the vacuum tube vehicle station 12. FIGS. 39A-39B further show the interior 31a of the station wall 30 and fluid transport members 420 of the fluid fill assembly 400 filled with fluid 416, and show the recessed areas 452. FIG. 39A further shows the vent-to-vacuum assembly 140, the vacuum pump assembly 141 having the vacuum valve 146, the vacuum pump 142, and the vacuum reservoir 148, the air supply assembly 130 filled with air 52, and the entryway 498 to the station door 68 filled with air 52. FIG. 39A shows the two door seals 122 in the retracted position 122b in the station wall 30.

Now referring to FIGS. 40A-45B, FIGS. 40A-45B show various stages during and after evacuating air 52, due to an air leak 464, from the one or more recessed areas 452 in the top portion 426 of the station wall 30 of the vacuum tube vehicle station 12, where the enclosed volume portion 402 is in a filled stated 404*a* filled with fluid 416, when the vacuum transport tube vehicle 60 is positioned, or stopped, at the vacuum tube vehicle station 12. If air 52 leaks into the enclosed volume portion 402 when it is filled with the fluid 416, the one or more recessed areas 452 are configured to evacuate, and evacuate, the air 52 to a vacuum reservoir 148 (see FIG. 44A) of the vacuum pump assembly 141 of the vent-to-vacuum assembly 140, to restore the vacuum 51 (see FIG. 25A), so that when the fluid 416 is removed or emptied (or the plurality of blocks 92 are retracted), a high quality vacuum with a desired vacuum quality 51*a* (see FIG. 3) in the vacuum tube vehicle station 12 is maintained, and when the enclosed volume portion 402 is opened, there is no contamination to the volume 50, under vacuum 51, in the vacuum tube vehicle station 12.

Now referring to FIGS. 40A-40B, FIG. 40A is an illustration of a cross-sectional front view of a vacuum transport tube vehicle 60, such as the vacuum transport tube train 60*a*, at the station door 68 and the door cavity 132 of the vacuum tube vehicle station 12, and shows an air leak at door seal stage 532. FIG. 40B is an illustration of a cross-sectional side view of the vacuum tube vehicle station 12 of FIG. 40A, taken along lines 40B-40B of FIG. 40A, and shows the air leak at door seal stage 532.

FIG. 40A shows an air leak 464 at a door seal 122 at an upper location 534 of the enclosed volume portion 402. As shown in FIGS. 40A-40B, the enclosed volume portion 402 is filled with fluid 416 and is in the filled state 404*a*. As shown in FIGS. 40A-40B, the air 52, such as in the form of air bubbles 536, moves upwardly toward the recessed areas 452. Air 52 (see FIG. 40A), such as from the door cavity 132 (see FIG. 40A), the entryway 498 (see FIG. 40A), and/or the air supply assembly 130 (see FIG. 40A) may leak past the one or more door seals 122 (see FIG. 40A) and into the enclosed volume portion 402 (see FIG. 40A).

FIGS. 40A-40B further show the recessed areas 452, each with the valve 454 in the open position 456*a* and the vent 458 in the closed position 460*b*, and also having no fluid 416 and no air bubbles 536 yet in the interior 466 of the recessed area 452. FIGS. 40A-40B further show the interior 31*a* of the station wall 30. FIG. 40A further shows the vent-to-vacuum assembly 140, the vacuum pump assembly 141 having the vacuum valve 146, the vacuum pump 142, and the vacuum reservoir 148, the cabin 76*a* filled with air 52, the vehicle door 66 in the closed position 66*a*, and the two door seals 122 in the deployed position 122*a*. FIGS. 40A-40B further show the fluid transport members 420 of the fluid fill assembly 400.

Now referring to FIGS. 41A-41B, FIG. 41A is an illustration of a cross-sectional front view of the vacuum transport tube vehicle 60, such as the vacuum transport tube train 60*a*, at the station door 68 of the vacuum tube vehicle station 12 of FIG. 40A, and shows an air moves into recessed area stage 538. FIG. 41B is an illustration of a cross-sectional side view of the vacuum tube vehicle station 12 of FIG. 41A, taken along lines 41B-41B of FIG. 41A, and shows the air moves into recessed area stage 538.

FIG. 41A shows the air 52, such as the air bubbles 536, from the air leak 464 at the door seal 122 moving through the fluid 416 in the enclosed volume portion 402 and upwardly into the interior 466 of the recessed area 452. FIG. 41B further shows the recessed areas 452, each with the valve 454 in the open position 456*a* and the vent 458 in the closed position 460*b*, and shows some of the air 52, such as in the form of air bubbles 536, in the interior 466 of the recessed areas 452. FIGS. 41A-41B further show the interior 31*a* of the station wall 30. FIG. 41A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76*a* filled with air 52, the vehicle door 66 in the closed position 66*a*, and the two door seals 122 in the deployed position 122*a*. FIGS. 41A-41B further show the fluid transport members 420 of the fluid fill assembly 400, and the enclosed volume portion 402 filled with fluid 416 and in the filled state 404*a*.

Now referring to FIGS. 42A-42B, FIG. 42A is an illustration of a cross-sectional front view of the vacuum transport tube vehicle 60, such as the vacuum transport tube train 60*a*, at the station door 68 of the vacuum tube vehicle station 12 of FIG. 41A, and shows an air accumulated in recessed area stage 540. FIG. 42B is an illustration of a cross-sectional side view of the vacuum tube vehicle station 12 of FIG. 42A, taken along lines 42B-42B of FIG. 42A, shows the air accumulated in recessed area stage 540.

FIG. 42A shows the air 52, such as in the form of air bubbles 536, from the air leak 464 at the door seal 122 accumulated in the interior 466 of the recessed area 452. FIG. 42B further shows the recessed areas 452, each with the valve 454 in the open position 456*a* and the vent 458 in the closed position 460*b*, and shows all of the air 52, such as in the form of air bubbles 536, accumulated in the interior 466 of the recessed areas 452. FIGS. 42A-42B further show the interior 31*a* of the station wall 30. FIG. 42A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76*a* filled with air 52, the vehicle door 66 in the closed position 66*a*, and the two door seals 122 in the deployed position 122*a*. FIGS. 42A-42B further show the fluid transport members 420 of the fluid fill assembly 400, and the enclosed volume portion 402 filled with fluid 416 and in the filled state 404*a*.

Now referring to FIGS. 43A-43B, FIG. 43A is an illustration of a cross-sectional front view of the vacuum transport tube vehicle 60, such as the vacuum transport tube train 60*a*, at the station door 68 of the vacuum tube vehicle station 12 of FIG. 42A, and shows a valve closed and air captured in recessed area stage 542. FIG. 43B is an illustration of a cross-sectional side view of the vacuum tube vehicle station 12 of FIG. 43A, taken along lines 43B-43B of FIG. 43A, and shows the valve closed and air captured in recessed area stage 542.

FIG. 43A shows the air 52, such as in the form of air bubbles 536, captured in the interior 466 of the recessed area 452, with the valve 454 in the closed position 456*b*. FIG. 43B further shows the recessed areas 452, each with the valve 454 in the closed position 456*b* and the vent 458 in the closed position 460*b*, and shows all of the air 52, such as in the form of air bubbles 536, captured in the interior 466 of the recessed areas 452. FIGS. 43A-43B further show the interior 31*a* of the station wall 30. FIG. 43A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76*a* filled with air 52, the vehicle door 66 in the closed position 66a, and the two door seals 122 in the deployed position 122a. FIGS. 43A-43B further show the fluid transport members 420 of the fluid fill assembly 400, and the enclosed volume portion 402 filled with fluid 416 and in the filled state 404a.

Now referring to FIGS. 44A-44B, FIG. 44A is an illustration of a cross-sectional front view of the vacuum transport tube vehicle 60, such as the vacuum transport tube train 60a, at the station door 68 of the vacuum tube vehicle station 12 of FIG. 43A, and shows an air evacuated out of recessed area stage 542. FIG. 44B is an illustration of a cross-sectional side view of the vacuum tube vehicle station 12 of FIG. 44A, taken along lines 44B-44B of FIG. 44A, and shows the air evacuated out of recessed area stage 544.

FIG. 44A shows an air flow 546 of air 52 evacuated, or vented, out of the recessed area 452, and shows the vent 458 in the open position 460a to allow the air flow 546 of air 52 to be evacuated, or vented, out to the vacuum duct 144 and the vacuum pump assembly 141, via the opening 470 through the station wall 30. FIG. 44B further shows the recessed areas 452, each with the valve 454 in the closed position 456b and the vent 458 in the open position 460a, and shows the air flow 546 of air 52 out of the interior 466 of the recessed areas 452, to the vacuum duct 144. FIGS. 44A-44B further show the interior 31a of the station wall 30. FIG. 44A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76a filled with air 52, the vehicle door 66 in the closed position 66a, and the two door seals 122 in the deployed position 122a. FIGS. 44A-44B further show the fluid transport members 420 of the fluid fill assembly 400, and the enclosed volume portion 402 filled with fluid 416 and in the filled state 404a.

Now referring to FIGS. 45A-45B, FIG. 45A is an illustration of a cross-sectional front view of the vacuum transport tube vehicle 60, such as the vacuum transport tube train 60a, at the station door 68 of the vacuum tube vehicle station 12 of FIG. 44A, and shows a valve opened to recessed area stage 548. FIG. 45B is an illustration of a cross-sectional side view of the vacuum tube vehicle station 12 of FIG. 45A, taken along lines 45B-45B of FIG. 45A, and shows the valve opened to recessed area stage 548.

FIGS. 45A-45B show the interior 466 of the recessed areas 452 empty or evacuated of the air 52 (see FIG. 43A), such as in the form of the air bubbles 536 (see FIG. 43A), and the valve 454 is in the open position 456a, and the vent 458 is in the closed position 460b (see FIG. 45B). FIGS. 45A-45B further show the interior 31a of the station wall 30. FIG. 45A further shows the vent-to-vacuum assembly 140, the vacuum pump assembly 141 having the vacuum valve 146, the vacuum pump 142, and the vacuum reservoir 148, the air supply assembly 130 filled with air 52, the door cavity 132, the entryway 498 filled with air 52, the cabin 76a filled with air 52, the vehicle door 66 in the closed position 66a, and the two door seals 122 in the deployed position 122a. FIGS. 45A-45B further show the fluid transport members 420 of the fluid fill assembly 400, and the enclosed volume portion 402 filled with fluid 416 and in the filled state 404a.

Figure 46:
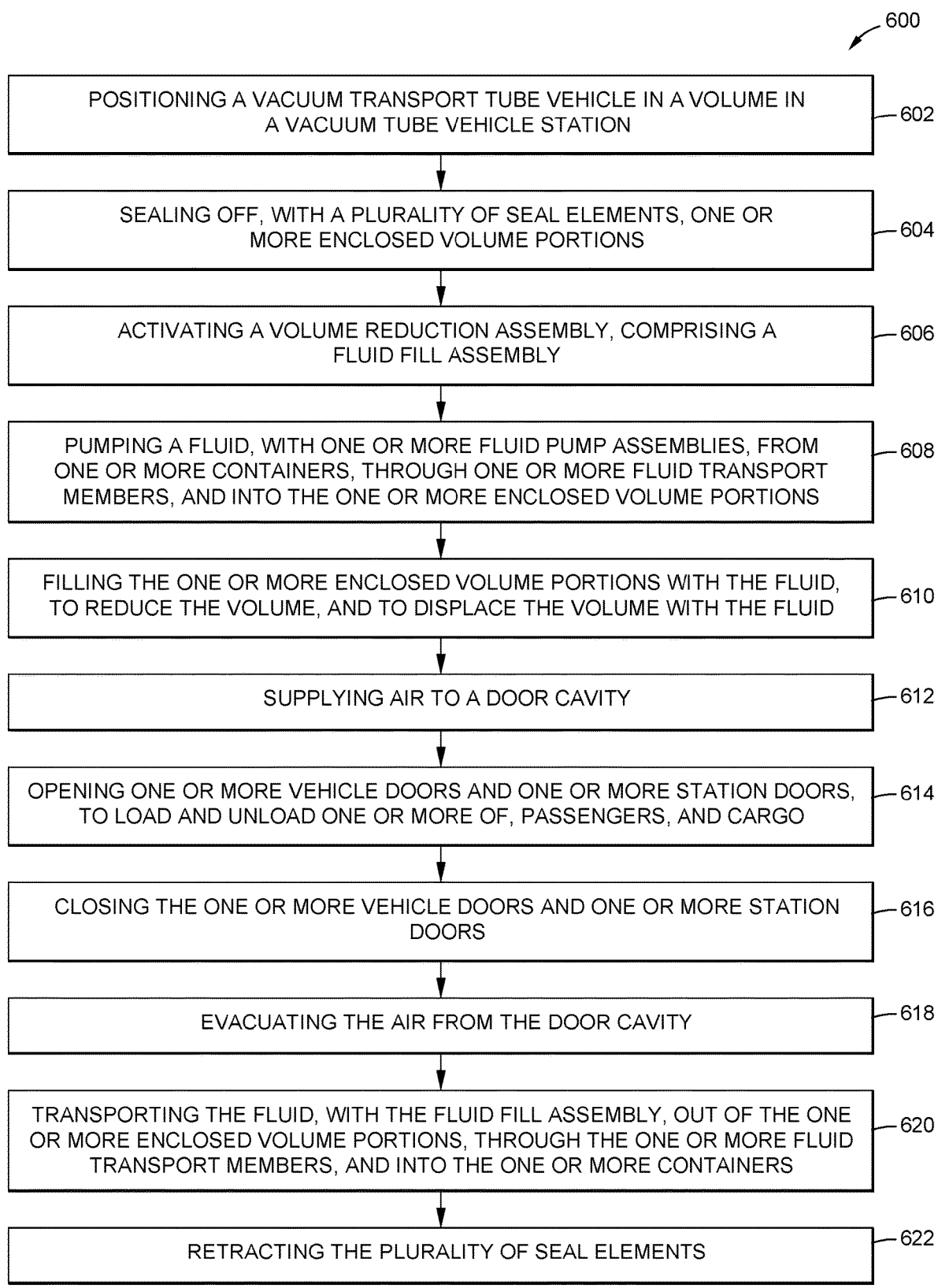
FIG. 46 is an illustration of a flow diagram showing an exemplary embodiment of another method of the disclosure.

Now referring to FIG. 46, FIG. 46 is an illustration of a flow diagram showing an exemplary embodiment of another method 600 of the disclosure. In another embodiment, there is provided a method 600 of using a vacuum volume reduction system 10a (see FIG. 22), to reduce a volume 50 (see FIG. 22), under a vacuum 51 (see FIG. 22), and to displace the volume 50 with a fluid 416 (see FIGS. 22, 23A-23C), in a vacuum tube vehicle station 12 (see FIGS. 23A-23C).

The blocks in FIG. 46 represent operations and/or portions thereof, or elements, and lines connecting the various blocks do not imply any particular order or dependency of the operations or portions thereof, or elements. FIG. 46 and the disclosure of the steps of the method 600 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 46, the method 600 comprises the step of positioning 602 a vacuum transport tube vehicle 60 in the volume 50, under the vacuum 51, in the vacuum tube vehicle station 12. Prior to positioning 602 the vacuum transport tube vehicle 60 in the volume 50 in the vacuum tube vehicle station 12, the method 600 may comprise the steps of applying a wetting prevention material 476 (see FIG. 22) to the exterior 79 (see FIGS. 22, 23A) of the vacuum transport tube vehicle 60, and applying the wetting prevention material 476 to the interior 31a (see FIGS. 22, 23A) of the station wall 30, to prevent wetting 480 (see FIG. 22) of the exterior 79 of the vacuum transport tube vehicle 60, and to prevent wetting 480 of the interior 31a of the station wall 30. As shown in FIG. 22, the wetting prevention material 476 comprises one of, a wax 476a, a sealant 476b, a ceramic coating 476c, a glaze 476d, or another suitable wetting prevention material.

As shown in FIG. 46, the method 600 further comprises the step of sealing off 604, with a plurality of seal elements 81 (see FIG. 22) of the vacuum volume reduction system 10a, one or more enclosed volume portions 402 (see FIGS. 22, 23A-23C), formed between the exterior 79 (see FIGS. 23A-23C) of the vacuum transport tube vehicle 60 and the interior 31a of the station wall 30 (see FIGS. 23A-23C) of the vacuum tube vehicle station 12.

As discussed above, the plurality of seal elements 81 comprise two or more door seals 122 (see FIGS. 22, 27A) coupled to the interior 31a of the station wall 30. The two or more door seals 122 are coupled to the interior 31a of the station wall 30, to seal off the one or more enclosed volume portions 402 from one or more vehicle doors 66 (see FIG. 22) of the vacuum transport tube vehicle 60, from one or more station doors 68 (see FIG. 22) located at the vacuum tube vehicle station 12, and from a door cavity 132 (see FIG. 27A) positioned between each of the one or more vehicle doors 66 and each of the one or more station doors 68. The two or more door seals 122 are deployed from a retracted position 122b (see FIG. 26A) to a deployed position 122a (see FIG. 27A), via a door seal control system 124 (see FIG. 3), to seal around a perimeter 125 (see FIG. 3) of each of one or more vehicle doors 66, and to seal off the door cavity 132 (see FIG. 27A) having a door cavity volume 50b (see FIG. 3). The two or more door seals 122 (see FIGS. 22, 27A) are preferably controlled with the door seal control system 124 (see FIG. 3).

As discussed above, the plurality of seal elements 81 further comprise a first pressure barrier seal 87a (see FIGS. 22, 23A) and a second pressure barrier seal 87b (see FIGS. 22, 23A), each coupled to the interior 31a of the station wall 30. The first pressure barrier seal 87a is coupled to the interior 31a of the station wall 30 at a front area 472 (see FIG. 23A) in front of a forward end 72a (see FIG. 23A) of the vacuum transport tube vehicle 60, and the second pressure barrier seal 87*b* is coupled to the interior 31*a* of the station wall 30 at a back area 474 (see FIG. 23A) aft of, or behind, an aft end 72*b* (see FIG. 23A) of the vacuum transport tube vehicle 60, to seal off the one or more enclosed volume portions 402.

As discussed above, the plurality of seal elements 81 may further comprise one or more pressure seals 82 (see FIG. 22) coupled to the vacuum transport tube vehicle 60. The one or more pressure seals 82 coupled to the vacuum transport tube vehicle 60 (see FIG. 22) may be coupled at one or more of, a forward location 86 (see FIG. 2A) of the vacuum transport tube vehicle 60, and at an aft location 84 (see FIG. 2A) of the vacuum transport tube vehicle 60.

As shown in FIG. 46, the method 600 further comprises the step of activating 606 a volume reduction assembly 90 (see FIGS. 22, 23A-23C) of the vacuum volume reduction system 10*a*. The volume reduction assembly 90 comprises a fluid fill assembly 400 (see FIGS. 22, 23A-23C), coupled to the interior 31*a* of the station wall 30 of the vacuum tube vehicle station 12. As discussed above in detail, the fluid fill assembly 400 comprises one or more containers 406 (see FIGS. 22, 23A-23C) positioned under the vacuum tube vehicle station 12. Each of the one or more containers 406 contains the fluid 416 (see FIGS. 22, 23A-23C)'. The one or more containers 406 comprise one of, a fluid tank 408 (see FIGS. 22, 23A), a fluid reservoir 409 (see FIGS. 22, 23B), or another suitable container to hold the fluid 416.

The fluid fill assembly 400 further comprises one or more fluid transport members 420 (see FIGS. 22, 23A-23C). Each fluid transport member 420 has a first end 422*a* (see FIG. 23A) attached to a bottom portion 424 (see FIGS. 22, 23A), or bottommost portion, of the interior 31*a* of the station wall 30. Each fluid transport member 420 has a second end 422*b* (see FIG. 23A) disposed within one of the one or more containers 406. As shown in FIG. 22, the one or more fluid transport members 420 each comprise one of, a pipe 420*a*, a tube 420*b*, a hose 420*c*, a duct 420*d*, or another fluid transport member, to transport the fluid 416 from the one or more containers 406 to the one or more enclosed volume portions 402.

The fluid fill assembly 400 further comprises one or more fluid pump assemblies 434 (see FIGS. 22, 23A-23C) attached to the one or more fluid transport members 420. The fluid fill assembly 400 further comprises a control and power system 444 (see FIGS. 22, 23A-23C). As shown in FIG. 22, each of the one or more fluid pump assemblies 434 preferably comprises a fluid pump 436, a motor 438 coupled to the fluid pump 436, and a control valve 440 coupled to the fluid pump 436, to control a flow 442 of the fluid 416.

As shown in FIG. 46, the method 600 further comprises the step of pumping 608 the fluid 416, with the one or more fluid pump assemblies 434, from the one or more containers 406, through the one or more fluid transport members 420, and into the one or more enclosed volume portions 402. The step of pumping 608 the fluid 416, with the one or more fluid pump assemblies 434, further comprises, pumping the fluid 416 comprising one of, a diffusion pump (DP) oil 416*a*, a diffusion pump (DP) fluid 416*b*, a polyphenyl ether (PPE) fluid 416*c*, a polyphenyl ether (PPE) diffusion pump (DP) fluid 416*d*, a silicone diffusion pump (DP) oil 416*e*, a silicone fluid 416*f*, a silicone diffusion pump (DP) fluid 416*g*, a silicone bath fluid 416*h*, a perfluoropolyether (PFPE) diffusion pump (DP) oil 416*i*, a hydrocarbon diffusion pump fluid 416*j*, hydraulic oil 416*k*, mineral oil 416*l*, or another suitable fluid.

The step of pumping 608 the fluid 416, with the one or more fluid pump assemblies 434, from the one or more containers 406, through the one or more fluid transport members 420, and into the one or more enclosed volume portions 402, may further comprise, using a hybrid volume reduction assembly 90*c* (see FIGS. 22, 23C), by using the fluid fill assembly 400 to pump 608 the fluid 416 into the one or more enclosed volume portions 402 around a vehicle outer surface 80 (see FIG. 23C) of contour portions 75 (see FIG. 23C), such as a forward contour portion 75*a* (see FIG. 23C) at a forward end 72*a* (see FIG. 23C), and an aft contour portion 75*b* (see FIG. 23C) at an aft end 72*b* (see FIG. 23C) of the vacuum transport tube vehicle 60, and using a plurality of blocks 92 (see FIG. 23C) to engage around the vehicle outer surface 80 (see FIG. 23C) of a constant radius portion 74 (see FIG. 23C) of the vacuum transport tube vehicle 60. The plurality of blocks 92 are preferably installed in a plurality of cavities 40 (see FIG. 23C) longitudinally formed around a circumference 42 (see FIG. 2B) of a station vacuum tube 33 (see FIGS. 2A, 23C) disposed in the interior 31*a* of the station wall 30 of the vacuum tube vehicle station 12. The plurality of blocks 92 may be deployed via a control system 108 (see FIG. 3), to engage around the vehicle outer surface 80 of the constant radius portion 74 of the vacuum transport tube vehicle 60. Alternatively, the hybrid volume reduction assembly 90*c* may comprise an inflatable bladder 114 (see FIGS. 2D, 3) instead of the plurality of blocks 92.

As shown in FIG. 46, the method 600 further comprises the step of filling 610 the one or more enclosed volume portions 402 with the fluid 416, to reduce the volume 50, and to displace the volume 50 with the fluid 416, until the one or more enclosed volume portions 402 are in a filled state 404*a* (see FIG. 22) filled with the fluid 416.

As shown in FIG. 46, the method 600 further comprises the step of supplying 612 air 52 (see FIG. 22), such as ambient air 52*a* (see FIG. 22), or compressed air 52*b* (see FIG. 22), to a door cavity 132 positioned between each of one or more vehicle doors 66 of the vacuum transport tube vehicle 60 and each of one or more station doors 68 of the vacuum tube vehicle station 12, when the vacuum transport tube vehicle 60 is positioned or stopped at the vacuum tube vehicle station 12.

As shown in FIG. 46, the method 600 further comprises the step of opening 614 the one or more vehicle doors 66 and the one or more station doors 68, to load and unload one or more of, passengers 62 (see FIG. 32A), and cargo 64 (see FIG. 32A), through the one or more vehicle doors 66 and through the one or more station doors 68. The method 600 (see FIG. 46) further comprises the step of closing 616 the one or more vehicle doors 66 and the one or more station door 68. The method 600 (see FIG. 46) further comprises the step of evacuating 618 the air 52, such as the ambient air 52*a*, or the compressed air 52*b*, from the door cavity 132. The air 52, such as the ambient air 52*a*, or compressed air 52*b*, may be evacuated from the door cavity 132 with the vent-to-vacuum assembly 140 (see FIG. 23A), and after the air 52 is evacuated from the door cavity 132, the vent-to-vacuum assembly 140 is closed to a closed position 140*b* (see FIG. 34A).

As shown in FIG. 46, the method 600 further comprises the step of transporting 620 the fluid 416, with the fluid fill assembly 400, out of the one or more enclosed volume portions 402, through the one or more fluid transport members 420, and into the one or more containers 406, until the one or more enclosed volume portions 402 are in an unfilled state 404*b* (see FIG. 22), or emptied state, with no fluid 416.

As shown in FIG. 46, the method 600 further comprises the step of retracting 622 the plurality of seal elements 81 (see FIG. 22). The two or more door seals 122 are retracted from a deployed position 122a (see FIG. 37A) to a retracted position 122b (see FIG. 38A), via the door seal control system 124 (see FIG. 3).

The method 600 may further comprise, after the step of evacuating 618 the air 52 from the door cavity 132, and before the step of transporting 620 the fluid 416, the steps of further capturing any air 52, from an air leak 464, within one or more recessed areas 452, of the vacuum volume reduction system 10a, the one or more recessed areas 452 positioned at a top portion 426 (see FIGS. 22, 23A), or topmost portion, of the interior 31a of the station wall 30 of the vacuum tube vehicle station 12, and evacuating the air 52 from the air leak 464 out of the one or more recessed areas 452 to a vent-to-vacuum assembly 140 coupled to the one or more recessed areas 452, via one or more openings 470 (see FIGS. 22, 23A) in the station wall 30. Each of the one or more recessed areas 452 has a valve 454 (see FIGS. 22, 23A) configured to capture within the recessed area 452 any air 52 from the air leak 464, and has a vent 458 (see FIGS. 22, 23A) configured to evacuate the air 52 out of the recessed area 452 to the vent-to-vacuum assembly 140.

Disclosed embodiments of the vacuum volume reduction system 10a (see FIGS. 22, 23A-23C) and method 600 (see FIG. 46) of using the vacuum volume reduction system 10a, to reduce a volume 50 (see FIG. 22), under a vacuum 51 (see FIG. 22), and to displace the volume 50 with a fluid 416 (see FIG. 22), in a vacuum tube vehicle station 12 (see FIGS. 22, 23A-23C), provide another way to take up all of the volume 50 in a vacuum tube vehicle station 12, such as an enclosed volume portion 402, with fluid 416, so that there is no place for air 52 to go. When the fluid 416 is emptied, or drained, out of the enclosed volume portion 402 surrounding the exterior 79 (see FIG. 22) of the vacuum transport tube vehicle 60 positioned, or stopped, within the vacuum tube vehicle station 12, the vacuum 51 in the volume 50, such as the station volume 50c (see FIG. 22) is restored.

In addition, disclosed embodiments of the vacuum volume reduction system 10a (see FIGS. 22, 23A-23C) and method 600 (see FIG. 46) of using the vacuum volume reduction system 10a, to reduce a volume 50 (see FIG. 22), under a vacuum 51 (see FIG. 22), and to displace the volume 50 with a fluid 416 (see FIG. 22), in a vacuum tube vehicle station 12 (see FIGS. 22, 23A-23C), provide for a hybrid volume reduction assembly 90c (see FIGS. 22, 23C) that use both a fluid fill assembly 400 to fill enclosed volume portions 402 around a forward contour portion 75a (see FIG. 23C) and an aft contour portion 75b (see FIG. 23C) of the vacuum transport tube vehicle 60, and a plurality of blocks 92 or inflatable bladder 114 to surround a constant radius portion 74 (see FIG. 23C) of the vacuum transport tube vehicle 60. The fluid 416 may also be used to fill in any spaces or gaps between the plurality of blocks 92, so that all of the volume 50, such as the station volume 50c, is taken up by the fluid 416 and the plurality of blocks 92, or the inflatable bladder 114.

Moreover, disclosed embodiments of the vacuum volume reduction system 10a (see FIGS. 22, 23A-23C) and method 600 (see FIG. 46) of using the vacuum volume reduction system 10a, to reduce a volume 50 (see FIG. 22), under a vacuum 51 (see FIG. 22), and to displace the volume 50 with a fluid 416 (see FIG. 22), in a vacuum tube vehicle station 12 (see FIGS. 22, 23A-23C), provide a mechanism to evacuate air 52 from a possible air leak 464 (see FIG. 22) that may occur at the door seals 122 from air 52 at the door cavity 132, the station door 68, or the vehicle door 66, when the one or more enclosed volume portions 402 are filled with fluid 416 in a filled state 404a, either before or after the loading and unloading of passengers 62 and/or cargo 64 to and from the vacuum transport tube vehicle 60. If air 52 from an air leak 464 leaks into the fluid 416, the air 52, such as in the form of air bubbles 536 (see FIG. 41A, 42A), rises to the top, such as to the recessed areas 452, where the air 52, such as in the form of air bubbles 536, is captured and evacuated out of the enclosed volume portion 402 filled with fluid 416, before the fluid 416 is removed or drained out of the enclosed volume portion 402 with the fluid fill assembly 400.

What is claimed is:

1. A vacuum volume reduction system comprising:
a volume reduction assembly comprising a fluid fill assembly coupled to an interior of a station wall of a vacuum tube vehicle station, to reduce a volume, under a vacuum, in the vacuum tube vehicle station, when a vacuum transport tube vehicle is positioned in the volume at the vacuum tube vehicle station, the fluid fill assembly comprising:
one or more containers, each containing a fluid;
one or more fluid transport members, each having a first end attached to a bottom portion of the interior of the station wall, and each having a second end disposed within one of the one or more containers, the one or more fluid transport members configured to transport the fluid from the one or more containers to one or more enclosed volume portions formed between an exterior of the vacuum transport tube vehicle and the interior of the station wall, to reduce the volume, and to displace the volume with the fluid;
one or more fluid pump assemblies attached to the one or more fluid transport members, to pump the fluid from the one or more containers into the one or more enclosed volume portions; and
a control and power system;
one or more recessed areas positioned at a top portion of the interior of the station wall of the vacuum tube vehicle station;
a vent-to-vacuum assembly coupled to the one or more recessed areas, via one or more openings in the station wall;
a plurality of seal elements, to seal off the one or more enclosed volume portions during filling and unfilling of the one or more enclosed volume portions with the fluid; and an air supply assembly coupled to the station wall, and configured to supply air to a door cavity positioned between each of one or more vehicle doors of the vacuum transport tube vehicle and each of one or more station doors of the vacuum tube vehicle station, wherein the one or more vehicle doors and the one or more station doors are configured to open and close, to load and unload one or more of, passengers, and cargo, through the one or more vehicle doors and through the one or more station doors.

2. The vacuum volume reduction system of claim 1, further comprising a wetting prevention material applied to the exterior of the vacuum transport tube vehicle, and applied to the interior of the station wall, to prevent wetting of the exterior of the vacuum transport tube vehicle and to prevent wetting of the interior of the station wall.

3. The vacuum volume reduction system of claim 2, wherein the wetting prevention material comprises one of, a wax, a sealant, a ceramic coating, and a glaze.

4. The vacuum volume reduction system of claim 1, wherein the one or more containers are positioned under the vacuum tube vehicle station, and comprise one of, a fluid tank, and a fluid reservoir.

5. The vacuum volume reduction system of claim 1, wherein the fluid comprises one of, a diffusion pump oil, a diffusion pump fluid, a polyphenyl ether fluid, a polyphenyl ether diffusion pump fluid, a silicone diffusion pump oil, a silicone fluid, a silicone diffusion pump fluid, a silicone bath fluid, a perfluoropolyether (PFPE) diffusion pump oil, a hydrocarbon diffusion pump fluid, hydraulic oil, and mineral oil.

6. The vacuum volume reduction system of claim 1, wherein the one or more fluid transport members comprise one of, a pipe, a tube, a hose, and a duct.

7. The vacuum volume reduction system of claim 1, wherein each of the one or more fluid pump assemblies comprises a fluid pump, a motor coupled to the fluid pump, and a control valve coupled to the fluid pump, to control a flow of the fluid.

8. The vacuum volume reduction system of claim 1, wherein each of the one or more recessed areas has a valve configured to capture within each of the one or more recessed areas any air from an air leak, and has a vent configured to evacuate the air out of each of the one or more the recessed areas to the vent-to-vacuum assembly.

9. The vacuum volume reduction system of claim 1, wherein the plurality of seal elements comprise two or more door seals coupled to the interior of the station wall, and comprise a first pressure barrier seal and a second pressure barrier seal, each coupled to the interior of the station wall.

10. The vacuum volume reduction system of claim 9, wherein the two or more door seals are coupled to the interior of the station wall, to seal off the one or more enclosed volume portions from the one or more vehicle doors of the vacuum transport tube vehicle, from the one or more station doors located at the vacuum tube vehicle station, and from the door cavity between each of the one or more vehicle doors and each of the one or more station doors.

11. The vacuum volume reduction system of claim 9, wherein the first pressure barrier seal is coupled to the interior of the station wall at a front area in front of a forward end of the vacuum transport tube vehicle, and the second pressure barrier seal is coupled to the interior of the station wall at a back area in back of an aft end of the vacuum transport tube vehicle.

12. The vacuum volume reduction system of claim 1, further comprising a plurality of blocks installed in a plurality of cavities longitudinally formed around a circumference of a station vacuum tube disposed in the interior of the station wall of the vacuum tube vehicle station, the plurality of blocks configured to engage around a vehicle outer surface of a constant radius portion of the vacuum transport tube vehicle, and the fluid configured to fill the one or more enclosed volume portions around the vehicle outer surface of a forward contour portion and an aft contour portion of the vacuum transport tube vehicle.

13. A vacuum volume reduction system for reducing a volume, under a vacuum, and displacing the volume with a fluid, in a vacuum tube vehicle station, the vacuum volume reduction system comprising:
   a volume reduction assembly comprising a fluid fill assembly coupled to an interior of a station wall of the vacuum tube vehicle station, to reduce the volume, under the vacuum, in the vacuum tube vehicle station, when a vacuum transport tube vehicle is positioned in the volume at the vacuum tube vehicle station, the fluid fill assembly comprising:
      one or more containers positioned under the vacuum tube vehicle station, each container containing the fluid;
      one or more pipes, each having a first end attached to a bottom portion of the interior of the station wall, and each having a second end disposed within one of the one or more containers, the one or more pipes configured to transport the fluid from the one or more containers to one or more enclosed volume portions formed between an exterior of the vacuum transport tube vehicle and the interior of the station wall, to reduce the volume, and to displace the volume with the fluid;
      one or more fluid pump assemblies attached to the one or more pipes, to pump the fluid from the one or more containers into the one or more enclosed volume portions, each of the one or more fluid pump assemblies comprising a fluid pump, a motor coupled to the fluid pump, and a control valve coupled to the fluid pump, to control a flow of the fluid; and
      a control and power system;
   one or more recessed areas positioned at a top portion of the interior of the station wall of the vacuum tube vehicle station, each of the one or more recessed areas having a valve configured to capture within the recessed area any air from an air leak, and having a vent configured to evacuate the air out of the recessed area;
   a vent-to-vacuum assembly coupled to the one or more recessed areas, via one or more openings in an exterior of the station wall;
   a plurality of seal elements, to seal off the one or more enclosed volume portions; and an air supply assembly coupled to the station wall, and configured to supply air to a door cavity positioned between each of one or more vehicle doors of the vacuum transport tube vehicle and each of one or more station doors of the vacuum tube vehicle station, wherein the one or more vehicle doors and the one or more station doors are configured to open and close, to load and unload one or more of, passengers, and cargo, through the one or more vehicle doors and through the one or more station doors.

14. The vacuum volume reduction system of claim 13, further comprising a wetting prevention material applied to the exterior of the vacuum transport tube vehicle, and applied to the interior of the station wall, to prevent wetting of the exterior of the vacuum transport tube vehicle and the interior of the station wall, the wetting prevention material comprising one of, a wax, a sealant, a ceramic coating, and a glaze.

15. The vacuum volume reduction system of claim 13, wherein the fluid comprises one of, a diffusion pump oil, a diffusion pump fluid, a polyphenyl ether fluid, a polyphenyl ether diffusion pump fluid, a silicone diffusion pump oil, a silicone fluid, a silicone diffusion pump fluid, a silicone bath fluid, a perfluoropolyether (PFPE) diffusion pump oil, a hydrocarbon diffusion pump fluid, hydraulic oil, and mineral oil.

16. A method of using a vacuum volume reduction system, to reduce a volume, under a vacuum, and to displace the volume with a fluid, in a vacuum tube vehicle station, the method comprising the steps of:
   positioning a vacuum transport tube vehicle in the volume in the vacuum tube vehicle station;
   sealing off, with a plurality of seal elements of the vacuum volume reduction system, one or more enclosed volume portions, formed between an exterior of the vacuum transport tube vehicle and an interior of a station wall of the vacuum tube vehicle station;

activating a volume reduction assembly of the vacuum volume reduction system, the volume reduction assembly comprising a fluid fill assembly, coupled to the interior of the station wall of the vacuum tube vehicle station, the fluid fill assembly comprising:

one or more containers positioned under the vacuum tube vehicle station, each of the one or more containers containing the fluid;

one or more fluid transport members, each having a first end attached to a bottom portion of the interior of the station wall, and each having a second end disposed within one of the one or more containers;

one or more fluid pump assemblies attached to the one or more fluid transport members; and a control and power system;

pumping the fluid, with the one or more fluid pump assemblies, from the one or more containers, through the one or more fluid transport members, and into the one or more enclosed volume portions;

filling the one or more enclosed volume portions with the fluid, to reduce the volume, and to displace the volume with the fluid, until the one or more enclosed volume portions are in a filled state filled with the fluid;

supplying air to a door cavity positioned between each of one or more vehicle doors of the vacuum transport tube vehicle and each of one or more station doors of the vacuum tube vehicle station;

opening the one or more vehicle doors and the one or more station doors, to load and unload one or more of, passengers, and cargo, through the one or more vehicle doors and through the one or more station doors;

closing the one or more vehicle doors and the one or more station doors;

evacuating the air from the door cavity;

transporting the fluid, with the fluid fill assembly, out of the one or more enclosed volume portions, through the one or more fluid transport members, and into the one or more containers, until the one or more enclosed volume portions are in an unfilled state with no fluid; and retracting the plurality of seal elements.

17. The method of claim 16, further comprising prior to positioning the vacuum transport tube vehicle in the volume in the vacuum tube vehicle station, the step of applying a wetting prevention material to the exterior of the vacuum transport tube vehicle, and applied to the interior of the station wall, to prevent wetting of the exterior of the vacuum transport tube vehicle and to prevent wetting of the interior of the station wall, and wherein the wetting prevention material comprises one of, a wax, a sealant, a ceramic coating, and a glaze.

18. The method of claim 16, wherein pumping the fluid, with the one or more fluid pump assemblies, further comprises, pumping the fluid comprising one of, a diffusion pump oil, a diffusion pump fluid, a polyphenyl ether fluid, a polyphenyl ether diffusion pump fluid, a silicone diffusion pump oil, a silicone fluid, a silicone diffusion pump fluid, a silicone bath fluid, a perfluoropolyether (PFPE) diffusion pump oil, a hydrocarbon diffusion pump fluid, hydraulic oil, and mineral oil.

19. The method of claim 16, wherein pumping the fluid, with the one or more fluid pump assemblies, into the one or more enclosed volume portions, further comprises pumping the fluid into the one or more enclosed volume portions around a vehicle outer surface of contour portions at a forward end and at an aft end of the vacuum transport tube vehicle, and using a plurality of blocks to engage around the vehicle outer surface of a constant radius portion of the vacuum transport tube vehicle, the plurality of blocks installed in a plurality of cavities longitudinally formed around a circumference of a station vacuum tube disposed in the interior of the station wall of the vacuum tube vehicle station.

20. The method of claim 16, wherein after evacuating the air from the door cavity, and before transporting the fluid, further capturing any air from an air leak, within one or more recessed areas, of the vacuum volume reduction system, positioned at a top portion of the interior of the station wall of the vacuum tube vehicle station, and evacuating the air, from the air leak, out of the one or more recessed areas to a vent-to-vacuum assembly coupled to the one or more recessed areas, via one or more openings in the station wall.

21. The vacuum volume reduction system of claim 1, wherein the fluid has a density in a range of from 0.8 grams per milliliter to 1.9 grams per milliliter at a temperature from 20 degrees Celsius to 25 degrees Celsius.

22. The vacuum volume reduction system of claim 13, wherein the plurality of seal elements comprise two or more door seals coupled to the interior of the station wall, and comprise a first pressure barrier seal and a second pressure barrier seal, each coupled to the interior of the station wall.

23. The vacuum volume reduction system of claim 22, wherein the two or more door seals are coupled to the interior of the station wall, to seal off the one or more enclosed volume portions from one or more vehicle doors of the vacuum transport tube vehicle, from one or more station doors located at the vacuum tube vehicle station, and from a door cavity between each of the one or more vehicle doors and each of the one or more station doors.

24. The vacuum volume reduction system of claim 22, wherein the first pressure barrier seal is coupled to the interior of the station wall at a front area in front of a forward end of the vacuum transport tube vehicle, and the second pressure barrier seal is coupled to the interior of the station wall at a back area in back of an aft end of the vacuum transport tube vehicle.

25. The vacuum volume reduction system of claim 13, further comprising a plurality of blocks installed in a plurality of cavities longitudinally formed around a circumference of a station vacuum tube disposed in the interior of the station wall of the vacuum tube vehicle station, the plurality of blocks configured to engage around a vehicle outer surface of a constant radius portion of the vacuum transport tube vehicle, and the fluid configured to fill the one or more enclosed volume portions around the vehicle outer surface of a forward contour portion and an aft contour portion of the vacuum transport tube vehicle.

* * * * *